United States Patent
Redmond et al.

(10) Patent No.: US 10,849,287 B2
(45) Date of Patent: *Dec. 1, 2020

(54) USER INTERFACE FOR A SENSOR-BASED INTERFACE DEVICE FOR INTERRUPTING AN IRRIGATION CONTROLLER

(71) Applicant: Rain Bird Corporation, Azusa, CA (US)

(72) Inventors: David M. Redmond, Scottsdale, AZ (US); Michael J. Tennyson, Sonora, CA (US); Randall A. Hern, San Diego, CA (US); Gerald E. Peterson, Riverside, CA (US); David G. Fern, Santee, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,672

(22) Filed: Dec. 21, 2018

(65) Prior Publication Data

US 2019/0141920 A1 May 16, 2019

Related U.S. Application Data

(63) Continuation of application No. 14/830,600, filed on Aug. 19, 2015, now Pat. No. 10,206,342, which is a
(Continued)

(51) Int. Cl.
*G05B 19/042* (2006.01)
*A01G 25/16* (2006.01)

(52) U.S. Cl.
CPC ......... *A01G 25/167* (2013.01); *G05B 19/042* (2013.01); *G05B 2219/2625* (2013.01)

(58) Field of Classification Search
CPC ................ A01G 25/167; G05B 19/042; G05B 2219/2625

See application file for complete search history.

(56) References Cited

U.S. PATENT DOCUMENTS

| | | |
|---|---|---|
| D127,348 S | 5/1941 | Gayda |
| D153,568 S | 4/1949 | Wagner |
| (Continued) | | |

FOREIGN PATENT DOCUMENTS

| | | |
|---|---|---|
| DE | 237456 A3 | 7/1986 |
| EP | 2883034 B1 | 6/2015 |
| (Continued) | | |

OTHER PUBLICATIONS

U.S. Appl. No. 10/206,342, filed Feb. 19, 2019, David M. Redmond.
(Continued)

*Primary Examiner* — Christopher E. Everett
(74) *Attorney, Agent, or Firm* — Fitch, Even, Tabin & Flannery LLP

(57) ABSTRACT

Some embodiments provide an interface unit interfacing with an irrigation controller, comprising: a housing; a controller configured to instruct an interruption of a watering schedule executed by the irrigation controller, the interruption based on one or both of sensed temperature and sensed rainfall amount, and based on one or both of user entered temperature and rainfall threshold parameters; a switching device coupled with the controller, and configured to cause the interruption in response to signaling from the controller; and a user interface comprising: a plurality of user input devices configured to provide signaling to the controller based upon user's engagement, and configured to allow the user to define the temperature and rainfall threshold parameters; and a user display comprising a display screen; wherein the controller is configured to cause the display screen to display a plurality of pictorial representations that
(Continued)

in combination convey whether irrigation is being interrupted.

21 Claims, 57 Drawing Sheets

Related U.S. Application Data continuation of application No. 13/277,224, filed on Oct. 20, 2011, now Pat. No. 9,144,204, which is a continuation-in-part of application No. 13/113,900, filed on May 23, 2011, now abandoned, which is a continuation of application No. 11/766,092, filed on Jun. 20, 2007, now Pat. No. 7,949,433.

(60) Provisional application No. 61/405,119, filed on Oct. 20, 2010, provisional application No. 61/428,151, filed on Dec. 29, 2010, provisional application No. 60/866,595, filed on Nov. 20, 2006, provisional application No. 60/805,331, filed on Jun. 20, 2006.

(56) References Cited

U.S. PATENT DOCUMENTS

| | | |
|---|---|---|
| 2,688,056 A | 8/1954 | Kettering |
| 2,776,860 A | 1/1957 | Griffis |
| 2,991,938 A | 7/1961 | Norcross |
| 3,127,769 A | 4/1964 | Stucky |
| 3,243,999 A | 4/1966 | Barker |
| 3,297,254 A | 1/1967 | Coffman |
| 3,309,474 A | 3/1967 | Heinrich |
| 3,485,096 A | 12/1969 | Miller |
| 3,705,533 A | 12/1972 | Guidi |
| 3,721,122 A | 3/1973 | Lucas |
| 3,808,385 A | 4/1974 | Klinefelter |
| 3,943,762 A | 3/1976 | Baer |
| 4,012,673 A | 3/1977 | Saarem |
| 4,022,384 A | 5/1977 | Hoyle |
| 4,064,507 A | 12/1977 | Schmitz |
| 4,209,131 A | 6/1980 | Barash |
| 4,264,902 A | 4/1981 | Miller |
| 4,313,042 A | 1/1982 | Ehrhart |
| 4,394,603 A | 7/1983 | Widmayer |
| D270,272 S | 8/1983 | Steele |
| 4,396,149 A | 8/1983 | Hirsch |
| D276,039 S | 10/1984 | Tanaka |
| 4,613,764 A | 9/1986 | Lobato |
| 4,644,786 A | 2/1987 | Jacobsen |
| 4,655,076 A | 4/1987 | Weihe |
| 4,684,920 A | 8/1987 | Reiter |
| 4,701,613 A | 10/1987 | Watanabe |
| 4,718,185 A | 1/1988 | Conlin |
| 4,760,547 A | 7/1988 | Duxbury |
| 4,817,875 A | 4/1989 | Karmeli |
| 4,862,701 A | 9/1989 | Small |
| 4,916,642 A | 4/1990 | Kaiser |
| 4,919,165 A | 4/1990 | Lloyd |
| 4,921,001 A | 5/1990 | Pittsinger |
| 4,922,433 A | 5/1990 | Mark |
| 4,987,296 A | 1/1991 | Kajioka |
| D316,875 S | 5/1991 | Momot |
| 5,060,859 A | 10/1991 | Bancroft |
| 5,087,886 A | 2/1992 | Mann |
| 5,101,083 A | 3/1992 | Tyler |
| 5,104,045 A | 4/1992 | Kah |
| 5,109,482 A | 4/1992 | Bohrman |
| D328,763 S | 8/1992 | Laviana |
| 5,193,570 A | 3/1993 | Mott |
| 5,207,380 A | 5/1993 | Harryman |
| 5,299,742 A | 4/1994 | Han |
| 5,321,578 A | 6/1994 | Morrison |
| 5,329,081 A | 7/1994 | Jones |
| 5,333,785 A | 8/1994 | Dodds |
| 5,355,122 A | 10/1994 | Erickson |
| 5,367,627 A | 11/1994 | Johnson |
| 5,375,617 A | 12/1994 | Young |
| 5,381,331 A | 1/1995 | Mock |
| 5,394,748 A | 3/1995 | McCarthy |
| 5,401,262 A | 3/1995 | Karwoski |
| 5,424,649 A | 6/1995 | Gluck |
| 5,444,611 A | 8/1995 | Woytowitz |
| 5,465,904 A | 11/1995 | Vaello |
| 5,499,024 A | 3/1996 | Germanton |
| D368,493 S | 4/1996 | Boes |
| 5,526,982 A | 6/1996 | McKenzie |
| 5,554,809 A | 9/1996 | Tobita |
| 5,568,385 A | 10/1996 | Shelton |
| 5,598,977 A | 2/1997 | Lemme |
| 5,640,176 A | 6/1997 | Mundt |
| D388,424 S | 12/1997 | DeMuro |
| 5,696,671 A | 12/1997 | Oliver |
| 5,727,950 A | 3/1998 | Cook |
| 5,740,038 A | 4/1998 | Hergert |
| 5,813,606 A | 9/1998 | Ziff |
| D399,837 S | 10/1998 | Garguilo |
| 5,818,734 A | 10/1998 | Albright |
| 5,821,864 A | 10/1998 | Knop |
| D400,522 S | 11/1998 | Waldner |
| 5,836,339 A | 11/1998 | Klever |
| 5,839,660 A | 11/1998 | Morgenstern |
| D402,645 S | 12/1998 | Garguilo |
| 5,853,122 A | 12/1998 | Caprio |
| 5,870,302 A | 2/1999 | Oliver |
| 5,886,697 A | 3/1999 | Naughton |
| D407,656 S | 4/1999 | Klever |
| 5,905,480 A | 5/1999 | Palalau |
| 5,918,276 A | 6/1999 | Grindle |
| 5,921,280 A | 7/1999 | Ericksen |
| 5,925,986 A | 7/1999 | Moisin |
| D415,134 S | 10/1999 | Culp |
| 6,005,517 A | 12/1999 | Friedrichs |
| 6,016,971 A | 1/2000 | Welch |
| 6,038,920 A | 3/2000 | Gilbert |
| 6,076,740 A | 6/2000 | Townsend |
| 6,088,621 A | 7/2000 | Woytowitz |
| 6,126,093 A | 10/2000 | Grether |
| 6,145,755 A | 11/2000 | Feltz |
| D437,859 S | 2/2001 | Alvarez |
| 6,210,383 B1 | 4/2001 | Want |
| D441,764 S | 5/2001 | Minagawa |
| 6,260,765 B1 | 7/2001 | Natale |
| 6,300,728 B1 | 10/2001 | Blackburn |
| 6,314,340 B1 | 11/2001 | Mecham |
| 6,369,712 B2 | 4/2002 | Letkomiller |
| 6,401,530 B1 | 6/2002 | Roman |
| 6,427,535 B1 | 8/2002 | Sakai |
| 6,452,499 B1 | 9/2002 | Runge |
| 6,453,216 B1 | 9/2002 | McCabe |
| D466,519 S | 12/2002 | Shim |
| D469,107 S | 1/2003 | Miller |
| D473,239 S | 4/2003 | Cockerill |
| D473,240 S | 4/2003 | Cockerill |
| 6,570,109 B2 | 5/2003 | Klinefelter |
| 6,585,168 B1 | 7/2003 | Caprio |
| 6,714,134 B2 | 3/2004 | Addink |
| 6,721,630 B1 | 4/2004 | Woytowitz |
| 6,782,310 B2 | 8/2004 | Bailey |
| 6,782,311 B2 | 8/2004 | Barlow |
| D496,667 S | 9/2004 | Hoglund |
| 6,823,239 B2 | 11/2004 | Sieminski |
| D503,178 S | 3/2005 | Choi |
| 6,892,114 B1 | 5/2005 | Addink |
| 6,895,987 B2 | 5/2005 | Addink |
| 6,977,351 B1 | 12/2005 | Woytowitz |
| 7,003,357 B1 | 2/2006 | Kreikemeier |
| 7,010,394 B1 | 3/2006 | Runge |
| 7,010,395 B1 | 3/2006 | Goldberg |
| 7,050,887 B2 | 5/2006 | Alvarez |
| 7,058,478 B2 | 6/2006 | Alexanian |
| D526,657 S | 8/2006 | Matsumoto |
| 7,096,094 B2 | 8/2006 | Addink |
| 7,111,179 B1 | 9/2006 | Girson |
| 7,123,993 B1 | 10/2006 | Freeman |

(56) References Cited

U.S. PATENT DOCUMENTS

| | | |
|---|---|---|
| 7,177,728 B2 | 2/2007 | Gardner |
| 7,198,393 B2 | 4/2007 | Tubidis |
| 7,216,659 B2 | 5/2007 | Caamano |
| 7,229,026 B2 | 6/2007 | Evelyn-Veere |
| 7,236,249 B1 | 6/2007 | Michenfelder |
| 7,245,991 B1 | 7/2007 | Woytowitz |
| 7,266,428 B2 | 9/2007 | Alexanian |
| 7,286,904 B2 | 10/2007 | Graham |
| 7,339,957 B2 | 3/2008 | Hitt |
| 7,363,113 B2 | 4/2008 | Runge |
| 7,386,289 B2 | 6/2008 | Weller |
| 7,403,840 B2 | 7/2008 | Moore |
| 7,412,303 B1 | 8/2008 | Porter |
| D587,278 S | 2/2009 | Sans |
| 7,494,070 B2 | 2/2009 | Collins |
| 7,516,002 B2 | 4/2009 | Veerasamy |
| 7,526,365 B1 | 4/2009 | French |
| D592,222 S | 5/2009 | Chaudhri |
| 7,532,954 B2 | 5/2009 | Evelyn-Veere |
| 7,552,632 B2 | 6/2009 | Runge |
| D599,816 S | 9/2009 | Kaczmarek |
| D600,704 S | 9/2009 | LaManna |
| D600,713 S | 9/2009 | LaManna |
| D600,714 S | 9/2009 | LaManna |
| 7,590,471 B2 | 9/2009 | Jacobsen |
| 7,596,429 B2 | 9/2009 | Cardinal |
| D601,578 S | 10/2009 | Poulet |
| D602,496 S | 10/2009 | Takano |
| D602,944 S | 10/2009 | Barkhouse |
| 7,613,546 B2 | 11/2009 | Nelson |
| D608,789 S | 1/2010 | Kaczmarek |
| 7,654,684 B1 | 2/2010 | Wight |
| D623,194 S | 9/2010 | Cook |
| 7,805,221 B2 | 9/2010 | Nickerson |
| D625,622 S | 10/2010 | Mallela |
| 7,844,368 B2 | 11/2010 | Alexanian |
| 7,853,363 B1 | 12/2010 | Porter |
| 7,877,168 B1 | 1/2011 | Porter |
| 7,912,588 B2 | 3/2011 | Runge |
| 7,949,433 B2 | 5/2011 | Hern |
| 7,962,245 B2 | 6/2011 | Runge |
| 8,160,750 B2 | 4/2012 | Weiler |
| 8,209,061 B2 | 6/2012 | Palmer |
| 8,215,570 B2 | 7/2012 | Hitt |
| 8,301,309 B1 | 10/2012 | Woytoxitz |
| 8,538,592 B2 | 9/2013 | Alexanian |
| 8,548,632 B1 | 10/2013 | Porter |
| 8,606,415 B1 | 12/2013 | Woytowitz |
| 8,660,705 B2 | 2/2014 | Woytowitz |
| 8,924,032 B2 | 3/2014 | Woytowitz |
| 8,733,165 B2 | 5/2014 | Hern |
| 8,862,275 B2 | 10/2014 | Runge |
| 9,144,204 B2 | 9/2015 | Redmond |
| 9,301,460 B2 | 4/2016 | Runge |
| 9,301,461 B2 | 4/2016 | Woytowitz |
| 9,500,770 B2 | 11/2016 | Hern |
| 9,763,393 B2 | 9/2017 | Parsons |
| 9,781,887 B2 | 10/2017 | Woytowitz |
| 10,123,493 B2 | 11/2018 | Runge |
| 10,345,487 B2 | 7/2019 | Hern |
| 16,573,834 | 9/2019 | Weiler |
| 10,444,769 B2 | 10/2019 | Weiler |
| 2001/0049563 A1 | 12/2001 | Addink |
| 2002/0026284 A1 | 2/2002 | Brown |
| 2002/0029111 A1 | 3/2002 | Peek |
| 2002/0060631 A1 | 5/2002 | Runge |
| 2003/0079974 A1 | 5/2003 | Klinefelter |
| 2003/0085929 A1 | 5/2003 | Huber |
| 2003/0117321 A1 | 6/2003 | Furse |
| 2004/0011880 A1 | 1/2004 | Addink |
| 2004/0039489 A1 | 2/2004 | Moore |
| 2004/0100394 A1 | 5/2004 | Hitt |
| 2004/0113106 A1 | 6/2004 | Pyun |
| 2004/0140903 A1 | 7/2004 | Buhler |
| 2004/0206395 A1 | 10/2004 | Addink |
| 2004/0217189 A1 | 11/2004 | Regli |
| 2004/0244833 A1 | 12/2004 | Buhler |
| 2005/0046372 A1 | 3/2005 | Heo |
| 2005/0082382 A1 | 4/2005 | Evelyn-Veere |
| 2005/0107924 A1 | 5/2005 | Bailey |
| 2005/0171646 A1 | 8/2005 | Miller |
| 2005/0192710 A1 | 9/2005 | Thornton |
| 2005/0199842 A1 | 9/2005 | Parsons |
| 2005/0206530 A1 | 9/2005 | Cumming |
| 2005/0216130 A1 | 9/2005 | Clark |
| 2006/0049271 A1 | 3/2006 | Hitt |
| 2006/0100747 A1 | 5/2006 | Runge |
| 2006/0118200 A1 | 6/2006 | Nies |
| 2006/0122736 A1 | 6/2006 | Alexanian |
| 2006/0155489 A1 | 7/2006 | Addink |
| 2006/0161309 A1 | 7/2006 | Moore |
| 2006/0172714 A1 | 8/2006 | Weller |
| 2006/0184285 A1 | 8/2006 | Evelyn-Veere |
| 2006/0202051 A1 | 9/2006 | Parsons |
| 2006/0293797 A1 | 12/2006 | Weiler |
| 2007/0010915 A1 | 1/2007 | Burson |
| 2007/0132599 A1 | 6/2007 | DuFaux |
| 2007/0162201 A1 | 7/2007 | Veerasamy |
| 2007/0191991 A1 | 8/2007 | Addink |
| 2007/0293990 A1 | 12/2007 | Alexanain |
| 2008/0027586 A1 | 1/2008 | Hern |
| 2008/0034859 A1 | 2/2008 | Runge |
| 2008/0129495 A1 | 6/2008 | Hitt |
| 2008/0249664 A1 | 10/2008 | Runge |
| 2008/0251602 A1 | 10/2008 | Leggett |
| 2008/0288116 A1 | 11/2008 | Nickerson |
| 2008/0295883 A1 | 12/2008 | Ducellier |
| 2009/0001193 A1 | 1/2009 | Parsons |
| 2009/0007706 A1 | 1/2009 | Hitt |
| 2009/0083656 A1 | 3/2009 | Dukhon |
| 2009/0177330 A1 | 7/2009 | Kah |
| 2009/0179165 A1 | 7/2009 | Parsons |
| 2009/0271044 A1 | 10/2009 | Bangalore |
| 2009/0284598 A1 | 11/2009 | Busch |
| 2010/0030389 A1 | 2/2010 | Palmer |
| 2010/0030476 A1 | 2/2010 | Woytowitz |
| 2010/0092107 A1 | 4/2010 | Mochizuki |
| 2010/0222932 A1 | 9/2010 | O'Connor |
| 2010/0263248 A1 | 10/2010 | Stadjuhar |
| 2010/0306012 A1 | 12/2010 | Zyskowski |
| 2011/0093123 A1 | 4/2011 | Alexanian |
| 2011/0224836 A1 | 9/2011 | Hern |
| 2011/0238227 A1 | 9/2011 | Hern |
| 2011/0238228 A1 | 9/2011 | Woytowitz |
| 2011/0238229 A1 | 9/2011 | Woytowitz |
| 2011/0288775 A1 | 11/2011 | Woytowitz |
| 2012/0041607 A1 | 2/2012 | Woytowitz |
| 2012/0072037 A1 | 3/2012 | Alexanian |
| 2012/0089259 A1 | 4/2012 | Williams |
| 2012/0215366 A1 | 8/2012 | Redmond |
| 2012/0221154 A1 | 8/2012 | Runge |
| 2012/0229284 A1 | 9/2012 | Hern |
| 2013/0110293 A1 | 5/2013 | Illig |
| 2013/0253714 A1 | 9/2013 | Williams |
| 2013/0269798 A1 | 10/2013 | Wood |
| 2014/0027539 A1 | 1/2014 | Kim |
| 2014/0039697 A1 | 2/2014 | Weiler |
| 2014/0081471 A1 | 3/2014 | Woytowitz |
| 2014/0148959 A1 | 5/2014 | Levine |
| 2014/0172180 A1 | 6/2014 | Woytowitz |
| 2014/0224008 A1 | 8/2014 | Hern |
| 2015/0032274 A1 | 1/2015 | Runge |
| 2015/0112494 A1 | 4/2015 | Woytowitz |
| 2016/0198645 A1 | 7/2016 | Weatherill |
| 2017/0038497 A1 | 2/2017 | Hern |
| 2018/0303049 A1 | 10/2018 | Weiler |
| 2018/0307253 A1 | 10/2018 | Weiler |
| 2019/0020054 A1 | 1/2019 | Kawase |
| 2019/0141920 A1 | 5/2019 | Redmond |
| 2019/0200547 A1 | 7/2019 | Marsano |

(56) References Cited

U.S. PATENT DOCUMENTS

| | | | |
|---|---|---|---|
| 2019/0278004 | A1 | 9/2019 | Hern |
| 2020/0012299 | A1 | 1/2020 | Weiler |

FOREIGN PATENT DOCUMENTS

| | | | |
|---|---|---|---|
| GB | 1498545 | | 1/1978 |
| GB | 2412735 | A | 10/2005 |
| JP | H02196990 | A | 8/1990 |
| WO | 9727733 | | 8/1997 |
| WO | 1999039567 | | 8/1999 |
| WO | 030760 | | 6/2000 |
| WO | 0227109 | A1 | 4/2002 |
| WO | 0227419 | A1 | 4/2002 |
| WO | 02086546 | A1 | 10/2002 |
| WO | 03038539 | A1 | 5/2003 |
| WO | 03041874 | A1 | 5/2003 |
| WO | 2004005628 | | 1/2004 |
| WO | 2004052560 | A2 | 6/2004 |

OTHER PUBLICATIONS

U.S. Appl. No. 12/855,615, filed Aug. 12, 2010, Thomas H. Runge.
U.S. Appl. No. 13/113,900, filed May 23, 2011, Randall A. Hern.
U.S. Appl. No. 13/151,269, filed Jun. 1, 2011, Randall A. Hern.
U.S. Appl. No. 13/479,111, filed May 23, 2012, Randall A. Hern.
U.S. Appl. No. 60/421,613, filed Oct. 24, 2002, Thomas H. Runge.
U.S. Appl. No. 60/805,331, filed Jun. 20, 2006, David M. Redmond.
U.S. Appl. No. 60/866,595, filed Nov. 20, 2006, David G. Fern.
U.S. Appl. No. 61/405,119, filed Oct. 20, 2010, Randall A. Hern.
U.S. Appl. No. 61/428,151, filed Dec. 29, 2010, Randall A. Hern.
"Presenting the Wireless RainSensor for Irrigation Systems" brochure, R&D Engineering, 2000. Printed from archive.org dated May 2001.
"R&D Engineering Wireless Rain Sensor Products", archive from May 2001 of http://www.rainsensor.com/productsl.htm.
Davis Instruments, Wireless and Cabled Weather Systems, Vantage Pro Catalog, 2 pages, Dec. 2004.
Dukes et al., Residential Irrigation System Rainfall Shutoff Devices, University of Florida IFAS Extension, 4 pages, Aug. 2002.
EPO; App. No. 07798852.5; Extended European Search Report dated Aug. 1, 2012.
European Patent Office, Extended European Search Report issued in Application No. 13768209.2, dated Nov. 24, 2015, 10 pp.
Graphic art Materials Reference Manual, Letraset, 1981, pp. 217 and 220.
Hunter Industries, 'Mini-Clik, The world's most simple, accurate, rugged, and reliable rain sensors', http://hunterindustries.com/Products/Sensors/miniclikintro.html, Mar. 2006, p. 1, Hunter Industries Incorporated, San Marcos, CA.
Hunter Industries, 'Rain-Clik, The reliable rain sensor with instant shut-off', http://hunterindustries.com/Products/Sensors/rainclikintro html, Apr. 2007, p. 1, Hunter Industries Incorporated, San Marcos, CA.
Hunter Industries; "Wireless Solar Sync Owner's Manual and Programming Instructions"; Oct. 12, 2008, San Marcos, CA, published at http://web.archive.Org/web/20081012080937/http://www.hunterindustries.com.
Hunter TM Wireless Rain-Clik(TM), 2 pages, Mar. 2006.
Hunter, Owner's Manual and Installation Instructions, 'WRC Wireless Rain-Clik(TM) Sensors', published at least on or before Dec. 31, 2005, 20 pages, Hunter Industries Incorporated, San Marcos, California.
Hunter, Solar Sync Owner's Manual and Programming Instructions, Dec. 2009, San Marcos, CA published at http://web.archive.org/web/20120502050544/http://www.hunterindustries.com/sites/default/files/OM_SolarSync_DOM.pdf.
Iconfactory : Freeware : iPhonica vol. 2, [online] Jan. 30, 2007 [retrieved on Apr. 4, 2007]. Retrieved from the Internet <URL: http://iconfactory.com/freeware/preview/iph2>.
Iconfactory : Freeware : NewtCons, [online] Jun. 1, 1999 [retrieved on Apr. 4, 2007]. Retrieved from the Internet <URL: http://iconfactory.com/freeware/preview/nwtc>.
Iconfactory : Freeware : Winter Wonderland, [online] Dec. 23, 2003 [retrieved on Apr. 4, 2007]. Retrieved from the Internet <URL: http://iconfactory.com/freeware/preview/wwld>.
InterfaceLIFT: Microsoft Windows Icons (by date), [online] Dec. 24, 2006 [retrieved on Apr. 4, 2007]. Retrieved from the Internet <URL: http://interfacelift.com/icons-win/>.
Logo Lounge, by Catharine Fishel and Bill Gardner, Rockport Publishers, Gloucester, MA 2003, p. 340.
PCT; App. No. PCT/US07/71713; International Preliminary Report on Patentability dated Dec. 22, 2008.
PCT; App. No. PCT/US07/71713; International Search Report dated Jul. 16, 2008.
PCT; App. No. PCT/US07/71713; Written Opinion dated Jul. 16, 2008.
R & D Engineering, Inc.; "The Wireless RainSensor Installation Guide"; published at http://web.archive.org/web/20010604063747/http://rainsensor.com/images/instr.pdf; Jun. 4, 2001; pp. 1-8; R & D Engineering, Inc.
R&D Engineering, Inc., New Plus+ Model Catalog, 2 pages, 2002.
Rain Bird, Central Computer Control System, Maxicom, 'Landscape Irrigation Products, 1993-1994 Catalog', Cover page and pp. 98-99, US.
Rain Bird, Central Control System, Maxicom, Feb. 1993, 19 pages; Rain Bird Sales, Inc.; US.
Rain Bird, Central Control System, Maxicom, Jun. 1994, Cover page and pp. 2-8, Rain Bird Sales, Inc., US.
Rain Bird, Components of the Maxicom System, Feb. 9, 1994, p. 3.2, Section 3, US.
Rain Bird, Maxicom Guide to Operations, Oct. 1, 1994, Chapter 7, Rain Bird Corporation, Glendora, CA.
Rain Bird; ET Manager Series, Installation and Operation Manual; Apr. 2007; 80 pages; Rain Bird Corporation; Tucson, AZ.
Rainbird Corporation, 'RSD Series Rain Sensor', http://www.rainbird.com/landscape/products/controllers/rsd.htm, Dec. 2007, pp. 1-2, Rainbird Corporation, Tucson, AZ.
Signs and Symbols: Their Design and Meaning, by Adrian Frutiger, Watson-Guptill Publications, New York, NY, 1978 Part 1, 1979 Part 2, 1981 Part 3, p. 356.
Symbol Source Book, by Henry Dreyfuss, Van Nostrand Reinhold Company, New York, NY, 1972, pp. 27, 35, and 160.
Toro, User's Guide, "Wireless Rain Sensor Series Rain Sensor, Model TWRS and Rain/Freeze Sensor, Model TWRFS", published at least on or before Dec. 31, 2005, 28 pages, The Toro Company, Irrigation Division.
Toro; "TMC-424 Series Turf Catalog"; 2008; pp. 88-89; The Toro Company, Riverside, CA.
Trenholm et al., "How to Calibrate Your Sprinkler System", University of Florida IFAS Extension, 2 pages, Jan. 2001.
U.S. Appl. No. 60/421,613, filed Oct. 24, 2012, Runge, priority claimed in U.S. Pat. No. 7,010,394.
U.S. Appl. No. 60/805,331, filed Jun. 20, 2006, Redmond, priority claimed in U.S. Pat. No. 7,949,433 and priority to the present application, U.S. Appl. No. 14/830,600.
U.S. Appl. No. 60/866,595, filed Nov. 20, 2006, Fern, priority claimed in U.S. Pat. No. 7,949,433 and priority to the present application, U.S. Appl. No. 14/830,600.
U.S. Appl. No. 61/405,119, filed Oct. 20, 2010, Hem, priority claimed in U.S. Pat. No. 9,144,204 and priority to the present application, U.S. Appl. No. 14/830,600.
U.S. Appl. No. 61/428,151, filed Dec. 29, 2010, Hem, priority claimed in U.S. Pat. No. 9,144,204 and priority to the present application, U.S. Appl. No. 14/830,600.
U.S. Appl. No. 14/036,881; Office Action dated Dec. 9, 2015.
U.S. Appl. No. 13/277,224; Notice of Allowance dated May 21, 2015.
U.S. Appl. No. 11/766,092; Interview Summary and Notice of Allowability dated Feb. 11, 2011.
U.S. Appl. No. 11/766,092; Interview Summary dated Dec. 15, 2010.

(56) References Cited

OTHER PUBLICATIONS

U.S. Appl. No. 11/766,092; Notice of Allowance dated Jan. 13, 2011.
U.S. Appl. No. 11/766,092; Office Action dated Jan. 5, 2009.
U.S. Appl. No. 11/766,092; Office Action dated Jun. 23, 2008.
U.S. Appl. No. 11/766,092; Office Action dated Jul. 8, 2010.
U.S. Appl. No. 11/766,092; Office Action dated Sep. 17, 2009.
U.S. Appl. No. 12/104,937; Notice of Allowability and Interview Summary dated Feb. 11, 2011.
U.S. Appl. No. 12/104,937; Office Action dated Jul. 13, 2010.
U.S. Appl. No. 12/104,937; Office Action dated Nov. 17, 2010.
U.S. Appl. No. 12/104,937; Office Action dated Dec. 8, 2009.
U.S. Appl. No. 12/855,615; Notice of Allowance dated Mar. 2, 2011.
U.S. Appl. No. 12/855,615; Office Action dated Nov. 17, 2010.
U.S. Appl. No. 13/113,900; Office Action dated Feb. 29, 2012.
U.S. Appl. No. 13/113,900; Office Action dated Oct. 11, 2013.
U.S. Appl. No. 13/113,900; Office Action dated Nov. 9, 2012.
U.S. Appl. No. 13/151,269; Applicant-Initiated Interview Summary dated Feb. 14, 2012.
U.S. Appl. No. 13/151,269; Applicant-Initiated Interview Summary dated Sep. 27, 2011.
U.S. Appl. No. 13/151,269; Examiner Interview Summary dated Sep. 11, 2012.
U.S. Appl. No. 13/151,269; Office Action dated Jan. 18, 2012.
U.S. Appl. No. 13/151,269; Office Action dated Jan. 23, 2017; (pp. 1-51).
U.S. Appl. No. 13/151,269; Office Action dated Jan. 23, 2018; (pp. 1-39).
U.S. Appl. No. 13/151,269; Office Action dated Feb. 18, 2015.
U.S. Appl. No. 13/151,269; Office Action dated May 6, 2014.
U.S. Appl. No. 13/151,269; Office Action dated Jun. 17, 2016.
U.S. Appl. No. 13/151,269; Office Action dated Oct. 23, 2013.
U.S. Appl. No. 13/151,269; Office Action dated Oct. 31, 2018; (pp. 1-42).
U.S. Appl. No. 13/151,269; Office Action dated Nov. 6, 2012.
U.S. Appl. No. 13/151,269; Office Action dated Nov. 19, 2015.
U.S. Appl. No. 13/277,224, Office Action dated Jan. 16, 2015.
U.S. Appl. No. 13/277,224; Office Action dated Mar. 27, 2014.
U.S. Appl. No. 13/277,224; Office Action dated Jul. 17, 2014.
U.S. Appl. No. 13/479,111; Notice of Allowance dated Jan. 15, 2014.
U.S. Appl. No. 13/479,111; Restriction Requirement dated Oct. 21, 2013.
U.S. Appl. No. 14/253,716, Notice of Allowance dated Jul. 15, 2016; (pp. 1-6).
U.S. Appl. No. 14/253,716; Office Action dated Jan. 28, 2016.
U.S. Appl. No. 14/830,600; Advisory Action dated Aug. 23, 2018; (pp. 1-3).
U.S. Appl. No. 14/830,600; Notice of Allowance dated Sep. 26, 2018; (pp. 1-11).
U.S. Appl. No. 14/830,600; Office Action dated May 31, 2018; (pp. 1-46).
U.S. Appl. No. 14/830,600; Office Action dated Oct. 18, 2017; (pp. 1-32).
U.S. Appl. No. 15/331,565; Notice of Allowance dated Feb. 26, 2019; (pp. 1-5).
U.S. Appl. No. 15/331,565; Office Action dated Nov. 1, 2018; (pp. 1-6).
U.S. Appl. No. 15/495,726; Office Action dated Jan. 24, 2019; (pp. 1-14).
U.S. Appl. No. 15/495,726; Office Action dated Sep. 4, 2018; (pp. 1-28).
U.S. Appl. No. 13/151,269; Office Action dated Jan. 7, 2020.
U.S. Appl. No. 13/151,269; Office Action dated May 15, 2019.
U.S. Appl. No. 15/495,726; Notice of Allowance dated Jun. 3, 2019.
U.S. Appl. No. 15/791,160; Notice of Allowance dated Jan. 9, 2020.
U.S. Appl. No. 15/791,160; Notice of Allowance dated Apr. 20, 2020, (pp. 1-7).
U.S. Appl. No. 15/791,160; Office Action dated Mar. 28, 2019.
U.S. Appl. No. 16/422,281; Notice of Allowance dated Mar. 23, 2020.
U.S. Appl. No. 16/422,281; Office Action dated Nov. 29, 2019.

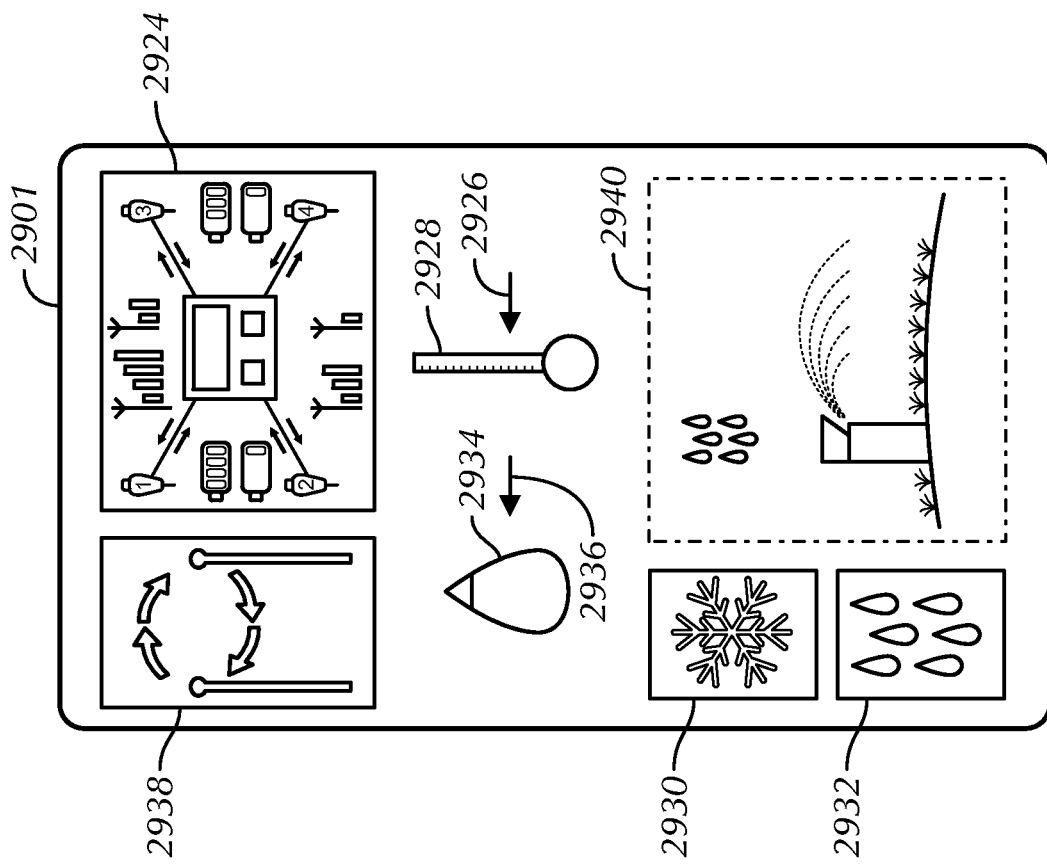
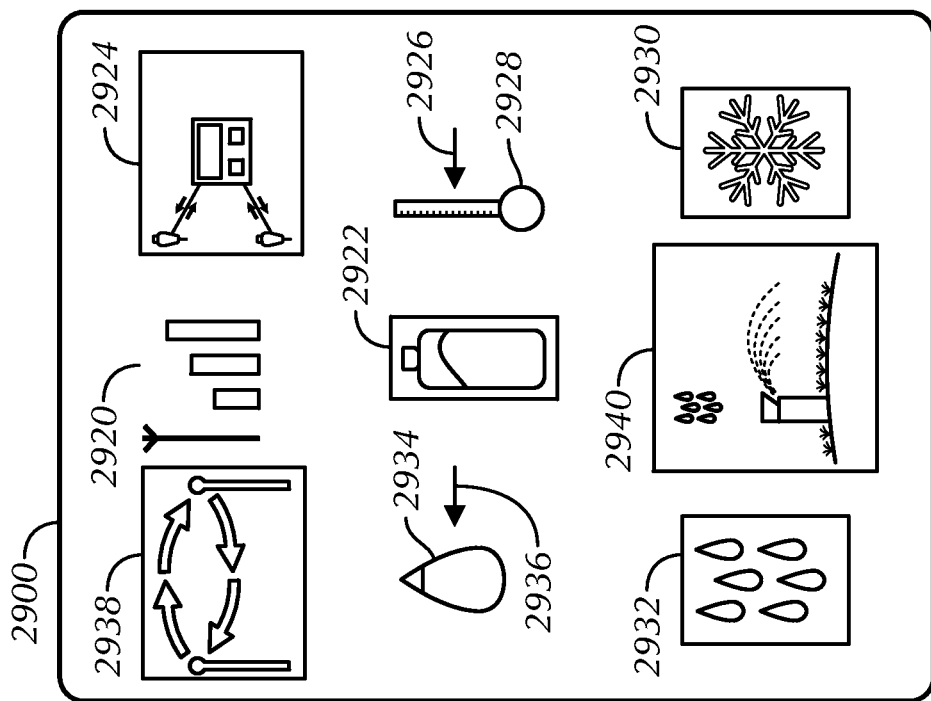
FIG. 29B
FIG. 29A

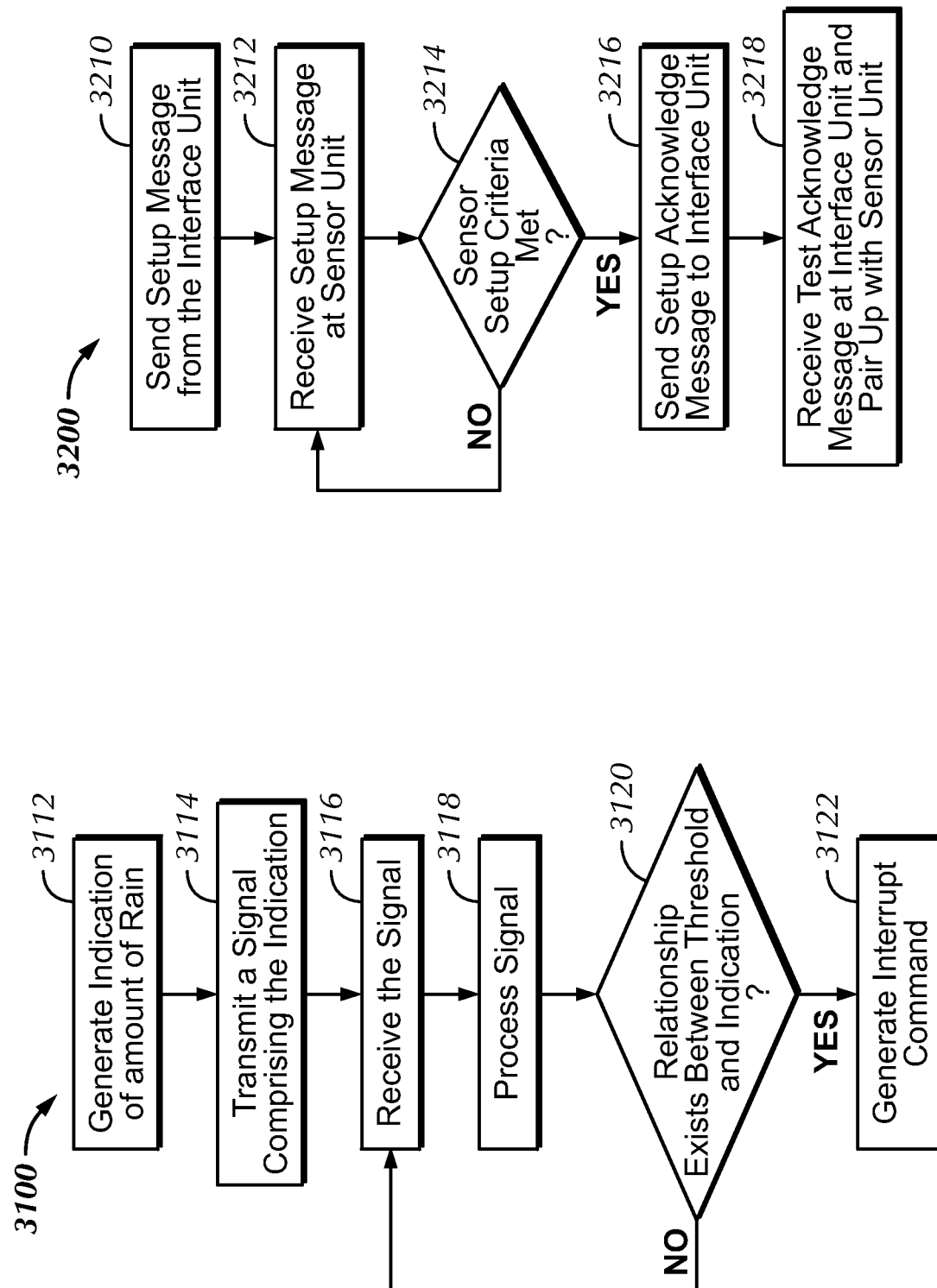

*4300*

| Signal | Interface Display | Sensor LED |
|---|---|---|
| EXCELLENT Install | ▫▫▫▫ | Four blinks, Pause |
| GOOD Install | ▫▫▫ | Three blinks, Pause |
| FAIR Do NOT install | ▫▫ | Two blinks, Pause |
| POOR Do NOT install | ▫ | One blinks, Pause |
| NO SIGNAL Do NOT install | | No blinks |

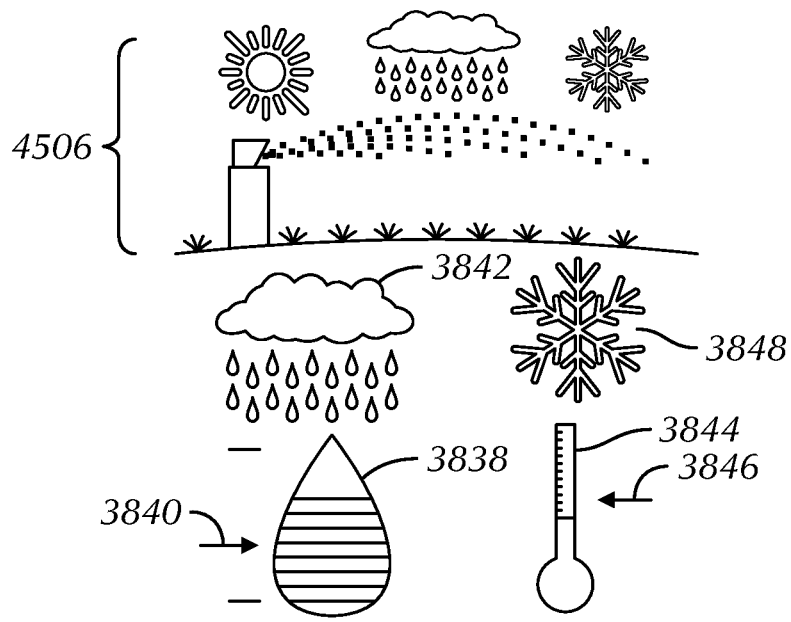
FIG. 52
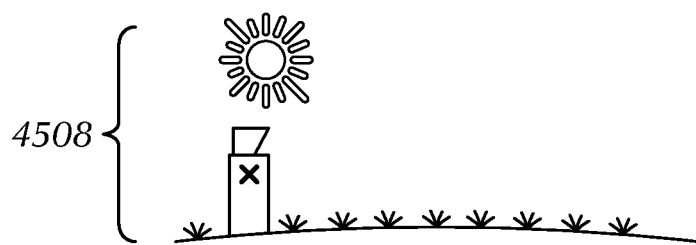
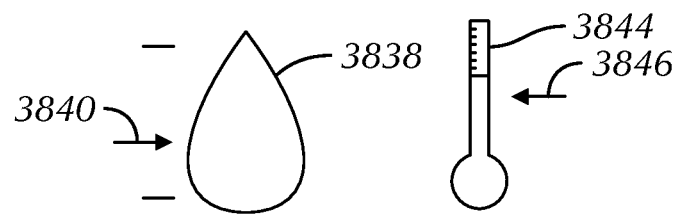
FIG. 53

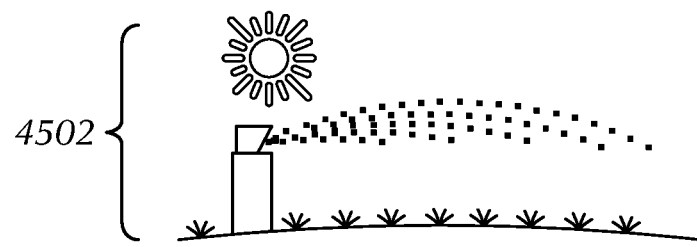
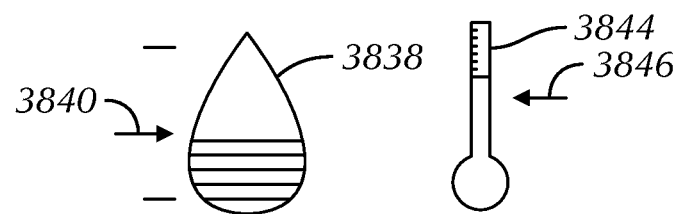
FIG. 56
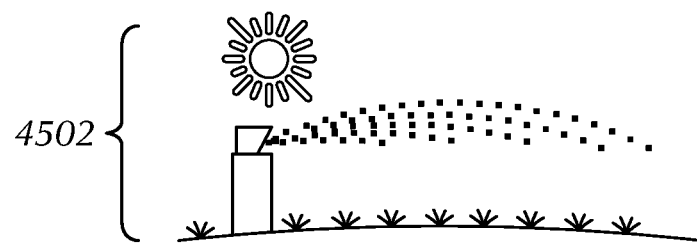
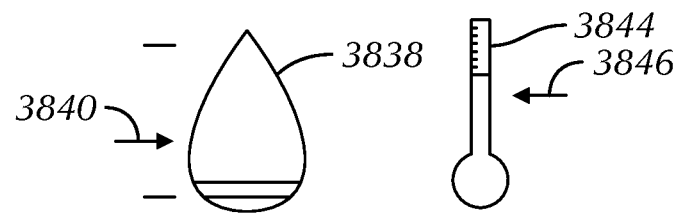
FIG. 57

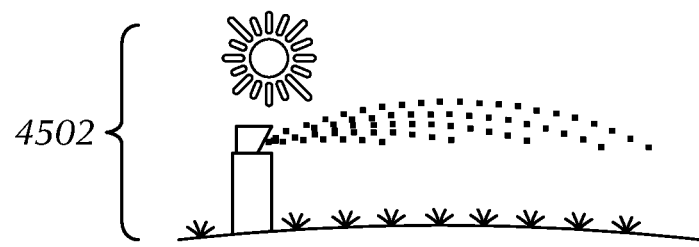
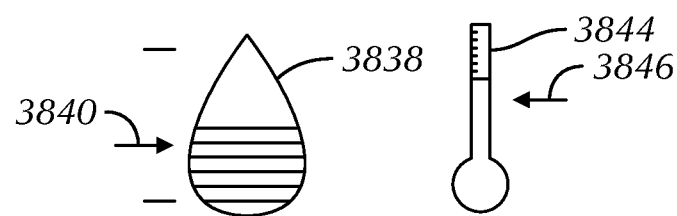
FIG. 62
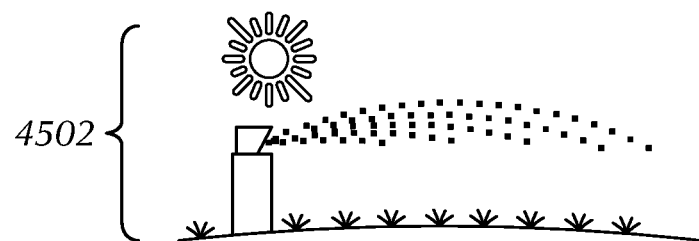
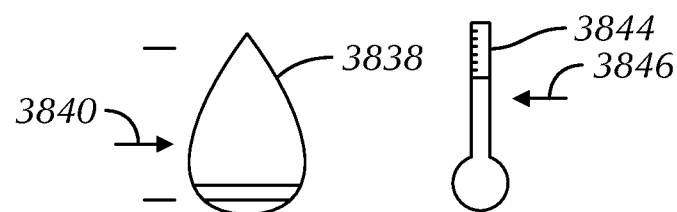
FIG. 63

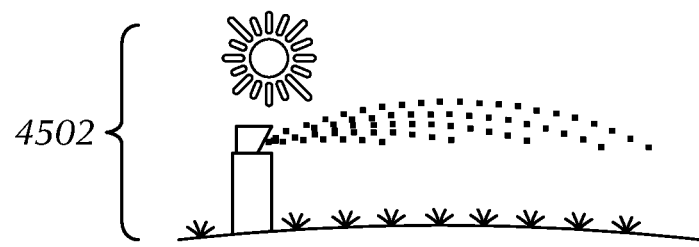
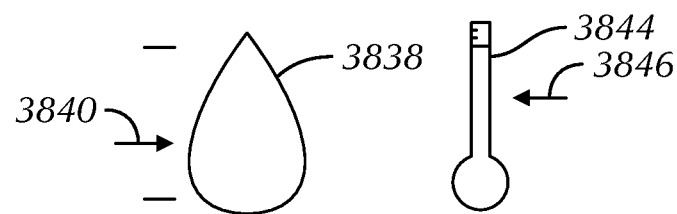
FIG. 64
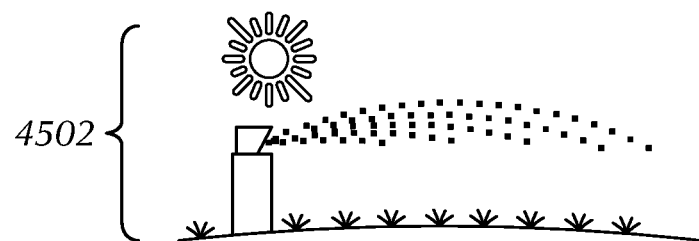
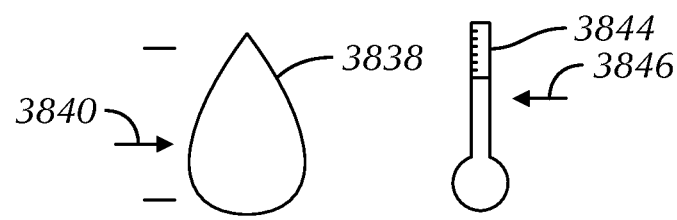
FIG. 65

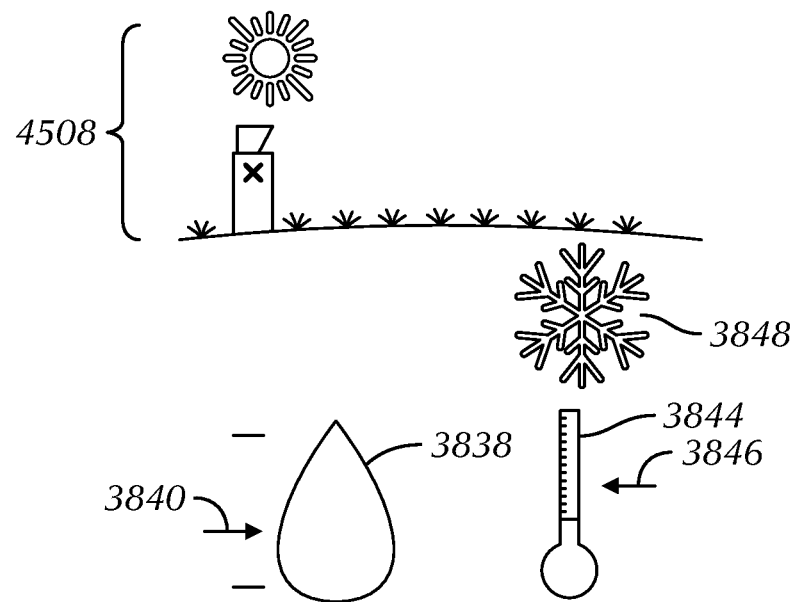
FIG. 68
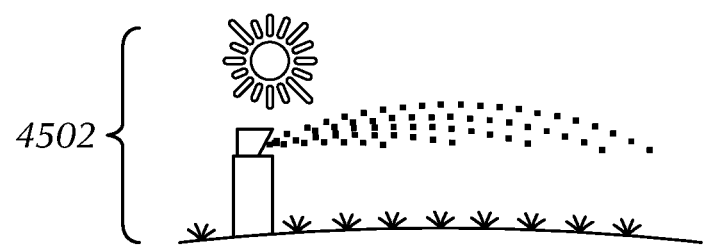
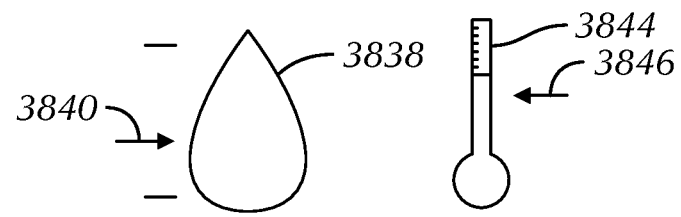
FIG. 69

USER INTERFACE FOR A SENSOR-BASED INTERFACE DEVICE FOR INTERRUPTING AN IRRIGATION CONTROLLER

This application is a continuation of U.S. application Ser. No. 14/830,600, filed Aug. 19, 2015, which is a continuation of U.S. application Ser. No. 13/277,224, filed Oct. 20, 2011, for Randall A. Hem et al., entitled USER INTERFACE FOR A SENSOR-BASED INTERFACE DEVICE FOR INTERRUPTING AN IRRIGATION CONTROLLER, now U.S. Pat. No. 9,144,204, which claims the benefit of U.S. Provisional Application No. 61/405,119, filed Oct. 20, 2010, for Randall A. Hem et al., entitled USER INTERFACE FOR A SENSOR-BASED INTERFACE DEVICE FOR INTERRUPTING AN IRRIGATION CONTROLLER; claims the benefit of U.S. Provisional Application No. 61/428,151, filed Dec. 29, 2010, for Randal A. Hem et al., entitled USER INTERFACE FOR A SENSOR-BASED INTERFACE DEVICE FOR INTERRUPTING AN IRRIGATION CONTROLLER; and is a continuation-in-part of U.S. application Ser. No. 13/113,900 filed May 23, 2011, for Randall A. Hem et al., entitled SENSOR DEVICE FOR INTERRUPTING IRRIGATION, which is a continuation of U.S. application Ser. No. 11/766,092, filed Jun. 20, 2007, for Randall A. Hem et al., entitled SENSOR DEVICE FOR INTERRUPTING IRRIGATION, now U.S. Pat. No. 7,949,433, which claims the benefit of U.S. Provisional Application No. 60/866,595, filed Nov. 20, 2006, entitled WIRELESS SENSOR FOR INTERRUPTING IRRIGATION and U.S. Provisional Application No. 60/805,331, filed Jun. 20, 2006, entitled RAIN SENSOR DEVICE AND METHOD FOR INTERRUPTING WATERING OF AN IRRIGATION CONTROLLER, all of which are incorporated in their entirety herein by reference.

BACKGROUND OF THE INVENTION

1. Field of the Invention

The present invention relates generally to the controlling of the execution of a watering program by an irrigation controller.

2. Discussion of the Related Art

Rain sensors for use in the interruption of programmed watering schedules of an irrigation controller are generally known to include a material that is responsive to rain, and in the event a preset level of rain is exceeded, a switch is activated which outputs a signal to the irrigation controller that causes the controller to cease the execution of watering schedules.

U.S. Pat. No. 6,452,499 to Runge et al. (which is incorporated herein by reference) describes a wireless rain sensor that uses a hygroscopic material that expands when exposed to water. When the hygroscopic material expands beyond a specified point or threshold, an integrated transmitter wirelessly transmits a radio frequency signal to a receiver attached to the controller. The receiver receives the wireless signal and causes the controller to cease watering. Similarly, U.S. Pat. No. 6,977,351 to Woytowitz (which is incorporated herein by reference) describes a wireless rain sensor including a hygroscopic material that is not mechanically connected to the switch that triggers the transmission of the wireless signal that will cause the interruption of watering. The threshold level may be adjusted by a user through the mechanical adjustment of the distance the hygroscopic material must expand before actuating the switch, such as described in U.S. Pat. No. 6,570,109 to Klinefelter et al (which is incorporated herein by reference). Thus, in order to exceed a selectable threshold, the hygroscopic material must expand a selectable distance, which corresponds to a selectable level of rain fall.

SUMMARY OF THE INVENTION

Several embodiments of the invention advantageously address the needs above as well as other needs by providing an interface unit interfacing with an irrigation controller, the interface unit comprising: a housing; a controller within the housing, where the controller is configured in part to determine whether an interruption of one or more watering schedules executed by the irrigation controller, which is separate from the interface unit, should occur and to output signaling to instruct the interruption, the interruption based at least on a sensed rainfall accumulation amount and a user set rainfall threshold parameter; a switching device coupled with the controller, and configured to cause the interruption in response to the signaling from the controller; and a user interface integrated with the housing and comprising: a plurality of user input devices coupled to the controller and configured to provide signaling to the controller based upon a user's engagement therewith, the plurality of user input devices configured to allow the user to set and adjust at least the user set rainfall threshold parameter; and a user display comprising a display screen and coupled to the controller and configured to display one or more pictorial representations; wherein the controller is configured to cause the display screen to display a plurality of pictorial representations that in combination convey to the user the sensed rainfall accumulation amount, the user set rainfall threshold parameter and whether irrigation is being interrupted.

Some embodiments can be characterized as methods for use in irrigation control, comprising: receiving a user set and adjustable rainfall threshold at a user interface integrated with an interface device, the interface device configured to cause interruption of one or more watering schedules executed by a separate irrigation controller; receiving at the interface device, from a remote sensor unit, sensed rainfall information; and displaying, at the interface device, multiple pictorial representations corresponding to the sensed rainfall information and the user set and adjustable rainfall threshold such that a state of interrupting irrigation based at least on a relationship between the sensed rainfall information and the user set and adjustable rainfall threshold is conveyed.

Further, some embodiments provide an interface unit interfacing with an irrigation controller, the interface unit comprising: a housing; a controller within the housing, where the controller is configured in part to determine whether an interruption of one or more watering schedules executed by the irrigation controller, which is separate from the interface unit, should occur and to output signaling to instruct the interruption, the interruption based at least on a sensed rainfall accumulation amount and a user set rainfall threshold parameter; a switching device coupled with the controller, and configured to cause the interruption in response to the signaling from the controller; and a user interface integrated with the housing and comprising: a plurality of user input devices coupled to the controller and configured to provide signaling to the controller based upon a user's engagement therewith, the plurality of user input devices configured to allow the user to set and adjust at least the user set rainfall threshold parameter; and a user display comprising a display screen and coupled to the controller and configured to display one or more pictorial representations; wherein the controller is configured to cause the display screen to display a plurality of pictorial representations that in combination convey to the user a mode of operation and whether irrigation is being interrupted.

Additionally, some embodiments provide a method used in controlling irrigation, comprising: receiving, through a user interface of an interface unit, a user set and adjustable rainfall threshold parameter, the interface unit configured to interrupt one or more watering schedules executed by an irrigation controller, which is separate from the interface unit; receiving, at the interface unit and from a sensor unit that is separate from the interface unit, a sensed rainfall accumulation amount; and displaying, on a display of the interface unit, multiple pictorial representations that in combination convey to a user a mode of operation and whether irrigation is being interrupted based at least on a relationship between the user set and adjustable rainfall threshold parameter and the sensed rainfall accumulation amount.

BRIEF DESCRIPTION OF THE DRAWINGS

The above and other aspects, features and advantages of several embodiments of the present invention will be more apparent from the following more particular description thereof, presented in conjunction with the following drawings.

FIG. 29A is another embodiment of the interface unit of the rain sensor device of FIG. 4 illustrating user inputs and display outputs.

FIG. 29B is another embodiment of the interface unit of the rain sensor device of FIG. 4 illustrating user inputs and display outputs.

FIG. 31 illustrates a simplified flow diagram of one embodiment of the overall operation of the rain sensor system 10.

FIG. 32 illustrates a simplified flow diagram of one embodiment of a process for installing and pairing the interface unit and the sensor unit of FIGS. 1 and 2 together.

FIGS. 50-53 illustrate one embodiment of the display outputs of the user interface of FIG. 38 depicting the interaction between the irrigation mode display area and the sensor data and thresholds display area as various irrigation modes are implemented.

FIGS. 54-57 illustrate one embodiment of the display outputs of the user interface of FIG. 38 during a light rain.

FIGS. 58-63 illustrate one embodiment of the display outputs of the user interface of FIG. 38 during a heavy rain.

FIGS. 64-69 illustrate one embodiment of the display outputs of the user interface of FIG. 38 during a low temperature condition.

Figure 1:
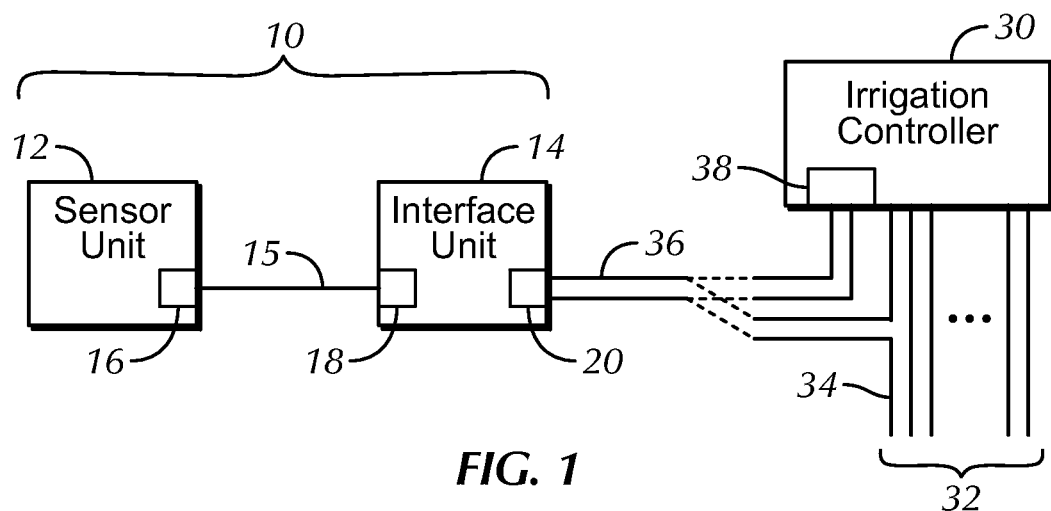
FIG. 1 is a diagram of a rain sensor device for interrupting execution of one or more watering schedules of an irrigation controller according to several embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Referring first to FIG. 1, a diagram is shown of a rain sensor system 10 for interrupting execution of one or more watering schedules of an irrigation controller 30 according to several embodiments. The rain sensor system 10 includes a sensor unit 12 having a first input/output unit 16 and an interface unit or system 14 having a second input/output unit 18. The first input/output unit 16 and the second input/output unit 18 are coupled to each other by a communication link 15. The interface unit 14 is coupled to an irrigation controller 30 (either directly to the controller via an interface 38, e.g., a rain sensor input, a common line connection point or other such interface or input to the irrigation controller 30, or indirectly, e.g., coupled to the controller activation or output lines 32 or a common line 34, as illustrated in dashed lines). Alternatively, in some embodiments, the interface unit may be implemented as a part of the irrigation controller. For example, in one embodiment, the interface unit may be implemented as a module that may be inserted into a modular irrigation controller. The irrigation controller 30 is programmed to execute one or more watering schedules. In one form, the irrigation controller 30 may output activation signals (e.g., 24 volt power signals) to respective ones of a plurality of activation lines 32, each coupled to a valve located in the region to be irrigated, an electrical switch to activate or deactivate lighting or other devices controlled by the controller 30. As is well known, one or more sprinkler devices, drip lines and/or other irrigation devices may be coupled to each valve.

The sensor unit 12 is typically located remotely from the interface unit 14 in a position where it is exposed to rainfall. For example, the sensor unit 12 may be mounted to a rooftop, light pole, or telephone pole. In some embodiments the sensor unit 12 periodically obtains measurements of parameters such as amount of rain fall, and/or precipitation, temperature, and/or other parameters, and transmits the information to the interface unit 14. The interface unit 14 receives the data from the sensor unit and processes it to determine whether to inhibit or interrupt irrigation. Additionally or alternatively, in some embodiments, the sensor unit may initiate transmission to the interface unit 14 once it detects a change in some atmospheric parameters, e.g., amount of rain fall and/or temperature, and sends an update message to the interface unit. In one embodiment, the message may include the amount of rain fall, temperature, battery strength, signal strength and/or other data available at the sensor unit.

In some embodiments, once the interface unit 14 detects the beginning of an irrigation cycle, it is instructed and/or is activated to communicate with the sensor unit 12 to request information regarding measurement parameters, such as but not limited to precipitation data, temperature and/or other such parameters. In one embodiment, the sensor unit 12 receives the request, obtains the requested measurement data and transmits the information to the interface unit 14. In some implementations, the interface unit 14 receives instructions from the irrigation controller 30 requesting the interface unit 14 to transmit a request to the sensor unit 12 requesting the measurement data.

In some embodiments, the interface unit 14 is located remotely from the sensor unit 12 and proximate to the irrigation controller 30 in a location that is, in some implementations, accessible to the user. The interface unit is also coupled to the irrigation controller 30 (either directly or indirectly). In some embodiments the interface unit may be implemented as a part of the irrigation controller and located on the irrigation controller. In one embodiment, for example, the interface unit may be implemented as a module that may be inserted into a modular irrigation controller.

Figure 34:
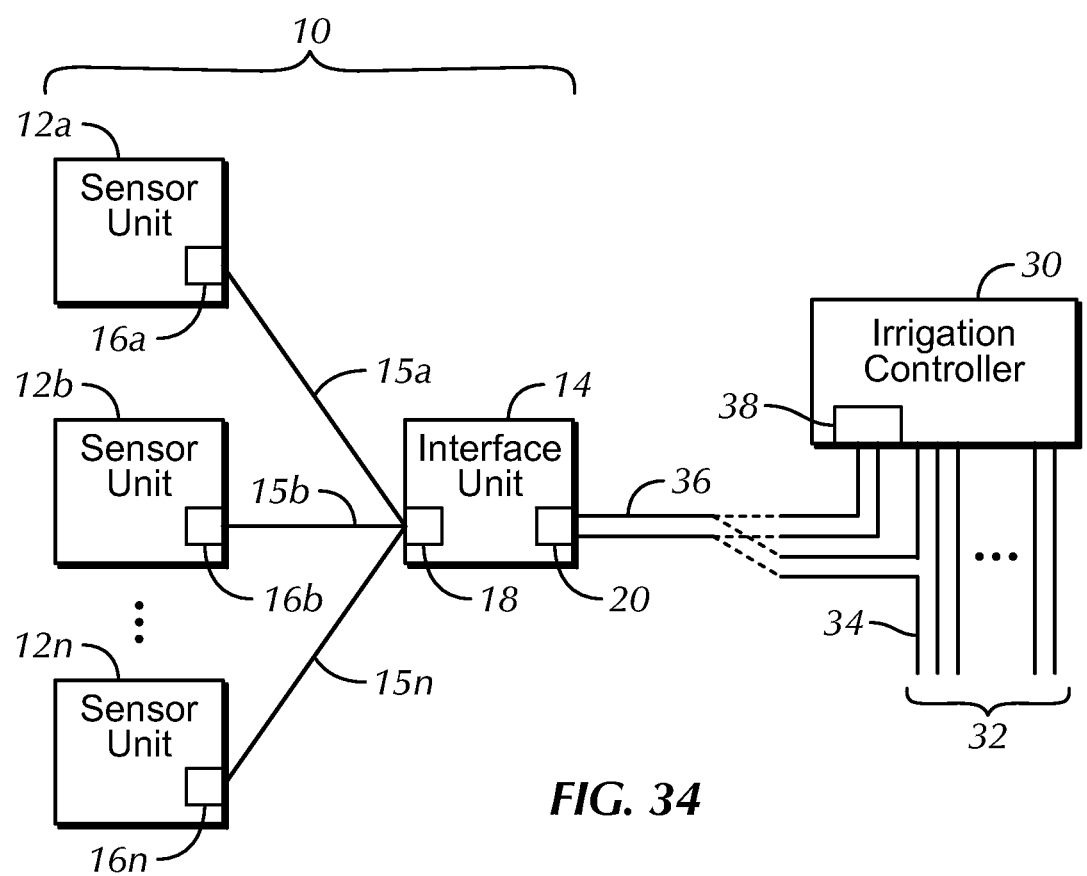
FIG. 34 illustrates a rain sensor system in which an interface unit is paired and communicates with n sensor units 12a-n according to some embodiments.
Figure 35:
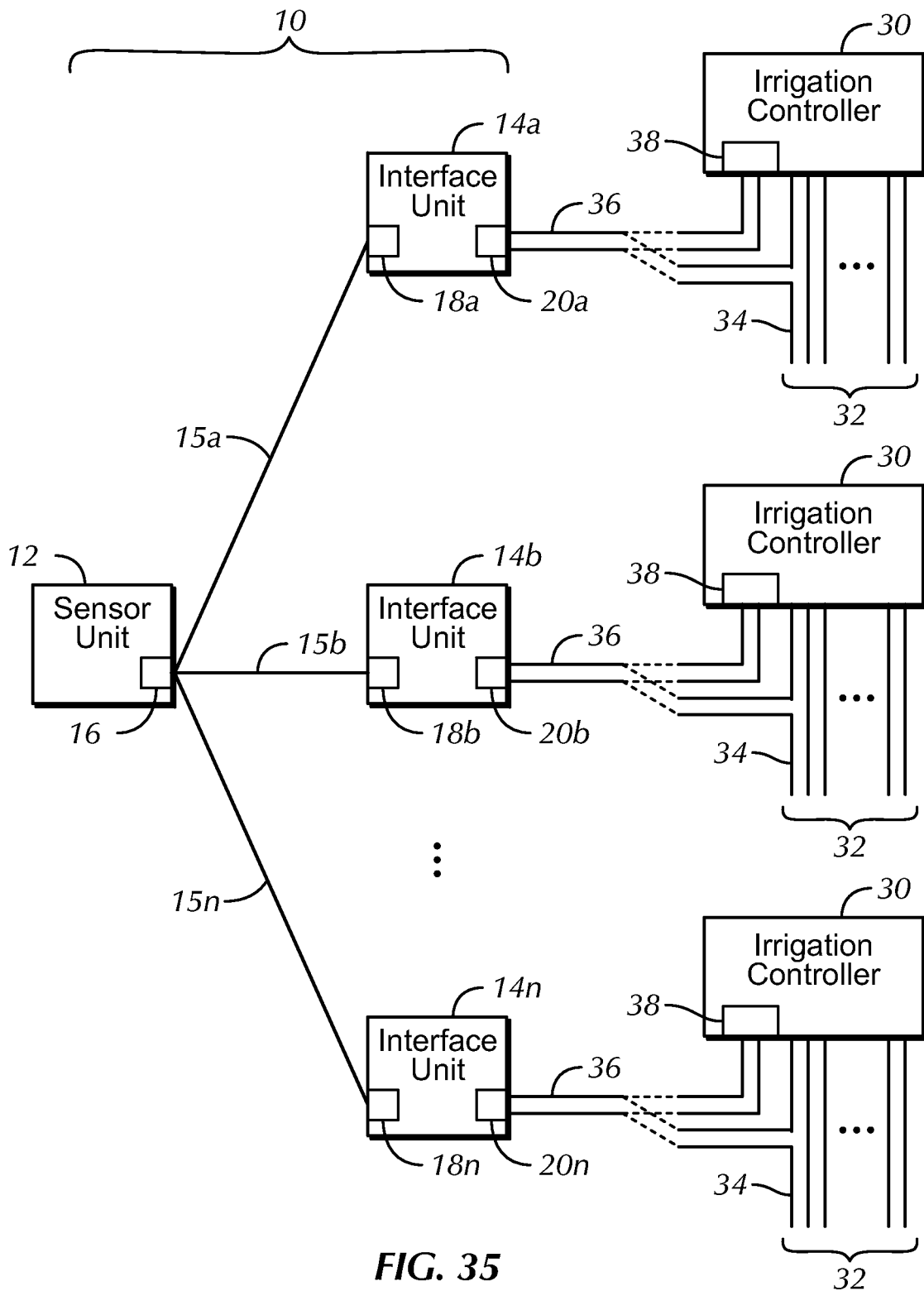
FIG. 35 illustrates a rain sensor system in which a sensor unit is paired with and communicates with n interface units 14a-n according to some embodiments.

In some embodiments, each interface unit 14 is specifically paired to a sensor unit so that each rain sensor system 10 includes a paired sensor unit 12 and interface unit 14. Alternatively, in some embodiments each interface unit 14 is paired to more than one sensor unit 12. In these embodiments, each sensor unit 12 is paired with the interface unit independently. FIG. 34 illustrates a rain sensor system 10 in which the interface unit 14 is capable of pairing and communicating with n sensor units 12a-n via communication links 15a-15n. Additionally, in one or more embodiments, each sensor unit 12 is paired with more than one interface unit 14, wherein, the sensor unit is paired with each of individual interface unit 14 of the plurality of interface units. FIG. 35 illustrates a system 10 in which the sensor unit 12 is capable of pairing with and communicating with n interface units 14a-n via communication links 15a-15n. The pairing may be implemented at the time of purchase, at the time of installation, during battery replacement, one or more interface units can be paired with a single sensor unit 12 after one or more other interface units are currently operating and already paired with the sensor unit 12, or at other such times. For example, a single sensor unit 12 within a community can be used by multiple different interface units each located at a different house within the community. As such, a community developer can reduce costs by utilizing the single sensor unit 12 and pairing the multiple interface units 14a-n with the single sensor unit 12. As described further below, the communication links 15a-15n can be wired or wireless, and are typically wireless.

The interface unit and sensor unit may be paired together using several different methods. For example, in one embodiment, the sensor unit 12 and the interface unit 14 may be paired using a wired serial interface, e.g., the I2C (Inter Integrated Circuit bus) interface and protocol. The pairing may be implemented using an additional 3 pin header connector (not shown) on both the sensor unit 12, and the interface unit 14, and a short 3-wire cable (not shown) with matching receptacle connectors on both ends, and a firmware procedure for executing the pairing upon connecting both units together. This method of pairing the two units diminishes problems created by side radio transmissions when implementing the pairing. Alternatively, the interface unit and the sensor unit may be paired by invoking a special mode of operation of the interface unit 14, in which the ID information regarding the sensor unit's radio signal may be memorized and used for matching with the same sensor unit 12 in the future.

In another embodiment, pairing is implemented by temporarily positioning the sensor unit 12 and the interface unit 14 close together and putting the sensor unit 12 in a high (preferably highest) power-transmission mode with packets following each other without any gap between them and having a special pairing-mode identification bit, while the interface unit 14 is held in a low (preferably lowest) sensitivity mode. The close proximity between the sensor unit 12 and the interface unit 14, combined with high-power transmissions from sensor unit and low-sensitivity of the interface unit help to eliminate any interfering emissions. The chance of catching a side emission may be further diminished by using a specific identifier for pairing mode, which helps eliminate any regular transmission from other sensor units.

FIG. 32 illustrates one possible implementation of a process 3200 of installing and pairing the interface unit 14 and the sensor unit 12 together. At step 3210 the interface unit initiates a set up request and transmits the request. The sensor unit 12 receives the request, in step 3212, and continues to step 3214 where it determines whether or not certain criteria are met. For example, the request message may comprise information about the interface unit 14. In one embodiment, the sensor unit 12 may use this information in step 3214 to determine whether it is able to pair up with the interface unit 14. For example, in some embodiments, the user may exert a manual force on a part of the sensor wherein the force fully depresses the plunger, the sensor unit will query the rain sensor 318 and will use the measurement to determine whether the plunger in the rain sensor 318 is fully depressed to determine whether there is user authorization to pair up with an interface unit.

Once the sensor unit determines that it is ready to pair up with the interface unit, it will generate and send or transmit an acknowledgment message to the interface unit in step 3216. The message may comprise identification information about the sensor unit, and/or other data stored in memory of the sensor unit and/or available from the sensors and or other devices coupled to the sensor unit 12. Additionally, in step 3216, the sensor unit may store information about the interface unit 14, for example, information received in the request message into its memory. In step 3218, the interface unit then receives the acknowledge message, and pairs up with the sensor unit. For example, the interface unit may store information about the sensor unit, received in the acknowledge message and/or other available sources, into its memory. Additionally or alternatively, when performing step 3214, the sensor unit may also determine whether it is ready for set up by ensuring that a user input, e.g. authorization, has been entered.

Referring generally back to FIG. 1, the interface unit 14 receives measurement data from the sensor unit 12 and processes this data to determine if irrigation (such as programmed into an irrigation controller 30) should be permitted or interrupted. For example, in one embodiment, the interface unit 14 determines whether a predetermined relationship exists between the received measurements detected and a stored preset level or threshold and/or other criteria. For example, the interface unit may determine if the signal indicative of an amount of rain has exceeded a threshold level of rainfall, and/or whether a relationship exists between the signal and some criteria. For example, in one embodiment, the interface unit may use the information transmitted from the sensor unit 12 to determine a rate of change, for example, for the rain fall accumulation, and determine whether the rate of change satisfies a predetermined relationship.

Additionally or alternatively, the interface unit may look at the relationship between the received measurements when processing the data to determine whether irrigation should be inhibited or interrupted. For example in one embodiment the interface unit receives the measurements and analyzes the relationship between one or more of the amount of rainfall, the rate of rain fall and the temperature. Alternatively in some instances, the information may be processed by the sensor unit 12, where the determination regarding the relationship may be made by the sensor unit, and the determination may then be transmitted to the interface unit 14 by the sensor unit 12, e.g., in response to the request from the interface unit 14. If the predetermined relationship exists (e.g., the threshold level of rainfall has been exceeded by the amount of sensed or measured rain fall), the electronics of the interface unit 14 and/or the controller 30 generate the appropriate signaling to cause the interruption of the execution of watering schedules by the irrigation controller 30.

This approach to overriding or interrupting watering based on measured data, such as sensed rain fall amounts is fundamentally different than the approach of known rain sensor devices that interrupt controller operation when a threshold level of rain has been exceeded. That is, traditional rain sensors, such as described in U.S. Pat. No. 6,452,499 to Runge et al., and U.S. Pat. No. 6,977,351 to Woytowitz (both of which are incorporated herein by reference), employ a remote rain sensor that sends a signal to its receiver to indicate that the rain threshold has been exceeded, where the rain sensor initiates the communication and sends a signal to its receiver as soon as a rain threshold has been exceeded. In contrast, according to several embodiments, the sensor unit 12 sends measurement information to the interface unit 14, and the processing of the data and determination of whether or not to interrupt and/or adjust irrigation occurs at the interface unit 14. Additionally, according to some embodiments, the interface unit 14 initiates the communication between the sensor unit 12 and the interface unit 14 periodically or when it detects that an irrigation cycle is to be initiated. The sensor unit 12 sends a signal to the interface unit 14 after receiving a request or query from the interface unit 14.

It is also known that the threshold level of existing rain sensors may be adjusted by making a mechanical adjustment to the sensor unit, such as described in U.S. Pat. No. 6,570,109 to Klinefelter (which is incorporated herein by reference). However, since the sensor unit is located on a roof top or other similar location such that it may be exposed to the environment and be relatively tamperproof, it is very difficult to easily adjust the threshold level of rainfall that will trigger the interruption of irrigation. Several present embodiments address this concern by providing a manual adjustment of the threshold level at the interface unit 14, since in some embodiments the interface unit 14 is the portion of the rain sensor system 10 that determines if the threshold has been exceeded. In other embodiments, the adjustment may be made at the interface unit 14 and/or controller 30 and transmitted to the sensor unit 12. The interface unit 14 is typically in a location that is far more easily accessible to the user; thus, the user may more easily adjust the rain threshold in use, e.g., to account for seasonal changes.

Additionally, known rain sensors only interrupt irrigation when the rain fall exceeds a fixed threshold. In contrast, according to several present embodiments, the sensor unit 12 sends measurement data to the interface unit 14 and the interface unit 14 analyzes the atmospheric measurement data to permit or interrupt irrigation based on one or more different considerations such as the amount of rain fall, the current or sensed temperature, the rate of change in the rain fall amount or temperature or the combination of several criteria.

In many embodiments, the sensor unit 12 sends data, and receives requests or queries for sensed data from the interface unit 14 through a communication link 15. The communication links 15 described herein may be any wireline or wireless communication link. Generically, the interface unit 14 includes an input/output unit 18, which will correspond to the specific communication link 15. For example, in a wireline communication link 15, the input/output unit 18 will be a wireline signal transmitter, a wireline signal receiver and a wireline connector. However, in a two-way wireless communication link 40 (see FIG. 2), the output takes the form of a wireless transceiver 44, such as a radio, optical, infrared, and/or ultrasonic transceiver. Furthermore, the input/output unit 16 of the sensor unit corresponds to the communication link 15. For example, in a wireline communication link 15, the input/output unit 16 will be a wireline signal transmitter, a wireline signal receiver and a wireline connector. However, in a wireless communication link 40 (see FIG. 2), the input/output unit 16 takes the form of a wireless transceiver 42, such as a radio, optical, infrared, and/or ultrasonic transceiver. Advantageously, the wireless communication link 40 of FIG. 2 allows for easier installation since a wireline connection is not required between the sensor unit 12 and the interface unit 14. It is understood that in some embodiments, both the interface unit 14 and the sensor unit 12 each have a transmitter and a separate receiver, instead of a transceiver, and in some instances includes input/output interfaces for both wired and wireless communication.

The interface unit 14 may be coupled to the irrigation controller 30 in different ways depending on the controller 30 and user preference. In some embodiments, the output lines 36 may be connected from an input/output unit 20 of the interface unit 14 direct to an interface 38 (e.g., a rain sensor input, a common line connection point or the like) of the controller 30. In the event the interface unit 14 determines or receives an indication that a relationship exists between a threshold or other criteria and the measurement data and/or in the event that a threshold has been exceeded, a switch is closed within the output 20 completing a circuit causing a current to flow through the output lines 36 to the interface 38. The controller 30 is configured to sense this current, and in response, the controller 30 temporarily halts the execution of one or more watering schedules and/or determines other appropriate actions. The current flowing through the output lines 36 is switched off after a period of time, in response to instructions or reset from the controller and/or in response to a data transmission, or a reply from the sensor unit 12 to a subsequent data request (e.g., when the precipitation data has returned to below the threshold level and/or the relationship between the threshold level and other criteria and the measured data no longer exists). In this case, the controller 30 senses the absence of the current at the interface 38 and resumes normal execution of watering schedules. In another embodiment, the signal from the input/output 20 is a data signal that includes a message instructing the controller 30 to temporarily halt execution of one or more watering schedules until a subsequent resume data signal is sent.

In a further embodiment, rather than coupling to an interface 38 of the controller, the interface unit 14 couples in series with the common line 34 of the activation lines 32. For example, the common line 34 electrically passes through the output 20 (e.g., a switching device) of the interface unit 14. When the interface unit 14 determines or receives an indication that a rain threshold has been exceeded and/or that other criteria have been met, the interface unit opens the switching device, breaking the common line 34. This effectively disables all electrical signals via the activation lines 32 to the valves, until the switch is closed. In this way, the controller 30 is not aware that the watering has been interrupted or overridden. It is noted that in some embodiments, the interface unit 14 may be integrated into the functionality of the controller 30.

Alternatively, in some embodiments, the interface unit 14 may forward the measurement data or the determination that some criteria has been met, e.g., a threshold has been exceeded or other relationship exists between the measurement data and some criteria, to the irrigation controller 30, where the processor or the irrigation controller will interrupt rain fall based on the received information.

Figure 33:
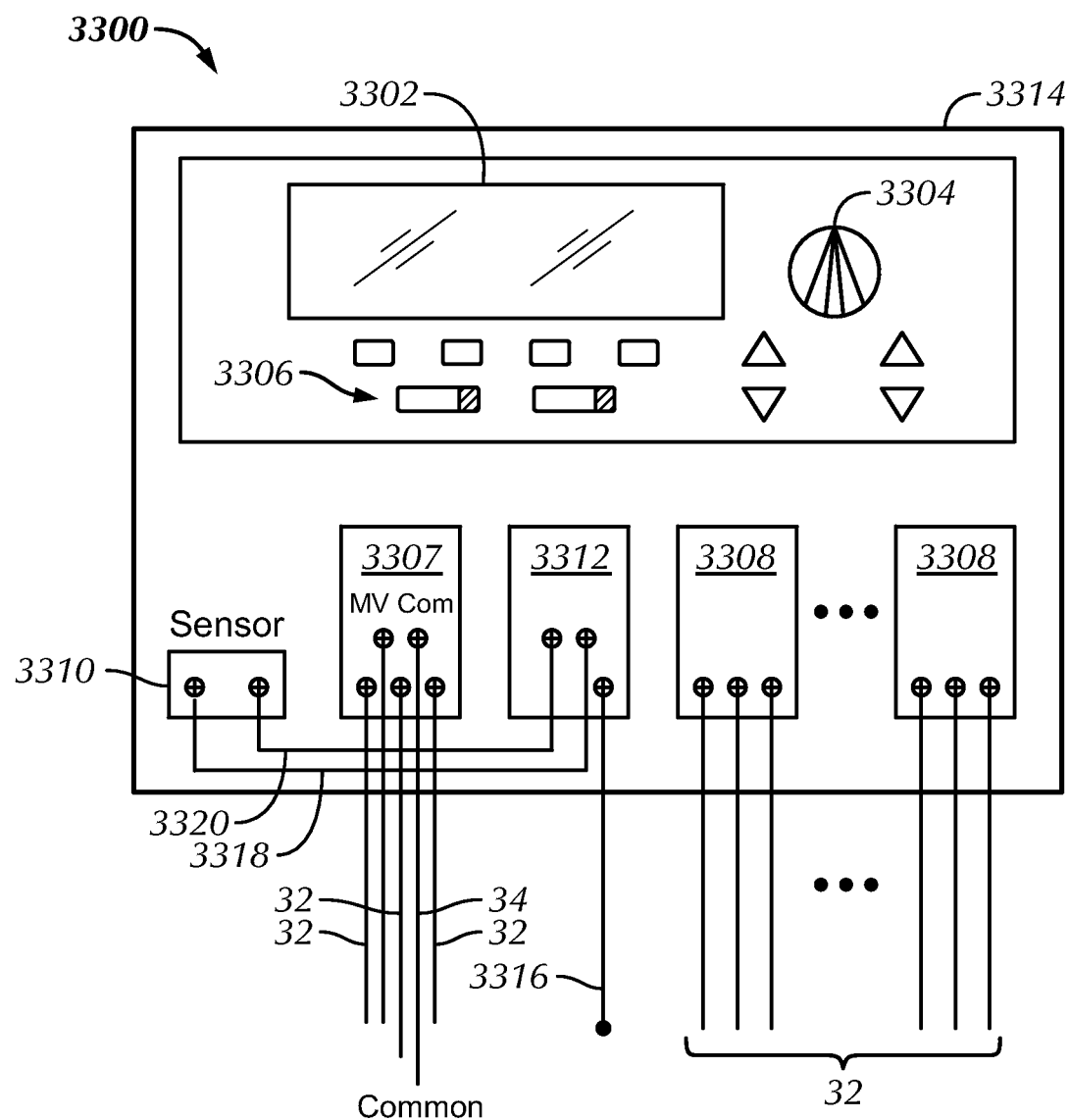
FIG. 33 illustrates an exemplary embodiment of a modular irrigation controller having an interface unit module.

In some embodiments the interface unit 14 may be implemented as a part of the irrigation controller 30 and/or located on or integral to the irrigation controller. In one embodiment, for example, the interface unit is implemented as a module that may be inserted into a modular irrigation controller. FIG. 33 illustrates an exemplary embodiment of a modular irrigation controller 3300 having an interface unit module 3312. The modular controller 3300 comprises a display 3302, a rotary dial 3304, one or more user inputs 3306, a base module 3307, one or more expansion modules 3308, a sensor connection 3310, and an interface unit module 3312, all generally contained within a housing 3314. Generally, modular irrigation controllers are known in the art to be controllers that accept expansion modules to provide additional station or zone outputs. Further details of various modular controllers are described in U.S. patent application Ser. No. 11/022,179 and published as U.S. Patent Application Publication No. 2005/0273205, the entirety of which is incorporated herein by reference. In one embodiment, a base module 3307 is provided that includes output connectors for the master valve (MV), common line (COM), and a number of station outputs (3 are illustrated in the base module 3307). Each expansion module 3308 includes an additional number of output connectors to allow connection of activation lines to actuate additional stations (in this case, three additional station outputs are provided with each module 3308).

In one embodiment, the interface unit module 3312 is coupled a module mounting location instead of an expansion module. The interface unit module 3312 includes an antenna 3316 (one embodiment of an input/output unit 18) to communicate with one or more sensor units 12. In one embodiment, the interface unit module 3312 includes two connectors that allow wires 3318 and 3320 to connect to the terminals or connections of the sensor connection 3310, where the sensor connection 3310 provides a way to connect to the common line 34 without having to cut the common line. It is noted that in this case, the wires 3318 and 3320 would replace a wire connecting the two terminals of the sensor connection 3310 together. In several embodiments, the interface unit module 3312 is now coupled in series with the common line 34. When the interface unit module 3312 determines that irrigation should be interrupted or when it receives an indication that a rain threshold has been exceeded and/or that other criteria have been met, the interface unit module 3312 opens an internal the switch, breaking the common line 34. This effectively disables all electrical signals via the activation lines 32 to the valves, until the switch is re-closed.

Alternatively, in another embodiment, the sensor connection 3310 is configured for connection to the controller of the modular controller 3300. For example, when the interface unit module 3312 determines that irrigation should be interrupted, the interface unit module 3312 causes a current to flow to the sensor connection. The controller detects that presence of current flow at the sensor connection, which indicates to the controller that irrigation should be interrupted and the controller causes the interruption. The controller of the modular controller 3300 may be implemented through a single-processor or multiprocessor systems, microcontroller, minicomputers, microprocessor, processor, programmable electronics and the like, and/or combinations thereof. In several embodiments, the interface unit module 3312 gets operational power from the backplane connection of the module to the controller 3300. The above embodiments, allow the interface unit module 3312 to operate when connected to a module mounting location of the modular controller 3300 without sending control signals directly from the module 3312 to the controller, since many modular controllers will not have sufficient programming to process such direct control signals. However, in other embodiments, the interface unit module 3312 directly outputs irrigation interrupt signals to the controller via the backplane connections between the module mounting location and the controller.

In one embodiment the interface unit module 3312 is inserted within the modular controller 3300, draws power therefrom and is coupled to an interface unit 14 mounted externally. In this embodiment, according to one implementation, the interruption is controlled by the external interface unit 14. In one embodiment, the interface unit 14 sends the determination to interrupt irrigation to the interface unit module 3312 and the interface unit module 3312 interrupts irrigation according to one or embodiments described above (e.g., breaks the common, or outputs a signal to the controller which interrupts irrigation). In another implementation, the interface unit module 3312 includes a display and buttons, etc., to create a user interface to allow a user to program the interface unit module 3312 while it is inserted into the modular controller 3300. In another embodiment, the interface unit module 3312 outputs signals to the controller of the modular controller 3300 and uses the user interface of the modular controller to allow the user to configure the interface unit module 3312.

Referring again back to FIGS. 1 and 2 and in a further embodiment, the interface unit 14 will continue to indicate to the controller 30 that it should remain off even after the precipitation data has returned below the threshold and/or other conditions no longer exist. For example, for a period of time after the precipitation data returns below the threshold level, the interface unit 14 continues to allow current to flow to the interface 38, continues to send the appropriate control message signaling to the interface 38, delays sending a control message instructing the controller to resume watering, or continues to break the common line 34. This delay in re-enabling the controller is settable by the user on the interface unit 14 and allows the system to postpone irrigation for several days after a heavy rain has occurred. In other embodiments, the delay can be automatically controlled, for example, using equations involving one or more of temperature, dry out rate, etc. This embodiment allows for increased water conservation.

Figure 2:
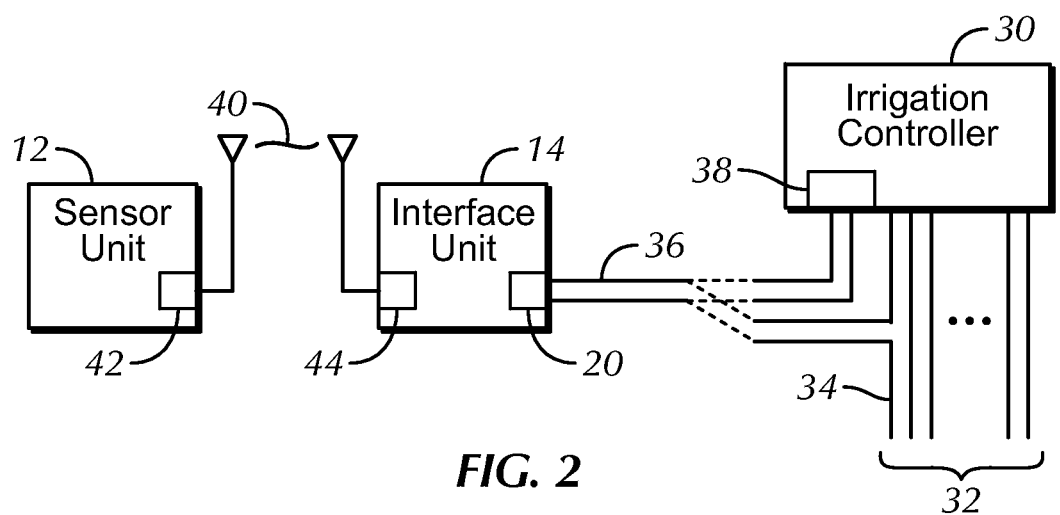
FIG. 2 is a variation of the rain sensor device of FIG. 1 according to several embodiments.

In some embodiments, as illustrated in FIGS. 1 and 2, the interface unit 14 and the sensor unit 12 are coupled via a two-way communication link 15. The communication link 15 may be a wired communication, as illustrated in FIG. 1, or a wireless communication via communication link 40 as illustrated in FIG. 2. The two-way communication link 15 enables the sensor unit 12 and the interface unit 14 to send and receive signals, including one or more of data, status information and control signals to and from one another. For example, in one embodiment, the interface unit 14 sends control signals to the sensor unit 12 and, depending on the control signal, the sensor unit 12 takes the appropriate action/s. For example, in one embodiment, the interface unit 14 may send a request to the sensor unit 12 for data. The sensor unit 12 may, in response to the request, generate the data and send it via the two-way communication link 15 to the interface unit 14. Further, in some embodiments, the interface unit sends control signals to the sensor unit 12 over the two-way communication link 15, wherein the sensor unit receives the signal and makes an adjustment or change based on the control signal received. In one embodiment, the control signal from the interface unit 14 causes the sensor unit 12 to change a mode of operation (e.g., such as entering a low power or hibernation mode). Additionally or alternatively, the sensor unit 12 sends signals, e.g., including data, information and/or control signals, to the interface unit 14, and the interface unit is adapted to receive the information and take actions and/or make determinations based on the information. For example, the sensor unit 12 may transmit information corresponding to an amount of rain and/or temperature sensed at the sensor unit 12. This information may be a measurement of rain fall or an indication that a threshold amount of received rain fall has been exceeded. In several embodiments, the interface unit 14 receives a measurement of rain fall and/or temperature and makes a determination of whether or not to interrupt irrigation based at least in part on the received measurements. The interface unit 14 is adapted to cause an interruption of irrigation if it is determined that irrigation should be interrupted. Further, the sensor unit 12 and interface unit 14 may both comprise transceivers 16 and 18 (wired or wireless) wherein the transceivers are capable of sending and receiving signals to one another over the two-way communication link 15.

Alternatively, in one embodiment, the sensor unit 12 and the interface unit 14 each have separate transmitter and a separate receiver.

It is noted that in many embodiments, the interface unit 14 is configured to break the common line 34 of an irrigation controller. In alternative embodiments, the interface unit 14 is coupled to and can break one or more individual activation lines 32. That is, the interface unit 14 may be coupled in series with one or more of the activation lines 32. When the interface unit 14 determines or receives an indication that a rain threshold has been exceeded and/or otherwise determines that irrigation should be interrupted, the interface unit 14 opens the switching device, breaking one or more of the activation lines. In this embodiment, the interface unit 14 may be adapted to interrupt irrigation for a specific set of activation lines while allowing irrigation for valves coupled to other activation lines. The breaking of the one or more activation lines 32 disables the electrical signals from those one or more activation lines 32 to the valves, until the switch is closed.

Figure 3:
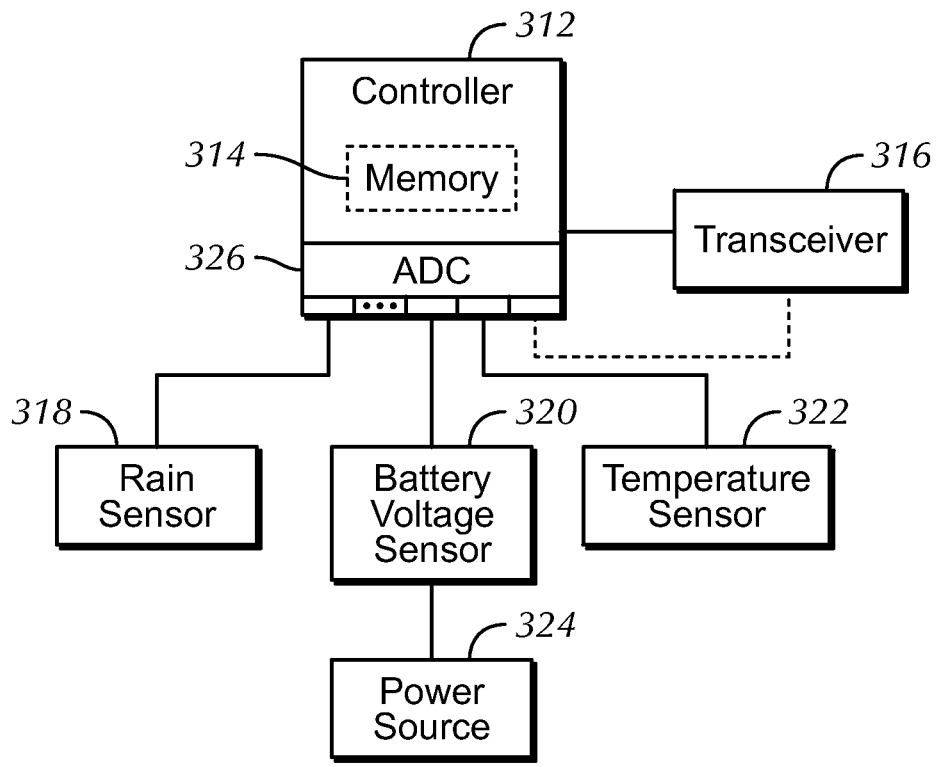
FIG. 3 is a functional diagram of the components of some embodiments of a rain sensor unit of the rain sensor device of FIGS. 1 and/or 2.

Referring next to FIG. 3, a diagram is shown of the functional components of some embodiments of a sensor unit 12 of the rain sensor system 10 of FIGS. 1 and 2. The sensor unit 12 includes a controller 312, a memory 314, and a transceiver 316. The sensor unit further includes and/or cooperates with a rain sensor 318. The controller 312 may be implemented through a single-processor or multiprocessor systems, microcontroller, minicomputers, microprocessor, processor, programmable electronics and the like, and/or combinations thereof.

The memory may be a separate memory unit within the sensor unit 12, external memory connected to the sensor unit via an interface (not shown), may be internal memory within the controller 312 as illustrated in FIG. 3, and/or other such configurations. In some instances, the controller 312 and the memory 314 together function as a microcontroller. In some embodiments, memory 314 comprises one or more of a random access memory (RAM), read only memory (ROM), Flash memory, an EEPROM memory, on-chip RAM, optical disk storage, and/or any other medium which may be used to store the desired information and which may be accessed by the controller. In some embodiments, the controller employs flash memory for storage of executable firmware, and is capable of being programmed "in-system". This may be accomplished in some instances by employing an in-system programming port in the sensor unit 12 and/or on a printed circuit board, for example of the controller, for accomplishing the programming process during a final assembly. In some embodiments, the controller further includes an EEPROM for non-volatile storage of miscellaneous data to support at least some of the functionality of the controller. Additionally or alternatively, on-chip RAM may be present in sufficient quantity to provide functional capabilities in many embodiments.

The sensor unit 12, in some instances, further includes a power source 324, such as a battery, solar cell, wind powered generated and/or other such power source, to power the components of the sensor unit 12. For example, the sensor unit 12 operates from a high capacity lithium-ion battery. As illustrated in FIG. 3, in some embodiments, the controller includes an on-chip analog-to-digital converter (ADC) 326. The ADC may, for example, have an 8-bit resolution or greater, and contain four or more input channels. In other embodiments, the ADC may be a separate unit within the sensor unit 12, or separate components within the sensor unit may comprise a separate ADC.

The transceiver 316 provides wired and/or wireless communication. Wireless radio frequency chips known in the art such as Texas Instruments CC1100, Melexis TH71211, Micrel MICRF112, or MICRF211, Semtech CE1201A, Atmel ATA5428, Analog Devices ADF7020 or ADF7021, and/or Maxim MAX7033 or MAX7044 may be used for the transceiver 316. The wireless transceiver includes or couples to an antenna. In some implementations, the transceiver comprises a single-chip transceiver that provides an analog or digital Received Signal Strength Indicator (RSSI) output signal. If the RSSI output is an analog signal, it may be supplied initially to one channel of the ADC 326.

In some embodiments the sensor unit 12 may include and/or may couple with several additional sensors, such as a temperature sensor 322, a battery voltage sensor 320 as shown in FIG. 3, and/or other such sensors. The battery voltage sensor 320 is connected to the power source 324. The temperature sensor 322 may be any temperature-sensitive device such as a thermistor, temperature-dependent current device, and the like. In some embodiments, the temperature sensor is capable of detecting an ambient temperature of between about, 150 to 0° F., for example detecting an ambient temperature of about 35-39° F., e.g., 37° F., with a tolerance of ±5% or better.

The rain sensor 318 reacts to the presence of water and generally reacts proportionally to the amount of water (rain fall) received, for example in one embodiment, the rain sensor generates an electrical signal that is indicative of a level of precipitation or rain. This electrical signal represents precipitation data. In some embodiments, the output signal is an output voltage signal of the rain sensor 318 that is provided to one channel of the controller's ADC 326. In some embodiments, the level indicated by the electrical signal is transmitted to the interface unit 14 via transceiver 316 periodically and/or when the sensor unit determines that a change has occurred in the amount of rain fall, and/or stored in memory for future access. For example, in this or other embodiments, the level indicated by the electrical signal is stored in the memory 314 and upon receiving a request from the interface unit 14 the controller 312 retrieves the data from the memory 314 and forwards the data to the transceiver 316 to be transmitted to the interface unit 14. Additionally or alternatively, the rain sensor may detect that a threshold level of rain or precipitation has been received and in response generate a signal that indicates that the threshold level of rain has been exceeded.

In other embodiments, the rain sensor may output signals from the temperature sensor 322 and/or the battery voltage sensor 320 that may, for example, additionally or alternatively be provided to two other channels of the ADC 326, and the indicated levels stored in memory 314, to be supplied to the interface unit 14 periodically, upon detecting a change, and/or upon receiving a request from the interface unit. In some embodiments, the signal or measured levels may not be stored, and instead the controller 312 may retrieve the information from one or more of the sensors at the time of transmission and/or when a request is received from the interface unit 14. For example, in one embodiment the sensor unit 12 requests measurements from the sensors at fixed intervals, e.g., every 5 minutes, and may additionally process the data to determine whether a change has occurred since the last received measurement. The controller 312 may generate a data signal based on the electrical signals received from the sensors, and may transmit the data signal to the interface unit 14 via the communication link 15.

In some embodiments, the measured data transmitted to the interface unit 14 is simply a measurement and does not include an indication that a threshold has been exceeded. Instead, the determination whether irrigation should be permitted or interrupted (e.g., whether a relationship exists between certain criteria and the data, such as when a threshold has been exceeded) is made at the interface unit 14 and/or irrigation controller 30 based on the received measurements from the sensor unit 12. Alternatively, in other embodiments, the controller 312 may be configured to determine if a predefined relationship exists between the measurement and a level or threshold, and transmit that determination to the interface unit 14 upon receiving a request from the interface unit 14. The sensor unit 12, in some implementations, does not transmit measurement data regarding the information obtained through the sensors to the interface unit 14 unless and until it receives a request from the interface unit 14 for such data. Alternatively, the sensor unit 12 may transmit the measurement data to the interface unit 14 at intervals, e.g., 6 hour intervals, or when it determines a change in the measurement data in addition to providing the data to the interface unit 14 upon receiving a request for the data. Further, the information may simply include an indication that a threshold has been exceeded. In other implementations, the information provided may include a level or measure of rain.

In some embodiments, the rain sensor 318 comprises a sensor and controller circuitry where upon sensing a level of precipitation the sensor will cause an electrical voltage to be generated by the control circuitry. The sensor and circuitry may take different forms in different embodiments. By way of example, in some embodiments, the rain sensor 318 includes a moisture absorptive material that expands and contracts based on the presence of and absence of rain fall, such as a hygroscopic material. The level or amount of expansion or contraction is sensed or measured and provided as an electrical signal. The level and/or measurement data is then transmitted by the transceiver 316 to the interface unit 14, wherein in some implementations, the interface unit determines if a rain threshold has been exceeded and/or if other relationship exists between the measurement data and certain criteria. In some embodiments, the electrical signal corresponding to the level of rain fall is converted to a measure of the amount of rainfall prior to being sent to the interface unit 14, and/or an indication of a relationship of the measurement relative to a threshold may be forwarded to the interface unit 14. Alternatively, the expansion of the absorptive material may cause activation of a switch when a preset level of rain is reached. Upon activation of the switch the control circuitry may send a signal to the controller and then store the indication in memory. In this embodiment, when a request from the interface unit is received for rain levels an indication that the preset level was reached is transmitted by the transceiver 316 to the interface unit 14. In some embodiments, the rain sensor will not generate any signals until information is requested from the rain sensor, at which time the sensor transmits a signal indicating the measurement of rain fall or the signal indicating that the switch is activated. Alternatively, the sensor unit 12 may initiate transmission to the interface unit 14 based on the measurement data. For example, in one embodiment, the sensor unit 12 will process the signal indicating the measurement of rain fall or signal indicating that the switch has been activated to determine if a change in the atmospheric conditions has occurred. In this embodiment, if the sensor unit 12 determines that a change has occurred it will forward the signal to the interface unit 14. Additionally or alternatively, in one embodiment, the sensor unit will initiate transmission to the interface unit 14 forwarding the signal at fixed intervals, e.g., every 6 hours.

In some embodiments, the interface unit 14 may send a request to the sensor unit 12 requesting that the sensor unit obtains current and/or updated data from the sensors prior to the initiation of an irrigation cycle and/or at other times, for example, when the user requests the data through the user input, and or by other means. In some embodiments, for example, when the interface unit determines that an irrigation cycle is about to begin the interface unit may send a message to the sensor unit 12 requesting current data to determine whether to inhibit irrigation. In one exemplary embodiment, the interface unit may send a message to the sensor unit 12 requesting data when the operator of the interface unit has requested the data. For example, in one exemplary embodiment, the operator may periodically request data, for example, through the user input 424 (see FIG. 4), to ensure that the sensor unit 12 and the system 10 as a whole are working properly. The receipt of a signal from the sensor unit 12 with data indicates that the sensor unit is properly working. Additionally, in some embodiments, the sensor unit 12 also sends its battery strength. This allows the operator send a test request message to the sensor unit 12 to determine if it is working. Additionally, in some embodiments, the sensor unit 12 sends data indicating the battery strength or battery life (and thus, approximately when the battery of the sensor unit will need to be charged or replaced).

Alternatively, in embodiments where the sensor unit 12 initiates transmission to the interface unit 14, the rain sensor may generate a signal comprising the measurements and/or other data and transmit the signal to the interface unit 14 upon making some determination, e.g., that a change in one or more parameters has occurred and/or other criteria has been satisfied, and/or at fixed intervals.

The shape and configuration of the hygroscopic material may be varied depending on the implementation. In some embodiments, the hygroscopic material is in the form of one or multiple disks. In another embodiment, the hygroscopic material is a granular and expandable material within a flexible envelope or casing. For example, the granular material may include polyacrylamide or similar materials.

In several embodiments, the sensor unit 12 operates in one of several modes. The mode of operation may depend on one or more factors, such as battery charge level or expected battery life, weather and/or atmospheric conditions, anticipated requests for data and/or other such factors. The modes may be adjusted internally by the controller 312 and/or externally by the user via the user input 424 and/or by other means. In one implementation, the sensor unit 12 is in a sleep or quasi-powered down mode, which in some implementations, is a "normal mode", which is in some embodiments the mode that the sensor unit 12 is most often operating in. The sensor unit 12 reduces and/or attempts minimize power consumption while in the sleep mode to better conserve power and/or maximize battery life. In some embodiments, while in the normal or sleep mode the sensor unit 12 does not initiate a transmission to the interface unit 14, and in some instance, will never initiate a transmission to the interface unit 14. In other embodiments, during normal or sleep mode the sensor unit will initiate transmissions to the interface unit 14, for example at fixed intervals and/or when some criteria are met, e.g., when there is a change in one of rain fall, temperature, and/or other parameters.

In some embodiments, while in the sleep mode, the transceiver 316 may be similarly put into a sleep mode, where many of the components of the transceiver are powered down, while the transceiver is still capable of detecting the presence of an incoming message without needing to apply full power to all circuitry. In several implementations, during the sleep mode the sensor unit 12 is capable of receiving requests initiated by the interface unit 14. The sensor unit may further receive requests for other information and/or operating parameters, such as requests for the measurements received by the sensors employed with the sensor unit, the signal strength, the transmittal power, identification information of the sensor unit, and/or a variety of other information. In one embodiment, after receiving requests from the interface unit 14 and/or other devices, the controller 312 will determine what information is requested, and will retrieve the information and/or initiate a measurement of the requested information by the sensors. In some embodiments, the measurement(s) by sensors occurs periodically, and the measurement data is forwarded to transceiver 316 and transmitted to the interface unit via communication link 15. Alternatively, in some embodiments, the data obtained is stored onto the memory 314.

Figure 23:
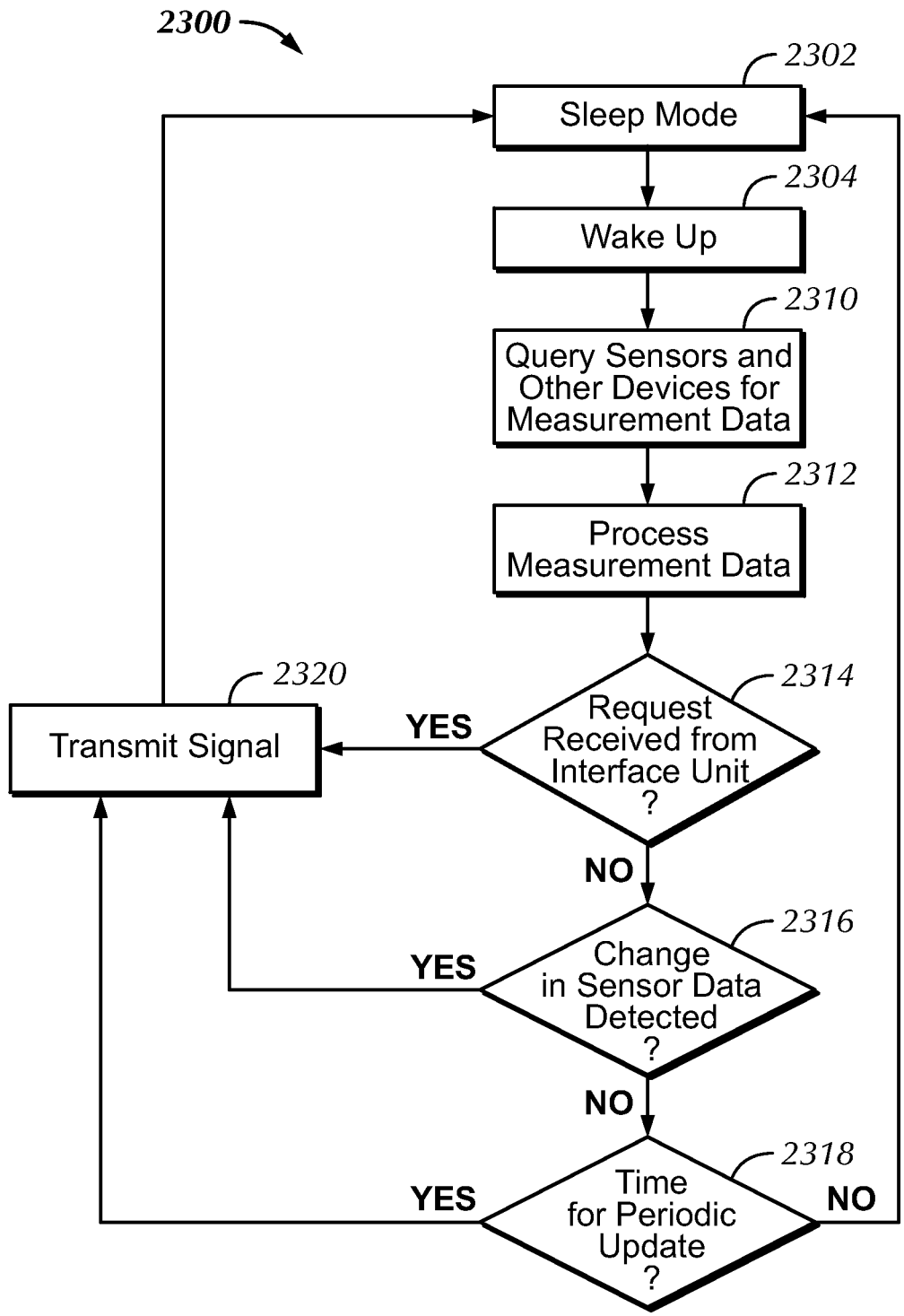
FIG. 23 illustrates a simplified flow diagram of an example implementation of a sleep or normal operational mode at the sensor unit of FIGS. 1 and 2, according to some embodiments.

FIG. 23 illustrates an example implementation of a process 2300 of operating in sleep or normal mode at the sensor unit 12, according to some embodiments. Normally, in the step 2302, the sensor unit is in sleep mode. Accordingly, the sensor unit operates in a low battery usage state with only minimal portions of the controller 414 running. Periodically, the sensor unit wakes up in step 2304. For example, the controller and other electronics of the sensor unit enter a normal power usage mode. In step 2310, once awake, the sensor unit 12 queries the sensor/s and other devices and generates measurements. In some implementations, these intervals are predefined. Alternatively, in other embodiments, the sensor unit may adjust the rate at which it will wake up and query the sensors based on the amount of rain fall, the temperature, the rate of change of rain fall and/or temperature, and/or other such criteria. In some embodiments, the sensor unit 12 then stores the measurements in the memory 314 for later processing. Alternatively, the sensor unit processes the data as soon as it is received from the sensors and other peripheral devices. Next, in step 2312, the sensor unit 12 processes the measurement data received from the sensors. The sensor unit 12 may process the signals to generate measurements to be sent to the interface units, and/or process the data to determine whether the data satisfy certain relationships and/or criteria. For example, in one embodiment, the sensor unit 12 analyzes the data received from the rain sensor 318 and temperature sensor 322 to determine a rate of rain fall, a rate of temperature and/or whether there is a change in the amount of rain fall and/or temperature.

In step 2314 the sensor unit 12 determines if a request for data has been received from the interface unit 14. When the sensor unit determines that a request has been received, in some embodiments, the process continues to step 2320 where the sensor unit 12 transmits a signal to the interface unit. For example, the controller 312 of the sensor unit constructs a message comprising data such as the obtained measurement data, e.g., rain fall and precipitation data, temperature, battery strength, signal strength of the received request, and/or other data into one or more data packets to be forwarded to the transceiver 316 to be transmitted to the interface unit 14. The sensor unit then returns to the low power or sleep mode of step 2302.

Alternatively, if no request has been received from the interface unit 14, the process moves to step 2316 where the sensor unit determines if there has been a change in the sensor data, for example, if there has been a change in sensed atmospheric conditions and/or other criteria have been met. For example, in one embodiment the sensor unit may process the data to determine whether there is a change in the amount of rain fall or temperature determined in step 2312. In one embodiment, the sensor unit may retrieve the results of the determination from the memory 314 to determine whether a change has occurred. Alternatively, the sensor unit may retrieve the data from the memory 314 for current and previous data and/or query the sensors for the data before making the determination in step 2316. If the sensor unit 12 determines that a change has occurred in one or more of the sensor data, then the process will continue to step 2320 where the sensor unit will send or transmit a signal to the interface unit comprising, for example, the measurements retrieved from the sensors, signal strength, and/or other data available at the sensor unit 12. The sensor unit then returns to the low power or sleep mode of step 2302. If, however, in step 2316 the sensor determines that no change has occurred in the atmospheric parameters, the process moves to step 2318 where the sensor unit determines if it is time for a periodic update to be sent to the interface unit. In one embodiment, the sensor unit 12 sends updates to the interface unit 14 at fixed intervals, e.g., every 6 hours. The updates may be sent to ensure the interface unit that the sensor unit is working and that the connection between the sensor unit and the interface unit 14 has not failed. If in step 2318 the sensor unit 12 determines that it is time for a periodic update, then it moves to step 2320 and sends a signal to the interface unit 14, and then returns to the sleep mode in step 2302. Alternatively, if it is not time for an update, then the sensor unit returns to step 2302 when it enters sleep mode before then proceeding back to step 2304.

In some embodiments, the content of the message or packet may vary based on different criteria or situation. For example, in one embodiment, the contents of the packet may depend upon the type of request received from the interface unit. For example, a SENSOR_STATUS_REQUEST message may be received at the sensor unit from the interface unit 14. Upon receipt of this message, the sensor unit 12 initiates a measurement of the precipitation level, ambient temperature, full-load battery voltage and/or other parameter depending on the received request according to some embodiments. The sensor unit may query the sensors to obtain such measurements, and/or retrieve the measurements from the memory 314. After these one or more measurements have been obtained, the sensor unit 12 constructs a message packet containing the results of the measurements along with the RSSI value that was observed during the receipt of the message. The entire message packet is then transmitted to the interface unit 14 in the form of a SENSOR_STATUS message. In some embodiments, in addition to information requests, while in the sleep mode, the sensor unit 12 may also receive "set" commands from the interface unit 14. These commands provide a value for one or more variables stored in memory within the sensor unit 12, such as transmittal power, threshold values, etc. Upon receiving such messages, the sensor unit 12 will store the value and transmit an acknowledge message to the interface unit 14.

Figure 5:
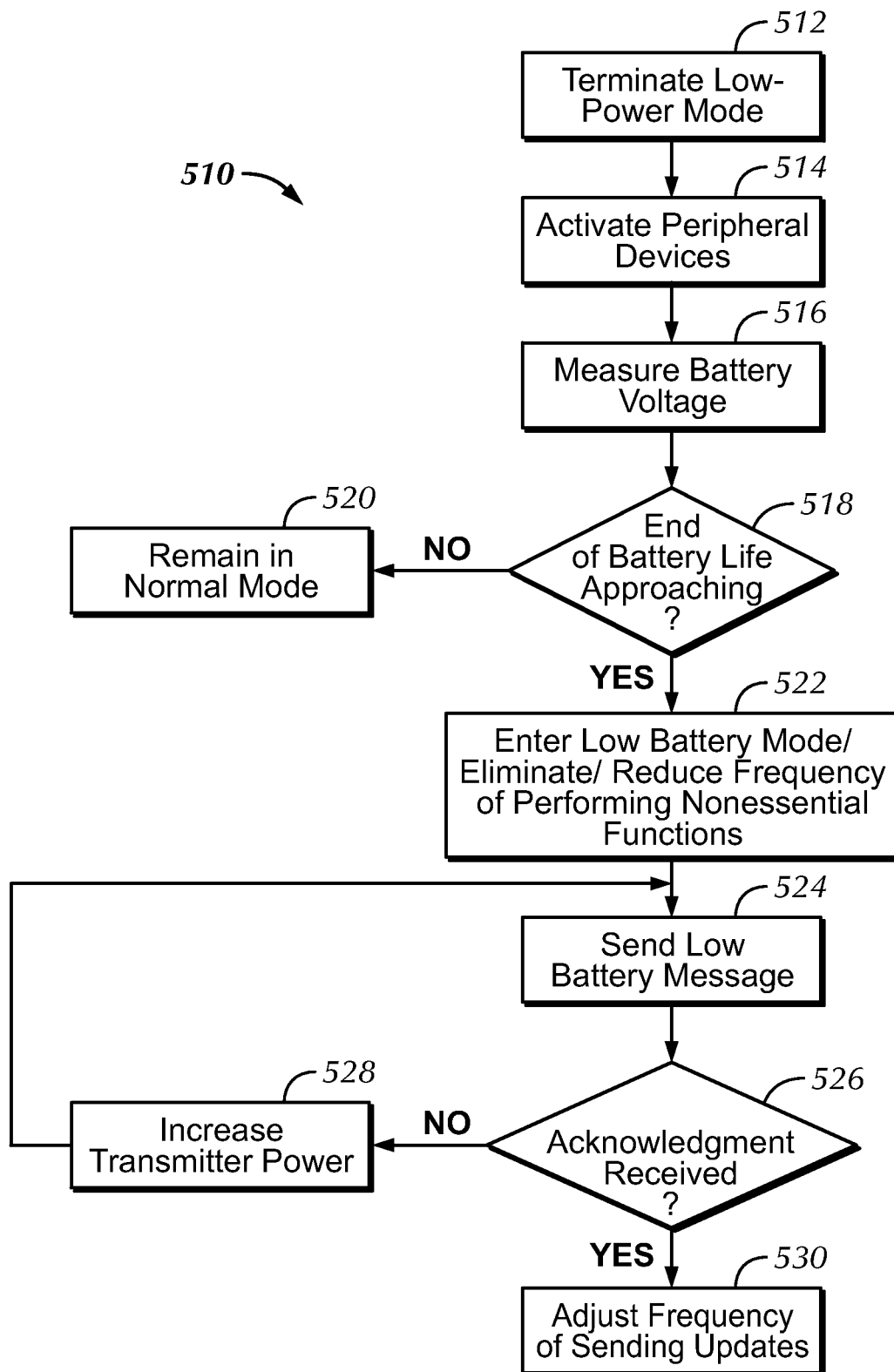
FIG. 5 depicts a simplified flow diagram of a process for use in adjusting the mode of operation of the sensor unit of FIG. 3.

In some embodiments, the sensor unit periodically monitors its stored power level and/or battery life while in the sleep mode. A process 510 by which the sensor unit monitors the battery life, according to some embodiments, is illustrated in FIG. 5. In step 512 the sensor unit 12 transitions out of the sleep or low-power mode. In step 514 the sensor unit activates one or more sensors and/or other peripheral systems in or cooperated with the sensor unit 12. In some instances, the transmitter and/or transceiver is not powered up or only the transceiver or portions of the transceiver are active.

The power or battery voltage level of the power source 324 is measured in step 516. In step 518, it is determined whether to enter a low-battery mode. This determination may be made by comparing a measured full battery voltage level measured while the sensors and other peripheral devices have been activated with a non-volatile constant value stored in memory 314 to determine if the power source 324 is nearing the end of its useful life or is below a threshold. In some embodiments, in order to accurately make this determination, the controller 312 may make a measurement of the ambient temperature, via the temperature sensor, to calibrate the measured battery voltage. If the battery is approaching the end of its life (e.g., the full-load battery voltage is below the minimum allowable voltage) the process 510 continues to step 522 where the controller 312 switches the sensor unit 12 into a low battery mode and attempts to reduce power consumption by eliminating or reducing the functions performed and/or the frequency of performing non-essential functions.

Once the sensor unit 12 enters a low battery mode, step 524 is entered where the sensor notifies the interface unit 14 that it has detected a low battery condition. In some instances, the sensor unit 12 initiates the transmission of a warning message to the interface unit 14 at or below the transmission power last assigned by the interface. In step 526, it is determined whether an acknowledgement has been received from the interface unit 14. If the acknowledgment is not received (typically within a predefined period of time), the process continues to step 528 where the transmission power is increased and the process returns to step 524 to again transmit the warning message at the increased power level. The power is increased with each subsequent attempt until an acknowledgment is received, a predefined number of attempts are made and/or a predefined transmission power level is reached. In some embodiments, the loop through steps 524, 526 and 528 may be repeated after a period of time when an acknowledgement is not received.

In some embodiments when an acknowledgment is received from the interface unit 14, the sensor unit 12 continues to step 530 where it adjusts the number of periodic updates it sends to the interface unit. For example, in one embodiment, where the sensor unit may send 4 periodic updates each day to the interface unit during normal mode, once it enters Low Battery mode the sensor unit may only send 1 periodic update per day to the interface unit. In some embodiments, the sensor unit 12 may also reduce the frequency at which it wakes up to query the sensors and/or other peripheral devices for information such as amount of rain, temperature, battery strength and/or other such data once it enters the Low Battery Mode of operation. Alternatively, in some embodiments, after receiving the acknowledge message, the sensor unit 12 will not initiate further transmissions other than in response to requests received from the interface unit. The interface unit 14, upon receiving the warning message, may notify a user, such as displaying a message on a user display of the interface unit 14 alerting the user of the operational mode of the sensor unit 12. Returning to step 518, if it is determined that the end of battery life is not approaching the system continues to step 520 where the sensor unit continues to operate and/or returns to operating in normal or sleep mode.

In some embodiments, the sensor unit 12, will perform the battery monitoring process 510 once per day to obtain a current battery voltage level and stores the measurement in memory 314, and/or forwards the measurement to the interface unit 14. Alternatively, in some implementations, it may not be necessary to perform battery monitoring process 510 often since the low battery usage of the sensor unit 12 allows the battery or power source to function for long periods of time, and usage of power sources such as solar or wind power energy allows longer battery life so that the monitoring of the battery life does not have to be performed frequently.

Figure 25:
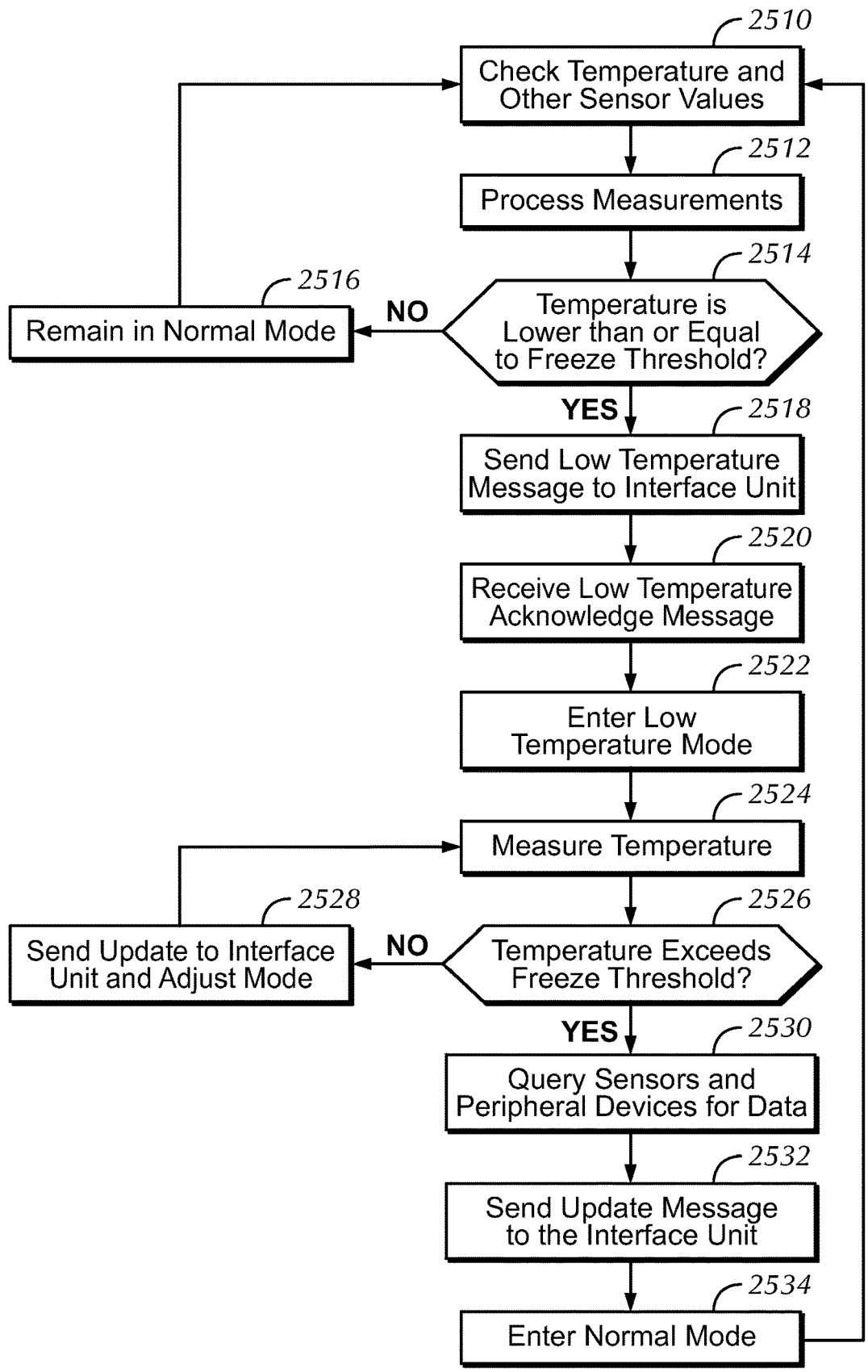
FIG. 25 illustrates a simplified diagram of one implementation of the low temperature operational mode according to some embodiments.

Further, in some embodiments, the sensor unit may operate in a "Low Temperature" or "hibernate" mode. The sensor unit 12, according to some possible implementations, may enter low temperature mode when it determines that the temperature is below a certain threshold. FIG. 25 illustrates one possible implementation of the low temperature operational mode, according to several embodiments. In step 2510, while in normal mode, the sensor unit will periodically, e.g. every 5 minutes, query the temperature and/or other sensors to determine the current temperature and other current values. Next, in step 2512 the sensor unit 12 will process the measurements and uses the measurement to determine if a certain relationship exists between the measurements, e.g., temperature, and a freeze threshold level in step 2514. For example, a freeze threshold level may be set at 36 degrees Fahrenheit. If in step 2514, the relationship does not exist, the sensor unit will remain in normal mode (step 2516) and cycle back to step 2510. If in step 2514, the sensor unit determines that the relationship exists, the process will move to step 2518 where it will generate and send a low temperature message or warning to the interface unit 14. Next, in step 2520 the sensor unit receives an acknowledgment message from the interface unit. In one embodiment, when the sensor unit 12 sends the low temperature message or warning and does not receive an acknowledgment it may retransmit the message for a certain period of time, e.g., five minutes, and or a certain number or retransmissions until acknowledgment is received. In some embodiments, the sensor unit 12 will increase its transmit power with each retransmission up to its maximum allowed transmit power. In one embodiment, if the acknowledgment is not received after the certain period of time and/or the certain number of retransmissions the sensor will monitor the ambient radio noise to determine if a certain level of noise exists. If the sensor unit 12 determines that noise exists, the sensor unit will wait a certain amount of time and check back to see if the noise goes away. When the sensor sees an opportunity to send in a noise free time period, it will retransmit the temperature message. In one embodiment, when the sensor unit determines that a noise free time does not exist, and or is not capable of retransmitting after a certain period of time, the sensor unit 12 will assume that the interface unit 14 is broken, has lost power or is powered down. Accordingly, the sensor unit 12 will stop trying to communicate and listens periodically to see when the interface unit is ready for communications and can receive transmissions. In some embodiments, when the interface unit does not hear a response from the sensor unit, the interface unit will cease transmissions so as not to clutter the air waves and listens constantly for communications from the sensor unit 12.

After the sensor unit 12 receives the acknowledgement message, it enters the low temperature mode in step 2522. In one embodiment, the sensor may decrease the rate at which it sends updates to the interface unit 14. Additionally or alternatively, the sensor unit may also decrease the frequency at which it wakes up to query the sensors and/or other local or peripheral devices for data. While in the low temperature mode, in step 2524 the sensor unit will query the temperature and/or other data. Next, in step 2524 the sensor unit uses the sensed temperature data to determine if the condition still exists at fixed intervals, e.g. once per day. For example, the sensor unit 12 may measure the temperature and determine whether the temperature exceeds a certain threshold. When, in step 2526 the sensor unit determines that condition still exists, e.g., that the temperature is still below a certain threshold level, in step 2528 the sensor unit generates an update message comprising the measurement of temperature and possibly other data and transmits the message to the interface unit 14. Further, in step 2528 the sensor unit may make certain determinations to adjust its mode of operation, while remaining in low temperature mode. For example, in several embodiments, the sensor unit will measure the battery strength to determine if it needs to enter into the low battery mode. Next, the sensor unit returns to step 2524 where it will periodically, e.g. once per day, and processes the measurements, in step 2526 to determine if the atmospheric conditions have returned to a normal condition, e.g. temperature is above the threshold. When in step 2526 the sensor unit determines that the conditions have returned to normal, e.g. the relationship between the temperature and/or other data and the threshold no longer exists, in step 2530 the sensor unit will query sensor and other local sensor and devices for data such as rain amount, temperature, battery strength, signal strength and/or other data and transmits an update message to the interface unit 14 in step 2532 comprising some or all of the data. Next, in step 2534 the sensor unit enters Normal mode and the process will begin again at step 2510.

The sensor unit 12 may also operate in a "test mode" in some embodiments. In many embodiments the test mode is utilized, in part, during the installation of the sensor unit 12 to provide the installer with a relatively quick and simple-to-understand process for testing that the sensor unit 12 is installed at a location with, for example, adequate radio reception from the interface unit 14. The installation process is described in further detail below.

Figure 4:
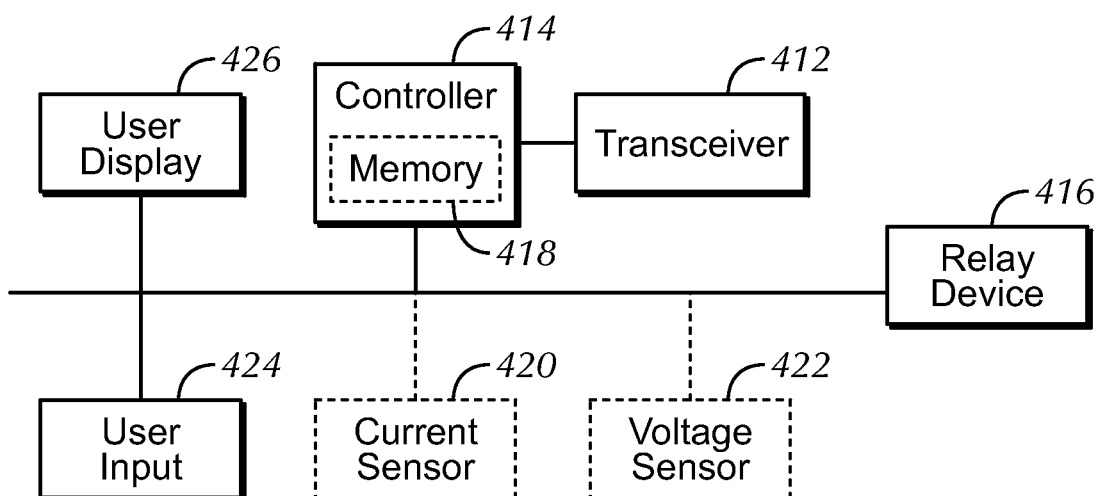
FIG. 4 is a functional diagram of the components of some embodiments of an interface unit of the rain sensor device of FIGS. 1 and/or 2.

Referring next to FIG. 4, a diagram is shown of the functional components of some embodiments of the interface unit 14 of the rain sensor device of FIGS. 1 and 2. The interface unit 14 comprises a transceiver 412, a controller 414, a relay device 416, a memory 418, a user display 426, and a user input 424. In some embodiments, the interface unit 14 may also include a current sensor 420, and a voltage sensor 422. The components of the interface unit 14 are coupled to one another by a bus or other means. The transceiver 412 may be any hard wire, wireless, optical and/or other device capable of transmitting and receiving signals to and from the interface unit 14 via the communication link 15 or 40. Examples of wireless radio frequency chips known in the art include Texas Instruments CC1100, Melexis TH71211, Micrel MICRF112, or MICRF211, Semtech CE1201A, Atmel ATA5428, Analog Devices ADF7020 or ADF7021, and/or Maxim MAX7033 or MAX7044 may be used for the transceiver 316. The wireless transceiver includes or couples to an antenna. The controller 414 may be implemented through a single-processor or multiprocessor systems, microcontroller, minicomputers, microprocessor, processor, programmable electronics and the like, and/or combinations thereof. The controller 414 and the memory 418, in some implementations, together function as a microcontroller. The memory 418 may be a separate memory unit within the interface unit 14, external memory connected to the interface unit via an interface (not shown), may be internal memory within the controller 414, and/or other such configurations. Further, the memory may comprise one or more of flash memory, EEPROM memory, RAM, ROM, on-chip RAM, and/or other such memory or combinations of memory.

In some embodiments, the controller 414 employs flash memory for storage of executable firmware, and is capable of being programmed "in-system". This may be accomplished in some instances by employing an in-system programming port in the interface unit 14, on a printed circuit board of the controller 414 and/or other configurations to accomplish the programming process during, for example, a final assembly. In some embodiments, the controller 414 further includes an EEPROM or other non-volatile memory for storage of data, executables and/or other software to support of the functional capabilities of the controller 414. Additionally or alternatively, on-chip RAM may be included on the controller 414 in sufficient quantity for functional capabilities in many embodiments. Generally, the controller 414 executes instructions, which in some instances are defined by processor and/or computer executable program codes or the like, stored in the memory 418 to implement the functionality of the interface unit 14.

Figure 24:
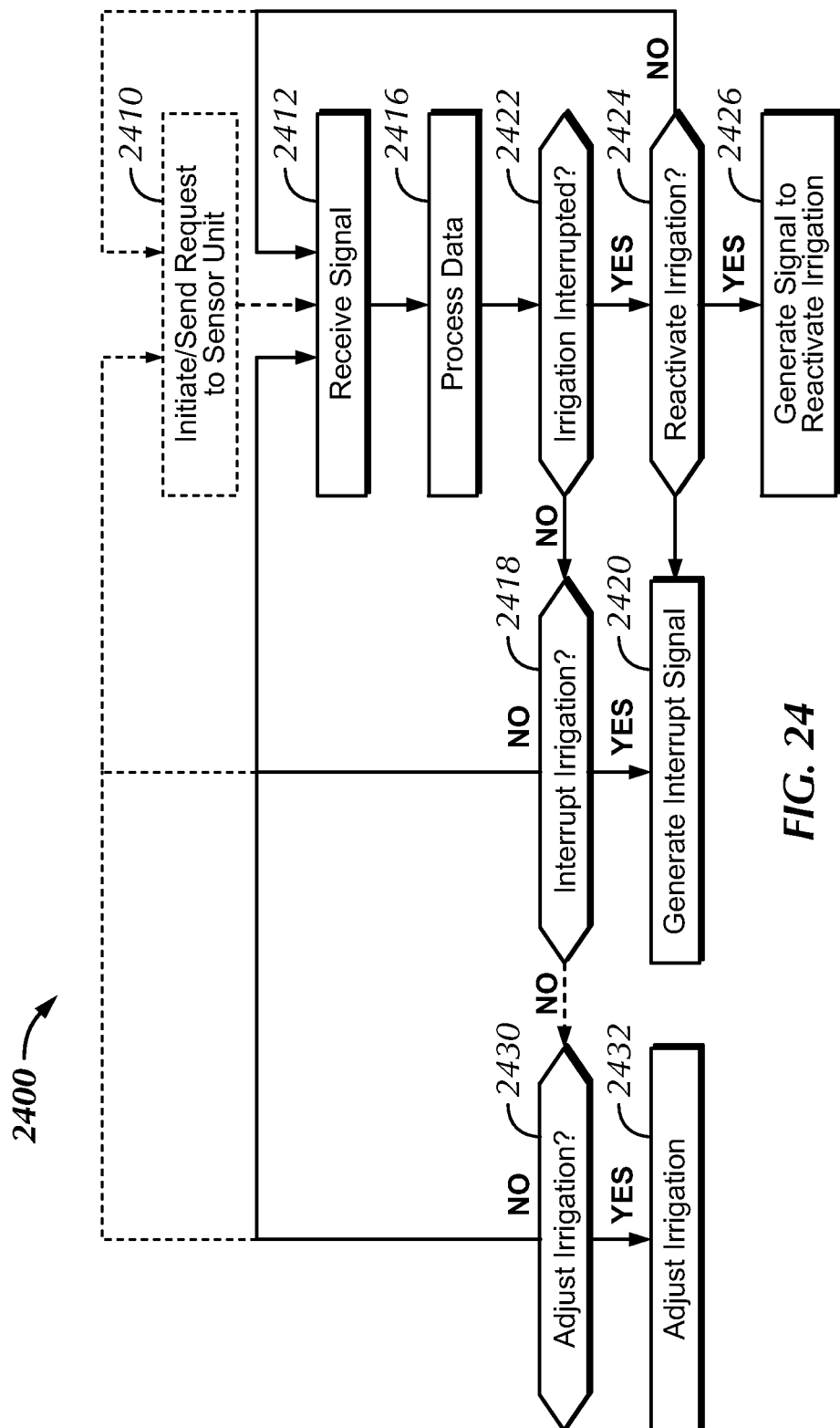
FIG. 24 illustrates a simplified flow diagram of a process for use in detecting and inhibiting an irrigation cycle in accordance with one embodiment.

FIG. 24 illustrates a process 2400, according to some embodiments, by which, at least in some part, the interface unit 14 provides some control over irrigation. When the sensor unit 12 transmits a signal to the interface unit 14, the signal is received at the interface unit in step 2412. In some embodiments, the sensor unit 12 will transmit the signal at fixed intervals, e.g., every 6 hours, and/or when it senses a change, for example, a change in the amount of rain fall or temperature. Additionally, the sensor unit 12 will send signals to the interface unit 14 when the interface unit sends a request to the sensor unit requesting information as shown in optional step 2410. Alternatively, the signal may be received in response to a request for data sent from the interface unit in step 2410.

After receiving the signal, in step 2416, the interface unit processes the signal to retrieve data such as temperature, amount of rain fall, and/or other data, such as battery strength. After processing the data, step 2422 is entered where the interface unit determines if irrigation is currently interrupted, e.g., if a relay or switch is currently open. When irrigation is not interrupted, in step 2418, the controller of the interface unit 14 will determine whether to interrupt irrigation. For example, in one embodiment, in step 2418, the interface unit compares the measurements received from the sensor unit to certain threshold levels and/or other criteria to determine whether a relationship exists between the measurements, e.g., amount of rain fall and/or temperature, rate of change thereof and the thresholds. Further, in one or more embodiments, the interface unit 14 may use the data to determine a relationship between current data and previous data received from the sensor unit. For example, in one embodiment the interface unit may determine a rate of change in the atmospheric data, e.g., rainfall, temperature, and/or other data. In some embodiments the decision to interrupt the irrigation is based on whether the measurement data exceeds certain preset thresholds. Additionally and/or alternatively the determination may be based on other criteria. For example, in one embodiment the sensor unit uses the data to determine a rate of change, and bases the determination at least in part on the calculated rate of change.

Figure 30:
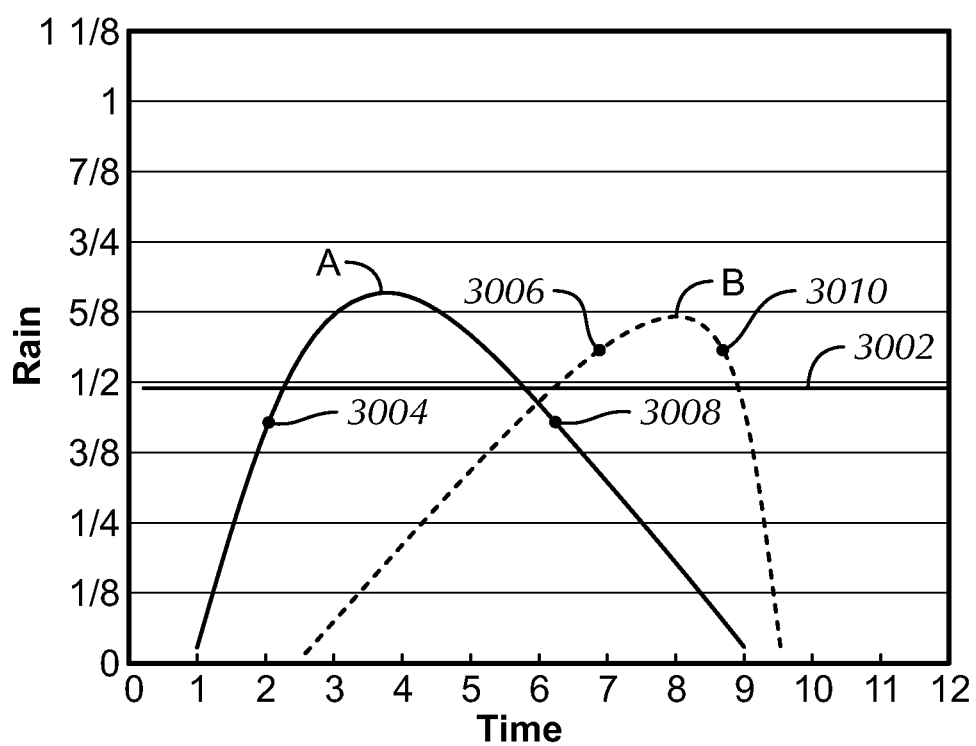
FIG. 30 graphically illustrates example rain profiles and the points at which irrigation is interrupted or reactivated based on a rate of change of a sensed amount of rain fall, according to some embodiments.

FIG. 30 illustrates one example of how the decision to interrupt irrigation may be based at least in part on the rate of change in the amount of rain fall. An example graph of rain fall amount in inches versus time in hours is illustrated with two different rain fall profiles A and B. In profiles, the rain fall cutoff (or interrupt) threshold 3002 is set at ½ inch. In profile A, the rate of increase of rainfall is high (indicated by a steep slope on the increasing side of profile), and therefore, in some embodiments, the interface unit 14 will interrupt irrigation before the threshold level is reached, for example at point 3004. Alternatively, in profile B, rate of increase of rain fall is less (indicated by the gradual slope of the increasing side of the profile), and in that situation, the interface unit 14 may inhibit irrigation after the rain fall amount reaches and/or exceeds the threshold 3002, for example at point 3006. Thus, when determining whether to interrupt irrigation, several embodiments, use at least the rain fall measurement and a rate of rain fall.

Referring back to FIG. 24, when in step 2418 the interface unit determines that irrigation should be interrupted it will generate an interrupt signal in step 2420. For example, in one embodiment, the interrupt signal is a signal to open a relay or switch to break the common line of the irrigation controller. Alternatively, if in step 2418 the interface unit determines that irrigation should not be interrupted (irrigation should be permitted) it may continue to step 2430 where it may determine whether irrigation should be adjusted. Criteria similar to the determination of whether irrigation should be interrupted may be used to make the determination in step 2430. If the interface unit determines that irrigation should be adjusted, it may generate a signal, in step 2432, that cause an adjustment to the irrigation schedule or amount of irrigation. Alternatively, if the interface unit determines that an adjustment is not necessary it returns to step 2412 or optional step 2410 and repeats the process once a request is initiated and/or a transmission from the sensor unit is received. Alternatively, in some embodiments, once in step 2418 the interface unit determines that irrigation should not be inhibited it returns to step 2412 or optional step 2410 and repeats the process once a request is initiated and/or a transmission from the sensor unit is received.

Returning to step 2422, when the interface unit determines that irrigation is currently interrupted, in step 2424 the interface unit 14 determines whether irrigation should be reactivated. For example, the interface unit uses the data from step 2416 and determines whether certain relationship exists between the data and certain levels and or thresholds. For example, the interface unit determines whether a relationship exists between a rain fall threshold and the amount of rain fall indicated by the data received from the sensor unit 12.

Additionally or alternatively, the interface unit may look at the rate of change in one or more atmospheric parameters to determine whether to reactivate irrigation. For example, in FIG. 30 the rate of rain fall in profile A indicates a gradual decrease in the amount of rain fall at the sensor unit 12 (i.e., it represents a gradual decrease or drying out of the sensor material, possibly indicating further rain or slowing rain). As such, the interface unit may reactivate or permit irrigation after the amount of rain fall is below the threshold level, for example, at point 3008. Alternatively, in profile B the rate of rain fall decrease is greater (as indicated by the decreasing slope of profile B). Therefore, the interface unit may reactivate or permit irrigation before the rain fall amount has fallen below the threshold 3002, for example at point 3010. A rapidly decreasing slope could indicate that the rain fall quickly stopped and perhaps that the air is dry such that irrigation should be permitted sooner.

Returning to FIG. 24, if in step 2424 the interface unit determines that irrigation should be reactivated or permitted it may generate a signal to reactivate irrigation in step 2426.

For example, in one embodiment, the signal may cause a relay or switch breaking the common line of a controller to close. This would allow irrigation activation lines of the controller to function. Alternatively, if in step 2424 the interface unit 14 determines that irrigation should remain interrupted, it will return to step 2412 or optional step 2410 and repeats the process once a request is initiated and/or a transmission from the sensor unit is received.

Figure 6:
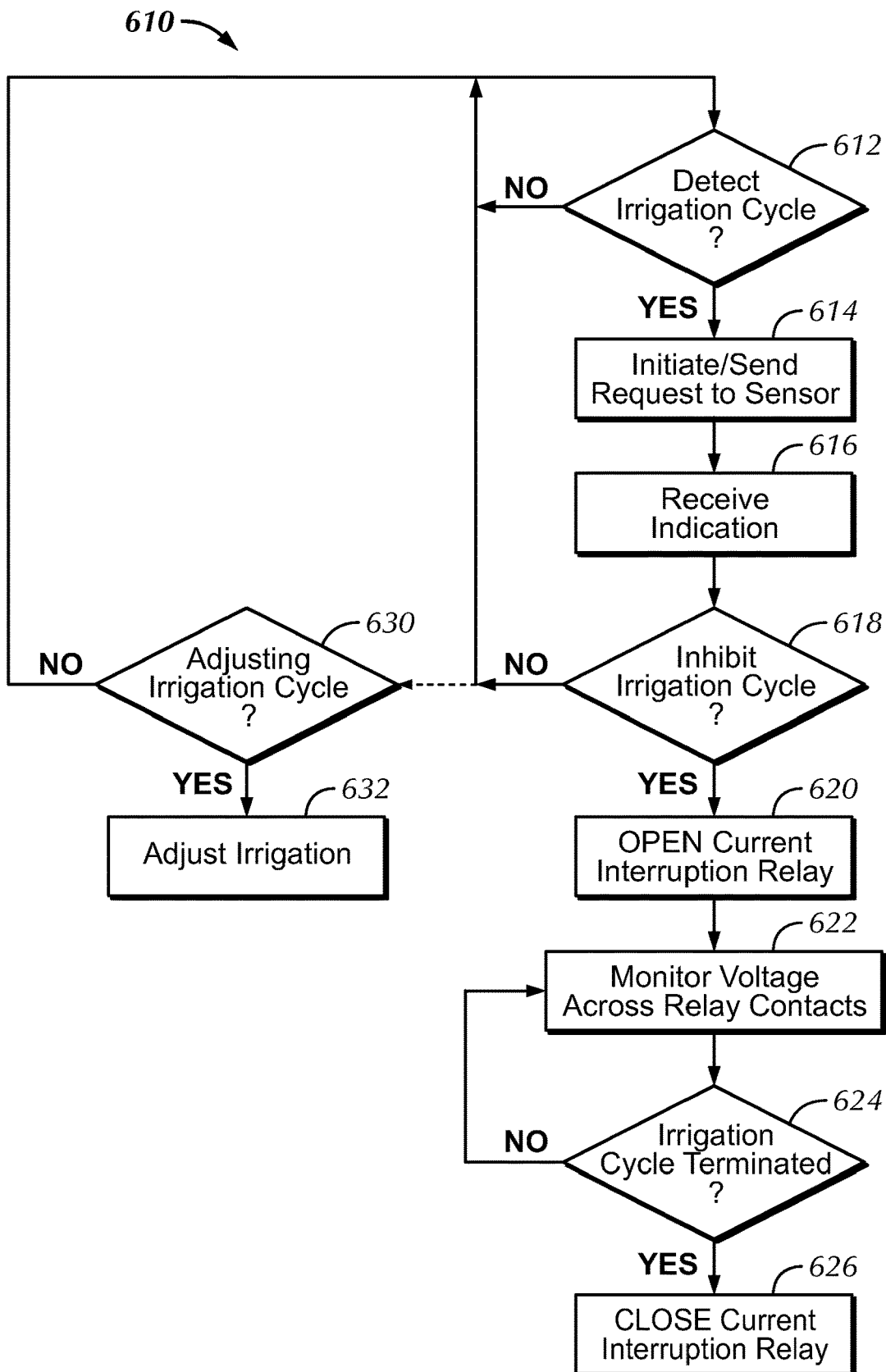
FIG. 6 depicts a simplified flow diagram of a process for use in detecting and inhibiting an irrigation cycle in accordance with one embodiment.

FIG. 6 illustrates an alternative process 610 to, at least in part, to provide some control over irrigation as implemented through the interface unit 14, according to some embodiments. When an irrigation cycle is initiated or commanded by the irrigation controller 30, the interface unit 14 is notified (e.g., a current flows in the common line 34 that is detected by the interface unit). In step 612, the interface unit detects the initiation of an irrigation and/or the notification that an irrigation is about to be initiated, for example, the current sensor 420 detects the current flow through the common line. Following detection of the signal, in step 614 the current sensor 420 notifies the controller 414 and the controller initiates a transmission of a request to the sensor unit 12 by the transceiver 412. Alternatively, in some embodiments the current sensor sends a signal to the controller 414 indicating the measurement of current flow and the controller determines whether an irrigation is about to be initiated. Following the detection of initiation of an irrigation cycle step 614 is entered where the controller 414 initiates a transmission of a request to the sensor unit 12 by the transceiver 412. In step 616, the transceiver 412 receives a signal carrying data transmitted by the sensor unit 12 in response to the request, and supplies the data to the controller 414. In some instances, the signal provides measurement data taken by the sensor unit 12 and/or an indication that a threshold has been reached, and the measurement data or indication is stored or cached in the memory 418. In some embodiments, the interface unit 14 may send a request to the sensor unit 12 requesting that the sensor unit obtains current and/or updated data from the sensors prior to the initiation of an irrigation cycle. In some embodiments, for example, when the interface unit determines that an irrigation cycle is about to begin the interface unit may send a message to the sensor unit 12 requesting current data to determine whether to inhibit irrigation.

In step 618, the interface unit 14 determines whether the irrigation cycle should be inhibited. Alternatively, the measurement data is forwarded to the irrigation controller 30 to evaluate and determine whether irrigation is to be interrupted. The signals received at the interface unit 14 from the sensor unit 12 may comprise an indicating a threshold level has been exceeded, data corresponding to a level of precipitation and/or rain fall, and in some instances may further include other measurement data, such as temperature data sensed by the sensor unit 12. In one embodiment of determining in step 618 of whether to inhibit irrigation, the controller 414 compares the measurement of precipitation and/or rainfall to some criteria, e.g., a stored threshold level, to determine whether a predetermined relationship exits between these variables (e.g., if the amount of measured rain fall exceeds a threshold level of rain). In some embodiments, the determination of whether the irrigation cycle should be inhibited comprises one or more criteria, wherein the interface unit 14 and controller 414 processes the data received from the interface unit to determine whether certain criteria is met and based on this determination the interface unit may generate an interrupt message inhibit irrigation. In one embodiment, for example, the interface unit 14 uses the information received from the sensor unit to determine a rate of change of the received atmospheric measurements, the interface unit may then generate an interrupt message to inhibit irrigation when it senses a certain level of change in the received measurements, e.g., a positive rate of change in amount of precipitation or the rate of change of temperature, and/or other such data. In some embodiments, the instruction set operating in the interface unit 14 is calibrated to correlate the information received from the sensor unit 12 to a level of rainfall that may be related to the threshold level or other criteria. For example, in embodiments where the signal received at the interface unit 14 represents a raw electrical signal output from the sensor unit 12, the transceiver 412, the controller 414 and/or other intermediate device processes this signal to correlate this signal to a corresponding level of rain fall. Alternatively, this correlation may be performed by the sensor unit 12, and the resulting correlation is forwarded to the interface unit 14. In some embodiments, when the rain fall relationship does not exist the controller 414 may further compare other parameters, such as the received measurement of temperature to a stored temperature threshold level to determine whether a predetermined relationship between these variables exists (e.g., if the measured temperature is below a threshold temperature). In other embodiments, the determination of whether a relationship exists between the measured rain level and a preset threshold, or whether other variables such as temperature exceed a preset threshold, is made at the sensor unit 12 and the signal received by the interface unit 14 from the sensor unit 12 provides these determinations from which the controller 414 determines whether to inhibit irrigation.

Once the controller 414 determines that irrigation should be inhibited in step 618 (e.g., the threshold level of rainfall has been exceeded by the amount of sensed or measured rain fall or the threshold level of temperature is above the measured ambient temperature), the process 610 continues to step 620 where the controller 414 generates an interrupt signal. In some forms, a relay device which is normally closed is opened, interrupting irrigation. In some embodiments, the relay device is implemented as a switching device which is opened to inhibit the irrigation. In step 622 when irrigation is being commanded by the irrigation controller 30 while the interface unit 14 is commanding that irrigation be inhibited, a voltage sensor 422 monitors the voltage across the relay contacts. In step 624, it is determined whether the irrigation cycle has terminated. When the irrigation cycle has not terminated, the process 610 returns to step 622 to monitor the irrigation cycle. When the irrigation cycle has terminated, the process moves to step 626 where the interface unit 14 closes the relay device. Following step 626 the process returns to step 612 where the interface unit determines whether an irrigation cycle is initiated (e.g., the current sensor device 420 monitors the current flow to determine if an irrigation cycle is detected).

Returning to step 618, when it is determined that irrigation should not be inhibited, the system returns to step 612 to determine whether an irrigation cycle is detected. In some embodiments, the determination that irrigation should be inhibited (e.g., that a relationship exists between the measured variables and the thresholds) is made at the sensor unit 12, and upon transmitting a request to the sensor unit, the interface unit 14 will receive an "irrigate" or "inhibit" command.

In some embodiments, when it is determined in step 618 that the irrigation is not to be interrupted (e.g., the level of rain fall or ambient temperature do not meet the predetermined relationship), optional step 630 is entered where the interface unit determines whether the level(s) of the measurement data (e.g., rain fall, temperature and/or other data) are such that the irrigation should be adjusted. This may be done by comparing the precipitation data and/or the temperature to a second set of thresholds. Additionally or alternatively, the interface unit 14 may forward one or more of the measurement data to the irrigation controller 30 allowing the irrigation controller to determine whether irrigation is to be adjusted.

When it is determined in step 630 that the irrigation is to be adjusted, step 632 is entered and the interface unit 14 adjusts the run time of the irrigation cycle and/or notifies the irrigation controller 30 that the runtime should be adjusted (e.g., by forwarding measurement levels and/or adjustments to be implemented). When it is determined in step 630 that adjustments are not to be made or following step 632 the process 610 returns to step 612 to detect the start of an irrigation cycle.

Referring back to FIG. 4, the user input 424 allows a user to input and adjust the stored threshold level(s), enable or disable the sensor(s), and/or adjust other settings. Generically, in one embodiment, the user input 424 comprises at least one selectable user input that allows the user to make adjustments and/or selections. The user input 424 may comprise one or more of buttons, switches, levers, rotating dials, etc. The user display 426 may indicate the operational status of the interface unit 14, e.g., the display may indicate that the receiver unit is powered on, what threshold level is selected, if the receiver unit is in an irrigation interrupt state, etc., and/or the operational status of sensor unit 12 such as the operational mode of the sensor unit. The user display 426 may be one or more of a display screen, liquid crystal display (LCD), touch screen display, lights, LEDs, and/or other relevant displays. In some, embodiments for example, the display comprises a backlit LCD, for example, which is capable of displaying alphanumeric characters with 11-segment LCD digits. It is noted that although the input/output unit 18 (whether wired or wireless) is illustrated as a transceiver (wired or wireless), in some embodiments the input/output 18 may comprise a separate transmitter and receiver.

Figure 7A:
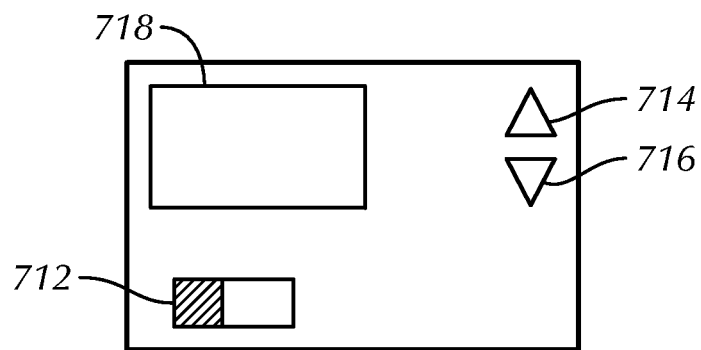
FIG. 7A is one embodiment of the interface unit of the rain sensor device of FIG. 4 illustrating user inputs and display outputs.

FIG. 7A is an illustration of some embodiments of the interface unit 14 for use in the rain sensor system 10 of FIGS. 1 and 2. In this embodiment, the user input 424 is embodied as including an ON/OFF switch 712, an up button 714 and a down button 716. The user display 426 is embodied as a small display screen 718. The ON/OFF switch 712 turns the power to the interface unit 14 on and off. The up and down buttons 714 and 716 are used to set and adjust one or more threshold levels and/or other parameters and settings. These thresholds and/or parameter may be utilized and/or forwarded to the sensor unit 12 to adjust a remote rain sensor to different threshold levels at the sensor unit 12 of the rain sensor system 10, such as described in U.S. Pat. No. 6,570,109; however, the threshold level is set electronically and at the interface unit 14. For example, by pressing the buttons 714 and 716, the user switches between multiple discrete levels of rain thresholds, e.g., a low threshold, a mid threshold and a high threshold. In other embodiments, the up and down buttons 714, 716 cause an up and down gradient or analog adjustment to the stored threshold level. The display 718 may be configured to indicate which threshold level the interface unit 14 is currently set, notify the user of battery strength or low battery, indicate if the interface unit 14 is in watering interrupt mode or not, and other such information. In some embodiments, the display screen 718 is not included.

Figure 7B:
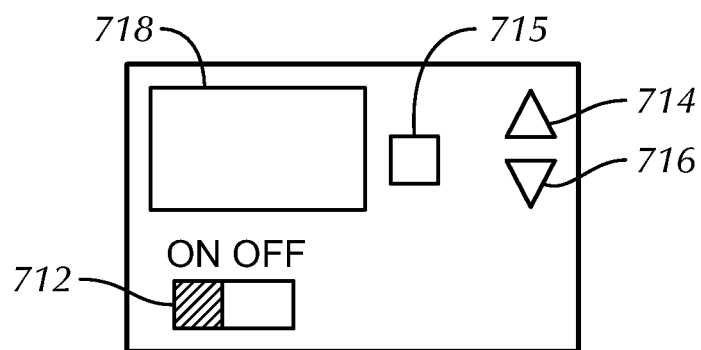
FIG. 7B is another embodiment of the interface unit of the rain sensor device of FIG. 4 illustrating user inputs and display outputs.

In other embodiments, such as shown in FIG. 7B, an additional selection button 715 is provided that allows a user to select different adjustable features or settings of the interface unit 14. For example, the selection button 715 provides different adjustment functionality to buttons 714 and 716. The display 718 indicates what parameter or setting the user may adjust with buttons 714 and 716. For example, by repeatedly pressing the selection or menu button 715, the user may navigate between different selectable or adjustable settings or features. For example, as described above, the selection button 715 allows the user to make adjustments to the rain fall threshold level. Pressing the button 715 again may allow the user to change the rain delay period after the water threshold has been exceeded and returned back below the threshold, to change the temperature threshold level, and/or change other parameters or settings. The button 715 may also allow features to be turned on or off with the buttons 714 and 716. For example, button 714 may be used to turn a feature selected by button 715 on, while button 716 turns that feature off.

Figure 8:
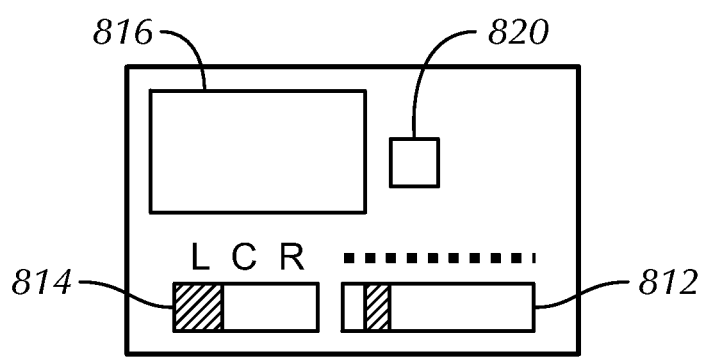
FIG. 8 is another embodiment of the interface unit of the rain sensor device of FIG. 4 illustrating user inputs and display outputs.

Referring to FIG. 8, in some embodiments of the interface unit 14, the threshold level is set by moving a multi-position switch 812 or other type of drag bar between multiple positions. Each switch position electrically signals to the processor what threshold level corresponds to the proper switch position. In many embodiments, precipitation amounts between, for example, ⅛" to ¾" are selectable in discrete increments or continuous manner. Further, in some embodiments, the user input 424 comprises a three-position toggle switch 814 to allow the user to configure the unit for the desired operation. The switch 814 has a center, left and right position. In some embodiments, placing the switch into the center position places the interface unit 14 into a normal operational mode where irrigation is inhibited if sufficient precipitation has been detected by the sensor unit 12. Placing the switch into the left position places the interface unit 14 into a bypass mode where irrigation is not inhibited by the system. The setting the switch into the right position places the interface unit 14 into a test mode. In some embodiments, the right position is a spring-loaded return to center, automatically releasing to center position e.g., normal mode, when the switch is no longer held in position. The user display 426, in some embodiments, may include an LCD backlit display screen 816. In many embodiments, the user input 424 may further include a pushbutton switch 820 to allow the user to activate the LCD backlight for a period of time.

FIG. 29A is an illustration of alternate embodiment of the interface unit 14. This embodiment comprises for example an LCD touch screen embodying both user input and user display functionality. In other embodiments, the user input may comprise selectable buttons, dials and/or switches, and the user display may be a graphical display and/or other means of displaying data to the user. The user input 424 is embodied as including a rain threshold selector 2936, a temperature threshold selector 2926, rain sensor activation selector 2932 and temperature activation selector 2930. The rain threshold selector 2936 and temperature threshold selector 2926 enable the user to set or adjust the threshold level for the amount of rain or temperature respectively. These thresholds may be utilized at the interface unit 14 for making decisions regarding whether to inhibit/interrupt or permit/allow irrigation, and/or may be forwarded to the sensor unit 12 to adjust a remote rain sensor to different threshold levels at the sensor unit 12. The rain activation selector 2932 and the temperature activation selector 2930 further allow the user to adjust the mode of operation wherein the user may select to inhibit irrigation based on the amount of rain or precipitation and/or the temperature. For example, using the selectors 2930 and 2932 the user may chose to interrupt irrigation based on both precipitation and temperature data by activating both selector and/or one or neither of the measurements by deactivating either or both of the selectors 2930 and 2932. It is noted that the rain threshold selector 2936 and the temperature threshold selector 2926 may be generically referred to as selectable inputs that allows a user to adjust a respective threshold level.

The display 2900, as illustrated in FIG. 29A, is embodied as a connectivity indicator 2938, a signal strength indicator 2920, a connection indicator 2924, a rain indicator 2934, a battery strength indicator 2922, a temperature indicator 2928, and a system status indicator 2940. The connectivity indicator 2938 indicates whether there is a connection between the interface unit 14 and the sensor unit 12. The signal strength indicator 2920 displays the signal strength of the wireless connection between the sensor unit 12 and the interface unit 14, where the number of bars represents the strength of the signals received from the sensor unit 12 at the interface unit 14. The connection indicator 2924 displays the number of sensor units 12 currently connected to the interface unit 14 and further displays which of the sensors 12 *a-n* is currently able to communicate with the interface unit. For example, two sensor units are illustrated, the upper left one in active communication with the interface unit, while the lower left one is not connected to the interface unit. The rain fall indicator 2934 and the temperature indicator 2928 display the amount of rain fall and the temperature currently present at the sensor unit 12 relative to the thresholds (indicated by 2936 and 2926). The signal strength indicator 2920 displays the signal strength between the interface unit 14 and the sensor unit 12. The battery strength indicator 2922 may display the battery strength of the battery at the interface unit, sensor unit, and/or the rain sensor system 10 as a whole. For example, in one embodiment, the battery strength indicator displays the battery strength measurement that it receives from the sensor unit. The system status indicator 2940 displays the mode of operation, i.e., whether the system inhibits irrigation based on rain fall, temperature, and/or both, and additionally displays whether irrigation is inhibited currently.

As illustrated in FIG. 29A, the top section of the system status indicator 2940 indicates whether the system is controlling irrigation based on the measurement of rain, temperature, or both. For example, FIG. 29A shows the system status indicator displaying that the system is currently only inhibiting based on the amount of rain, i.e., only the rain symbol is present at the top of the indicator. The system status indicator further indicates whether the system is currently interrupting irrigation, where the sprinkler symbol on the indicator is either showing irrigation or displays that no irrigation is occurring, for example, the system status indicator as illustrated in FIG. 29A indicates that irrigation is currently not interrupted since the sprinkler symbol is showing irrigation.

FIG. 29B illustrates an alternative embodiment 2901 of the display 2900 of the interface unit 14 for use with the system 10, for example in embodiments when the interface unit 14 is coupled with multiple sensor units. As illustrated, in some embodiments the connection indicator 2924 displays the interface unit, and also displays multiple sensor units coupled to the interface unit (in this case sensor units 1, 2, 3 and 4). The interface unit also displays signal strength 2920, and battery strength 2922 for each of the sensor units 12.

With respect to the embodiments of FIGS. 7A, 7B, 8, 29A and 29B and others described herein, prevention of tampering of slide switches and/or push buttons may be provided by using a mechanical cover (not shown) over the switches/buttons. Additionally or alternatively, in some embodiments, buttons have to be pressed and held for a period of time (e.g., 2-5 seconds) before any changes occurs. This prevents the accidental altering of receiver unit settings.

The interface unit 14 may be powered by connection to the controller 30, e.g., it draws power from the 24 VAC power source of the controller 30. In other embodiments, battery, solar, wind powered or other power sources and/or combinations of sources may be used to supply power to the interface unit 14.

In some embodiments, the sensor unit 12 includes an indicator light, such as a bi-color LED, that is visible to a user and also includes the driver circuitry and power to drive the indicator light. This indicator light is useful when initializing the sensor unit 12 and/or the interface unit 14. For example, in some embodiments, the interface unit 14 includes a test mode button that when pressed sends a signal to the sensor unit 12. In one embodiment, when the sensor unit 12 receives the signal, it illuminates the indicator light. An installer may mount the sensor unit 12 to a given location. The test button on the interface unit may be activated allowing the installer to return to the sensor unit to verify that the indicator light is illuminated, verifying that the communication between the sensor unit 12 and the interface unit 14 is valid.

In some embodiments, additionally or alternatively, when the sensor unit receives the signal from the interface unit it determines the signal strength of the signal and displays the signal via the indicator light. For example, in one embodiment the indicator light blinks a certain number of times representing the signal strength of the test signal. An installer may use the signal strength indication to locate one of a plurality of possible installation locations with the best signal strength. Additionally, in some embodiments the installer may move the sensor unit where the signal strength varies with the change in location, and further where the determining and displaying of the signal strength is done automatically, so that the installer may install the interface unit, push the test message and then move the sensor unit in the remote location until the installer finds a location with the best signal strength where the sensor unit 12 may be installed.

Additionally and/or alternatively, once power is applied to the interface unit 14, the interface unit starts sending signals to the sensor unit 12 for a period of time. If the sensor unit 12 is in range, the indicator light is illuminated. For example, an installer may determine whether the location of the sensor unit 12 is adequate and/or in communication with the interface unit 14 based on the decision criteria of whether the bi-color LED is illuminated (e.g., illuminated green). If the location is determined to be inadequate, the bi-color LED is not illuminated or is illuminated a second color (e.g., illuminated red).

Figure 9:
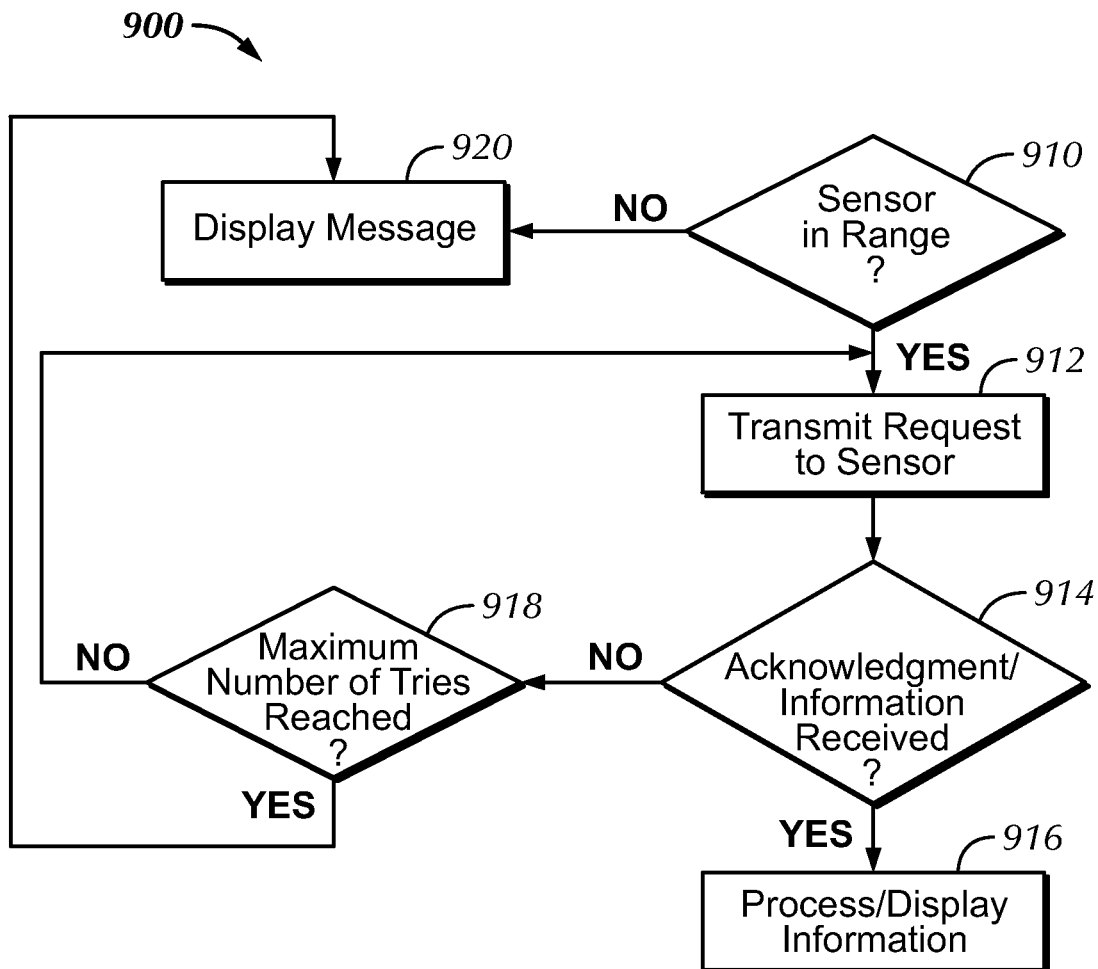
FIG. 9 depicts a simplified flow diagram of a process for use in initializing the rain sensor device illustrated in FIGS. 1 and 2.

FIG. 9 illustrates a flow chart of the process 900 by which the interface unit communicates with the sensor unit once communication is established between the interface unit 14 and the sensor unit 12, according to some embodiments of the rain sensor system 10 illustrated in FIGS. 1 and 2. In some embodiments, the process 900 initiates at step 910 where a determination is made as to whether there is a sensor unit 12 to receive an activation and/or start up message from the interface unit. This determination may include retrieving from memory 418 identification information for one or more sensor units 12 with which the interface unit is associated. Step 910 may be an optional step. For example, when there is only a single sensor unit 12 that is associated with the interface unit. Additionally or alternatively, the interface unit may instead skip to step 912 and broadcast a request as described below to each sensor unit associated with the interface unit 14. This identification information may include the version number of the sensor unit, an identification number of the sensor unit and/or other information uniquely assigned to the sensor unit. Further, this information, in some instances, is stored in the memory 418 at the time the sensor unit 12 is installed, or assigned to an interface unit 14. If there are no sensor units associated with the interface unit, the process 900 moves to step 920 where a message is displayed on the user display 426 alerting the user that there are no sensor units 12 associated with the interface unit 14.

In step 912, once power is applied to the interface unit 14 the interface unit enters an initialization mode and transmits a request to one or more sensor units 12. In step 914, the interface unit 14 checks to see if an acknowledgment message is received from the sensor unit 12. When an acknowledgment is received in step 914 the process then continues to step 916, where the interface unit 14 processes the message and displays the appropriate data on the display 426 (e.g., a confirmation of connection message, an identification of the one or more sensors from which responses are received and/or other such information). When the sensor unit 12 is in range, as introduced above, the indicator light may also be illuminated at the sensor unit.

If it is determined in step 914 that an acknowledgment is not received, the process continues to step 918 where an incremental counter is increased by one, and it is determined whether the request signal has been transmitted a predefined number of times. If the request has not been sent the predefined number of times, the process returns to step 912 to again transmit the request. The subsequent transmission may be delayed for a period of time and/or the subsequent request may be transmitted at a higher transmit power in attempts to connect with the sensor unit 12. Alternatively, when an acknowledgment is not received after a predetermined number of connection attempts the process continues to step 920 where it displays a message alerting the user.

Following step 916, following the initialization mode, the interface unit 14 enters the normal or sleep mode. In normal mode the interface unit will function in accordance with the process as described in FIG. 6. In many embodiments, the interface unit 14 also provides a test mode to enable the user to determine whether or not a proposed location for the sensor unit will result in satisfactory signal reception and communications reliability. This is made possible, in such embodiments, by having a two way communication between the sensor and interface unit. In the test mode, the interface unit 14 initiates a test message transmitted to the sensor unit and receiving an acknowledgment to verify that the sensor unit 12 and interface unit 14 may communicate. The test mode may be initiated automatically by the system in the initialization step. In some embodiments, the user may also initiate a test mode by using the user input 424.

Figure 10:
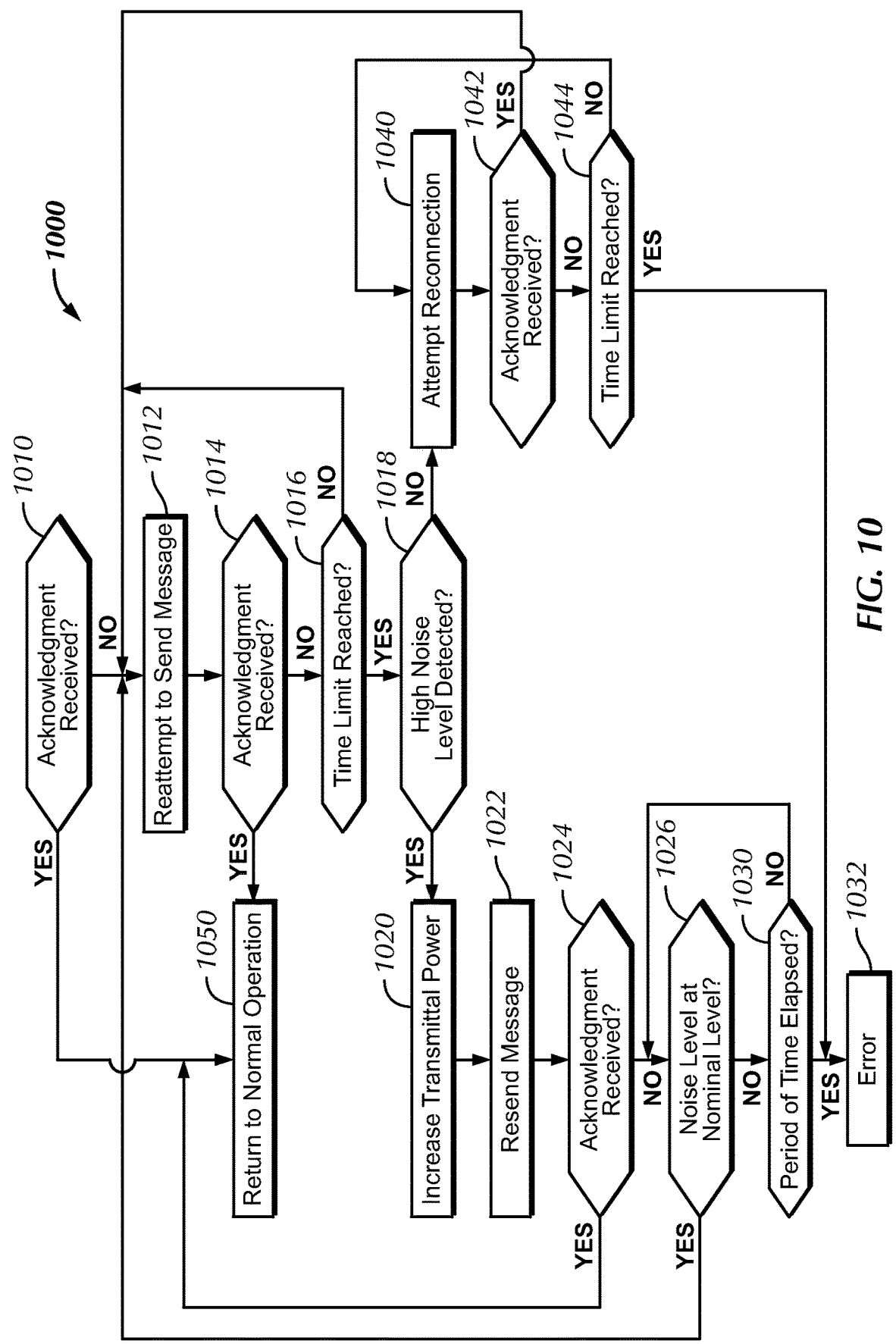
FIG. 10 illustrates a simplified flow diagram of a process for use in the event that loss of communication occurs between the sensor unit and interface unit of rain sensor device or system illustrated in FIGS. 1 and 2.

In many embodiments message traffic between the interface unit 14 and sensor unit 12 occurs in pairs, e.g., when a message is sent, there is an acknowledgement. In the event that the sender of an initial message does not receive an acknowledgement corresponding to the message sent, the originator of the message may assume that the message was lost and attempt to retransmit the message. FIG. 10 illustrates a process 1000 that is implemented in the event that loss of communication occurs between the sensor unit 12 and interface unit 14 of rain sensor device or system 10 illustrated in FIGS. 1 and 2. In step 1010 after sending a message, the originator of the message, e.g., the sensor unit 12 or the interface unit 14, determines whether an acknowledgment is received. When an acknowledgement is received, the process 1000 continues to step 1050 to continue normal operations. Alternatively, if an acknowledgment is not received, typically within a predefined period of time, then the process continues to step 1012 where the originator resends the message.

In step 1014 the originator checks to see if an acknowledgment is received. When it is determined in step 1014 that an acknowledgment is received, the process continues to step 1050 and resumes its normal operation. If no acknowledgment is received then the process continues to step 1016 to determine whether a predefined time limit for reattempting to send the message is reached and/or whether the message is retransmitted a predefined number of times. When it is determined in step 1016 that the predefined time period and/or number of attempts is not reached, the process returns to step 1012 to continue attempting to transmit the message. Alternatively, when, an acknowledgment is not received within the predetermined period of time and/or within the limited number of attempts, the system continues onto step 1018 where the originator attempts to determine whether there is interference in the communications channel.

In some embodiments, both the sensor unit 12 and interface unit 14 periodically monitor the RSSI values obtained from the receiver and/or transceiver 316, 412 during periods where no message traffic is being passed. These values are noted and stored in memory so that information about the noise levels at the sensor unit 12 and interface unit 14 locations are available with which to assess the communications channel at a given time. In some embodiments, when no message traffic is being passed, the interface unit 14 samples the RSSI value randomly, at scheduled times, at intervals, e.g., at intervals of one minute, or the like. Additionally or alternatively, the sensor unit 12 may samples the RSSI value, randomly, at scheduled times or at intervals, e.g., at intervals of one hour. In step 1018 the originator of the message may samples the RSSI value, for example from its receiver chip, and assesses whether or not there is interference or noise levels that exceed limits. When it is determined that high noise level is present the system continues to step 1020 where the originator increases the transmittal power.

In step 1022, the device attempts retransmission of the message at the increased transmitter power. In some embodiments, this step comprises retrieving the maximum transmittal power from memory. In step 1024 the system checks to see if an acknowledgment is received. When an acknowledgement is received, the process continues to step 1050 to transition to a normal mode of operation. If the retransmission attempt does not result in an acknowledgment, step 1026 is entered where it is determined whether the noise level has returned to or is below a threshold and/or a nominal value. In some embodiments, the process may repeat steps 1022 and 1024 in attempts to resend the message for a certain period of time or a predetermined number of attempts before continuing to step 1026. When it is determined in step 1026 that the noise level over the communication link has subsided or reduced to desired levels, the process returns to step 1012 to retransmit the message. In some embodiments when returning to step 1012 the interface unit sends a message to reset the transmittal power of the sensor unit.

Alternatively, when it is determined in step 1026 that the noise level has not reduced, the originator device continues to sample RSSI values, e.g., at predetermine time intervals and the process then proceeds to step 1030. In step 1030, it is determined whether a period of time has elapsed without detecting a reduction in noise level (e.g., reduction to a desired level). If the time limit has not elapsed the process returns to step 1026 to determine whether there has been a reduction in noise over the channel. Alternatively, when the time period has elapsed, the process enters step 1032 where an error message is displayed and/or otherwise indicated and the process terminates. In some embodiments, during this process the user display 426 of the interface unit 14 displays status information, such as a noise message or levels, error message, acknowledgement not received and/or other such information.

Returning to step 1018, when it is determined that the noise level is not in excess, it is presumed that the receiving device at the other end of the communication channel (e.g., wireless link) has failed. The system then continues to step 1040 where the transmitting device attempts to reestablish communication. In step 1042, it is determined whether an acknowledgement is received for the reconnection. When the reconnection is achieved, the process 1000 returns to step 1012 to resend the message (or in some instances to step 1050 for normal operation). Alternatively, the process continues to step 1044, where it is determined whether a time limit has expired while attempting to reestablish communication. When the time limit has not been reached the process returns to step 1040. When the time limit has been reached, the process continues to step 1032, and an error message is displayed and/or otherwise indicated and the process terminates.

In some embodiments, the sensor unit 12 in performing steps 1016, 1030 and/or 1044 may attempt implement a shorter amount of time and/or number of tries before ceasing to transmit, and waits until the interface unit 14 attempts to reconnect. Additionally or alternatively, the sensor unit 12 may not perform all of the steps of the process 1000, and may termination communication earlier in the process to await communication from the interface unit 14. In some embodiments, the user display 426 of the interface unit 14 displays a NO SIGNAL message or other indicator during the time the interface unit is waiting for an acknowledgement and/or is attempting to reconnect until reconnection is achieved or the process terminates.

The next several figures illustrate and describe various types of sensors and circuitry for sensing or generating a signal indicative of the amount of rain fall. These drawings have been simplified and do not illustrate all components of the device. For example, all components of the circuitry and outputs such as a power source (battery and/or solar cell) and wireless transmitters are not illustrated. Depending on the embodiment, a signal representing a sensed value that corresponds to an amount of rain fall received is transmitted to the interface unit 14. In some forms, the interface unit is configured to properly interpret the information in the signal and correlate that information to a corresponding level of rain fall received. In other embodiments, the signal is converted to a corresponding level of rain fall prior to being transmitted to the interface unit 14. Still further in some implementations, the sensor unit 12 determines whether a threshold level of rain is received and transmits an indication of whether the threshold is exceeded in response to an inquiry from the interface unit 14.

Figure 11:
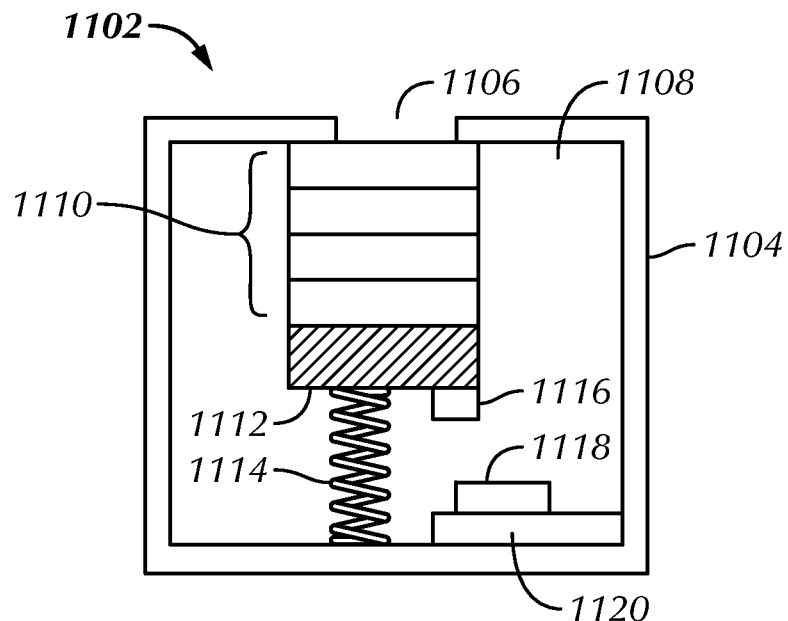
FIGS. 11-19, 27A-B and 28 illustrate various embodiments of the components of a rain sensor unit for use with a receiver unit for interrupting execution of one or more watering schedules of an irrigation controller according to several embodiments.

Referring next to FIG. 11, a diagram is shown of a sensor unit 1102 for use in a system to interrupt execution of one or more watering schedules of an irrigation controller according to several embodiments. In this embodiment, the sensor unit 1102 includes a housing 1104 having an opening 1106 to allow rain fall to enter a volume 1108. Although not illustrated, a ceramic or other porous filter is located in the opening 1106 to allow rainfall to be received into the volume 1108 while preventing dirt and other debris from entering the volume. Within the volume 1108 is a moisture absorptive material that expands and contracts based on the presence of and absence of rain fall, such as a hygroscopic material 1110 comprising a plurality of hygroscopic discs. It is understood that the shape and configuration of the hygroscopic material may vary according to the specific implementation. For example, the hygroscopic material 1110 may comprise discs (as illustrated, or may comprise other suitable materials, such as an expandable granular material (e.g., polyacrylamide, etc.) contained within an envelope or flexible container.

The material 1110 expands in the presence of water, expanding further as the presence of water increases, and contracting as water is evaporated from the volume 1108. Vents (not illustrated) are provided to allow evaporation, i.e., allow the volume 1108 to dry when rainfall is not present. A plunger 1112 is coupled to the material 1110 and a spring 1114 to bias the material 1110 upwardly. A metal piece 1116 (e.g., a metal plate or short section of metal cylindrical tubing) is mounted on the lower surface of the mechanical plunger 1112. This metal piece 1116 is situated in proximity to a capacitor 1118 mounted on the printed circuit board 1120 comprising the sensor electronics. In some embodiments, the printed circuit board 1120 may comprise a controller, memory, transceiver and/or other relevant elements. The capacitor 1118 forms the capacitive arm of an oscillator. The capacitor 1118 is such that the electric field surrounding its plates should have sufficient extent so that the metal piece 1116 mounted on the plunger 1112 will affect its capacitance. Expansion of the hygroscopic material 1110 causes the spacing between the piece of metal 1116 and the capacitor 1118 to change, altering the capacitance of the plunger/capacitor system. Changes in the capacitance of the system will result in a change of the frequency of oscillation of the oscillator, the frequency of corresponding to the amount of precipitation. The sensed frequency provides an analog continuous measurement corresponding to the amount of rain fall. The value of this sensed frequency is transmitted to the interface unit for a determination of whether a rain threshold has been exceeded. Additionally or alternatively in some embodiments, the rain sensor unit 1102 detects when a threshold amount of water is received. For example, contact of the piece of metal 1116 with the capacitor 1118 or circuit board 1120 causes the closing of a switch indicating that a threshold amount of water has been exceeded such that a signal indicating that the threshold has been exceeded is then forwarded to the interface unit in response to the request from the interface unit. In another embodiment, item 1118 is a mechanical switch or button that when contacted by item 1116, presses the switch. In this embodiment, the fact that the switch is pressed, closed or contacted indicates to the electronics that the threshold has been exceeded.

Figure 12:
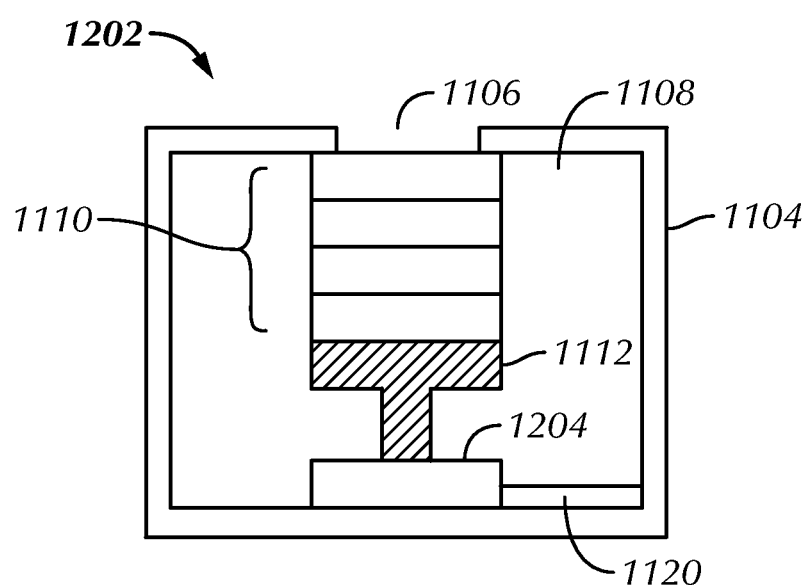

Referring next to FIG. 12, a sensor unit 1202 includes a strain gauge 1204 coupled to the printed circuit board 1120 and that engages the plunger 1112 when the material 1110 expands. Expansion of the material 1110 changes the force applied to the strain gauge 1204 by the plunger 1112. The plunger 1112 may initially contact the strain gauge 1204 or not and a spring 1114 may optionally be included between the strain gauge 1204 and the plunger 1112. This change in force on the strain gauge 1204 is detected by appropriate electronics on the printed circuit board 1120. The sensed force provides an analog continuous measurement corresponding to the amount of rain fall. The value of this sensed force is transmitted to the interface unit 14 for a determination of whether a rain threshold has been exceeded and/or a determination of whether a threshold is exceeded may be transmitted to the interface unit 14.

Figure 13:
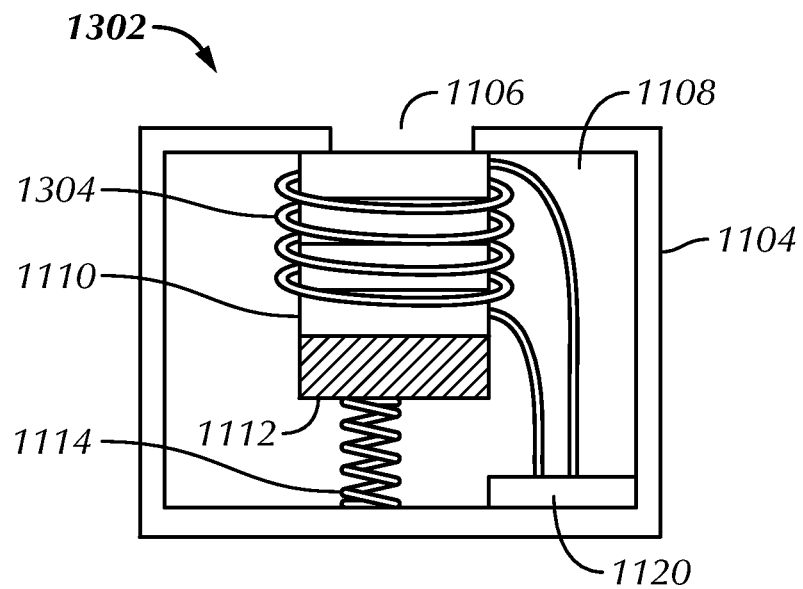

Referring next to FIG. 13, a sensor unit 1302 includes an inductor 1304 wrapping around the material 1110 and coupled to the printed circuit board 1120. The inductor 1304 is fabricated from a fine wire and forms one arm of an oscillator circuit on the circuit board 1120. Expansion of the hygroscopic discs (material 1110) changes the inductance and internal dissipation of the inductor, changing the frequency and amplitude of the oscillator. This change is detected by appropriate electronics on the printed circuit board 1120, providing an analog continuous measurement corresponding to the amount of rain fall and/or an indication of exceeding a threshold. The value of this sensed frequency and/or amplitude is transmitted to the interface unit 14 for a determination of whether a rain threshold has been exceeded.

Figure 14:
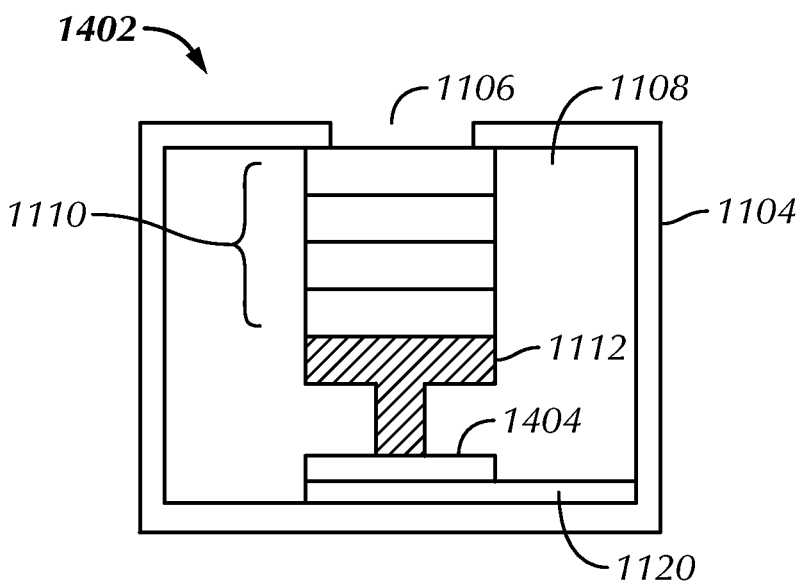

Referring next to FIG. 14, a sensor unit 1402 includes graphite stack resistor 1404 coupled to the printed circuit board 1120 and that engages the plunger 1112 when the material 1110 expands. Expansion of the hygroscopic discs (material 1110) changes the force applied to the graphite stack resistor 1404 by the plunger 1112. The plunger 1112 may initially contact the stack resistor 1404 or not and a spring 1114 may optionally be included between the stack resistor 1404 and the plunger 1112. This change in force on the graphite stack 1404 changes its electrical resistance, and is detected by appropriate electronics on the printed circuit board 1120, providing an analog continuous measurement corresponding to the amount of rain fall. The value of this sensed resistance is transmitted to the interface unit 14 for a determination of whether a rain threshold has been exceeded.

Figure 15:
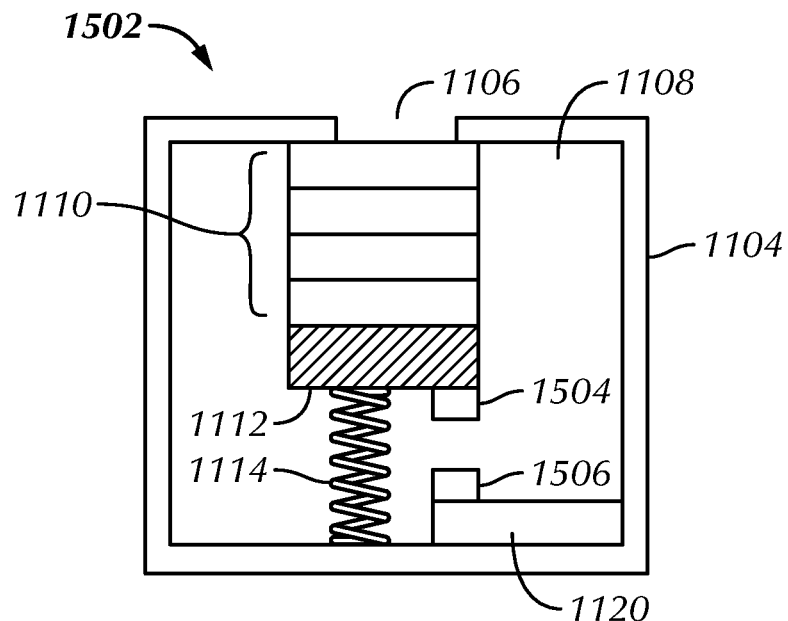

Referring next to FIG. 15, a sensor unit 1502 includes a magnet 1504 on a surface of the mechanical plunger 1112. This magnet 1504 is situated in close proximity to a Hall Effect device 1506 mounted on the printed circuit board 1120 comprising the circuitry or electronics of the sensor unit 1502. Expansion of the hygroscopic discs (material 1110) causes the spacing between the magnet 1504 and the Hall Effect device 1506 to change, changing the output of the Hall Effect device 1506. This change in the output of the Hall effect device 1506 is detected by appropriate electronics on the printed circuit board 1120, providing an analog continuous measurement corresponding to the amount of rain fall. The value of this output is transmitted to the interface unit 14 for a determination of whether a rain threshold has been exceeded.

Figure 16:
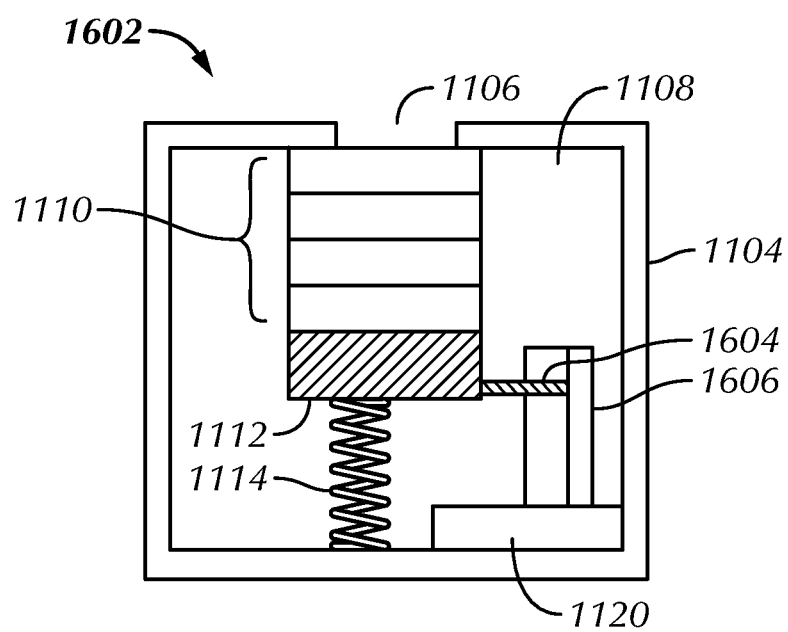

Referring next to FIG. 16, a sensor unit 1602 is shown in which the base of the mechanical plunger 1112 is in contact with a wiper 1604 of a fixed resistive sensing element 1606. In some embodiments, the resistive element and the wiper form a linear potentiometer. Expansion of the hygroscopic discs (material 1110) changes the position of the linear wiper 1604 on the potentiometer 1606, changing its resistance. This change in resistance is detected by appropriate electronics on the printed circuit board 1120, providing an analog continuous measurement corresponding to the amount of rain fall. The value of this resistance is transmitted to the interface unit 14 for a determination of whether a rain threshold has been exceeded.

Figure 17:
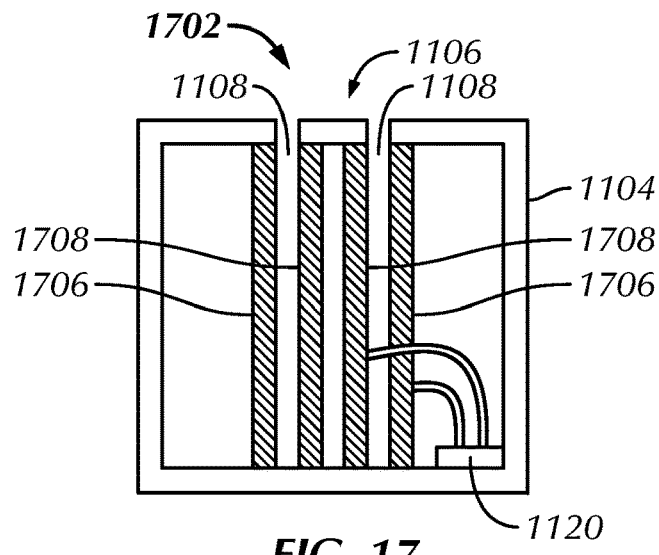

Referring next to FIG. 17, a sensor unit 1702 is shown which does not use a hygroscopic material, and instead uses a capacitor 1704 including a set of plates or electrodes. In the illustrated form, the electrodes are formed as coaxially aligned cylindrical tube electrodes 1706 and 1708, electrode 1706 being the outer coaxial tube and electrode 1708 being the inner coaxial tube. These tubes are illustrated in cross section view. The capacitor 1702 forms the capacitive arm of an oscillator implemented on the circuit board 1120. The volume 1108 and electrodes 1706 and 1708 are configured such that water collects in the space between the electrodes 1706, 1708, changing the capacitance of the coaxial system. The high dielectric constant of water will effect a large change in the capacitance of the system under conditions of small accumulations of precipitation. Changes in the capacitance of the system will result in a change of the frequency of oscillation, providing an analog continuous measurement corresponding to the amount of rain fall. The value of this changing frequency is transmitted to the interface unit 14 for a determination of whether a rain threshold has been exceeded.

Figure 18:
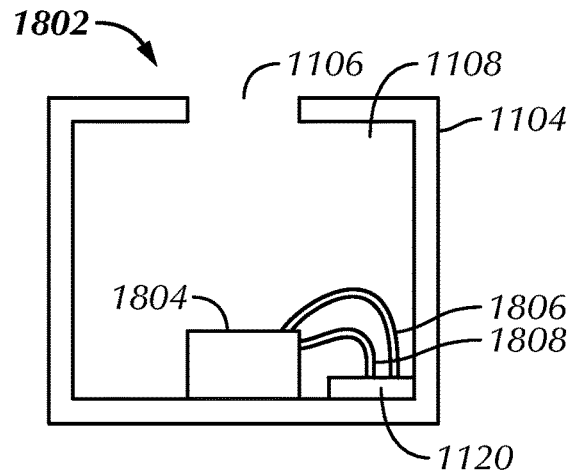

Referring next to FIG. 18, a sensor unit 1802 is shown which does not use a hygroscopic material. In this embodiment, a material whose electrical resistance changes when exposed to water is employed to detect precipitation. As illustrated, a resistance cell 1804 is located within the volume 1108. Electrodes 1806 and 1808 couple from the resistance cell 1804 to the circuit board 1120 and measure the resistance across the cell. Resistance across the resistance cell 1804 decreases as it becomes wet relative to the initial readings when the sensor unit is initialized. Changes in the resistance of the cell 1804 correspond to changes in the level of rain fall received, providing an analog continuous measurement corresponding to the amount of rain fall. The value of this changing resistance is transmitted to the interface unit 14 for a determination of whether a rain threshold has been exceeded.

Figure 19:
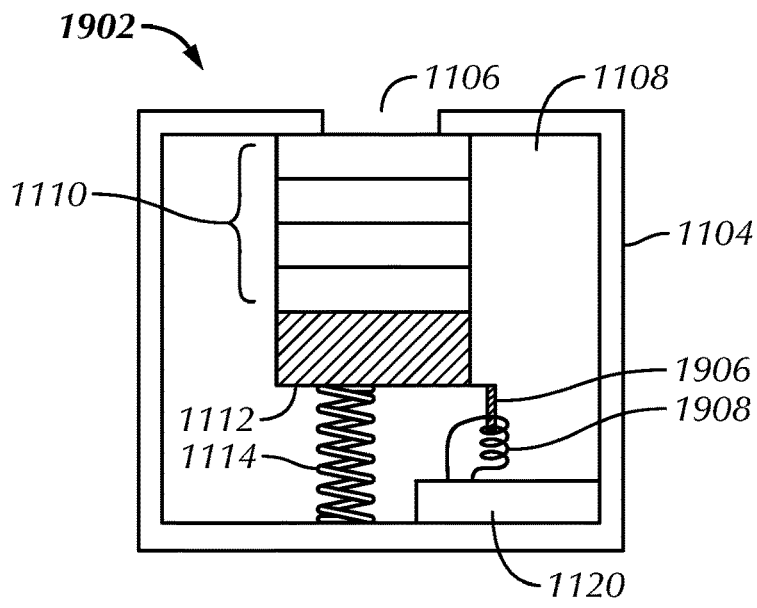

Referring next to FIG. 19, a sensor unit 1902 is shown in which the base of the mechanical plunger 1112 is in contact with a ferrous plunger 1906. This plunger 1906 is situated such that it moves within an inductive coil 1908 connected to the printed circuit board 1120. The inductor 1908 is fabricated from a fine wire and forms one arm of an oscillator circuit on the circuit board 1120. Expansion of the hygroscopic discs (material 1110) changes the position of the plunger 1906 altering the inductance of the plunger/inductor system. Changes in the inductance of the system will result in a change of the frequency of oscillation of the oscillator. This frequency change is detected by appropriate electronics on the printed circuit board 1120, providing an analog continuous measurement corresponding to the amount of rain fall. The value of this frequency is transmitted to the interface unit 14 for a determination of whether a rain threshold has been exceeded.

Figure 27A:
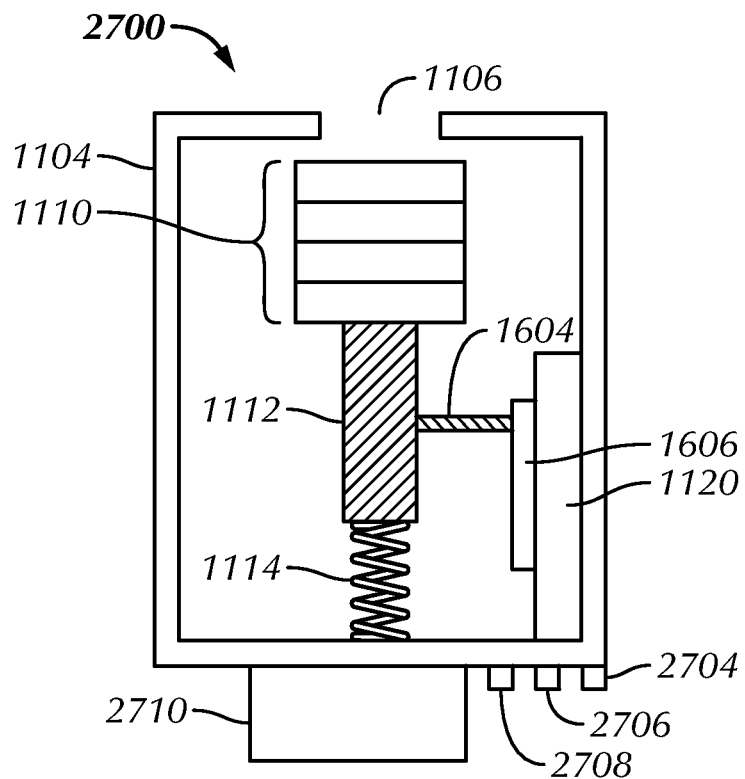
Figure 27B:
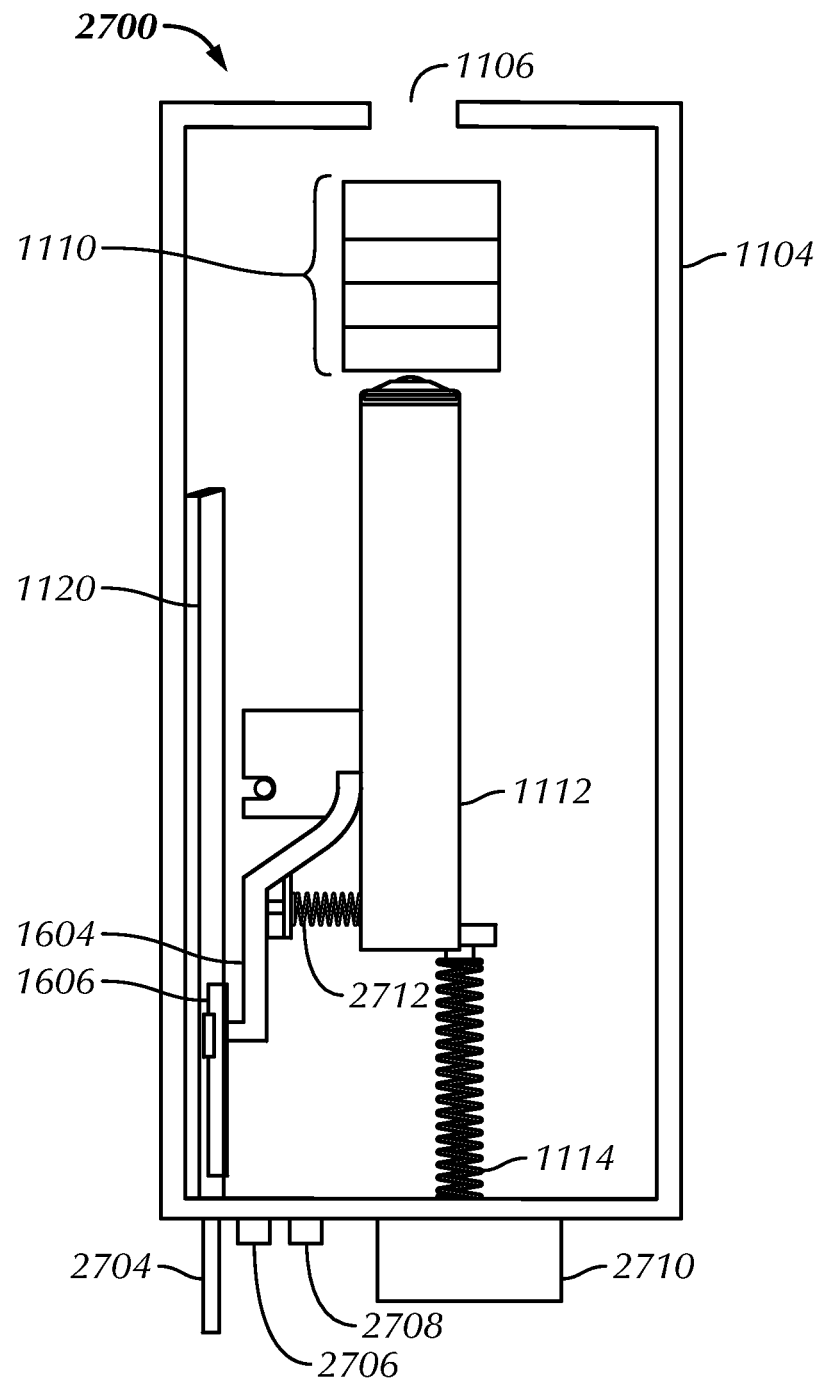

Referring next to FIGS. 27A and 27B, a sensor unit 2700 is shown in which the mechanical plunger 1112 is in contact with the wiper 1604 of the fixed resistive sensing element 1606. As illustrated in FIG. 27B, in one embodiment a spring 2712 is coupled to the wiper 1604 and the plunger 1112 pushes the wiper towards the resistive sensing material maintaining appropriate contact between the resistive sensing material and the wiper. In some embodiments the wiper and the resistive sensing element are parts of a linear potentiometer. Expansion of the hygroscopic discs (material 1110) changes the position of the linear wiper 1604 on the resistive sensing element 1606, changing its resistance. In some embodiments, this change in resistance is detected by appropriate electronics on the printed circuit board 1120, where it is processed to generate an indication representing an amount of rain fall. For example, in one embodiment, the processing results in an analog continuous measurement corresponding to the amount of rain fall. The indication representing the amount of rain fall derived from this resistance is transmitted to the interface unit 14 for a determination of whether irrigation should be permitted or interrupted. In some embodiments, the indication may also be used by the sensor unit to determine whether some internal criteria are met, for example, when changing the mode of operation of the sensor unit. In some implementations, the sensor unit also includes an antenna 2704, a light indicator 2706 and a temperature sensor 2708 coupled to the printed circuit board. Further, in some embodiments, the sensor unit comprises a battery housing 2710 which holds the batteries from which the sensor unit draws its power.

According to several embodiments, the wiper 1604 can be generically referred to as a first element, while the resistive sensing element 1606 may be generically referred to as a second element. In a preferred embodiment, the first element is a moving element and the second element is fixed in a location. Generically, the plunger causes the first element to move relative to the second element causing a change in a variable (in this case, an electrical resistance) corresponding to an amount of rain fall. In some embodiments, the controller implemented on the circuit board is measures the variable and generates signals comprising an indication of the amount of rain fall based on the measured variable.

Figure 28:
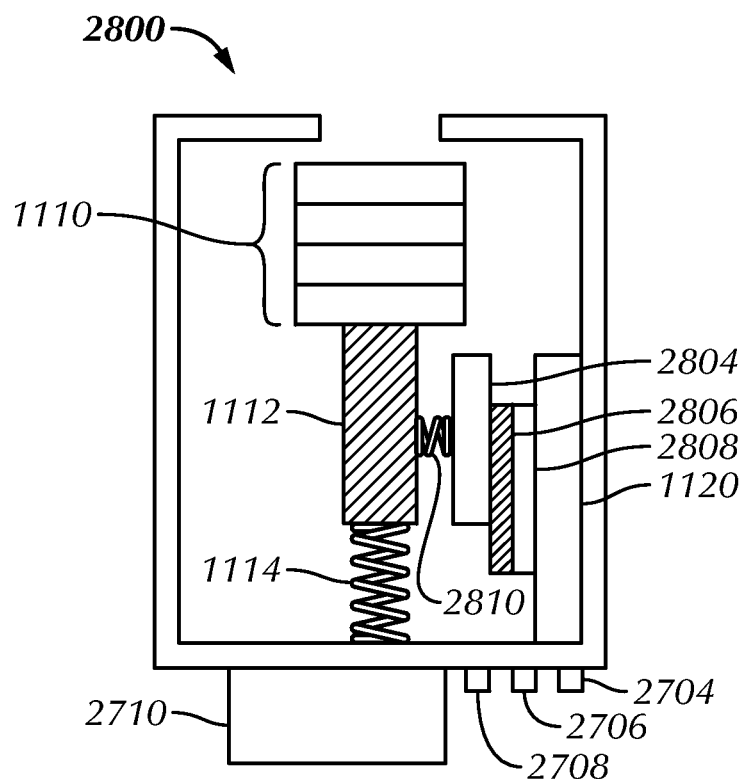

Referring next to FIG. 28, a sensor unit 2800 is shown in which the mechanical plunger 1112 is in contact with a first electrode 2804 (e.g., an electrode plate). In response to expansion/contraction of the hygroscopic disks, the moving plunger moves the first electrode 2804 relative to a second electrode 2808 (e.g., an electrode plate) fixed to the electronic circuit board 1120. The fixed second electrode 2808 is covered with a layer of insulator material 2806, e.g., Mylar insulation, where the insulator material is in contact with the moving first electrode 2804 such that it maintains a gap between the fixed electrode 2808 and the moving electrode 2804. As illustrated in FIG. 8, in one embodiment, a spring 2810 coupled to the fixed electrode 2804 and the plunger 1112 pushes the moving electrode 2804 towards the fixed electrode 2808 and the insulator material maintaining appropriate contact between the fixed electrode covered with the insulator material and the moving electrode. Expansion of the hygroscopic discs (moisture absorptive material 1110) changes the position of the moving electrode 2804 relative to the fixed electrode 2808, changing the surface area of the fixed electrode 2808 that is covered by the moving electrode 2804. Accordingly, this changes the capacitance generated between the two electrodes given a voltage difference therebetween. For example, a voltage is applied to the fixed electrode. In some embodiments, this change in capacitance is detected by appropriate electronics on the printed circuit board 1120, where it is processed to generate an indication representing an amount of rain fall. For example, in one embodiment, the processing results in an analog continuous measurement corresponding to the amount of rain fall. The indication representing the amount of rain fall derived from this capacitance is transmitted to the interface unit 14 for a determination of whether irrigation should be permitted or interrupted. In some embodiments, the indication may also be used by the sensor unit to determine whether some internal criteria are met, for example, when changing the mode of operation of the sensor unit.

According to several embodiments, the first electrode 1806 can be generically referred to as a first element, while the second electrode 1808 may be generically referred to as a second element. In a preferred embodiment, the first element is a moving element and the second element is fixed in a location. Generically, the plunger causes the first element to move relative to the second element causing a change in a variable (in this case, an electrical capacitance due to a changing surface area of the first element positioned above the second element) corresponding to an amount of rain fall. In some embodiments, the controller implemented on the circuit board is measures the variable and generates signals comprising an indication of the amount of rain fall based on the measured variable.

In many embodiments, the rain sensor system 10 is capable of measuring rainfall and according to one or more selected settings to permit or prevent an irrigation controller 30 from irrigating. Rainfall settings are, for example, from ⅛" to ¾" and are selectable at the interface unit 14. The rain sensor system 10 comprises the remote sensor unit 12, and an interface unit 14 mounted near an irrigation controller 30. Communication between the remote sensor unit 12 and interface unit 14, according to some embodiments, is a two way wireless radio link that may eliminate the need to route wires/cable between the units. The wireless sensor unit 12 may be in one of the following forms or a combinations thereof, a wireless rain sensor (transmitter/receiver combination pack), a wireless rain/freeze sensor (transmitter/receiver combination pack), a wireless rain sensor receiver, a wireless rain/freeze sensor transmitter, and/or a wireless rain/freeze sensor receiver.

FIG. 31 illustrates one possible implementation of the overall operation of the system 10 according to several embodiments. In step 3112 the sensor unit 12 generates an indication of the amount of rain and/or other data such as temperature. In one embodiment, the rain sensor generates such data periodically e.g. every 5 minutes. In other embodiments, the sensor unit may generate such indications in response to a request from the interface unit 14. Next, in step 3114 the sensor unit transmits a signal comprising at least the generated indication to the interface unit 14. In some embodiments, the sensor unit may initiate transmission to the interface unit 14 once it detects a change in some atmospheric parameters, e.g., amount of rain fall and/or temperature, and sends an update message to the interface unit. Additionally or alternatively, the sensor unit 12 may transmit the indication to the interface unit 14 at fixed intervals, e.g. every 6 hours. The sensor unit may also transmit the indication to the interface unit 14 in response to a request from the interface unit 14. In one embodiment, the message may include the sensed amount of rain fall, sensed temperature, battery strength, signal strength and/or other data available at the sensor unit.

In step 3116, the interface unit 14 receives the signal containing the data from the sensor unit. In step 3118, the signal is processed to obtain the indication of data from the sensor unit, such as amount of rain or precipitation, and/or temperature. Next, in step 3120 the interface unit 14 determines whether a relationship exists between the indications and a threshold and/or other criteria. If in step 3120 the interface unit 14 determines that the relationship exists, then in step 3122 the interface unit generates an interrupt command to cause irrigation executed by an irrigation controller to be interrupted. Alternatively, when the interface unit 14 determines that the relationship does not exist, the interface unit 14 does not take any actions and returns to step 3116. Thus, in this way, the interface unit allows or permits irrigation executed by the irrigation controller to occur. In some embodiments, steps 3118 and 3120 may be generically be referred to as the step of determining, based at least on the indication from the signal, whether irrigation should be interrupted.

The interface unit 14 typically is mounted on a wall near to, and wired to, an irrigation controller 30. The interface unit may include methods for outdoor and/or indoor mounting. For example, a mounting plate may be provided to be secured into position with one or more screws. The interface unit 14 then slips and/or otherwise is connected onto the mounting plate. Further, the interface unit 14 typically includes a housing. The housing may be made of plastic and may include means to secure the device to a wall without the mounting plate (e.g., a pair of keyhole slots). The housing may be made of polymetric material. It is desired that if the external housing is of a polymetric material, it meets UL standards for flammability, UL 94-5V or better, UV resistance, water absorption, and other applicable UL safety standards. The housing is set up for outdoor/indoor mounting.

An installation mode is activated in the interface unit 14 that the sensor unit 12 unit responds to by displaying the signal strength received from the interface unit. The sensor unit 12 may be mounted with one or more attached brackets in a location that indicates good signal and that catches direct rainfall. The mounting bracket employed by the sensor unit 12 is designed so that a minimum number of tools are needed for installation. The material employed for this bracket is light in weight and resistant to corrosion from water and sunlight.

After installation a simple signal test may be performed to verify communication is working properly between the sensor unit 12 and the interface unit 14. In some embodiments, the sensor unit 12 has batteries that last for 5 years or more under the following conditions: one (1) "TEST" mode activation per year for the duration of five minutes and a total of ten (10) one-second transmissions per day at a power level of +10 dBm. According to many implementations, the system does not require end-user calibration. Normal maintenance consists of debris removal, elimination of plant encroachment, and periodic battery replacement.

The rain sensor system 10 is used in conjunction with 24 VAC irrigation controllers 30 to conserve water usage by automatically preventing the irrigation controller from irrigating once the rainfall reaches a pre-set level.

In some embodiments, the interface unit 14 operates by receiving periodic communication from the sensor unit and processing the data received to decide whether or not to irrigate based on internal rules including, for example, past history, rate of rainfall, thresholds, and/or other criteria. Additionally or alternatively, in some embodiments, the interface unit 14 may operate by interrogating the sensor unit 12 and then deciding to water or not water based on internal rules including past history. In some situations, for example, the sensor unit 12 will show dry conditions and the interface unit 14 will not allow watering due to recent rainfall. Watering may be prevented by breaking the continuity of the common circuit or connecting to the sensor input of the irrigation system, which prevents the solenoid valves of the irrigation system from operating.

In some embodiments, the system operates in either the 868 MHz or 915 MHz license-free ISM bands. It is understood other embodiments will operate in other frequency bands, for example, some embodiments operate at 2.4 GHz and others operate in the 400 MHz ISM band. The system operates reliably at a straight-line distance of 300 feet or more with the sensor unit 12 installed ten feet above the ground and the interface unit 14 installed five feet above the ground.

In one example implementation of the rain sensor device or system 10, communications reliability is defined as a message reception rate of 99% or more between the sensor unit 12 and the interface unit 14 while the system is situated in a residential environment with buildings, trees and other obstructions. This 99% reliability performance metric is with respect to an environment where Rayleigh fading is present, having a link budget fading margin of 20 dB.

Figure 20:
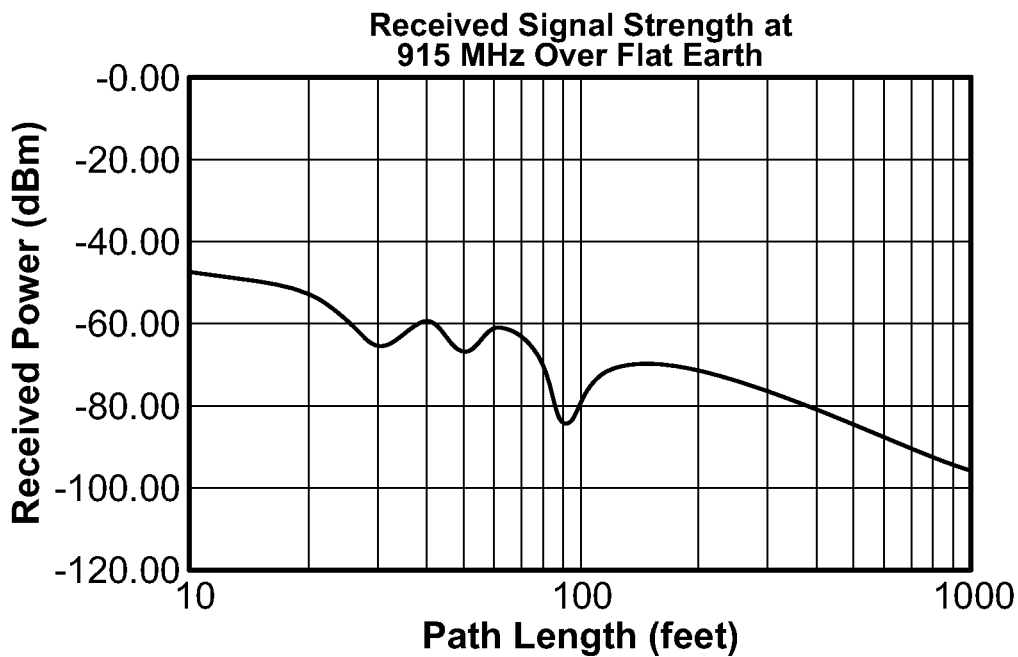
FIGS. 20 and 21 graphically illustrate signal strength profiles used to approximate the propagation environment over communication distances less than the breakpoint distance at 915 MHz and 868 MHz, respectively according to one embodiment.
Figure 21:
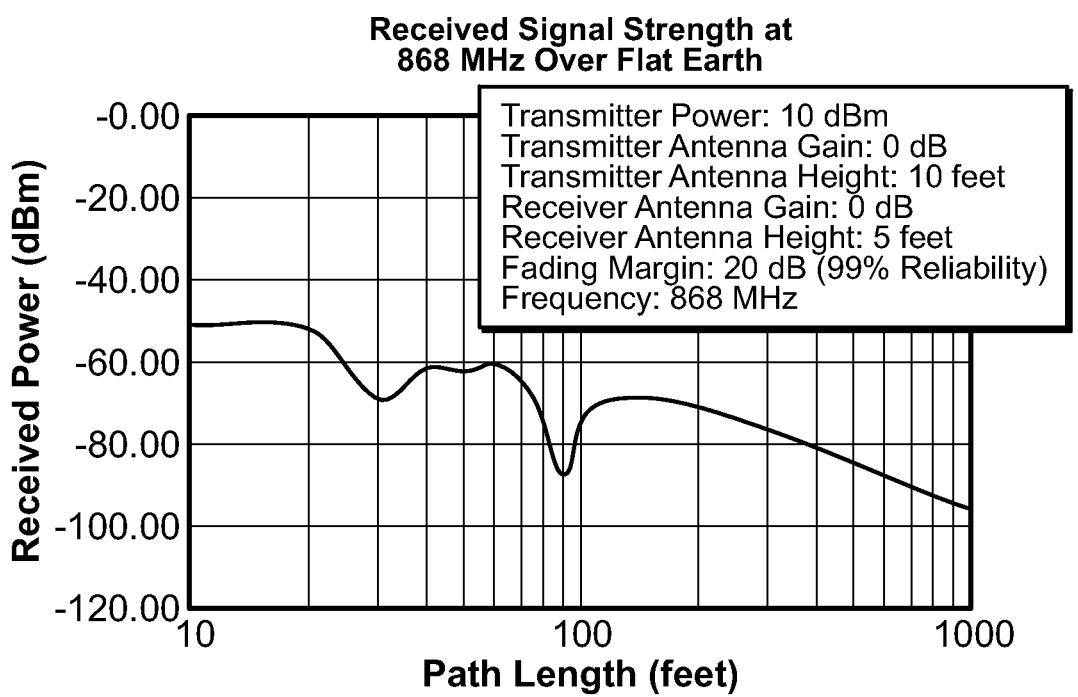

In the 915 MHz band the received signal strength profile that is used to approximate the propagation environment over communication distances less than the breakpoint distance is graphically illustrated in FIG. 20, with the breakpoint distance defined as $$\frac{4h_{TX}h_{RX}}{\lambda}$$

where $h_{TX}$ is the transmitter height above ground, $h_{RX}$ is the receiver height above ground, and $\lambda$ is wavelength. For the 868 MHz band, the received signal strength profile used is graphically illustrated in FIG. 21.

The sensor unit 12 and interface unit 14 may each employ a low-cost, single chip radio transceiver device that is capable of operating across the 868 MHz and/or 915 MHz ISM bands without requiring tuning or component changes. The transceiver devices 316, 412 are capable of generating either direct sequence or frequency hopping spread spectrum signals. In some embodiments, it is desired that the transceiver device meets UL 1950 safety standard and CSA C22.2. In one embodiment, the devices may have a maximum transmitted power level of 10 milliwatts (+10 dBm) or more into a 50Ω resistive load. The frequency of operation and transmitted power level are adjustable through firmware. The device is capable of achieving compliance with all applicable FCC regulations for unintentional and intentional radiators in the 868 MHz and/or 915 MHz bands. In some embodiments, the transceiver 412 may be implemented as a single-chip transceiver 412 employed on the sensor unit 12 providing an analog and/or digital Received Signal Strength Indicator (RSSI) output signal. In one embodiment where the RSSI output is an analog signal, it is provided to one channel of the controller's ADC.

In many embodiments, the sensor unit 12 operates from a high capacity lithium-ion battery. It may employ power conservation techniques to provide a battery lifetime of five years or more while meeting its other functional operating capabilities. A voltage sensing or other battery monitor circuit such as battery voltage sensor 320 is employed, in some embodiments, to measure the battery voltage while it is under load. According to some implementations, the output voltage signal of this monitor circuit is provided to one channel of the controller's ADC 326.

In some embodiments, the sensor unit 12 may include an adjustable cap/collector, and a micro sensor on the PWB protected by a waterproof seal that measures rainfall total.

According to some implementations, the controller 312 of the sensor unit 12 is implemented through and/or utilizes a low-cost 8-bit microcontroller that has sufficient computational power and speed to support the functional capabilities of the unit. It is equipped with one or more very low power "sleep" modes capable of being terminated by externally and/or internally-generated interrupt events. The microcontroller or microprocessor may employ a quartz crystal for generation of an internal clock signal.

In some embodiments, the controller 312 additionally employs FLASH memory for storage of executable firmware, and is capable of being programmed "in-system". An in-system programming port may be available on the printed circuit board for accomplishing the programming process during final assembly. The in-system programming port may be accessible via surface pads (through the use of "pogo" pins on an ICT fixture). A programming header may also be available on the printed circuit board to permit reprogramming the controller during firmware development. In some implementations, Circuit boards may be designed for ease of testability such as using automated test fixture equipment.

Additionally the controller may include on-chip EEPROM for non-volatile storage of miscellaneous data for support of its functional capabilities, according to some embodiments. On-chip RAM may also be present in sufficient quantity for the controller's functional capabilities. The controller may also include an on-chip ADC 326 with 8-bit resolution or greater. In this and/or other implementations, the ADC 326 contains four or more input channels.

In some embodiments, the sensor unit 12 includes a rain sensor 318 employing hygroscopic material suitable for the detection of precipitation. This material typically has a useful lifetime around that of the power source 324, about five years or more. Upon exposure to precipitation, expansion of the hygroscopic material causes a change in a variable. This change in variable or a value derived from the change in the variable is provided to one channel of the controller's ADC 326.

The hygroscopic material and the mechanical structures designed to contain it and translate its expansion to a linear displacement are calibrated, in some embodiments. This calibration establishes the ability of the structure to detect between about ⅛ and ¾ inches of precipitation with a repeatability of ±20% or better. Unit-to-unit variations in the detection of identical amounts of precipitation are ±20% or less.

In one embodiment, in order to detect ambient temperature, the sensor unit 12 may also employ a temperature-sensitive device 322 such as a thermistor, temperature-dependent current source, and/or other such device. For example, a "direct digital" temperature sensor may be employed as the temperature sensor 322. According to some embodiments, the temperature-sensitive device 322 is capable of detecting an ambient temperature of 37° F. with a tolerance of ±5% or better. In some embodiments, the output signal from the temperature-sensitive device is provided to one channel of the controller's ADC.

In one or more embodiments, the sensor unit 12 is also equipped with a light indicator, such as a bi-color LED capable of illumination in red or green. The LED is visible through a clear window in the unit's plastic enclosure to eliminate the need to create a penetration through the plastic. The enclosure of the sensor unit 12 may also include a mounting bracket for outdoor mounting of the sensor unit.

In some embodiments, when the power source 324 (e.g., battery) is inserted into the sensor unit 12, the unit powers up and enters "INITIALIZATION" operational mode. During the initialization mode the sensor may receive a signal from the interface unit 14 to establish a wireless and/or wired communication path between the interface unit 14 and the sensor unit 12. Alternatively, the sensor unit may initiate a message to one or more interface units 14 and start the initialization process. Once the sensor unit 12 receives the set up signal from the interface unit it will send back an acknowledge signal. In one or more embodiments, the acknowledgment signal comprises identification information and/or other local information. The interface unit 14 then receives the acknowledgment message. In one embodiment, the interface unit 14 extracts the ID information and/or other information from the signal and may store the data onto memory 418. According to some implementations, the interface unit 14 may use the data from the setup acknowledge signal in the future to validate communication from the sensor unit to ensue that it only responds to communication from the sensor units it is paired up with. Similarly, in some embodiments the setup signal may comprise ID information about the interface unit 14 which the sensor unit may retrieve and store in memory 314, for example for future validation of signals from the interface unit. After processing the acknowledgment signal at the interface unit 14 the sensor unit 12 and the interface unit 14 are paired up and may communicate through the wireless and/or wired communication link 15. In some embodiments, before sending an acknowledgment message the sensor unit 12 will determine if certain criteria are met. For example in one embodiment, the sensor unit 12 may determine whether there is user input at the sensor unit and will only transmit the acknowledge message when user input is present at the sensor unit. For example, the sensor unit may check to see if the plunger on the rain sensor unit is fully depressed.

Additionally or alternatively, during this mode, the controller 312 may complete firmware initializations in order to set the unit up for operation. In one embodiment, once firmware initializations are completed, the controller 312 reads the battery voltage under full load (with the exception of the radio transmitter or transceiver 316). If the battery voltage is above a minimum voltage for proper operation in "NORMAL" mode, the sensor unit 12 transmits a signal, i.e. a BATTERY_OK message, to the interface unit 14. This signal may be transmitted at a defined power and/or transmitted utilizing the maximum transmitter power available. The interface unit 14 may respond to receipt of this message by sending an acknowledgement signal, i.e., a BATTERY_OK_ACKNOWLEDGE message back to the sensor unit 12. Upon receipt of this message, the sensor unit 12 enters a sleep or "NORMAL" operational mode.

Alternatively, if the measured battery voltage is below the minimum allowable voltage for proper operation in "NORMAL" mode, the unit transmits a low battery warning, e.g., a LOW_BATTERY_WARNING message, to the interface unit 14. This message is transmitted at a defined power and/or utilizing the maximum transmitter power available. The interface unit 14 responds to receipt of this message by sending an acknowledgment, e.g., a LOW_BATTERY_ACKNOWLEDGE message, back to the sensor unit 12. Upon receipt of this message, the sensor unit 12 enters "LOW BATTERY" operational mode.

In some embodiments, during "INITIALIZATION" mode the bi-color LED will illuminate in both red and green for a period of one second. This provides a visual indication to the user that the unit has powered up and is operating. In other embodiments the light indicator may blink a number of times displaying the signal and/or connection strength between the sensor unit 12 and the interface unit 14.

In some embodiments, while the sensor unit 12 is in "NORMAL" mode, the controller 312 brings itself out of its low-power mode periodically to query the sensors and/or other peripheral devices. In one or more embodiments, the controller 312 will process the data to determine if there has been any change in the data obtained from the sensors and/or other devices, e.g., a change in temperature, change in the amount of rain, etc. When the controller determines that a change has occurred, it will initiate a transmission to the interface unit 14. Additionally or alternatively, in some embodiments, the sensor unit 12 will initiate a transmission to the interface periodically, at fixed intervals, sending the data received from the sensors. In this embodiment, the data may be queried from the sensors at the time of the transmission or may be retrieved from memory 314. In an alternative embodiment, while in "NORMAL" mode, the sensor unit 12 typically will not initiate a radio transmission to the interface unit 14. The sensor unit 12 will minimize its power consumption to maximize its battery life, and will place its radio receiver device into a "quasi-sleep" mode. In this embodiment, while in "quasi-sleep" mode, the radio receiver is capable of detecting the presence of an incoming message but may accomplish this without the need to apply full power to all receiver circuitry. In one or more embodiments, during normal mode the bi-color LED may be extinguished.

At intervals, for example of approximately once per day, the controller 312 brings itself out of its normal or sleep mode and activate one or more and typically all peripheral systems on the unit (with the exception of the radio transmitter or transceiver 316). Once all peripherals have been activated, the controller 312 performs a measurement of the full-load battery voltage. The resulting measurement, at least in some embodiments, is stored in memory 314 and/or transmitted to the interface unit 14. Additionally or alternatively, the resulting measurement may be compared with a non-volatile constant stored in memory 314, i.e., EEPROM, to determine if the battery is nearing the end of its useful life. In order to accurately make this determination, the controller may also make a measurement of the ambient temperature to calibrate the measured battery voltage. In some embodiments, if the full-load battery voltage is below the minimum allowable voltage (end of battery life is approaching), the controller may switch the system into "LOW BATTERY" mode.

While in "Normal" mode the sensor unit 12 may respond to a number of messages from the interface unit 14. For example, the sensor unit 12 responds to a SENSOR_STATUS_REQUEST message from the interface unit 14. Upon receipt of a SENSOR_STATUS_REQUEST message, the controller initiates a measurement of the hygroscopic material displacement, ambient temperature, and full-load battery voltage. After these measurements have been completed, the sensor unit 12 constructs a message packet containing the results of the measurements. It also includes in the message packet the RSSI value observed during the receipt of the SENSOR_STATUS_REQUEST message. The entire message packet is transmitted to the interface unit 14 in the form of a SENSOR_STATUS message.

The sensor unit 12 may also respond to a LINK_QUALITY_REQUEST message from the interface unit 14. A LINK_QUALITY_REQUEST message instructs the sensor unit 12 to transmit a LINK_QUALITY message back to the interface unit 14 at the power level specified in the payload of the LINK_QUALITY_REQUEST. The LINK_QUALITY message contains data packets that indicate the requested power level for the transmission and the RSSI value observed during the receipt of the LINK_QUALITY_REQUEST message.

Additionally, the sensor unit 12 responds to a TX_POWER_ASSIGN message from the interface unit 14. A TX_POWER_ASSIGN message instructs the sensor unit 12 to utilize a specific power level for future transmissions (with the exception of a LINK_QUALITY, where the transmit power is assigned by a LINK_QUALITY_REQUEST). The sensor unit 12 responds with a TX_POWER_ACKNOWLEDGE message that contains a packet indicating the assigned transmit power and the RSSI value observed during the receipt of the TX_POWER_ASSIGN message.

The sensor unit 12 responds to a VERSION_REQUEST message from the interface unit 14. A VERSION_REQUEST message instructs the sensor unit 12 to transmit a VERSION message containing the unit's unique ID number, the version number of the firmware stored in its FLASH memory, and the RSSI value observed during the receipt of the VERSION_REQUEST message.

In some embodiments, in "LOW BATTERY" operational mode the sensor unit 12 may notify the interface unit 14 that it has detected a low battery condition. It may also attempt to reduce power consumption by eliminating or reducing the frequency of performing non-essential functions. During the "LOW BATTERY" mode the bi-color LED will be extinguished at all times.

In one or more embodiments, when a low battery condition is detected, the sensor unit 12 initiates a LOW_BATTERY_WARNING message to the interface unit 14. In some embodiments, the power level used for this transmission is the power that was last assigned by the interface unit 14, e.g., through a TX_POWER_ASSIGN message. In one implementation, the LOW_BATTERY_WARNING message instructs the interface unit 14 to transmit an acknowledgment, e.g., a LOW_BATTERY_ACKNOWLEDGE message, indicating that the LOW_BATTERY_WARNING was correctly received. In one embodiment, in the event that the sensor unit 12 does not receive a LOW_BATTERY_ACKNOWLEDGE message, it may increase the transmitter power and resend the LOW_BATTERY_WARNING message. In some embodiments, the transmitter power may be increased with each subsequent attempt to contact the interface unit 14 until an acknowledgment, e.g., a LOW_BATTERY_ACKNOWLEDGE message, is received.

In one or more embodiments, once an acknowledgment has been received the sensor unit 12 may reduce the number of periodic updates it sends to the interface units. Additionally, or alternatively, the sensor unit 12 may also reduce the number of times it wakes up to query the sensors, and/or other peripheral devices. Alternatively, once an acknowledge message has been received the sensor unit 12 may not initiate further transmissions, but only acknowledges messages received from the interface unit 14.

Figure 26:
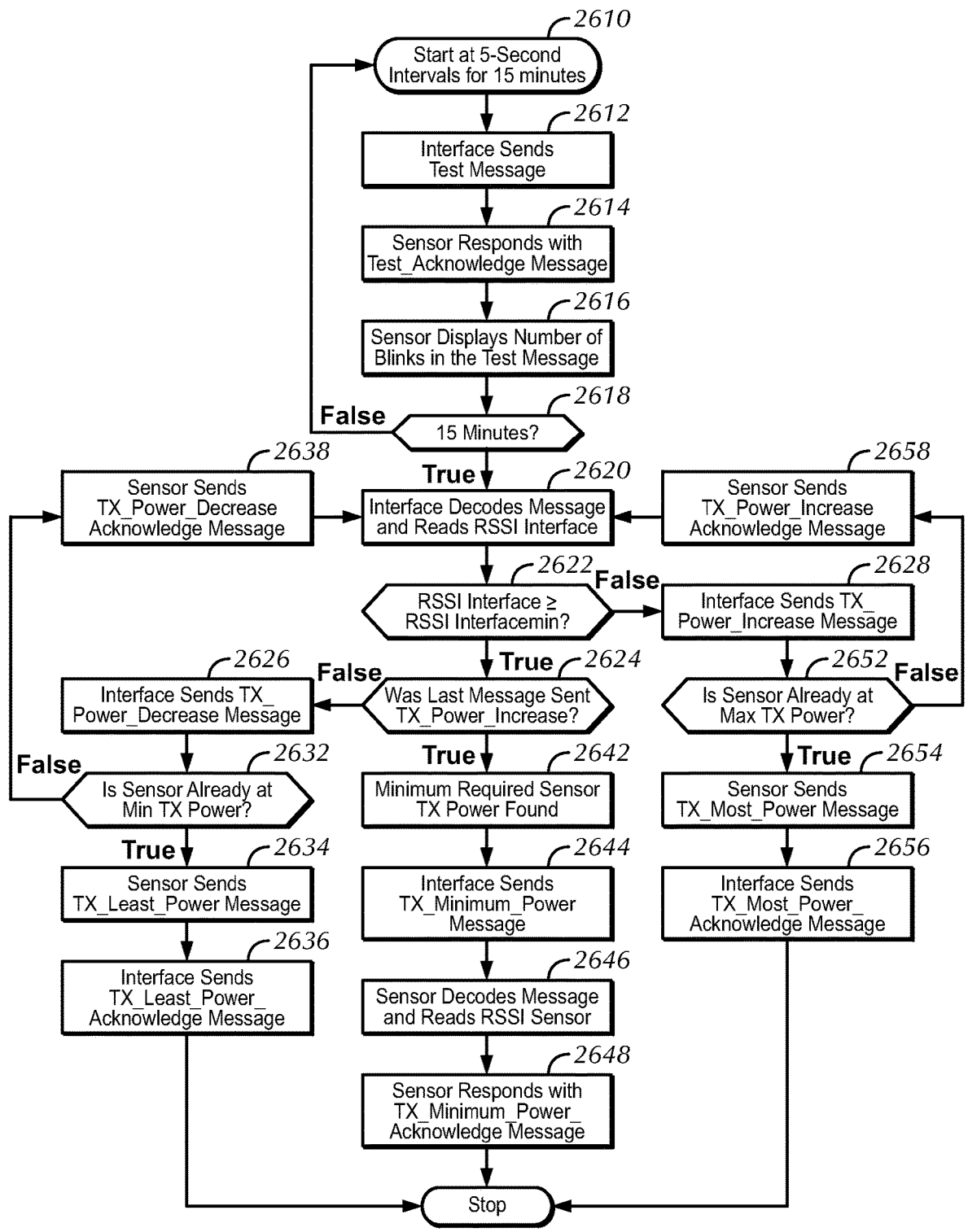
FIG. 26 illustrates one implementation of a "TEST" operational mode in accordance with some embodiments.

FIG. 26 illustrates one possible implementation of the "TEST" operational mode utilized during the installation of the sensor unit 12. This process provides the installer with a quick and simple-to-understand process for determining that the sensor unit 12 is installed at a location with adequate radio reception from the interface unit 14. In some embodiments, the "TEST" operational mode is initiated by the interface unit 14 in response to a "Press and Hold" actuation of the button 820 on the interface unit 14. Still further, in some implementations the "TEST" operational mode terminates automatically after a set period of time, e.g., 15 minutes.

Further, according to some implementations, the "TEST" operational mode consists of an exchange of radio messages between the sensor unit 12 and the interface unit 14 to determine whether or not the sensor unit 12 is positioned at a satisfactory location. Moreover, in some implementations, the test operational mode allows the installer to determine the best possible location for the sensor unit 12 relative to the interface unit 14 before the sensor unit 12 is fixed at a location. In one or more embodiments, a location may be deemed satisfactory if the following conditions are satisfied:

$$RSSI_{SENSOR} \geq RSSI_{SENSORMIN}$$

$$RSSI_{INTERFACE} \geq RSSI_{INTERFACEMIN}$$

$$P_{TXSENSOR} \leq P_{TXNOMINAL}$$

Where $RSSI_{SENSOR}$ is the RSSI value of the RF signal transmitted from the interface unit 14 as received at the sensor unit 12. $RSSI_{SENSORMIN}$ is the minimum allowable value of $RSSI_{SENSOR}$ to achieve communication reliability for the system. $RSSI_{INTERFACE}$ is the RSSI value of the RF signal transmitted from the sensor unit 12 as received at the interface unit 14. $RSSI_{INTERFACEMIN}$ is the minimum allowable value of $RSSI_{INTERFACE}$ to achieve communication reliability for the system. $P_{TXSENSOR}$ is the transmitter power employed by the sensor unit 12. $P_{TXNOMINAL}$ is the maximum transmitter power allowed for the sensor unit 12 to utilize for operations under normal operating conditions. In some embodiments, the power level may typically be at least 6.0 dB below the maximum output power achievable by the transmitter, and may be selected to achieve the overall battery lifetime of the sensor unit 12 is adequate.

According to some implementations, While in the "TEST" operational mode, the "TEST" operational mode flag in the FLAGS field of all message payloads may be SET.

Still referring to FIG. 26, in step 2610 the message transactions are initiated by the interface unit 14 at two-second intervals, and culminate in the determination of the optimal location to install the sensor unit and/or to determine the minimum transmitter power for the sensor unit 12 to communicate with the interface unit 14 to achieve the desired system reliability. In step 2612 the interface unit sends a test message to the sensor unit. Next, in step 2614 the sensor unit receives the signal and determines and responds with an acknowledgment message. In one or more implementations, the sensor unit then moves to step 2616 where it determines the signal strength of the test message and displays the signal strength (e.g., as a number of blinks of the light emitting diode). In some embodiments, as the location of the sensor unit 12 is changed by the installer and the sensor unit 12 automatically determines and displays the test acknowledge signal strength. According to some implementations, the signal strength is automatically updated by the sensor unit 12 with each two-second "TEST" operational mode message exchange. In one embodiment, the sensor unit 12 displays the signal strength through an indicator, e.g., an LED, where, for example, the indicator blinks a number of times representing the signal strength at a particular location. Alternatively, or additionally the indicator may be an LCD display that displays the signal strength. The installer may then change the location of the sensor unit 12 and by observing the signal strength in different areas may determine a location to install the sensor unit 12. Alternatively, in some embodiments, when the location of the sensor unit is determined to be adequate based on the decision criteria, a bi-color LED may be illuminated green. If the location is determined to be inadequate, the bi-color LED may be illuminated red. In one embodiment, the status of the bi-color LED is updated with each two-second "TEST" operational mode message exchange. In some embodiments, this initialization process continues for a preset period, e.g., 15 minutes where the interface unit and the sensor unit exchange messages to allow the user to find the optimal location for the sensor unit in terms of signal strength.

In some embodiments, the TEST message may be identical in form to the LINK_QUALITY_REQUEST message with the exception that the "TEST" operational mode flag in the FLAGS field of the message payload may be SET. According to some implementations, the sensor unit 12 responds with a TEST_ACKNOWLEDGE message. This message may be identical in form to the LINK_QUALITY_ACKNOWLEDGE message with the exception that the "TEST" operational mode flag in the FLAGS field of the message payload is SET.

In one implementation, in step 2620 the interface unit 14 decodes the message to obtain the value of $RSSI_{INTERFACE}$. In step 2622 the interface unit determines if $RSSI_{SENSOR} \geq RSSI_{SENSORMIN}$. If the condition is satisfied, in step 2624 the interface unit checks to see whether the last message sent was a TX_POWER_INCREASE message. If the last message received was not a TX_POWER_INCREASE message, in step 2626 the interface unit 14 issues a TX_POWER_DECREASE message to the sensor unit 12. In step 2632 the sensor unit determines whether it is at the minimum TX power necessary for proper functioning, in step 2634 the sensor unit send a TX_LEAST_POWER message to the interface unit. In response to this message, in step 2636, the interface unit issues a TX_LEAST_POWER_ACKNOWLEDGMENT message to the sensor unit 12. Alternatively, when in step 2632 the sensor unit is not at the minimum TX power, then in step 2638 the sensor unit 12 decreases its transmittal power by the smallest possible amount and replies with a TX_POWER_DECREASE_ACKNOWLEDGE message.

Returning to step 2624, if the last message sent by the interface unit was a TX_POWER_INCREASE message, in step 2644 the interface unit then issues a TX_MINIMUM_POWER message to the sensor unit 12 notifying it of the transmitter power for use in future transmissions. In step 2646 sensor unit decodes the message and obtains the $RSSI_{SENSOR}$ value. In step 2648 the sensor responds with a TX_MINIMUM_POWER_ACKNOWLEDGE message.

If alternatively in step 2622 $RSSI_{INTERFACE} < RSSI_{INTERFACEMIN}$ has been satisfied, in step 2628, the interface unit 14 issues a TX_POWER_INCREASE message to the sensor unit 12 notifying it to increase its transmitter power by the smallest possible amount. In response to the TX_POWER_INCREASE message, in step 2652 the sensor unit determines if it is at the maximum TX power it is capable of producing. If the sensor unit is not at the maximum TX power, then in step 2658 the sensor unit 12 increases the transmitter power by the smallest allowable increment and initiates a TX_POWER_INCREASE_ACKNOWLEDGE message to the interface unit 14. Alternatively, if the sensor unit 12 is already set to transmit the maximum power it is capable of producing, the process continues to step 2654 where the sensor unit initiates a TX_MOST_POWER message to the interface unit 14 indicating that it may no longer increase its transmit power. In response to this message, in step 2656 the interface unit issues a TX_MOST_POWER_ACKNOWLEDGE message to the sensor unit 12.

In one embodiment, after the initializations are complete the sensor unit 12 may query all of the sensors and/or other peripheral devices and construct a data packet comprising atmospheric data, battery strength, signal strength, and/or other data and forward the data packet to the interface unit 14.

Figure 22:
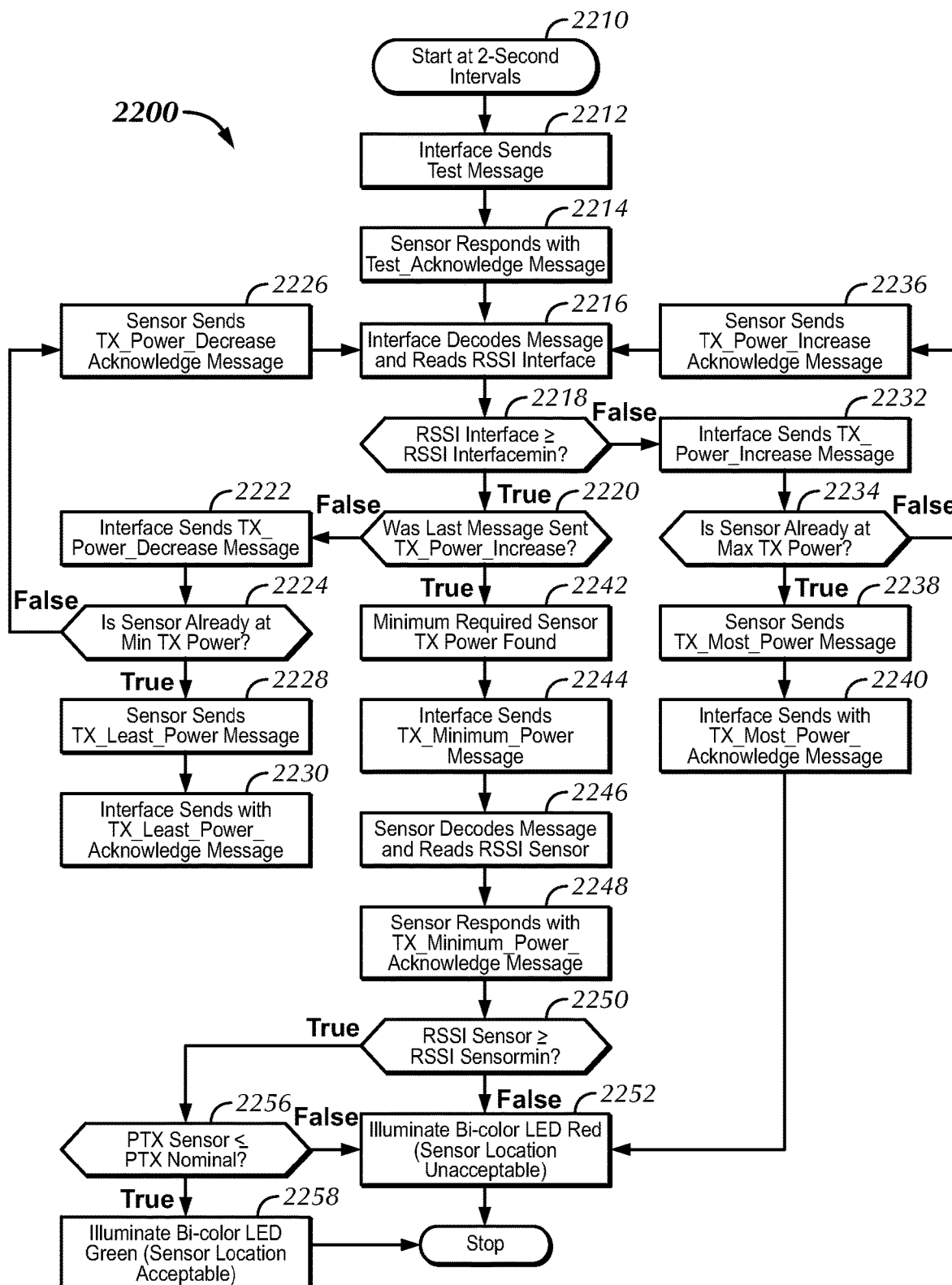
FIG. 22 illustrates an example implementation of a "TEST" operational mode utilized during the installation of the sensor unit in accordance with one embodiment.

An alternative implementation of "TEST" operational mode is illustrated in FIG. 22. The "TEST" operational mode is utilized during the installation of the sensor unit 12 to provide the installer with a quick and simple-to-understand process for determining that the sensor unit 12 is installed at a location with adequate radio reception from the interface unit 14. Further, the "TEST" operational mode is initiated by the interface unit 14 in response to a "Press and Hold" actuation of the button 820 on the interface unit 14. Still further, the "TEST" operational mode terminates automatically after a period of five minutes.

Additionally, the "TEST" operational mode consists of an exchange of radio messages between the sensor unit 12 and the interface unit 14 to determine whether or not the sensor unit 12 is positioned at a satisfactory location. A location is deemed to be satisfactory if the following conditions are satisfied:

$$RSSI_{SENSOR} \geq RSSI_{SENSORMIN}$$

$$RSSI_{INTERFACE} \geq RSSI_{INTERFACEMIN}$$

$$P_{TXSENSOR} \leq P_{TXNOMINAL}$$

Where $RSSI_{SENSOR}$ is the RSSI value of the RF signal transmitted from the interface unit 14 as received at the sensor unit 12. $RSSI_{SENSORMIN}$ is the minimum allowable value of $RSSI_{SENSOR}$ to achieve communication reliability for the system. $RSSI_{INTERFACE}$ is the RSSI value of the RF signal transmitted from the sensor unit 12 as received at the interface unit 14. $RSSI_{INTERFACEMIN}$ is the minimum allowable value of $RSSI_{INTERFACE}$ to achieve communication reliability for the system. $P_{TXSENSOR}$ is the transmitter power employed by the sensor unit 12. $P_{TXNOMINAL}$ is the maximum transmitter power allowed for the sensor unit 12 to utilize for operations under normal operating conditions. This power level is typically at least 6.0 dB below the maximum output power achievable by the transmitter, and is selected to achieve the overall battery lifetime of the sensor unit 12 is adequate.

While in the "TEST" operational mode, the "TEST" operational mode flag in the FLAGS field of all message payloads will be SET.

Still referring to FIG. 22, in step 2210 the message transactions are initiated by the interface unit 14 at two-second intervals, and culminate in the determination of the minimum transmitter power for the sensor unit 12 to communicate with the interface unit 14 to achieve the desired system reliability. If the location of the sensor unit 12 is determined to be adequate based on the decision criteria, the bi-color LED is illuminated green. If the location is determined to be inadequate, the bi-color LED is illuminated red. The status of the bi-color LED is updated with each two-second "TEST" operational mode message exchange.

In step 2212 the interface unit sends a TEST message to the sensor unit 12. In step 2214 the sensor unit 12 responds to the TEST message from the interface unit 14. The TEST message may be identical in form to the LINK_QUALITY_REQUEST message with the exception that the "TEST" operational mode flag in the FLAGS field of the message payload is SET. The sensor unit 12 responds with a TEST_ACKNOWLEDGE message. This message may be identical in form to the LINK_QUALITY_ACKNOWLEDGE message with the exception that the "TEST" operational mode flag in the FLAGS field of the message payload is SET.

In step 2216 the interface unit 14 decodes the message to obtain the value of $RSSI_{INTERFACE}$. In step 2218 the interface unit determines if $RSSI_{SENSOR} \geq RSSI_{SENSORMIN}$. If the condition is satisfied, in step 2220 the interface unit checks to see whether the last message sent was a TX_POWER_INCREASE message. If the last message received was not a TX_POWER_INCREASE message, in step 2222 the interface unit 14 issues a TX_POWER_DECREASE message to the sensor unit 12. In step 2224 the sensor unit determines whether it is at the minimum TX power necessary for proper functioning, in step 2228 the sensor unit send a TX_LEAST_ POWER message to the interface unit. In response to this message, in step 2230, the interface unit issues a TX_LEAST_POWER_ACKNOWLEDGMENT message to the sensor unit 12. Following receipt of the message the sensor unit continues to step 2250. Alternatively, when in step 2224 the sensor unit is not at the minimum TX power, then in step 2226 the sensor unit 12 decreases its transmittal power by the smallest possible amount and replies with a TX_POWER_DECREASE_ACKNOWLEDGE message.

Returning to step 2220, if the last message sent by the interface unit was a TX_POWER_INCREASE message, in step 2244 the interface unit then issues a TX_MINIMUM_POWER message to the sensor unit 12 notifying it of the transmitter power for use in future transmissions. In step 2246 sensor unit decodes the message and obtains the $RSSI_{SENSOR}$ value. In step 2248 the sensor responds with a TX_MINIMUM_POWER_ACKNOWLEDGE message. Following step 2248, in step 2250 the sensor unit determines if $RSSI_{SENSOR} \geq RSSI_{SENSORMIN}$. When the condition is satisfied, then in step 2256 the sensor unit determines whether $P_{TXSENSOR} \leq P_{TXNOMINAL}$. If this condition is satisfied, then the sensor unit continues to step 2258 where the bi-color led is illuminated green, indicating that the sensor location is acceptable. Alternatively, if in step 2256 the sensor unit determines the $P_{TXSENSOR} > P_{TXNOMINAL}$ then in step 2252 the bi-color led is illuminated in red indicating that the sensor location is unacceptable.

Similarly, if in step 2250 the sensor unit determines that $RSSI_{SENSOR} < RSSI_{SENSORMIN}$ process continues to step 2252, where the bi-color led is illuminated in red indicating that the sensor location is unacceptable.

Following receipt of the message, in step 2216 the interface unit 14 decodes the message and obtains the value of $RSSI_{INTERFACE}$. The interface unit then repeats steps 2218-2226, as described above, until $RSSI_{INTERFACE} < RSSI_{INTERFACEMIN}$ has been satisfied by the power decrease. If this condition has been satisfied, in step 2232, the interface unit 14 issues a TX_POWER_INCREASE message to the sensor unit 12 notifying it to increase its transmitter power by the smallest possible amount. In response to the TX_POWER_INCREASE message, in step 2234 the sensor unit determines if it is at the maximum TX power it is capable of producing. If the sensor unit is not at the maximum TX power, then in step 2236 the sensor unit 12 increases the transmitter power by the smallest allowable increment and initiates a TX_POWER_INCREASE_ACKNOWLEDGE message to the interface unit 14. Alternatively, if the sensor unit 12 is already set to transmit the maximum power it is capable of producing, the process continues to step 2238 where the sensor unit initiates a TX_MOST_POWER message to the interface unit 14 indicating that it may no longer increase its transmit power. In response to this message, in step 2240 the interface unit issues a TX_MOST_POWER_ACKNOWLEDGE message to the sensor unit 12. Then in step 2252 the sensor unit causes the bi-color led to be illuminated in red indicating that the sensor location is unacceptable.

In one or more implementations the interface unit 14 draws power from the main irrigation controller 30. The interface unit 14 may operate from 22 to 30.8 VAC input voltage. Typically, the interface unit 14 operates by taking 24 VAC electrical power from its associated irrigation controller. Additionally or alternatively, the interface unit may comprise a power source, such a battery, solar power, and/or other such source, where the interface unit draws some or all of its power from the power source.

In some embodiments, the controller 414 of the interface unit 14 may be implemented utilizing a low-cost 8-bit microcontroller that has sufficient computational power and speed to support all of the functional capabilities of the unit. In one embodiment, the microcontroller may employ a quartz crystal for generation of an internal clock signal. It may be desired that the same type of controller and/or microcontroller be used in both the sensor unit 12 and the interface unit 14.

According to some implementations, the controller typically employs FLASH memory for storage of executable firmware, and is capable of being programmed "in-system". For example, an in-system programming port may be available on the printed circuit board for accomplishing the programming process during final assembly. The in-system programming port may be accessible via surface pads (through the use of "pogo" pins on an ICT fixture), in one or more embodiments. A programming header may also be available on the printed circuit board to permit reprogramming the controller during firmware development. In some embodiments, the circuit board may be designed for ease of testability such as using automated test fixture equipment. In this embodiment, standard solder connections with conformal coating are used for the circuit board.

In some implementations, the controller 414 may also include on-chip EEPROM for non-volatile storage of miscellaneous data required for support of all functional capabilities. On-chip RAM is also typically present in sufficient quantity for all functional capabilities, according to some embodiments.

In some embodiments, the interface unit employs a single-chip transceiver 412 which provides an analog or digital Received Signal Strength Indicator (RSSI) output signal. In one embodiment, where the RSSI output is an analog signal, it may be provided to one channel of the controller's ADC.

The interface unit 14, according to some implementations, may also be equipped with a backlit LCD 816. The display may be capable of displaying alphanumeric characters with 11-segment LCD digits. A sufficient number of LCD digits are provided to display at least the following messages:

a) BATT OK
b) BATT LOW
c) BYPASS
d) NORMAL
e) INHIBIT
f) FREEZE
g) TEST
h) NO SIGNAL
i) NO SENSOR
j) NOISE

Additionally, or alternatively the interface unit may be capable of displaying the mode and or status of the system through other means. For example, in one embodiment the user display 426 comprises a graphic display capable of displaying the mode of operation or status of the system. For example, in one embodiment, the display 426 may display the status of the system using pictorial or graphical symbols or icons displayed on the graphic display of the interface unit 14.

In some implementations, the interface unit 14 employs a "normally closed" relay device to permit breaking the COMMON return line connection between the sprinkler valve solenoids and the irrigation controller 30. In one or more embodiments, this relay may be actuated by a voltage that is compatible with the voltage output of one of the controller output pins. According to some implementations, the maximum current rating of the relay contacts may be no less than 3.0 amperes.

In some embodiments, the interface unit 14 also employs a current sensing device 420 to allow detection of the current flow in the COMMON return line. In one embodiment, when an irrigation cycle is commanded by the irrigation Controller, current flows in the COMMON line. The current sensor may detect this signal, triggering the controller 414 to initiate a SENSOR_STATUS_REQUEST to the sensor unit 12. In one embodiment, when the SENSOR_STATUS message returned by the sensor unit 12 indicates that irrigation should be inhibited, the current interruption relay 416 is OPEN, interrupting irrigation.

Additionally or alternatively, the interface unit 14 may employ a voltage sensing device 422, in one or more embodiments, to allow detection of the voltage across the current interruption relay 416 in the COMMON return line. When irrigation is being commanded by the irrigation controller 30 while the system 10 is commanding that irrigation be inhibited, the voltage sensor 422 may monitor the voltage across the relay contacts to determine when the irrigation cycle has terminated. Once the irrigation cycle has terminated the interface unit 14 will CLOSE the current interruption relay.

In some embodiments, the interface unit comprises a user input 424, wherein in one or more embodiments the user input allows the user to change the mode of operation of the interface unit and/or perform other adjustments in the operation of the interface unit 14. For example, in one embodiment, the interface unit 14 is equipped with a three-position toggle switch 814 to allow the user to configure the unit for the desired operation. The switch has a CENTER position in addition to a LEFT and a RIGHT position. Placing the switch into the CENTER position places the interface unit 14 into NORMAL operational mode where irrigation is inhibited if sufficient precipitation has been detected by the sensor unit 12. Placing the switch into the LEFT position places the interface unit 14 into BYPASS mode, where irrigation will not be inhibited by the system. The RIGHT switch position is a spring-loaded "return to center", automatically releasing back to CENTER when the switch is no longer held in position. This spring-loaded position places the interface unit 14 unit into TEST operational mode. The interface unit may also include a way too override or shut-off the device. Alternatively, and or additionally, in one embodiment, the interface unit 14 is equipped with a touch screen comprising buttons that allow the user to switch the mode of operation.

In some embodiments, the interface unit 14 unit is equipped with a pushbutton switch 820 to allow the user to activate an LCD backlight for a period of five seconds. When the pushbutton is depressed, the LCD backlight is illuminated. The LCD backlight remains illuminated for a period of time, e.g., 5 seconds, after the pushbutton has been released. In one or more embodiments, when the toggle switch on the interface unit 14 is set to the BYPASS position, the LCD display continuously displays the "BYPASS" message.

In many embodiments, the interface unit 14 incorporates a user-friendly method of adjusting the rainfall level desired by the user. For example, the interface unit 14 may be equipped with a linearly-adjustable slide switch 812 that allows the user to select the level of precipitation at which irrigation will be interrupted. In one or more embodiments, precipitation amounts between ⅛" and ¾" are selectable in a continuous manner.

When power is first applied to the interface unit 14, the unit powers up and enters "INITIALIZATION" operational mode. In some embodiments, during the initialization mode, the controller 414 executes the initializations that need to be completed in order to set the unit up for operation. During the initialization mode the interface unit may also attempt to pair up with one or more sensor units 12, such as illustrated in the system diagram of FIG. 34. In one implementation, the interface unit will send a setup signal to one or more sensor units 12. Next, the interface unit may receive an acknowledgement signal from one or more sensor units 12 in response to the setup signal. In some embodiments, the acknowledgment signal may comprise identification and/or other information about the sensor unit. In some embodiments, the interface unit 14 may store the data in memory 418 and/or use the data to pair up with the sensor unit 12. Once the setup is complete the interface unit and sensor unit 12 may communicate through the communication link or path 15. In one embodiment, during "INITIALIZATION MODE" the LCD backlight may be continuously illuminated.

In one embodiment, after the initializations are complete the sensor unit 12 may query all of the sensors and/or other peripheral devices and construct a data packet comprising atmospheric data, battery strength, signal strength, and/or other data and forward the data packet to the interface unit 14. The interface unit 14, according to some implementations, may receive the data from the sensor unit 12, and process the data and display information about the sensor unit on the user display 426.

Additionally or alternatively, in some embodiments, at the conclusion of the internal initializations, the controller may retrieve from its memory 418, and more specifically the EEPROM, the identification number of the sensor unit 12 with which it is associated and transmit a SENSOR_STATUS_REQUEST message. Upon receipt of a SENSOR_STATUS message from the sensor unit 12, the interface unit 14 may process the message. In one embodiment, the interface unit 14 may further display the appropriate sensor unit 12 status message on the LCD display 426.

In one or embodiments, when no sensor unit is associated with the interface unit 14, the user display 426 may display a "NO SENSOR" message and/or a similar message and or graphic display. In one embodiment, when the "NO SENSOR" message is displayed the LCD backlight flashes on and off at a 4-second rate (two seconds on, two second off). According to one implementation, at the conclusion of the "INITIALIZATION" mode, the interface unit 14 enters "NORMAL" mode.

In some embodiments, the interface unit 14 spends the majority of its time in the "NORMAL" operation mode. In "NORMAL" mode, the LCD backlight is OFF unless illuminated by the user by depressing the pushbutton, or by an event requiring its illumination.

In one or more embodiments, when the interface unit 14 is set to BYPASS, the current interruption relay is set to CLOSED. In one implementation, a "BYPASS" message may be continuously displayed on the LCD. In this or other implementations, The LCD backlight may be OFF.

In some embodiments, during "NORMAL" mode, the interface unit 14 will continually monitor the open-circuit voltage across the current interruption relay to detect when irrigation is being commanded from the irrigation controller 30. In this embodiment, when 24 VAC is detected across the current interruption relay, the interface unit 14 initiates a SENSOR_STATUS_REQUEST to its associated sensor unit 12. If the SENSOR_STATUS reply message received from the sensor unit 12 indicates that irrigation should be inhibited, the current interruption relay is OPENED. Once the relay has been OPENED, the interface unit 14 may monitor the current flow in the COMMON return line to detect when irrigation has ceased, at which time the current interruption relay is set to CLOSE. Alternatively, if the SENSOR_STATUS reply message received from the sensor unit 12 indicates that irrigation should be permitted, the current interruption relay remains in its default CLOSED state. In some embodiments, while in normal mode, the current interruption relay is normally CLOSED, unless the SENSOR_STATUS reply message received from the sensor unit 12 indicates that irrigation should be inhibited. In these embodiments if system failure occurs at any time the relay is in its default CLOSED state.

Alternatively, in some embodiments, the interface unit will open and close the relay based on transmission of signals initiated from the sensor unit. In one embodiment the sensor unit 12 will initiate an update message to the interface unit when it senses a change in one or more of the data retrieved from sensors and/or other peripheral devices. Additionally or alternatively, the sensor unit may initiate communication with the interface unit 14, in some embodiments, at fixed intervals, e.g., 4 times a day, when it may query one or more sensors and/or other devices and send an update signal to the interface unit 14. In one or more embodiments the frequency of transmission of periodic updates based on internal and/or external criteria. For example, in one embodiment the sensor unit 12 may decrease the number of updates it will send the interface unit 14 during the Low Battery mode. Additionally or alternatively, the sensor unit may also reduce the number of updates it transmits to the interface unit 14 during low temperature or hibernation mode. In some embodiments, in addition to these messages the sensor unit may also send a message to the interface unit when it receives a request for data from the interface unit 14.

In one embodiment, after the SENSOR_STATUS message, or an update message is received from the sensor unit 12, the interface unit 14 may continuously displays the appropriate system status message on the user display 426. In one embodiment, for example:

a) when irrigation is currently enabled, the message "NORMAL" is displayed b) when irrigation is currently disabled because of precipitation, the message "INHIBIT" is displayed c) when irrigation is currently disabled because of low temperature, the message "FREEZE" is displayed In one implementation, while these messages are being displayed, the LCD backlight may be turned OFF.

Alternatively, in another exemplary embodiment, the display may be a graphical display. In this and other embodiments, the interface unit may display the status and other data received from the sensor unit through a graphical representation.

In many embodiments, while in "NORMAL" operational mode the interface unit 14 responds to a BATTERY_OK message from the sensor unit 12. Upon receipt of this message the interface unit 14 may send a BATTERY_OK_ACKNOWLEDGE message back to the sensor unit 12. In one embodiment, after transmitting this message, the message "BATT OK" is displayed on the display for a certain period, e.g., five seconds. In an alternative embodiment, the interface unit may display the battery strength of the sensor unit 12 on the display 426.

The interface unit 14, in some embodiments, may also responds to a low battery warning message, e.g., a LOW_BATTERY_WARNING message, from the sensor unit 12. In one embodiment, the interface unit 14 may respond to receipt of this message by sending a LOW_BATTERY_ACKNOWLEDGE message back to the sensor unit 12. In one implementation, after this message is transmitted a low battery indication, e.g., a "BATT LOW" message, is displayed continuously on the user display 426. Additionally, in some embodiments, the LCD backlight is flashed on and off at a 4-second rate (two seconds on, two second off). In some embodiments, the other irrigation control functions at the interface unit 14 continue to operate normally. In one embodiment, in order to indicate this, the low battery indication is displayed alternately with the status indication that is appropriate for the current state of the system (e.g., "NORMAL", "INHIBIT", "FREEZE", "BYPASS", etc.).

In some embodiments, at fixed intervals, e.g., approximately once per day, the interface unit 14 initiates a measurement of the communications link quality, for example by issuing a LINK_QUALITY_REQUEST message to the sensor unit 12. Upon receipt of the response from the sensor unit 12, for example the LINK_QUALITY_ACKNOWLEDGE message, the interface unit 14 determines if the value of $RSSI_{INTERFACE}$ satisfies the condition:

$$RSSI_{INTERFACE} \geq RSSI_{INTERFACEMIN}.$$

In one embodiment, when $RSSI_{INTERFACE} < RSSI_{INTERFACEMIN}$ the interface unit 14 may send a power increase message, for example a TX_POWER_INCREASE message, to the sensor unit 12. In one embodiment the sensor unit 12 may respond to the message by increasing its transmit power by the smallest possible amount and reply, for example with a TX_POWER_INCREASE_ACKNOWLEDGE message. Upon receipt of this message, in one or more implementations, the interface unit 14 may determine if the condition $RSSI_{INTERFACE} \geq RSSI_{INTERFACEMIN}$ has been satisfied by the power increase. If this condition has been satisfied, the interface unit 14 may issues a message, e.g., a TX_MINIMUM_ POWER message, to the sensor unit 12 notifying it of the transmitter power to use for future transmissions. Alternatively, when this condition is not satisfied, the interface unit 14 may continue to issue power increase requests, e.g., TX_POWER_INCREASE messages, to the sensor unit 12 until the condition is satisfied and/or a preset period of time has lapsed. In some embodiments, when the sensor unit 12 reaches the maximum power that it may transmit during this process, it may send a message indicating that it has reached it maximum power level, e.g., a TX_MOST_ POWER message, to the interface unit 14. In this case, the interface unit 14 may respond with an acknowledgment message, e.g., a TX_MOST_POWER_ACKNOWLEDGE message, and terminate the power adjustment process.

Alternatively, according to some embodiments, when $RSSI_{INTERFACE} \geq RSSI_{INTERFACEMIN}$, the interface unit may 14 issues a message to the sensor unit 12, requesting that the sensor unit 12 decrease its transmit power, e.g., a TX_POWER_DECREASE message. In one implementation, as a result of this message the sensor unit 12 may decrease its transmit power by the smallest possible amount and may further reply with an acknowledgment message, for example a TX_POWER_DECREASE_ACKNOWLEDGE message. Upon receipt of this message, the interface unit 14 may determine if the condition $RSSI_{INTERFACE} < RSSI_{INTERFACEMIN}$ has been satisfied by the power decrease, according to some implementations. In one embodiment, when this condition has been satisfied, the interface unit 14 may issue a request to the sensor unit 12 notifying it to increase its transmitter power by the smallest possible amount, e.g., TX_POWER_INCREASE message. The sensor unit 12 may respond to the request with an acknowledgement message, e.g., a TX_POWER_INCREASE_ACKNOWLEDGE message, and, in one or more embodiments, the interface unit 14 may verify that the condition $RSSI_{INTERFACE} \geq RSSI_{INTERFACEMIN}$ is now satisfied. The interface unit 14 may then issue a message to the sensor unit 12 notifying it of the transmitter power to use for future transmissions, e.g., a TX_MINIMUM_POWER message.

In some embodiments, so long as the condition $RSSI_{INTERFACE} < RSSI_{INTERFACEMIN}$ is not satisfied, the interface unit 14 may continue to issue requests to the sensor unit 12 notifying it to decrease its transmitter power, e.g., a TX_POWER_DECREASE messages, until the condition is satisfied. In one embodiment, once the sensor unit 12 reaches the minimum power that it may transmit during this process, it will send a message to the interface unit notifying it that it has reached its minimum power, e.g., a TX_LEAST_ POWER message. In this or other embodiments, the interface unit 14 may respond with an acknowledgment, for example a TX_LEAST_POWER_ACKNOWLEDGE message, and may further terminate the power adjustment process.

As described with respect to FIGS. 22 and 26, the "TEST" mode may be used during the installation of the sensor unit 12 and provides a method for a single installer to easily determine whether or not the proposed location for the sensor unit 12 will result in satisfactory signal reception and communications reliability in one or more embodiments. In one implementation, the "TEST" mode is initiated by switching the toggle switch to "TEST" mode and holding it for a minimum of three seconds. In this embodiment, after this time requirement has been met, the interface unit 14 continuously displays an indication, e.g., the message "TEST", on the user display 426. In one embodiment, the LCD backlight may be continuously illuminated while in "TEST" mode. Additionally or alternatively, the test mode may be initiated through other forms of user input, e.g., activating a test button, selecting the test option, etc. In one embodiment, the test mode may also be initiated by the interface unit once the interface unit is powered up and paired with one or more sensor units.

After the test mode has been initiated, according to some implementations, the interface unit 14 may initiate a TEST message at intervals of no more frequently than, for example, two seconds. Alternative procedures followed throughout the "TEST" mode are described in the flowchart depicted in FIGS. 22 and 26. In some embodiments, the "TEST" mode may be terminated by the operator, for example by selecting and holding the toggle switch in the "TEST" position for a period, such as, a period of no less than two seconds, and/or automatically after a period of, for example, fifteen minutes.

In many embodiments, message traffic between the interface unit 14 and sensor unit 12 typically occur in pairs, i.e., for every message that is sent, there is an acknowledgement.

In one embodiment, in the event that the sender of an initial message does not receive an acknowledgement corresponding to the message sent within a period of time (e.g., five seconds), the originator of the message may assume that the message was lost. In one embodiment, retransmission of the message may be attempted for a period (e.g., one minute). When the message may not be successfully transmitted and acknowledged within a period (e.g., one minute), in one or more embodiments, the sender of the message may assume either that the communications channel is suffering from an unusually high level of interference or that a malfunction has occurred at the other end of the communications link.

In order to assess potential interference in the communications channel, both the interface unit 14 and the sensor unit 12 may periodically monitor the RSSI values obtained from the receiver chip during periods where no message traffic is being passed, according to some embodiments. In one embodiment, these values may be noted and stored, e.g. in a histogram, so that a statistical archive of the distribution of noise levels at the sensor unit 12 and interface unit 14 locations is available with which to assess the communications channel at any given time. In some implementations, when no message traffic is being passed, the interface unit 14 may sample the RSSI value from its receiver chip at intervals of one minute. In one or more embodiments, the sensor unit 12 may sample the RSSI value from its receiver chip at fixed intervals, e.g. one hour.

In some embodiments, after a failure to receive a timely acknowledgement to a message that has been sent, the originator of the message may sample the RSSI value from its receiver chip and may further assess whether or not the sample obtained meets some criteria, for example whether the sample obtained lies within the bins of the histogram associated with the expected noise floor. In one implementation, when it is determined that an unusually high noise level is present, an attempt at a retransmission may be made at the maximum possible transmitter power. When this attempt fails to result in a successful acknowledgement, in some embodiments, the device may sample the RSSI value from its receiver chip at fixed intervals, e.g. 15 minute intervals, and may retransmit the message when the noise level has returned to its nominal value.

In one embodiment when a certain amount of time lapses without reduction in noise level the interface and/or sensor unit may cease attempts to transmit the message. For example, in one exemplary embodiment, when 24 hours elapses with no reduction in the atmospheric noise level, the interface unit 14 may ceases attempting to retransmit the message. In one implementation of this exemplary embodiment, the interface unit may continuously display an indication of the presence of noise, e.g. the "NOISE" message, on the user display 426. In this embodiment, while this indication is being displayed, the LCD backlight may be illuminated continuously. In one embodiment, when the noise level has returned to its nominal level, the interface unit 14 may initiate a message, e.g. a LINK_QUALITY_REQUEST message, to re-establish the communications link and configure the appropriate transmitter power for the sensor unit 12. In one exemplary embodiment, if 1 hour elapses with no reduction in the atmospheric noise level, the sensor unit 12, the unit may cease attempting to retransmit the message.

Alternatively, when sampling the RSSI value from the receiver chip, when the device determines that no excess atmospheric noise is present in the communications channel; it may presume that the device at the other end of the wireless link has failed.

In one embodiment when the interface unit 14 determines that the sensor unit 12 has failed, it may continue to attempt making contact with the sensor unit 12 at fixed intervals, e.g. five-minute intervals, for a period, e.g., 24 hours. In one embodiment, when no contact with the sensor unit 12 is made after a certain period of time, e.g. 24 hours, the interface unit 14 may cease further attempts at contacting the sensor unit 12 and, in one or more embodiment, may continuously display an indication that communication has failed, e.g. the "NO SIGNAL" message, on the user display. In one embodiment, while this message is displayed, the LCD backlight is ON. In some embodiments, the interface unit may reattempt to communicate with the interface unit after a period of time has lapsed.

Further, in some embodiment, when the sensor unit 12 determines that the interface unit 14 has failed, it may continue to attempt making contact with the interface unit 14 at fixed intervals, e.g. five-minute intervals, for a certain period of time, e.g. one hour. In some embodiments, when communication has not been re-established after this period, the sensor unit 12 may cease further attempts at contacting the interface unit 14. In one embodiment, no further transmissions may be attempted until the interface unit 14 attempts to establish contact with the sensor unit 12. Alternatively, in some embodiments, the sensor unit 12 may try to reconnect to reestablish communication with the interface unit 14 after a certain period of time.

In some implementations of the rain sensor system 10, communication messages may comply with a desired Protocol. As such messages may have the following format:

| Preamble | Start Frame Marker | Length | Message Data | Checksum | End Frame Marker |
|---|---|---|---|---|---|
| F5hex | F5hex | 1Chex | 1 byte | up to 255 bytes | 1 byte | 1Dhex |

The preamble consists of 2 or more F5 (hex) transmissions. The purpose of the preamble is to give the receiving device an opportunity to sync up with the transmitting device.

Packet frames use the byte 1C hex as the start of frame marker and 1D hex as the end of frame marker. When the payload contains a data byte equal to 1C or 1D, that byte is replaced by the sequence 1B, 01 or 1B, 03. When the payload contains a data byte equal to 1B, that byte is replaced by the sequence 1B, 02. Upon reception, sequences 1B, 01 are replaced as 1C, sequences 1B, 02 are replaced as 1B, and sequences 1B, 03 are replaced as 1D. This is similar to SLIP protocol used for TCP/IP. Packets start with the value 1C, and that value typically does not appear in the payload. Packets end with the value 1D, and that value typically does not appear in the payload. It may be desirable in some instances that the length, message data or checksum contain the combination of 1B followed by one of a 01, 02 or a 03.

The length element is a single byte that describes the length of the message data element in terms of byte count. For example, a frame that has 4 bytes in the message data element would have a length of 4. A length of 0 would denote a blank frame. Because of the 1-byte limitation, a message data element may not be any longer than 256 bytes. Also, if a frame has been subjected to the replacement of 1Cs with 1B, 01, 1Bs with 1B, 02, or 1Ds with 1B, 03, the length describes the length of the intended packet before it was encoded to remove the 1Cs, 1Bs or 1Ds. This provides another check of the packet's integrity.

The message data element carries the data payload for the frame. The message data typically has the same number of bytes as the described in the length element.

The checksum is the logical addition (ignoring carry overflows) of the length byte and all of the bytes in the message data element. This may be used to ensure the integrity of the frame. Also, if a frame has been subjected to the replacement of 1Cs with 1B, 01, 1Bs with 1B, 02, or 1Ds with 1B, 03, the checksum is performed on the intended packet before it was encoded to remove the 1Cs, 1Bs or 1Ds. This provides another check of the packet's integrity.

For messages that originate from the interface unit 14 the first byte of the message payload is desired to be 3E hex. Similarly, to comply with the desired protocol, messages that originate from the sensor unit 12 the first byte of the message payload shall be BE hex.

The following description is generally directed towards embodiments of the user interface (including user inputs and display outputs) of the interface unit which may be utilized with one or more embodiments of the rain sensor device/s described herein. It is understood that in some embodiments, the user interface described below may be implemented in whole or in part in the user interface of the irrigation controller 30. Furthermore, in some embodiments, the user interface may be shared between the interface unit and the controller 30.

Figure 36:
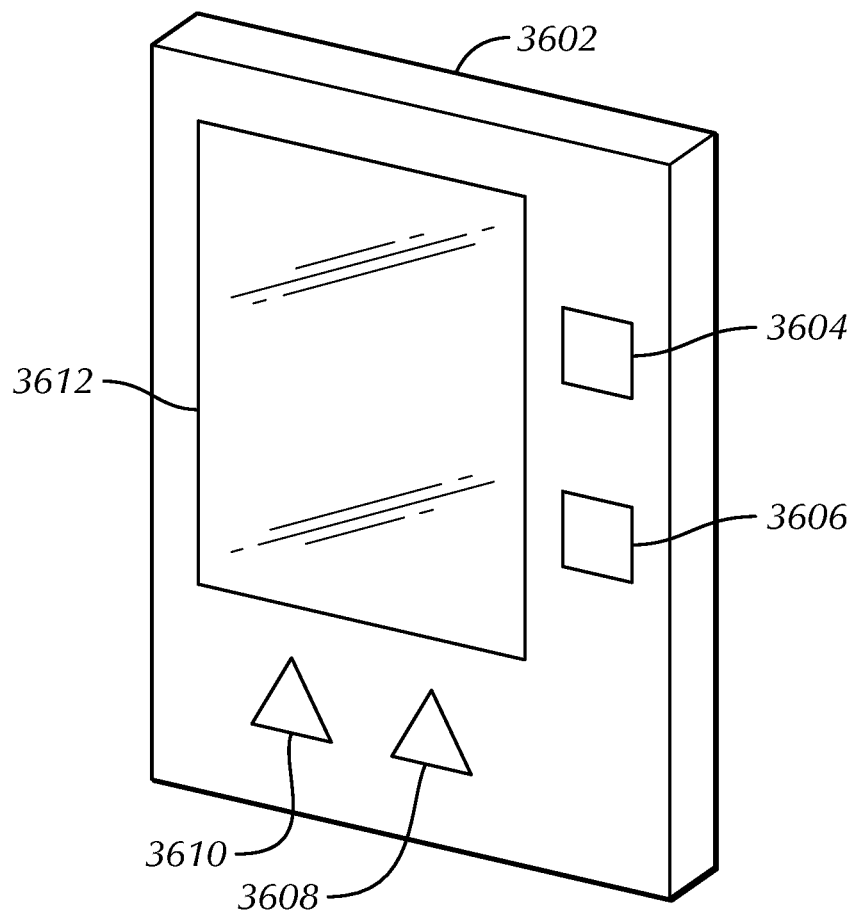
FIG. 36 is one embodiment of the interface unit of the rain sensor device of FIG. 4 illustrating user inputs and display outputs.
Figure 37:
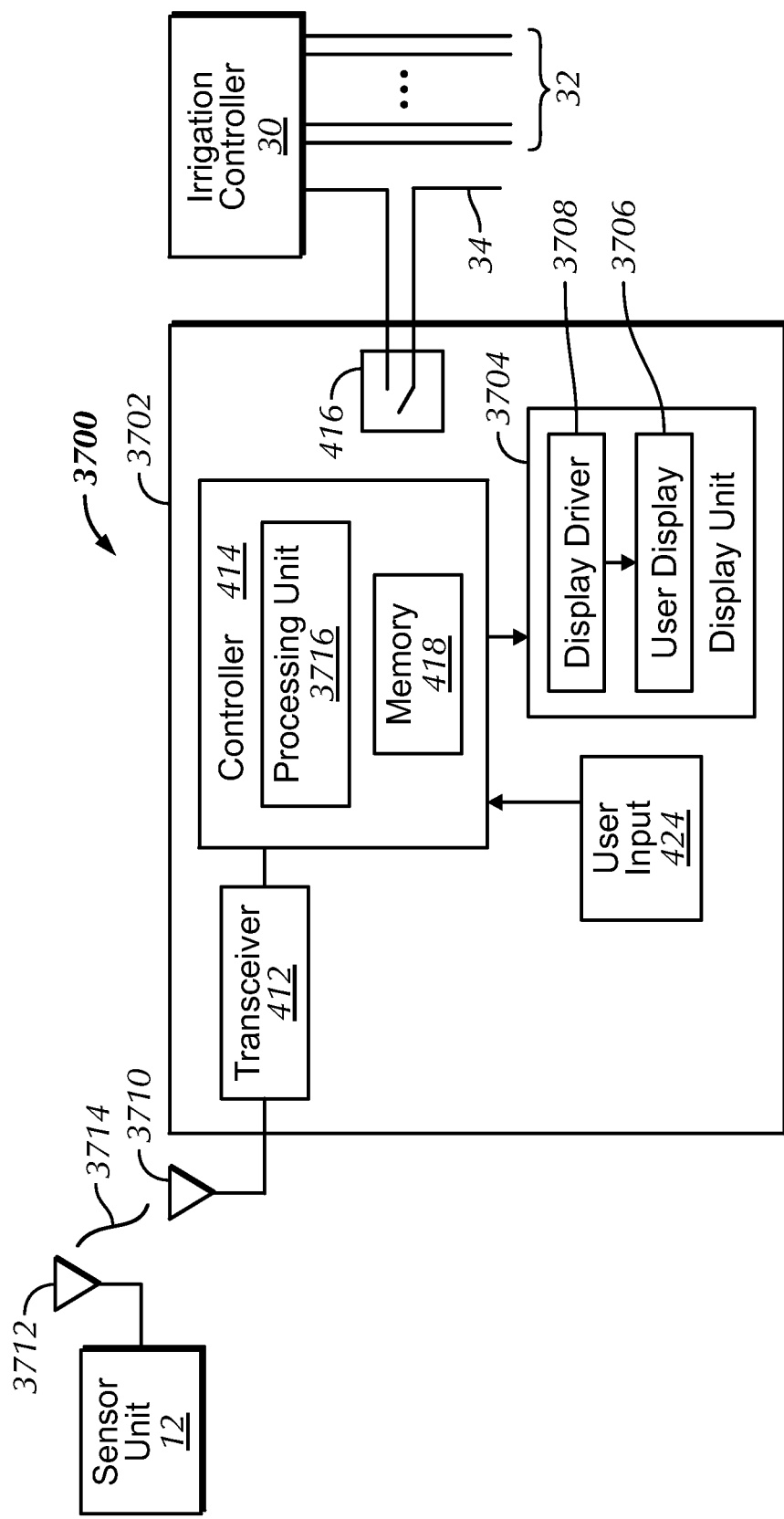
FIG. 37 is functional diagram of the components of some embodiments of an interface unit of the rain sensor device.

FIG. 36 is an illustration of another embodiment of the interface unit of FIGS. 4 and 37 for use in the rain sensor system 10 of FIGS. 1 and 2. In this embodiment, the interface unit 3600 comprises a housing 3602, the user input 424 is embodied as a test button 3604, an irrigation button 3606, a temperature threshold button 3608 and a rain threshold button 3610, while the user display 426/3706 is embodied as a display screen 3612. In accordance with several embodiments, the interface unit 3600 is positioned near the controller 30 and couples to one or more of the activation lines 32. The interface unit 3600 wireless communicates with the sensor unit 12. In operation, the interface unit 3600 receives one or both of rainfall and temperature measurements and determines whether irrigation to be executed by the controller 30 should be allowed or interrupted. The operation of the various buttons will be described more fully in the embodiment of FIG. 38.

Referring to FIG. 37, a functional diagram of the components of some embodiments of an interface unit in a rain sensor system 3700, as depicted with regards to FIG. 2, is illustrated comprising a sensor unit 12, an interface unit 3702 and the irrigation controller 30. The sensor unit 12 further comprises a sensor antenna 3712. The sensor unit 12 utilizes the wireless communication link 3714 to communicate to the interface unit 3702.

The interface unit 3702 further comprises a controller 414, a processing unit 3716, the memory 418, a display unit 3704, a display driver 3708, the user display 3706, the user input 424, the relay device 416, the transceiver 412 and an interface antenna 3710. As mentioned above, the irrigation controller 30 further couples to activation lines 32 and may output activation signals to respective ones of the plurality of activation lines 32, each coupled to a valve located in the region to be irrigated, or coupled to an electrical switch to activate or deactivate lighting or other devices controlled by the controller 30. As is well known, one or more sprinkler devices, drip lines and/or other irrigation devices may be coupled to each valve.

In one embodiment, the sensor unit 12, interface unit 3702, and irrigation controller 30 comprise the rain sensor system 3700. As mentioned above with respect to FIG. 2, the sensor unit 12 utilizes the sensor antenna 3712 to send data to the interface unit 3702 through the wireless communication link 3714. The interface unit 3702 receives the data through the interface antenna 3710 and the transceiver 412. The interface unit 3702 further couples with the irrigation controller 30 through means of the relay device 416 and the common line 34.

Within the interface unit 3702, the transceiver 412 comprises circuitry adapted to send data to and from the controller 414. User input data received from the user input 424 (embodied as the test button 3604, the irrigation button 3606, the temperature threshold button 3608, and the rainfall threshold button 3610 in FIG. 36) is also sent to the controller 414. As mentioned above, the controller 414 comprises circuitry to analyze the incoming data from the sensor unit 12 and the user input 424 to determine whether or not irrigation from the irrigation controller should be interrupted. The controller 414 may be implemented through a single-processor or multiprocessor systems, minicomputers, microprocessor, processor, programmable electronics and the like, and/or combinations thereof. The controller 414 comprises the processor unit 3716 and the memory 418. The memory 418 may be a separate memory unit within the interface unit 3702, external memory connected to the interface unit via an interface (not shown), may be internal memory within the controller 414, and/or other such configurations. The processor unit 3716 comprises circuitry for executing instructions, which in some instances are defined by processor and/or computer executable program codes or the like, stored in memory 418 and analyzing the given sensor unit data and user input data to determine whether irrigation should be interrupted. Together, the processor unit 3716 and the memory 418 work together as the controller 414 to implement the functionality of the interface unit 3702.

As discussed above, in one embodiment the interface unit 3702 interrupts irrigation by coupling to the common line 34 of the irrigation controller and further utilizing the relay device 416. When the controller 414 of the interface unit 3702 determines that irrigation should be interrupted, the controller 414 sends signaling to the relay device 416 to open the switching device, therefore breaking the common line 34. This effectively disables all electrical signals via the activation lines 32 to the valves, until the switch is closed. In this way, the irrigation controller 30 is not aware that the watering has been interrupted or overridden.

The display unit 3704 comprises the user display 3706 and the display driver 3708. In some embodiments, the user display 3706 is another embodiment of user display 426. Signaling regarding various information such as the threshold levels the interface unit 3702 is currently set at, notifying the user of battery strength or low battery, indicating if the interface unit 14 is in watering interrupt mode or not, or other such information is sent to the display unit 3704 from the controller 414. The display driver 3708 then processes the received information which is then displayed to a user on the user display 3706. The user display 3706 may be one or more of a display screen, liquid crystal display (LCD), touch screen display, lights, LEDs, and/or other relevant displays.

While the components within the interface unit 3702, such as the controller 414, the transceiver 412, the interface antenna 3710, the relay device 416, and the display unit 3704 are depicted as separate entities, it should be appreciated that these components may be combined together as one component, or any combination thereof.

Figure 38:
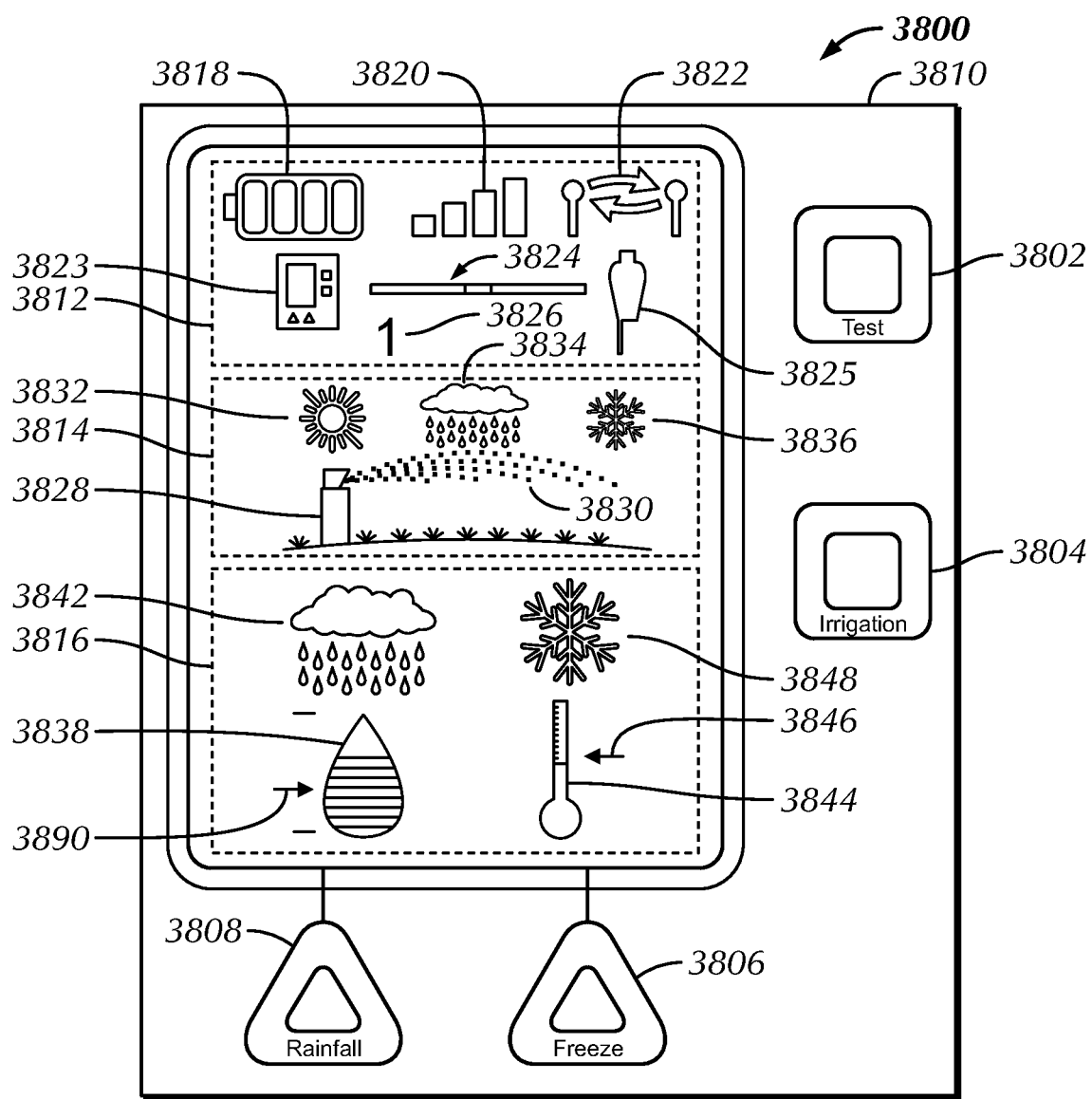
FIG. 38 is one embodiment of a user interface of the interface unit of FIGS. 36 and 37 illustrating various user inputs and display outputs.

Referring next to FIG. 38, an embodiment is shown of a user interface 3800 of the interface unit of FIG. 36 illustrating the user interface in the form of user inputs and display outputs. The user interface comprises a test button 3802, an irrigation button 3804, a temperature threshold button 3806, a rainfall threshold button 3808, a display screen 3810, and various icons and/or graphical, pictorial or other representations or visual indications which may be displayed at any given time on the display screen.

In one embodiment, the test button 3802 is utilized to initiate initial installation or to initiate the test mode for the interface unit. The irrigation button 3804 is utilized to alter the irrigation mode of the interface unit. The irrigation mode of the interface unit determines under what sensed weather conditions, such as rainfall and temperature, irrigation executed by an irrigation controller is to be interrupted. In one embodiment, the temperature threshold button 3806 and the rainfall threshold button 3808 are utilized to set the temperature threshold point and the rainfall threshold point respectively. In some embodiments, by pressing the rainfall threshold button 3610, the user switches the rainfall threshold point between multiple discrete levels of rain threshold, e.g. a low threshold, a mid threshold and a high threshold. In some embodiments, by pressing the temperature threshold button 3608, the user switches the temperature threshold point between multiple discrete levels of temperature. In some embodiment, the rainfall threshold point sets the minimum amount of rainfall sensed before irrigation is interrupted. On the same note, in some embodiments, the temperature threshold point sets the maximum sensed temperature before irrigation is interrupted. The various ways which these buttons alter what is displayed on the display screen 3810 will be discussed in further detail below.

The display screen 3810 is configured to display a plurality of icons which convey information about the rain sensor system, such as indicating which threshold levels the interface unit 14 is currently set at, notifying the user of battery strength or low battery, indicating if the interface unit 14 is in watering interrupt mode or not, and other such information. Thus, in a generic sense, the various icons may be referred to as visual indicators. In one embodiment, the display screen 3810 may be divided into three separate regions: a system communication and status display area 3812, an irrigation mode display area 3814, and a sensor data and thresholds display area 3816.

The system communications and status display area 3812 displays information regarding the connectivity between devices in the rain sensor system or the current operational status of the various sensor units configured to communicate with the interface unit. The status display area 3812 displays icons such as a battery remaining indicator 3818, a signal strength indicator 3820, a test mode indicator 3822, and a sensor communication indicator 3824.

The battery remaining indicator 3818 is disposed to the upper left corner of the system communications and status display area 3812. The battery remaining indicator 3818 displays the strength of the battery of the sensor unit 12. The battery remaining indicator 3818 is filled with a varying number of dark bars which indicate battery strength. When the battery remaining indicator 3818 is completely filled with dark bars, then the battery of the sensor unit is at full strength. As the battery strength of the sensor unit 12 depletes, the battery remaining indicator 3818 will display fewer bars. The number of bars displayed within the battery remaining indicator 3818 roughly corresponds to the amount of battery strength left in the sensor unit. For example, in one embodiment the battery remaining indicator 3818 is filled with four dark bars when the battery strength of the sensor unit is at its max. When the battery strength of the sensor unit is roughly at half strength, then the battery remaining indicator 3818 would be filled with two dark bars. Once the battery remaining indicator 3818 is filled with either one or no bars, this should signal to a user to change the battery of the given sensor unit. As described herein, the sensor unit 12 is configured to send information about its battery strength to the interface unit.

The signal strength indicator 3820 is disposed to the upper middle of the system communication and status display area 3812. The signal strength indicator 3820 illustrates the strength of signaling via the communication link between the connected interface unit and sensor unit. In one embodiment, the signal strength indicator 3820 illustrates the strength of the radio signal (e.g., in terms of signal to noise) between the interface unit (14, 3600, 3702) and the given sensor unit 12. The signal strength indicator 3820 comprises a plurality of bars of increasing heights. The number of bars represents the strength of the signals received from the sensor unit at the interface unit.

The test mode indicator 3822 is disposed on the upper right corner of the system communication and status display area 3812. The test mode indicator 3822 indicates whether there is a connection between the interface unit and the sensor unit. In addition, the test mode indicator 3822 indicates whether the interface unit is in test or install mode. Further details regarding test and install mode will be discussed with respect to FIGS. 40 and 41.

The sensor communication indicator 3824 is roughly disposed in the center of the system communication and status display area 3812. The sensor communication indicator 3824 illustrates the current status between the link between the interface unit (represented as icon 3823) and the connected sensor unit (represented as icon 3825). As illustrated in FIG. 38, the sensor communication indicator 3824 includes a sensor unit indicator 3826 to convey to the user which sensor unit the interface unit is currently communicating with. In FIG. 38, the sensor unit indicator 3826 is indicating that the user interface is communicating with the sensor unit configured as "1." Therefore the information illustrated in the system communications and status display area 3812, such as the battery remaining indicator 3818, signal strength indicator 3820, and the sensor communication indicator 3824, correspond to the sensor unit configured as sensor unit "1." In one embodiment, the sensor unit indicator 3826 may toggle between 1 and 5, indicating that up to five sensor units may be connected to a single interface unit.

Figure 40:
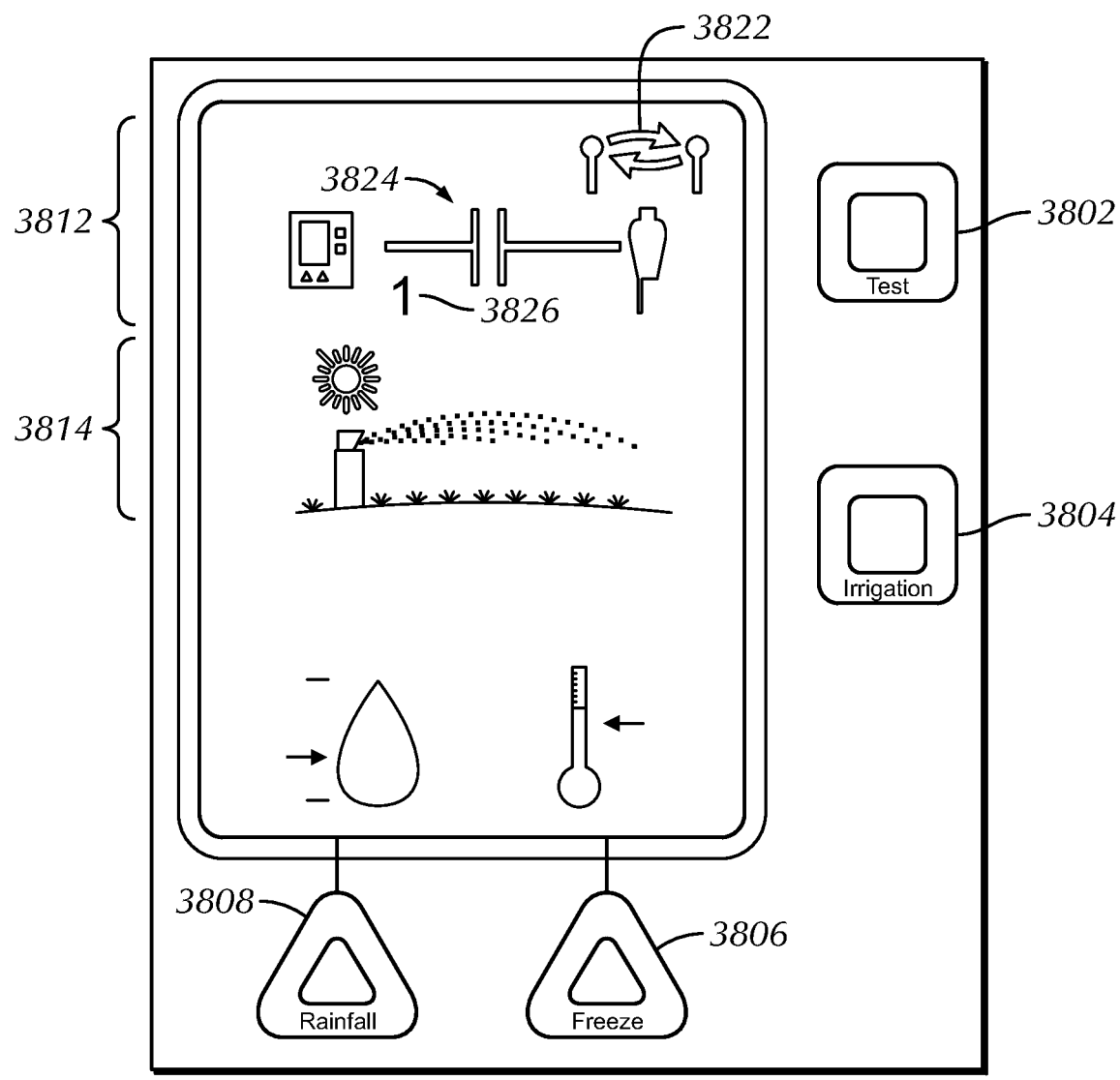
FIG. 40 illustrates one embodiment of the user inputs and display outputs of the user interface of FIG. 38 when the system is pairing with the rain sensor device.

The sensor communication indicator 3824 illustrates the current status of the link (or communication) between the interface unit and the given sensor unit indicated by the sensor unit indicator 3826. The sensor communication indicator 3824 comprises of two icons 3823 and 3825 exemplifying the interface unit and the sensor unit, respectively. When a straight line exists between the icons of the interface unit and the sensor unit, then the link is "good" or communication between the interface unit and the indicated sensor unit is currently active. When the link is a broken line, as depicted in FIG. 40, then link is broken and communication between the interface unit and the indicated sensor is not active.

The irrigation mode display area 3814 displays information regarding the current irrigation mode which the interface unit is set. In FIG. 38, the irrigation mode display area 3814 comprises icons depicting an irrigation valve 3828 (e.g., a rotor), sprayed water 3830, a sun 3832, a rain cloud 3834, and a snowflake 3836. The various combinations of these icons indicate to a user which irrigation mode the interface unit is set in. For example, when the irrigation mode display area 3814 comprises the irrigation valve 3828, the sprayed water 3830, and the sun 3832, then the irrigation mode is set to normal irrigation. The normal irrigation mode allows irrigation executed by the irrigation controller 30 to continue as scheduled when sensed rainfall is below the rainfall threshold and the sensed temperature is above a given temperature threshold. The various irrigation modes will be discussed in further detail with regards to FIGS. 45a-d.

The sensor data and thresholds display area 3816 displays information received from the connected sensor unit regarding the amount of rainfall sensed and the sensed temperature. The sensor data and thresholds display area 3816 comprises icons such as a rainfall indicator 3838, a rainfall threshold 3840, a rain trip indicator 3842, a temperature indicator 3844, a temperature threshold 3846, a temperature trip indicator 3848 and low temperature indicator 3850 (shown in FIG. 46d).

The rainfall indicator 3838 illustrates the amount of moisture currently present at the sensor unit 12. The rainfall indicator 3838 fills with dark horizontal bars as rainfall is collected at the sensor unit. The rainfall threshold 3840 is exemplified as an arrow which may toggle up and down the height of the rainfall indicator 3838. As discussed above, a user utilizes the rainfall threshold button 3808 to set the rainfall threshold point, indicating what level of rainfall would need to be sensed to prompt the interface unit to interrupt irrigation. The rainfall threshold 3840 displays to the user the selected rainfall threshold point with respect to the rainfall indicator 3838. In one embodiment, as the user presses the rainfall button 3808, the rainfall threshold 3840 is raised within the rainfall indicator 3838. Once the rainfall threshold 3840 reaches the top of the rainfall indicator 3838, further depression of the rainfall button 3808 will cause the rainfall threshold 3840 to wrap to the bottom of the rainfall indicator 3838 and repeat as above. When the rainfall threshold 3840 is closer to the top of the rainfall indicator 3838, the user has selected a high rainfall threshold point allowing the irrigation controller to continue irrigation even though a high level of moisture may be detected. The rain trip indicator 3842 is exemplified as a rain cloud which appears when the interface unit determines that the moisture sensed by a given sensor unit has risen above the rainfall threshold (as is illustrated).

The temperature indicator 3844 illustrates the temperature currently present in the rain sensor system. The temperature indicator 3844 is exemplified as a thermometer; the amount of dark fill in the thermometer illustrates the sensed temperature. Disposed to the side of the temperature indicator 3844 is the temperature threshold 3846 which is exemplified as an arrow which toggles up and down the height of the temperature indicator 3844. The temperature threshold 3846 illustrates the selected sensitivity for interrupted irrigation during low temperature. As discussed above, a user utilizes the temperature threshold button 3806 to set the temperature threshold point, in some embodiments, indicating at the maximum temperature would need to be sensed to prompt the interface unit to interrupt irrigation. The temperature threshold 3846 displays to the user the selected temperature threshold point with respect to the temperature indicator 3844. Similar to the rainfall threshold, in one embodiment, the user may press the temperature threshold button 3806 to alter the temperature threshold 3846. Once the temperature threshold 3846 reaches the top of the temperature indicator 3844, further depression of the temperature threshold button 3806 causes the temperature threshold 3846 to wrap back to the bottom of the temperature indicator 3844 and repeat as above. The temperature trip indicator 3848 is exemplified as a snowflake which appears on the display screen 3810 when the interface unit determines from measurements sent from the sensor unit that the temperature has dropped below the temperature threshold 3846. In addition, a low temperature indicator 3850, exemplified as a snowflake at the bottom of the temperature indicator 3844 (further depicted in FIG. 46d), appears once the interface unit determines that temperature detected by the sensor unit is approximately at the freezing point.

Figure 39:
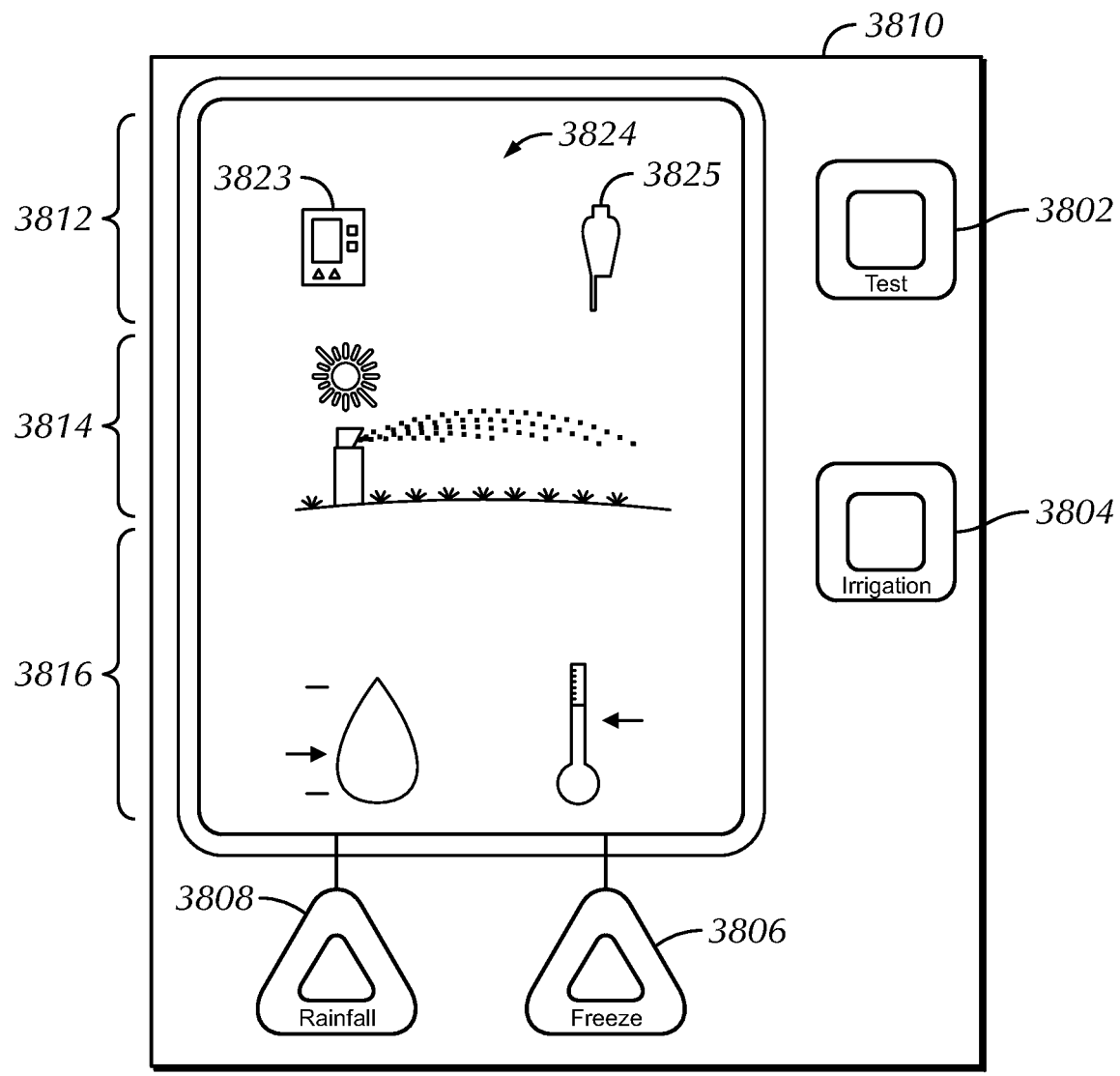
FIG. 39 illustrates one embodiment of the user inputs and display outputs of the user interface of FIG. 38 during initial power up.

Referring to FIG. 39, one embodiment of the user interface 3800 of the interface unit during initial power up of the interface unit is illustrated. When the interface unit is first powered up, the irrigation mode display area 3814 is set to normal mode, while no rainfall or temperature has yet to be sensed in the sensor data and thresholds display area 3816. Default rainfall and temperature thresholds are illustrated. At the initial power up of the interface unit, only the sensor communication indicator 3824 is displayed in the system communication and status display area 3812 of the display screen 3810. The straight or broken line between the icons 3823 and 3825 exemplifying the interface unit and the sensor unit, respectively, in the sensor communication indicator 3824 has disappeared. In addition, the icons 3823 and 3825 of the interface unit and the sensor unit flash until an interface unit and a sensor unit are communicationally paired together.

Referring next to FIG. 40, one embodiment of the user interface 3800 of the interface unit when the system is pairing with the rainfall sensor device is illustrated. As in the initial power up, the irrigation mode display area 3814 is set to normal mode, while no rainfall or temperature has yet to be sensed in the sensor data and thresholds display area 3816.

Figure 41:
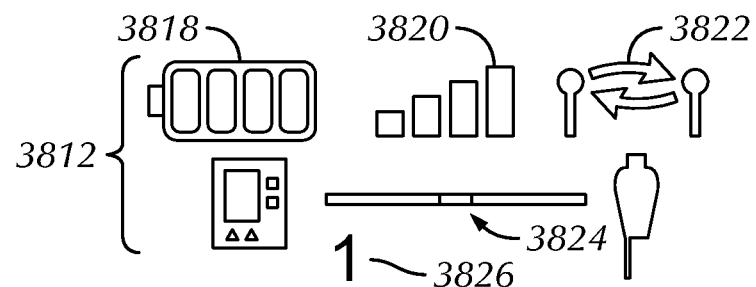
FIG. 41 illustrates one embodiment a system communication and status display area of the user interface once the interface unit is paired with the rain sensor device.

To begin install mode and pairing the interface unit with a given sensor unit, the user presses the test button 3802 for a given amount of time. In some embodiments, the given amount of time is roughly 5 seconds. Next, the user inserts a power unit into the sensor unit. In some embodiments, a battery cassette is utilized as a power unit to provide power to the sensor unit. While the sensor unit and the interface unit is pairing, the system communication and status display area 3812 displays the test mode indicator 3822, indicating to the user that communication between the interface unit and the sensor unit is commencing and the interface unit is in install mode. The system communication and status display area 3812 also displays the system communication indicator 3824 and sensor unit indicator 3826. For this example, the sensor unit indicator 3826 is set to "1," as this is the first time the interface unit is paired to a sensor unit. It should be appreciated that the sensor unit indicator 3826 may be set to a different number, corresponding to a different sensor unit. During install mode, or pairing of the interface unit and the sensor unit, the system communication indicator 3824 displays a broken line between the icons 3823 and 3825 representing the interface unit and the sensor unit, since the communication link between the two devices has yet to be established. Once install mode is complete and the interface unit has paired with the sensor unit, the display screen 3810 will display the battery remaining indicator 3818, the signal strength indicator 3820, the test mode indicator 3822, the signal communication indicator 3824 with a straight solid line between then icons 3823 and 3825 representing the interface and sensor unit, and the sensor unit indicator 3826. This display indicates to the user that pairing was successful and the display eventually disappears in a specified amount of time. FIG. 41 provides an example of the system communication and status display area 3812 that is displayed to a user to indicate that the pairing of the interface unit and sensor unit was successfully completed.

Figures 42, 43:
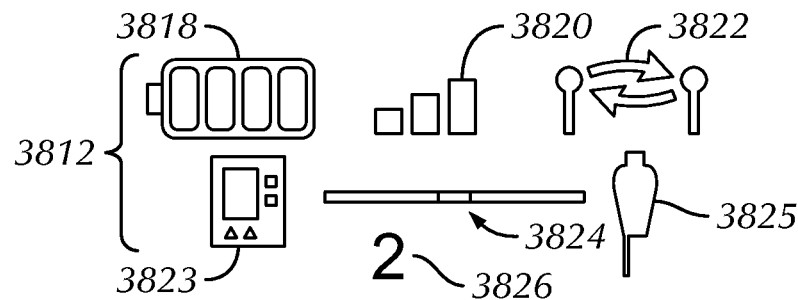
FIG. 42 illustrates one embodiment of the system communication and status display area of the user interface during test mode between the interface unit and the rain sensor device.
FIG. 43 is a chart illustrating signal strength and interaction with the rain sensor device according to one embodiment.

In one embodiment, as described herein, the sensor unit is equipped with a lighting mechanism to communicate to the user the signal strength between the sensor unit and the interface unit to help determine the optimal location for the sensor unit. For the embodiment where the signal strength may be exemplified between 1 and 4 bars, the sensor unit may utilize the lighting mechanism to represent the number of bars in the signal strength indicator 3820. In one embodiment, the lighting mechanism is an LED which blinks the number of signal strength bars. For example, if there are four bars of signal strength indicated by the signal strength indicator 3820, the LED on the sensor unit will blink four consecutive times before pausing and then repeats the blinking until an alteration in the signal strength indicator 3820 has been detected or a specified time frame for determining the optimal location of the sensor unit has elapsed. In one embodiment, the specified time frame is roughly five minutes, meaning the user is allotted a five minute window to select the sensor unit location before the light mechanism ceases representing the signal strength. This feature provides many advantages, namely, a user would be able to install the sensor unit and the interface unit without the need of assistance from other users since the sensor unit itself provides feedback regarding the signal strength. FIG. 43 provides a chart 4300 illustrating the interaction between the signal strength indicated by the signal strength indicator 3820 at the interface unit and the indicator light (e.g., LED) of the sensor unit 12 in accordance with one embodiment.

When a user wishes to test the rain sensor system or the connection between the interface unit and the sensor unit, the user depresses test button 3802. If no sensor units are paired with the system, the interface unit sends out a wireless pairing signal to find the closest sensor unit then begins the install mode outlined above. However, when sensor units are paired to the interface unit, pressing the test button 3802 causes the interface unit to display the last known system information of the given interface unit in the system communication and status display area 3812. Pressing the test button allows the user to cycle through each paired sensor unit, the sensor unit indicator 3826 indicates to the user which sensor unit the interface unit is currently communicating with, and displays the last known communication and system information for the sensor indicated by the sensor unit indicator 3826. Pressing the test button 3802 cycles through the paired sensor units until reaching the first unpaired sensor position (if a sensor position is available). If a sensor unit and a sensor position are available (the sensor position is indicted by the sensor unit indicator 3826), a pairing signal is sent from the interface unit to the sensor unit and install mode as outlined above commences.

FIG. 42 illustrates an example of the system communication and status display area 3812 during test mode. The test button 3802 has been depressed a certain number of times such that the interface unit is communicating with the sensor unit in the second sensor position indicated by the sensor unit indicator 3826 currently at "2." From the example of FIG. 42, the system communication and status display area 3812 illustrates that the sensor unit is at full battery power, however the signal strength is not at full strength. The system communication and status display area 3812 is visible on the display screen for a specified amount of time. In one embodiment, the system communication and status display area 3812 is visible for roughly ten seconds.

Figure 44:
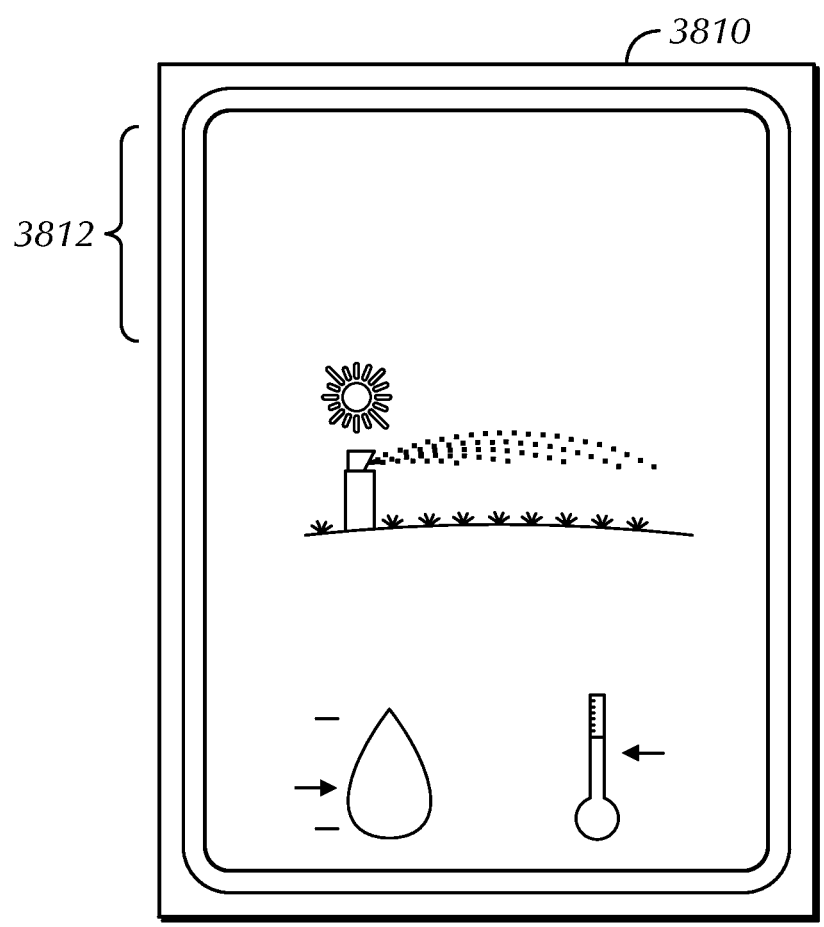
FIG. 44 illustrates one embodiment of the user inputs and display outputs of the user interface of FIG. 38 once the interface unit has been paired to the rain sensor device.

Referring next to FIG. 44, one embodiment of the user interface of the interface unit once the interface unit has been paired to the rainfall sensor device is illustrated. As mentioned above, in one embodiment, the icons found within the system communication and status display area 3812 has disappeared from the display screen 3810. The display screen 3810 displays the icons within the irrigation mode display area 3814 and the sensor data and thresholds display area 3816. For the display screen 3810 of FIG. 44, the interface unit is in normal mode, no precipitation has been sensed, and temperature is above the temperature threshold 3846.

Referring to FIGS. 45*a-d*, one embodiment of the irrigation mode display area of the interface unit depicting various irrigation modes is illustrated. The various irrigation modes include a normal irrigation mode 4502, a bypass rain mode 4504, a bypass rain/freeze mode 4506 and a halt irrigation mode 4508. When displayed, these irrigation modes represent the current irrigation mode of the interface unit. In addition, the user may set the irrigation mode by pressing the irrigation button 3804.

Figure 45A:
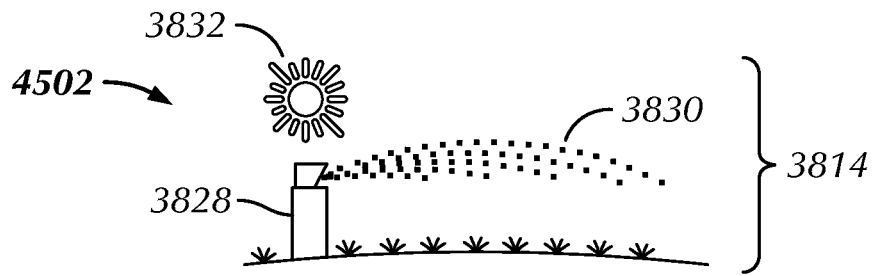
FIGS. 45a-d illustrate one embodiment of an irrigation mode display area of the user interface of FIG. 38 depicting various irrigation modes.

FIG. 45*a* illustrates the normal irrigation mode 4502 for the interface unit. When the interface unit is in the normal irrigation mode 4502, the interface unit displays the icons of the irrigation valve 3828, the sprayed water 3830, and the sun 3832 in the irrigation mode display area 3814. During the normal irrigation mode 4502, the interface unit does not interrupt the irrigation schedule of the irrigation controller 30, i.e., it allows the controller 30 to irrigate as it is programmed. However, the normal irrigation mode 4502 is shut off when the interface unit determines that the rainfall sensed is above the rainfall threshold 3840, or determines when the sensed temperature drops below the temperature threshold 3846. In addition, the normal irrigation mode 4502 may be viewed as the default mode, since the system will revert back to the normal irrigation mode 4502 after a given amount of time from any of the other three irrigation modes. In one embodiment, the interface unit will revert back to the normal irrigation mode 4502 after three days time.

Figure 45B:
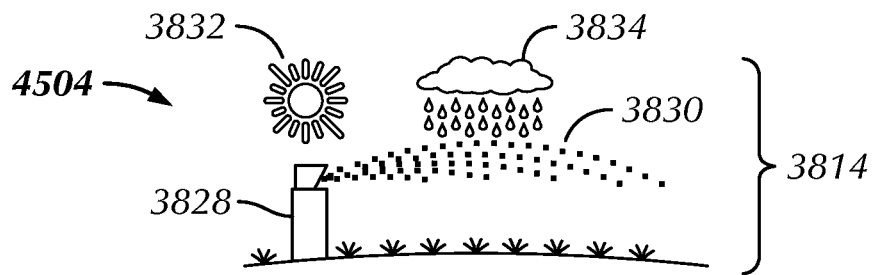

FIG. 45*b* illustrates the bypass rain mode 4504 depicted on the irrigation mode display area 3814. When the interface unit is in the bypass rain mode 4504, the interface unit displays the icons of the irrigation valve 3828, the sprayed water 3830, the sun 3832, and the rain cloud 3834 in the irrigation mode display area 3814. During the bypass rain mode 4504, the interface unit allows the irrigation controller to irrigate during fair weather or when it is raining. The interface unit determines that it is raining when the rainfall sensed (as illustrated in the rainfall indicator 3838) rises above the rainfall threshold 3840, or the rainfall sensed by the sensor unit is increasing. However, during the bypass rain mode 4504, the interface unit interrupts irrigation when a low temperature condition (e.g., a "freeze" condition) is sensed, the low temperature condition occurring when the sensed temperature falls below the temperature threshold 3846. The interface unit returns to the normal irrigation mode 4502 when either the user manually returns the interface unit to normal irrigation mode 4502 by pressing the irrigation button 3804, after the occurrence of one rain event (after the rain trip indicator 3842 is displayed once), or automatically after a given time span. In one embodiment, the given time span is roughly three days or seventy-two hours.

Figure 45C:
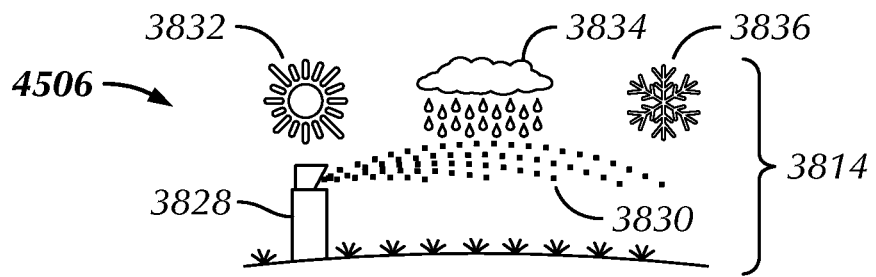

FIG. 45c illustrates the bypass rain/freeze mode 4506 depicted on the irrigation mode display area 3814. When the interface unit is in the bypass rain/freeze mode 4506, the interface unit displays the icons of the irrigation valve 3828, the sprayed water 3830, the sun 3832, the rain cloud 3834, and the snowflake 3836 in the irrigation mode display area 3814. During the bypass rain/freeze mode 4506, the interface unit allows the irrigation controller to irrigate during fair weather, rain, or when a low temperature condition (e.g., a freeze condition) is determined. The interface unit returns to the normal irrigation mode 4502 when either the user manually returns the interface unit to normal irrigation mode 4502 by pressing the irrigation button 3804, after the occurrence of one rain event or a freeze condition, or automatically after a given time span. In one embodiment, the given time span is roughly three days or seventy-two hours.

Figure 45D:
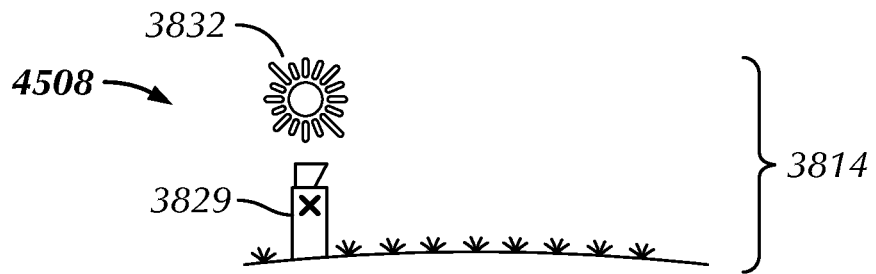

FIG. 45d illustrates the halt irrigation mode 4508 (also referred to as an interrupt irrigation mode) depicted on the irrigation mode display area 3814. When the interface unit is in the halt irrigation mode 4508, the interface unit displays the icons of an irrigation valve 3828 and the sun 3832. In the halt irrigation mode 4508, the icon for the irrigation valve 3828 differs from the normal irrigation valve 3828 in that an "X" is added to the icon for the irrigation valve 3828 to indicate that irrigation from the irrigation controller should be interrupted, hence the absence of the sprayed water 3830. During the halt irrigation mode 4508, the interface unit interrupts irrigation from the irrigation controller 30. When the halt irrigation mode 4508 is triggered by a user, irrigation is interrupted regardless of the sensed weather conditions. The user may manually place the interface unit into the halt irrigation mode 4508 by selecting the mode through the irrigation button 3804. In addition, the interface unit may enter into the halt irrigation mode 4508 from either the normal irrigation mode 4502 or the bypass rain mode 4504. The interface unit enters into the halt irrigation mode 4508 from normal irrigation mode 4502 when the interface unit determines that a rain or low temperature condition exists, for example, based on temperature and/or rainfall measurements received from the sensor unit according to the techniques described herein. The interface unit enters into the halt irrigation mode 4508 from the bypass rain mode 4504 when it is determined that a low temperature condition exists. The interface unit returns to the normal irrigation mode 4502 when either the user manually returns the interface unit to the normal irrigation mode 4502 by pressing the irrigation button 3804 or automatically after a given time span. In one embodiment, the given time span is roughly three days or seventy-two hours.

Figure 46A:
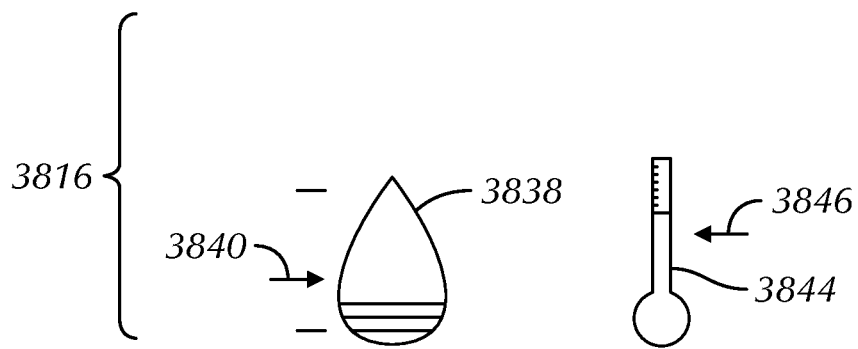
FIGS. 46a-d illustrate one embodiment of a sensor data and thresholds display area of the user interface of FIG. 38 depicting various rain and temperature indications.
Figure 46B:
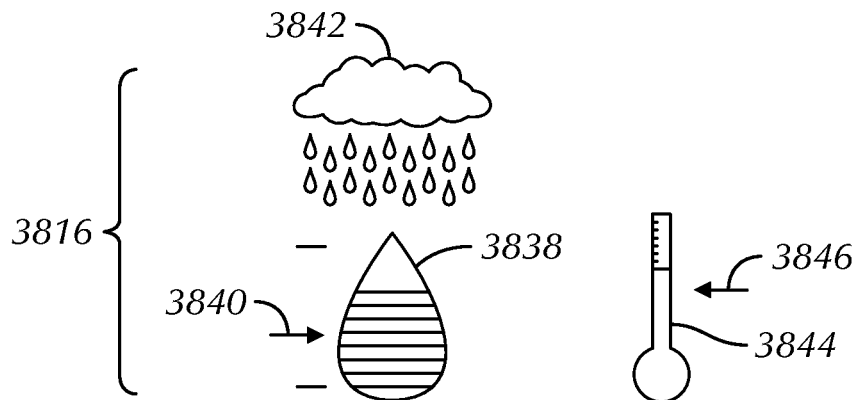
Figure 46C:
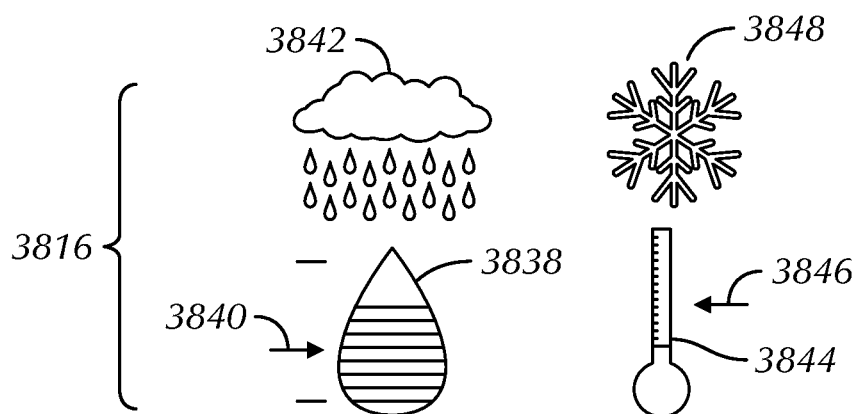
Figure 46D:
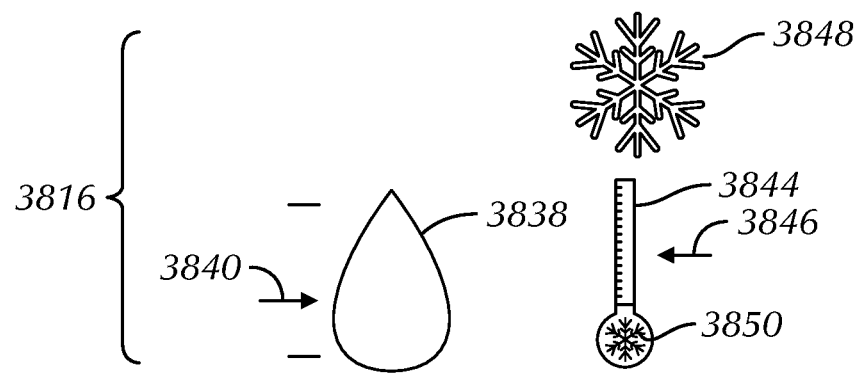

FIGS. 46a-d illustrate the relationship between the sensed rainfall and temperature depicted in the rainfall indicator 3838 and temperature indicator 3844 to the rain trip indicator 3842, temperature trip indicator 3848, and the temperature indicator 3850 (see FIG. 46d).

FIG. 46a illustrates an embodiment of the sensor data and thresholds display area 3816 when the sensed rainfall is below the rainfall threshold 3840 and the sensed temperature is above the temperature threshold 3846. From FIG. 46a, the dark horizontal bars vertically fill the rainfall indicator, however the bars fall below the rainfall threshold 3840. On a similar note, the temperature indicator 3844 depicts the sensed temperature to be above the temperature threshold 3846. Since neither the sensed rainfall has fallen above the rainfall threshold 3840 nor the sensed temperature has fallen below the temperature threshold 3846 (as determined by the interface unit based on measurements from the sensor unit), the area of the display screen 3810 which normally displays the rain trip indicator 3842 or the temperature trip indicator 3848 is empty.

FIG. 46b illustrates an embodiment of the sensor data and thresholds display area 3816 when the sensed rainfall is above the rainfall threshold 3840 and the sensed temperature is above the temperature threshold 3846. The dark horizontal bars within the rainfall indicator 3838 exceed the rainfall threshold 3640. In response to the sensed rainfall exceeding the rainfall threshold 3840, the rain trip indicator 3842 is displayed on the display screen 3810 in the sensor data and threshold display area 3816. By displaying the rain trip indicator 3842, the interface unit conveys that a rain event is occurring. In addition, the interface unit may determine a rain event is occurring if the dark horizontal bars within the rainfall indicator 3838 are gradually increasing upward, trigger the interface unit to display the rain trip indicator 3842. The temperature indicator 3844 depicts the sensed temperature to be above the temperature threshold 3846, therefore the area of the display screen 3810 which normally displays the temperature trip indicator 3848 is empty.

FIG. 46c illustrates an embodiment of the sensor data and thresholds display area 3816 when the sensed rainfall is above the rainfall threshold 3840 and the sensed temperature is below the temperature threshold 3846. The dark horizontal bars within the rainfall indicator 3838 exceed the rainfall threshold 3640. In response to the sensed rainfall exceeding the rainfall threshold 3840, the rain trip indicator 3842 is displayed on the display screen 3810 in the sensor data and threshold display area 3816. By displaying the rain trip indicator 3842, the interface unit conveys that a rain event is occurring. The temperature indicator 3844 depicts the sensed temperature to be below the temperature threshold 3846. In response, the interface unit displays the temperature trip indicator 3848 to indicate a low temperature condition has occurred.

FIG. 46d illustrates an embodiment of the sensor data and thresholds display area 3816 when the sensed rainfall is below the rainfall threshold 3840 and the sensed temperature is significantly below the temperature threshold 3846. No dark horizontal bars fill the rainfall indicator 3838, indicating the sensor unit has not sensed any rainfall or moisture. For this example, since there is no sensed rainfall, the sensed rainfall falls below the rainfall threshold 3840 and the area of the display screen 3810 which normally displays the rain trip indicator 3842 is empty. The temperature indicator 3844 depicts the sensed temperature to have dropped below the freezing point, or 32 degrees Fahrenheit (i.e., 0 degrees Celsius). Since the sensed temperature has dropped so low, the interface unit displays the low temperature indicator 3850, which is embodied as a snowflake embedded within the temperature indicator 3844. In addition, the temperature trip indicator 3848 is displayed to indicate the determination of a freeze condition.

Figure 47:
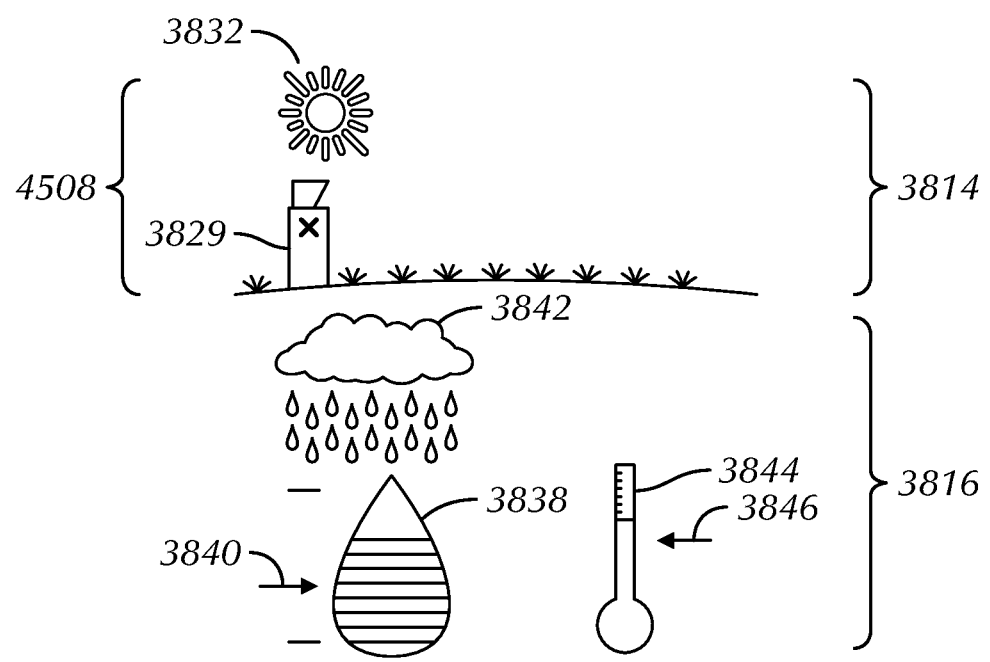
FIGS. 47-49 illustrate one embodiment of the display outputs of the user interface of FIG. 38 depicting the interaction between the irrigation mode display area and the sensor data and threshold display area.
Figure 48:
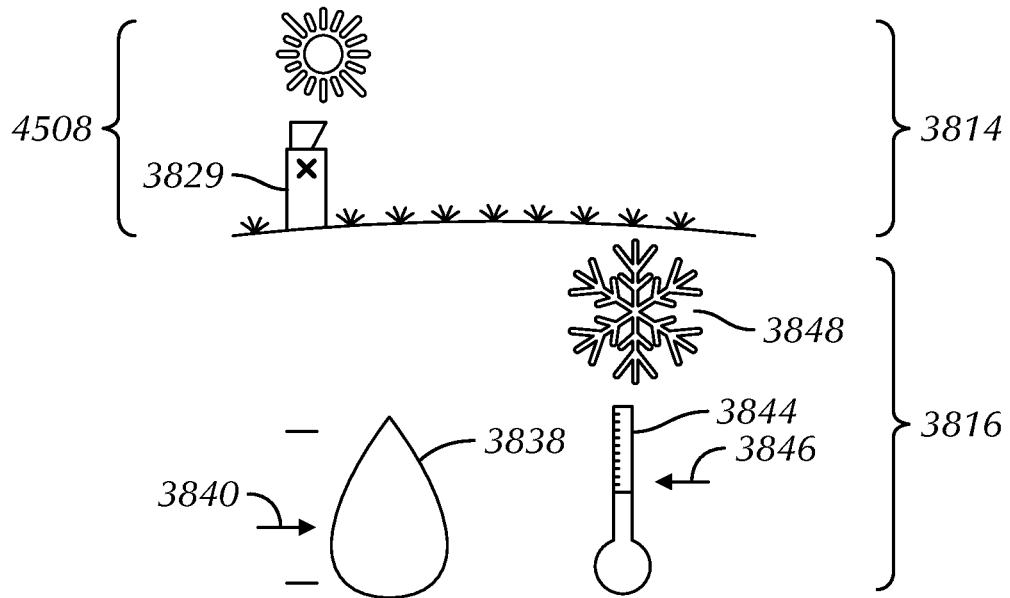
Figure 49:
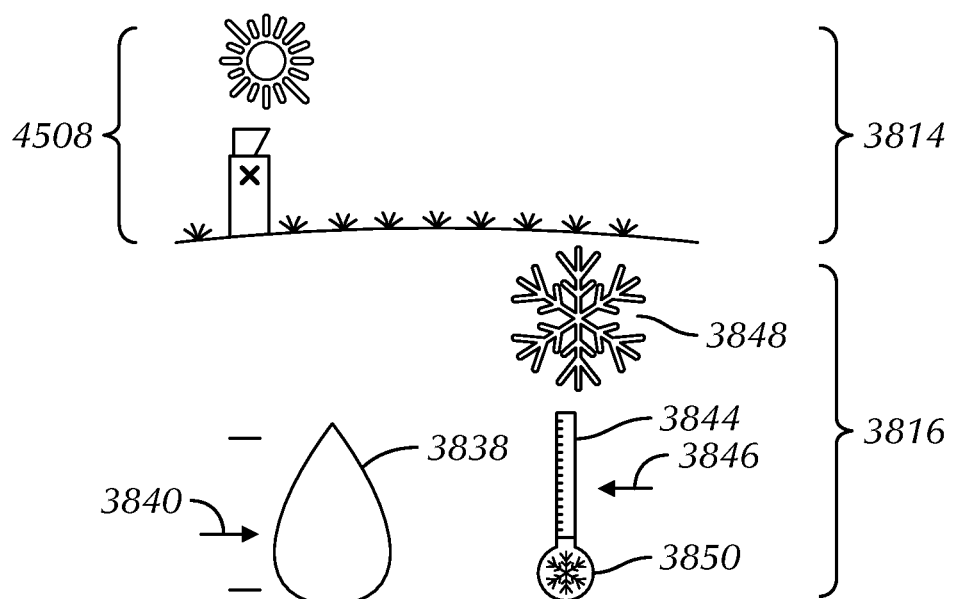

FIGS. 47-49 illustrate the relationship between the sensor data, such as sensed rainfall and temperature, and the subsequent effects to irrigation mode and what is displayed in the irrigation mode display area 3814 of the display screen 3810 when the interface unit is initially in the normal irrigation mode 4502.

FIG. 47 illustrates an embodiment of the display screen of the interface unit when the sensed rainfall is above the rainfall threshold 3840 and the sensed temperature is above the temperature threshold 3846. The dark horizontal bars within the rainfall indicator 3838 exceed the rainfall threshold 3840. In response to the sensed rainfall exceeding the rainfall threshold 3840, the rain trip indicator 3842 is displayed on the display screen 3810 in the sensor data and threshold display area 3816. By displaying the rain trip indicator 3842, the interface unit conveys that a rain event is occurring. The temperature indicator 3844 depicts the sensed temperature to be above the temperature threshold 3846, therefore the area of the display screen 3810 which normally displays the temperature trip indicator 3848 is empty.

Since the interface unit has determined a rain event is occurring, as mentioned above with regards to the normal irrigation mode 4502, the interface unit interrupts the irrigation of the irrigation controller. The interface unit then displays the halt irrigation mode 4508 to indicate to a user that the interface unit is inhibiting/interrupting irrigation. The interface unit returns to normal irrigation mode 4502 when the rain fall sensed by the rainfall indicator 3838 falls below the rainfall threshold 3840.

FIG. 48 illustrates an embodiment of the display screen of the interface unit when the sensed rainfall is below the rainfall threshold 3840 and the sensed temperature is below the temperature threshold 3846. No dark horizontal bars fill the rainfall indicator 3838, indicating the sensor unit has not sensed any rainfall or moisture. For this example, since there is no sensed rainfall, the sensed rainfall falls below the rainfall threshold 3840 and the area of the display screen 3810 which normally displays the rain trip indicator 3842 is empty. The temperature indicator 3844 depicts the sensed temperature to be below the temperature threshold 3846. In response, the interface unit displays the temperature trip indicator 3848 to indicate a freeze condition has occurred. It is noted that the freeze condition as used herein may be broadly referred to as a low temperature condition. That is, the low temperature condition may not strictly correspond to a freeze, but simply to a defined low temperature.

Since the interface unit has determined a freeze condition is occurring, as mentioned above with regards to the normal irrigation mode 4502, the interface unit interrupts the irrigation of the irrigation controller. The interface unit then displays the halt irrigation mode 4508 to indicate to a user that the interface unit is inhibiting/interrupting irrigation. The interface unit returns to normal irrigation mode 4502 when the temperature sensed by the temperature indicator 3844 rises above the temperature threshold 3846.

FIG. 49 illustrates an embodiment of the display screen of the interface unit when the sensed rainfall is below the rainfall threshold 3840 and the sensed temperature is significantly below the temperature threshold 3846. No dark horizontal bars fill the rainfall indicator 3838, indicating the sensor unit has not sensed any rainfall or moisture. For this example, since there is no sensed rainfall, the sensed rainfall falls below the rainfall threshold 3840 and the area of the display screen 3810 which normally displays the rain trip indicator 3842 is empty. The temperature indicator 3844 depicts the sensed temperature to have dropped below the freezing point, or 32 degrees Fahrenheit. Since the sensed temperature has dropped so low, the interface unit displays the low temperature indicator 3850, which is embodied as a snowflake embedded within the temperature indicator 3844. In addition, the temperature trip indicator 3848 is displayed to indicate the determination of a freeze condition.

Since the interface unit has determined a freeze condition is occurring, as mentioned above with regards to the normal irrigation mode 4502, the interface unit interrupts the irrigation of the irrigation controller. The interface unit then displays the halt irrigation mode 4508 to indicate to a user that the interface unit is inhibiting/interrupting irrigation. The interface unit returns to normal irrigation mode 4502 when the temperature sensed by the temperature indicator 3844 rises above the temperature threshold 3846.

It should be understood that when the interface unit is initially in normal irrigation mode 4502 and both a rain event and a freeze condition is occurring at the same time, the interface unit interrupts irrigation and displays the halt irrigation mode 4508 in the irrigation mode display area 3814. In essence, the display screen 3810 would display the halt irrigation mode 4508 in the irrigation mode display area as depicted by FIG. 45*d* along with the sensor data and threshold display area 3816 of FIG. 46*c*. In addition, if the temperature drops to the freezing point (32 degrees Fahrenheit) or below, the low temperature indicator 3850 would also be present on the display screen 3810.

FIGS. 50-53 illustrate the relationship between the sensor data, such as sensed rainfall and temperature, and the subsequent effects to irrigation mode and what is displayed in the irrigation mode display area 3814 and the sensor data and threshold display area 3816 of the display screen 3810 when the interface unit is in either the bypass rain mode 4504, the bypass rain/freeze mode 4506, or the halt irrigation mode 4508.

Figure 50:
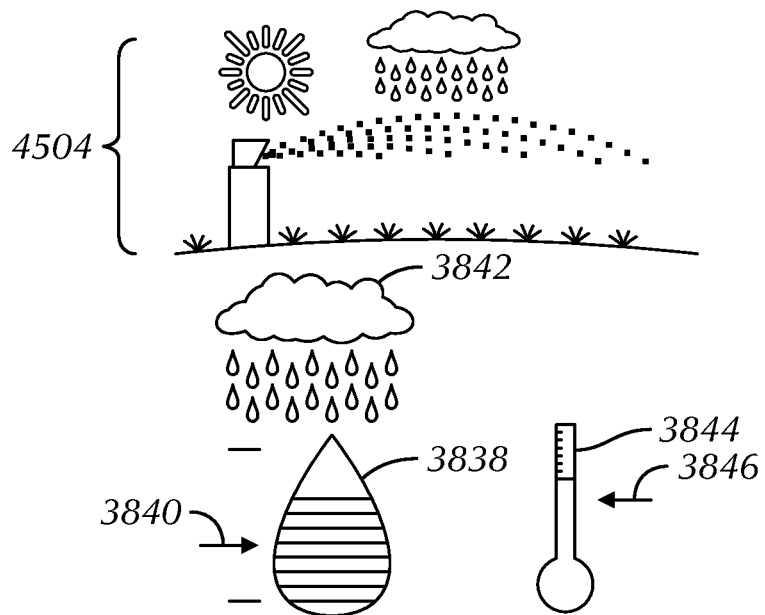

FIG. 50 illustrates an embodiment of the display screen of the interface unit when the interface unit is in the bypass rain mode 4504 and the sensed rainfall is above the rainfall threshold 3840 and the sensed temperature is above the temperature threshold 3846. The dark horizontal bars within the rainfall indicator 3838 exceed the rainfall threshold 3640. In response to the sensed rainfall exceeding the rainfall threshold 3840, the rain trip indicator 3842 is displayed on the display screen 3810 in the sensor data and threshold display area 3816. By displaying the rain trip indicator 3842, the interface unit conveys that a rain event is occurring. In addition, the interface unit may determine a rain event is occurring if the dark horizontal bars within the rainfall indicator 3838 are gradually increasing upward, trigger the interface unit to display the rain trip indicator 3842. The temperature indicator 3844 depicts the sensed temperature to be above the temperature threshold 3846, therefore the area of the display screen 3810 which normally displays the temperature trip indicator 3848 is empty.

Since the interface unit is in the bypass rain mode 4504, even though the interface unit has determined a rain event is currently occurring, the interface unit does not interrupt the irrigation schedule of the irrigation controller 30. Once the interface unit has determined the rain event has passed (when the sensed rainfall in the rainfall indicator 3838 has fallen below the rainfall threshold 3840), the interface unit returns to normal irrigation mode 4502. In addition, the interface unit may also return to normal irrigation mode 4502 from either the user manually returning the interface unit to normal irrigation mode 4502 by pressing the irrigation button 3804 or automatically after a given time span, typically three days or seventy-two hours.

If the interface unit determined a freeze condition existed while in the bypass rain mode 4504, the interface unit would proceed to the halt irrigation mode 4508 and interrupt the irrigation controller 30. The interface unit would then display on the display screen 3810 the irrigation mode display area 3814 and sensor data and threshold display area 3816 of FIG. 48. Alternatively, the interface unit would display on the display screen 3810 the irrigation mode display area 3814 and sensor data and threshold display area 3816 of FIG. 49 if a freeze condition and conditions to trigger the display of the low temperature indication 3850 existed.

Figure 51:
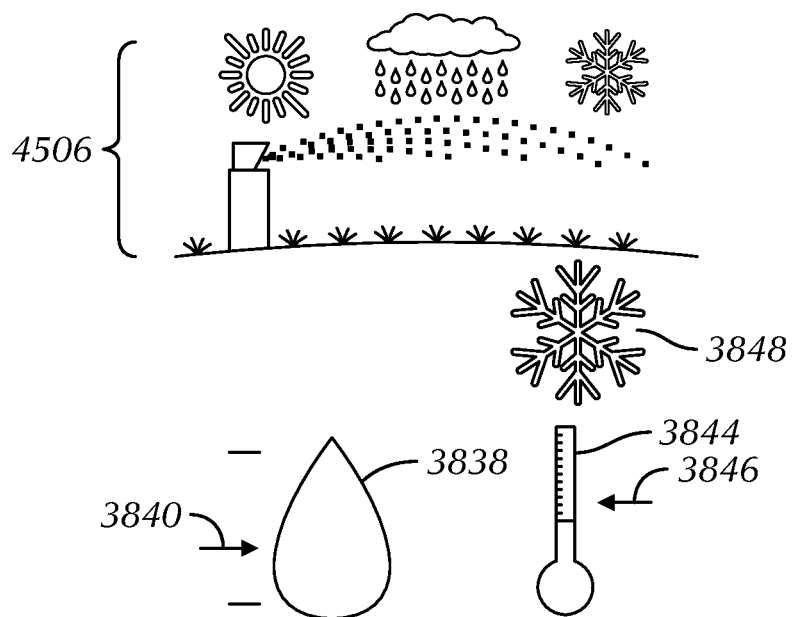

FIG. 51 illustrates an embodiment of the display screen of the interface unit when the interface unit is in the bypass rain/freeze mode 4506 when the sensed rainfall is below the rainfall threshold 3840 and the sensed temperature is below the temperature threshold 3846. No dark horizontal bars fill the rainfall indicator 3838, indicating the sensor unit has not sensed any rainfall or moisture. For this example, since there is no sensed rainfall, the sensed rainfall falls below the rainfall threshold 3840 and the area of the display screen 3810 which normally displays the rain trip indicator 3842 is empty. The temperature indicator 3844 depicts the sensed temperature to be below the temperature threshold 3846. In response, the interface unit displays the temperature trip indicator 3848 to indicate a freeze condition has occurred. It should be understood that a rain event may not be detected, and therefore the rain trip indicator 3842 is not displayed, if the sensed rainfall is less than the rainfall threshold 3840.

Since the interface unit is in the bypass rain/freeze mode 4506, even though the interface unit has determined a freeze condition is currently occurring, the interface unit does not interrupt the irrigation schedule of the irrigation controller 30. Once the interface unit has determined the freeze condition has passed (when the sensed temperature has risen above the temperature threshold 3846), the interface unit returns to normal irrigation mode 4502. In addition, the interface unit may also return to the normal irrigation mode 4502 from either the user manually returns the interface unit to normal irrigation mode 4502 by pressing the irrigation button 3804 or automatically after a given time span, typically three days or seventy-two hours.

If instead a rain event was sensed instead of a freeze condition when the interface unit is in bypass rain/freeze mode 4506, the interface unit does not interrupt the irrigation schedule of the irrigation controller 30 even when a rain event is determined. In this event, the interface unit would display on the display screen 3810 the irrigation mode display area of FIG. 45c in conjunction with the sensor data and threshold display area displayed in FIG. 46b. Once the interface unit has determined the rain event has passed (when the sensed rainfall in the rainfall indicator 3838 has fallen below the rainfall threshold 3840), the interface unit returns to normal irrigation mode 4502.

FIG. 52 illustrates an embodiment of the display screen of the interface unit when the interface unit is in bypass rain/freeze mode 4506 when the sensed rainfall is above the rainfall threshold 3840 and the sensed temperature is below the temperature threshold 3846. The dark horizontal bars within the rainfall indicator 3838 exceed the rainfall threshold 3640. In response to the sensed rainfall exceeding the rainfall threshold 3840, the rain trip indicator 3842 is displayed on the display screen 3810 in the sensor data and threshold display area 3816. By displaying the rain trip indicator 3842, the interface unit conveys that a rain event is occurring. The temperature indicator 3844 depicts the sensed temperature to be below the temperature threshold 3846. In response, the interface unit displays the temperature trip indicator 3848 to indicate a freeze condition has occurred.

Since the interface unit is in bypass rain/freeze mode 4506, even though the interface unit has determined both a rain event and freeze condition has occurred, the interface unit does not interrupt the irrigation schedule of the irrigation controller 30. The interface unit returns to normal irrigation mode 4502 when either the rain event and freeze condition has passed, the user manually returns the interface unit to normal irrigation mode 4502 by pressing the irrigation button 3804, or after a given time span, typically three days or seventy-two hours.

FIG. 53 illustrates an embodiment of the display screen of the interface unit when the interface unit is in the halt irrigation mode 4508 and the sensed rainfall is below the rainfall threshold 3840 and the sensed temperature is above the temperature threshold 3846, corresponding to fair weather conditions. No dark horizontal bars fill the rainfall indicator 3838, indicating the sensor unit has not sensed any rainfall or moisture. For this example, since there is no sensed rainfall, the sensed rainfall falls below the rainfall threshold 3840 and the area of the display screen 3810 which normally displays the rain trip indicator 3842 is empty. The temperature indicator 3844 depicts the sensed temperature to be above the temperature threshold 3846, therefore the area of the display screen 3810 which normally displays the temperature trip indicator 3848 is empty.

Since the interface unit is in the halt irrigation mode 4508, the interface unit interrupts the irrigation schedule of the irrigation controller 30, regardless of the sensed weather conditions. The display screen 3810 in FIG. 53 indicates fair weather conditions which would normally prompt normal irrigation. However, the user may wish to interrupt irrigation for an event such as an outdoor gathering and therefore has the option to choose the halt irrigation mode 4508 to interrupt irrigation regardless of the sensed weather conditions. The interface unit returns to normal irrigation mode 4502 either when the user manually places the interface unit into normal irrigation mode 4502 as discussed above or after a given time span, typically three days or seventy-two hours.

FIGS. 54-57 illustrate an embodiment of the display screen 3810 of the interface unit during light rain. During the light rain, rainfall has been sensed, however, the amount of rainfall sensed and displayed on the rainfall indicator 3838 never exceeds the set rainfall threshold 3840. As illustrated in FIGS. 54-57, as the sensed rainfall displayed on the rainfall indicator 3838 increases, the interface determines a rain event has occurred and interrupts irrigation. In an alternative embodiment, the interface unit waits to interrupt irrigation until the rainfall threshold 3840 has been met or exceeded before irrigation is interrupted. When the rain sensor system begins to dry, the interface unit returns to the normal irrigation mode 4502 and allows the irrigation controller 30 to irrigate. For FIGS. 54-57, the temperature is above the temperature threshold 3846, and therefore a freeze condition has not been determined and the temperature trip indicator 3848 is not displayed on the display screen 3810.

Figure 54:
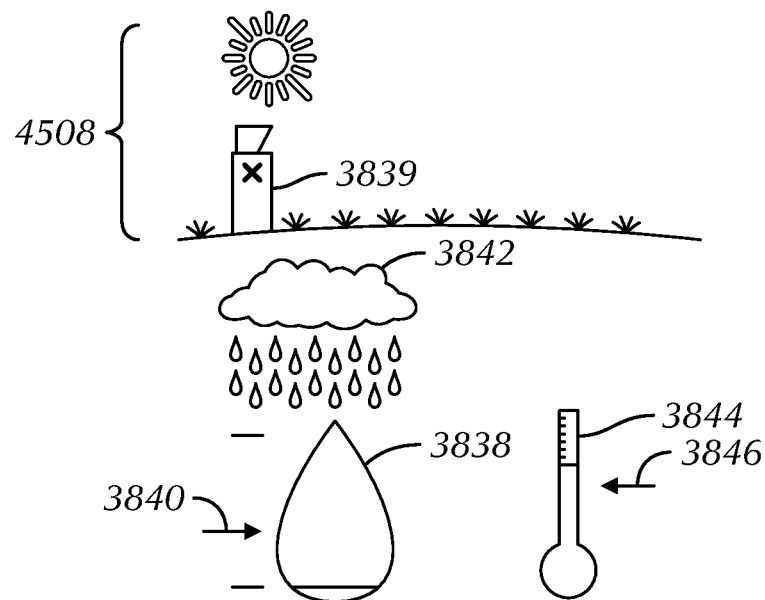
Figure 55:
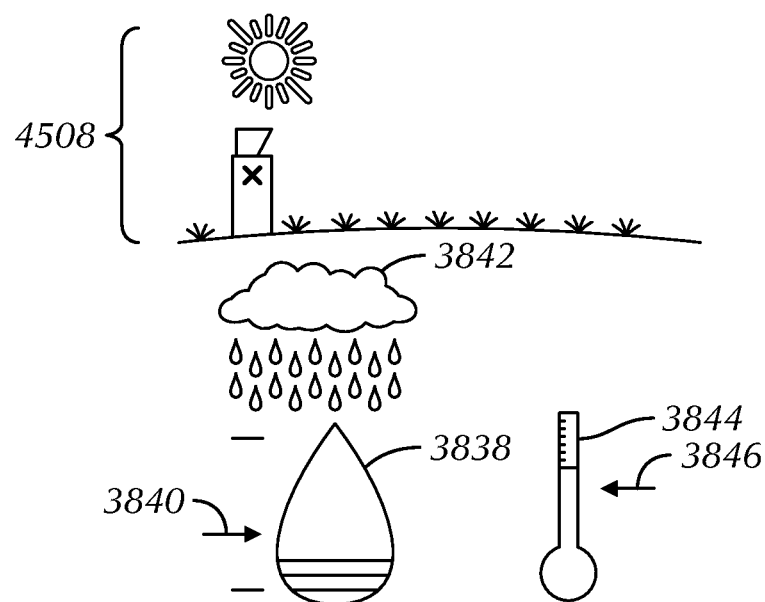

At the beginning of the light rain, as depicted in FIG. 54, rainfall is increasing and the dark horizontal bars within the rainfall indicator 3838 gradually fills the rainfall indicator 3838. Even though the sensed rainfall is below the rainfall threshold 3840, the interface unit has determined a rain event is occurring since the sensed rainfall, or the moisture in the system, is increasing. The rain trip indicator 3842 is then displayed onto the display screen 3810 to indicate a rain event is occurring. The interface unit proceeds to interrupt irrigation, and the halt irrigation mode 4508 is displayed on the display screen 3810 in the irrigation mode display area 3814. In FIG. 55, the sensed rainfall is still increasing, the dark horizontal bars within the rainfall indicator 3838 fills the rainfall indicator 3838 more than what is illustrated in FIG. 54.

As the rain continues, moisture in the system increases but never exceeds the rainfall threshold 3840. As depicted in FIG. 56, as the rainfall sensed and displayed in the rainfall indicator 3838 reaches the rainfall threshold 3840 and begins to dry out, the interface unit returns to the normal irrigation mode 4502. As the system further dries out, the moisture in the system decreases and therefore the amount of the rainfall indicator 3838 filled by dark horizontal bars decreases as depicted in FIG. 57.

FIGS. 58-63 illustrate an embodiment of the display screen 3810 of the interface unit when the interface unit is undergoing a hard rain. During hard rain, the amount of rainfall sensed by the sensor unit exceeds the rainfall threshold 3840. As illustrated in FIGS. 58-63, as the sensed rainfall displayed on the rainfall indicator 3838 increases, the interface determines a rain event has occurred and interrupts irrigation. When the rain sensor system begins to dry, the interface unit returns to normal irrigation mode 4502 and allows the irrigation controller 30 to irrigate. For FIGS. 54-63, the temperature is above the temperature threshold 3846, and therefore a freeze condition has not been determined and the temperature trip indicator 3848 is not displayed on the display screen 3810.

Figure 58:
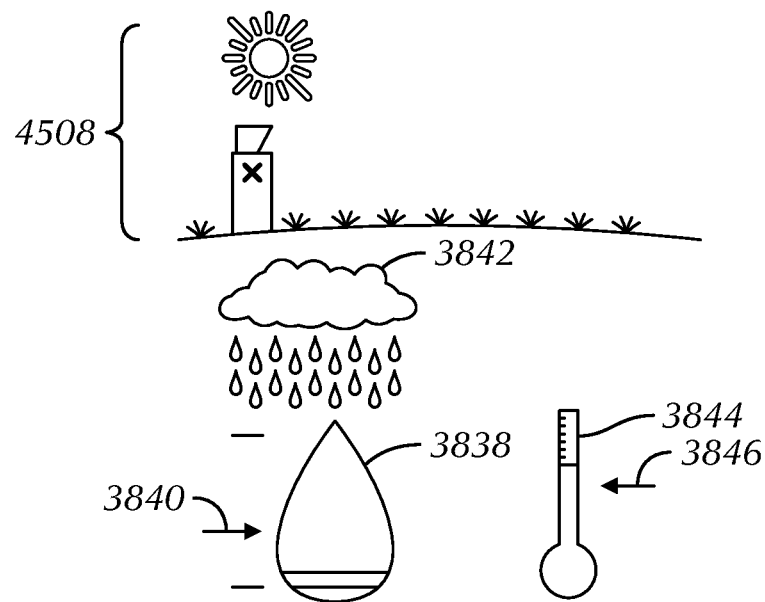
Figure 59:
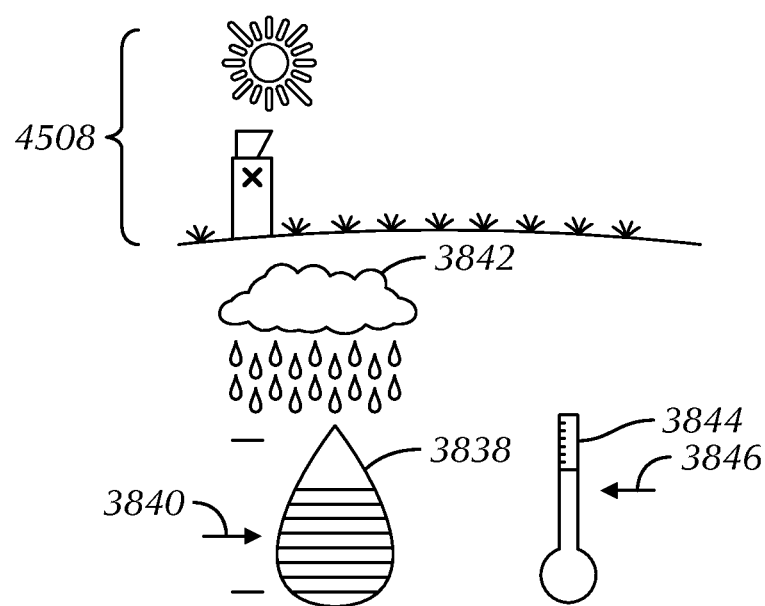

At the beginning of hard rain, as depicted in FIG. 58, rainfall is increasing and the dark horizontal bars within the rainfall indicator 3838 gradually fills the rainfall indicator 3838. Even though the sensed rainfall is below the rainfall threshold 3840, the interface unit has determined a rain event is occurring since the sensed rainfall, or the moisture in the system, is increasing. The rain trip indicator 3842 is then displayed onto the display screen 3810 to indicate a rain event is occurring. The interface unit proceeds to interrupt irrigation, and the halt irrigation mode 4508 is displayed on the display screen 3810 in the irrigation mode display area 3814. As the hard rain continues, rainfall is still increasing and the moisture sensed in the system has exceeded the rainfall threshold 3840. FIG. 59 illustrates the increasing rainfall as the dark horizontal bars fill the rainfall indicator 3838 past the rainfall threshold 3840. The rain trip indicator 3842 is still displayed on the display screen 3810 and the interface unit continues in halt irrigation mode 4508.

Figure 60:
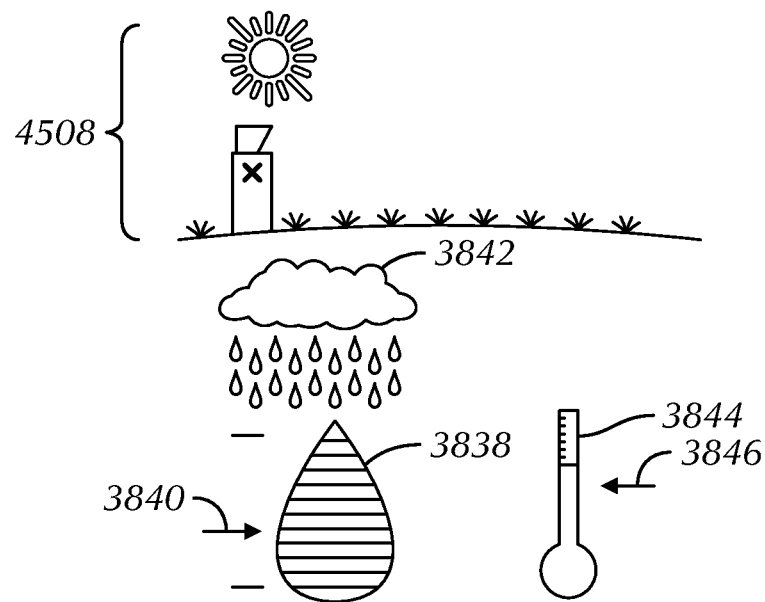
Figure 61:
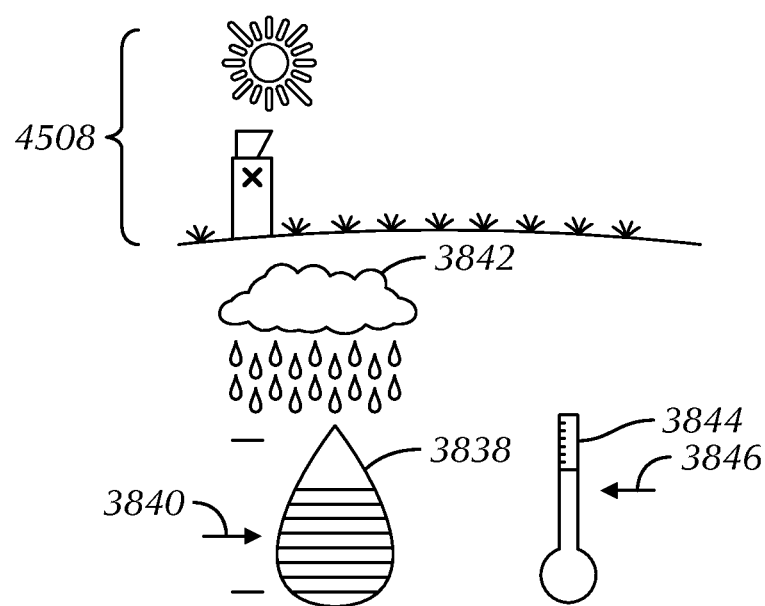

FIG. 60 illustrates hard rain when the amount of moisture sensed fills the rainfall indicator 3838. At this point, the interface unit continues in the halt irrigation mode 4508. FIG. 61 illustrates the rain sensor system as the system begins to dry and the amount of moisture sensed decreases. The rainfall indicator 3838 is less filled than the rainfall indicator 3838 of FIG. 60, however, the rain sensed in FIG. 61 is still above the rainfall threshold 3849 and therefore the rain trip indicator 3842 is displayed on the display screen 3810 and the interface unit continues in halt irrigation mode 4508. FIG. 62 depicts the portion of the hard simulation when the sensor unit has dried to the point where the rainfall/moisture sensed in the system is less than the rainfall threshold 3840. At this point, the interface unit detects the end of the rain event and returns to normal irrigation mode 4502. In one embodiment, the interface unit detects the end of the rain event when the rainfall/moisture sensed in the system has decreased to the rainfall threshold 3840. In another embodiment, the interface unit detects the end of the rain event when the rainfall/moisture sensed in the system has decreased to a point below the rainfall threshold 3840. FIG. 63 depicts further drying of the rain sensor system, the rainfall indicator 3838 has fallen much lower than the rainfall threshold 3840 and the interface unit continues in normal irrigation mode 4502.

FIGS. 64-69 illustrate an embodiment of the display screen 3810 of the interface unit when the interface unit is undergoing a night freeze (e.g., more broadly characterized as a low temperature event). During night freeze, the temperature sensed drops to the freezing point (roughly thirty-two degrees Fahrenheit). As illustrated in FIGS. 64-49, the temperature decreases below the temperature threshold 3846, then further decreases to the freezing point to trigger the low temperature indicator 3850. Once the temperature drops below the temperature threshold 3846, a freeze condition is determined and the interface unit proceeds to interrupt irrigation of the irrigation controller 30. Once the temperature has increased above the temperature threshold 3846, the freeze condition has ended and the interface unit returns to normal irrigation mode 4502. For FIGS. 64-69, no moisture is sensed in the rain sensor system and therefore the rain trip indicator 3842 is not present on the display screen 3810.

At the beginning of night freeze, as depicted in FIG. 64, the sensed temperature displayed by the temperature indicator 3844 is above the temperature threshold 3846. No freeze condition has been determined by the interface unit and therefore the interface unit is in normal irrigation mode 4502 and does not interrupt the watering schedule of the irrigation controller 30. At FIG. 65, the temperature displayed on the temperature indicator 3844 is still above the temperature threshold 3846. Accordingly, the interface unit continues in normal irrigation mode 4502.

Figure 66:
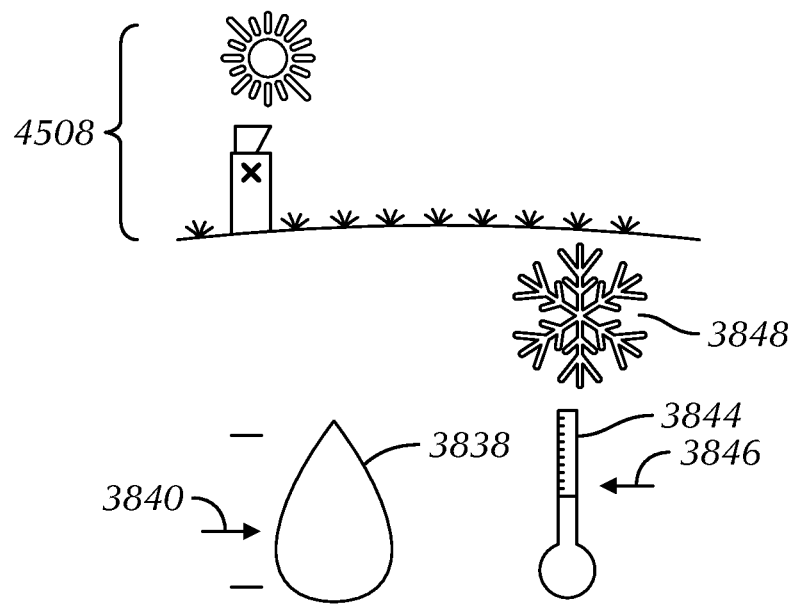
Figure 67:
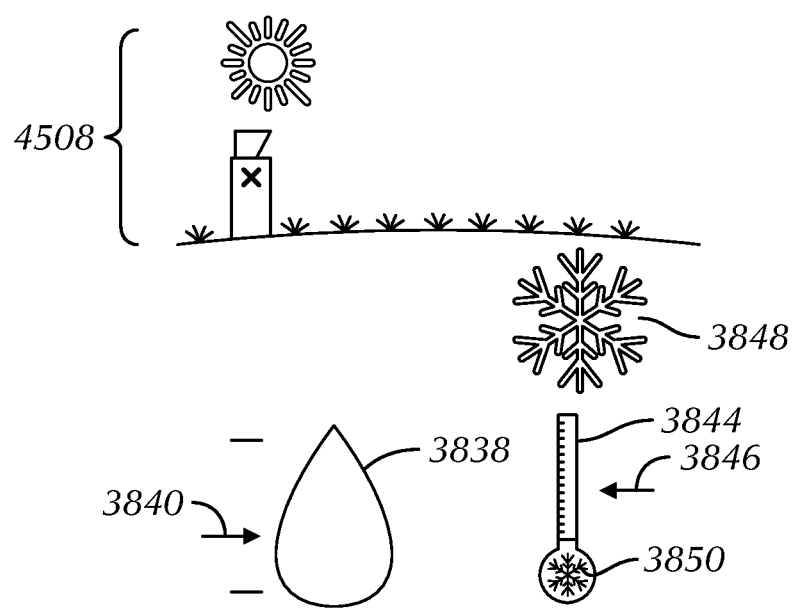

As the temperature continues to drop, as depicted in FIG. 66, the sensed temperature displayed by the temperature indicator 3844 drops below the temperature threshold 3846. The interface unit determines that a low temperature (e.g., freeze) condition exists since the temperature has dropped below the temperature threshold 3846. The temperature trip indicator 3848 is then displayed on the display screen 3810 to indicate a freeze condition is present. The interface unit proceeds to interrupt irrigation, and the halt irrigation mode 4508 is displayed on the display screen 3810 in the irrigation mode display area 3814. The temperature continues to drop until it has reached the freezing point. FIG. 67 illustrates one embodiment of the display screen 3810 once the sensed temperature has reached the freezing point. The low temperature indicator 3850 is displayed within the temperature indicator 3844 and the interface unit continues halt irrigation mode 4508.

FIG. 68 illustrates the display screen 3810 as the temperature begins to increase from the freezing point. The low temperature indicator 3850 has disappeared, however the temperature is still below the temperature threshold 3846 and therefore a freeze condition still exists. The interface unit continues in halt irrigation mode 4508. After a given amount of time, as depicted in FIG. 69, the temperature displayed by the temperature indicator 3844 has risen above the temperature threshold 3846. The interface unit has then detected the end of the freeze condition and switches to normal irrigation mode 4502, allowing the irrigation controller to proceed with normal watering functions.

Generally, the user interface is implemented under control of the controller 414 (see FIG. 37). The controller 414 receives inputs via the user input 424 and sensor inputs from the sensor unit 12 via the transceiver 412. Based at least in part on one or more inputs and/or on the execution of one or more routines by the controller 414, the controller determines what to cause the display unit 3704 to display to the viewer and/or whether the current display is to be updated. For example, display generating and/or updating may be based in part on: (1) user inputs, such as, user manipulation of the various buttons 3604, 3606, 3608 and 3610; (2) sensor data from the sensor unit 12, such as rainfall measurements, temperature measurements, battery strength indications, pairing communications, signal strength indications, and so on; (3) information sent to the sensor unit from the interface unit via the transceiver, such as pairing and setup communications, queries, and so on; and (4) routines executed by the processing unit 3716 of the controller 414, such as irrigation interrupt, pairing, setup routines, to name a few.

In order to cause particular information to be displayed via the display unit 3704 (for example, via visual representations of data such as icons or other visual indicators), the processing unit 3716 determines what information is to be displayed via the user display 3706. Next, the appropriate signal/s are generated and transmitted to the display driver/s 3708. It is noted that the display driver/s 3708 may be implemented as one or more units, some or all of which may be implemented functionally or structurally within the controller 414. Then the display driver/s 3708 generates the appropriate display driving signals which are sent to the user display 3706. The user display 3706 responds to the driving signals by displaying information to the user. As described herein the user display 3706 may be provided as one or more of a display screen (e.g., a dot matrix-type liquid crystal display (LCD) (color or black/white), a segment-type LCD (color or black/white), a cathode ray tube (CRT) (color or black/white), a plasma display panel (PDP) (color or black/white)), one or more illuminatable devices (e.g., light emitting diodes (LEDs)) of one or more colors, or similar display devices, or combinations thereof.

Figure 70:
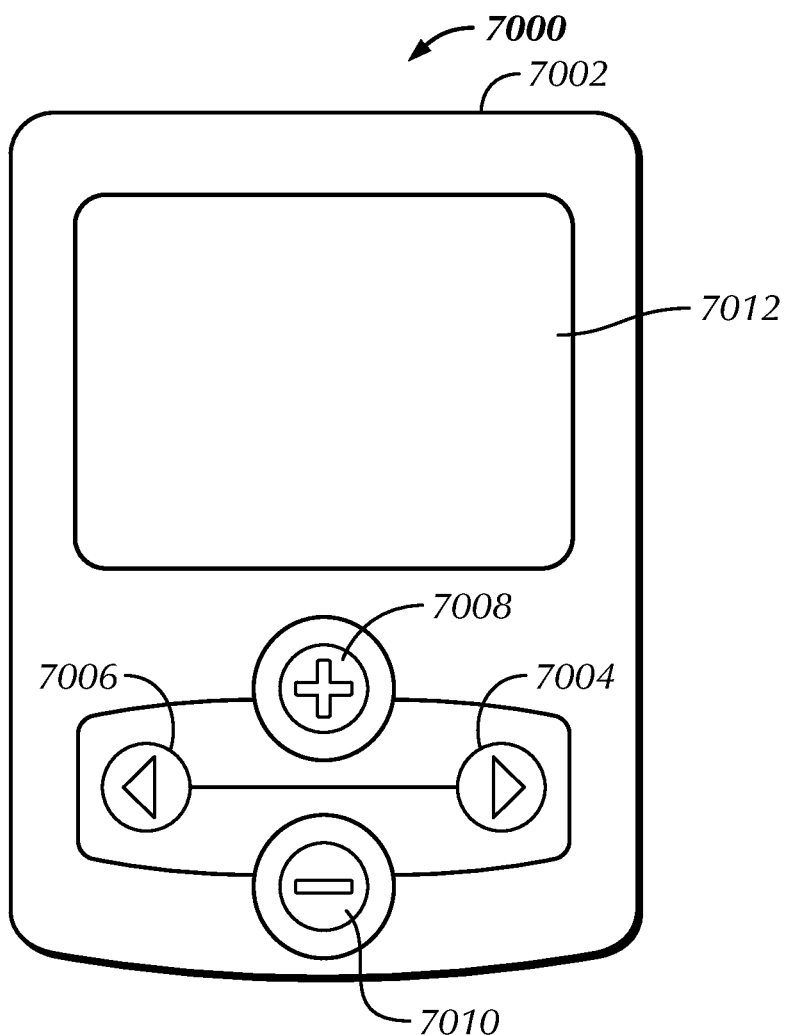
FIG. 70 is an illustration of another embodiment of an interface unit for use in the rain sensor system of at least FIGS. 1 and 2, which is similar to the interface units of FIGS. 4 and 37.

FIG. 70 is an illustration of another embodiment of an interface unit 7000 for use in the rain sensor system 10 of at least FIGS. 1 and 2, which is similar to the interface units of FIGS. 4 and 37. In this embodiment, the interface unit 7000 comprises a housing 7002, a display 7012 and a user input. The user input comprises a forward or right arrow ("→") button 7004, a back or left arrow ("←") button 7006, a plus ("+") button 7008, a minus ("−") button 7010, and/or other such buttons. In accordance with several embodiments, the interface unit 7000 is positioned near the controller 30 and couples to one or more of the activation lines 32 or common line 34 from the irrigation controller 30 or an interface 38 (e.g., a sensor input) or common connection point at the irrigation controller 30 (not shown in FIG. 70). The interface unit 7000 wirelessly communicates with one or more sensor units 12. In operation, the interface unit 7000 receives one or both of sensed rainfall (e.g., measurement of accumulated rainfall) and temperature information and/or measurements and determines whether irrigation, to be executed by the irrigation controller 30, should be allowed or interrupted. The operation of the interface unit 7000 is similar to that described for the embodiments of at least FIGS. 4, 7A-B, 8, 36 and 37.

Figure 71A:
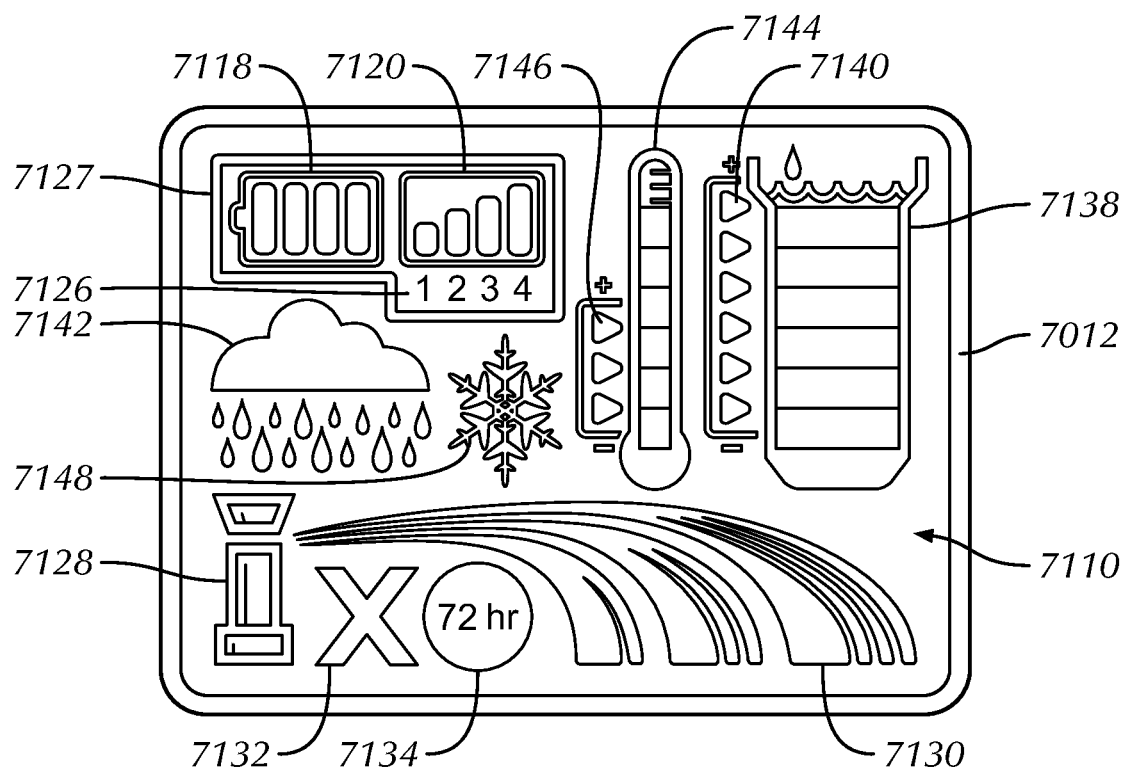
FIG. 71A shown a graphical user interface displayed on the display of the interface unit of FIG. 70 displaying various pictorial representations in accordance with some embodiments.

Referring next to FIG. 71A, an embodiment is shown of a graphical user interface 7110 displayed on the display 7012 of the interface unit 7000 of FIG. 70, displaying a graphical user interface that displays various icons, graphical representations, pictorial representations and/or other representations, or visual indications that may be displayed at given times on the display 7012. The displayed graphical user interface and pictorial representations are further described in related U.S. Design Pat. No. D623,194, issued Sep. 7, 2010, to Carl D. Cook et al., entitled GRAPHICAL USER INTERFACE FOR A WIRELESS RAIN SENSOR, which is incorporated in its entirety herein by reference; and to U.S. Design patent application Ser. No. 29/366,882, filed Jul. 30, 2010, for Carl D. Cook et al., entitled WIRELESS RAIN SENSOR WITH A GRAPHICAL USER INTERFACE, which is incorporated in its entirety herein by reference. It is noted that in some embodiments the interface unit 7000 can similarly be implemented into an irrigation controller, and/or located on or integral to the irrigation controller. For example, an interface module can be incorporated into an irrigation controller and/or the functionality of the various icons, graphical representations, pictorial representations and/or other representations, or visual indicators can similarly be displayed on a display of an irrigation controller that incorporates the functionality of the interface unit 7000 (e.g., on the display 3302 of the irrigation controller 3300).

The representations in FIG. 71A are used to convey information to the user, and the combinations of two or more representations simultaneously displayed convey information at least about irrigation interruption, reasons why irrigation was interrupted, states or modes of operation of the interface unit and/or irrigation, and other such information. It is noted that not all of the pictorial representations are required to be displayed at a single time, and typically less than all the pictorial representations would be displayed at a single time. In some cases, pictorial representations may be displayed sequentially to convey information. Further, some embodiments may be configured such that the interface unit can enter a sleep mode where the display is effectively powered down and none of the pictorial representations are displayed, which may be initiated after a threshold amount of time following a most recent user interaction with the interface unit. The display 7012 can quickly reactivate from the sleep mode in response to user interaction (e.g., user pressing one or more of the buttons). Again, the interface unit communicates with one or more sensor units, where the communication can be via wired or wireless communication, and further interfaces with an irrigation controller 30 to at least in part provide some control over the irrigation.

In some embodiments, the displayed pictorial representations can include a battery remaining indicator 7118, a signal strength indicator 7120, a sensor unit indicator 7126, an irrigation device (e.g., a rotor) indicator or representation 7128, sprayed water indicator 7130, an interrupt or suspend indicator 7132, a bypass or override indicator 7134, a rain or rainfall indicator 7138, an indicator of rainfall threshold or rainfall threshold parameter 7140, a rain symbol or rain trip indicator 7142, a temperature indicator 7144, an indicator of temperature threshold or temperature threshold parameter 7146, a temperature trip indicator 7148 and/or other such representations. The battery remaining indicator 7118, the signal strength indicator 7120 and the sensor unit indicator 7126 together are sometimes referred to as and/or are grouped within a pairing status or sensor indicator 7127.

The battery remaining indicator 7118 displays the strength of the battery of a sensor unit 12 in communication with the interface unit 7000. In some instances, the battery remaining indicator 7118 is filled with a varying number of bars that indicate battery strength. When the battery remaining indicator 7118 is completely filled with bars, then the battery of the sensor unit is at about full strength. As the battery strength of the sensor unit 12 depletes, the battery remaining indicator 7118 will display fewer bars. The number of bars displayed within the battery remaining indicator 7118 roughly corresponds to the amount of battery strength left in the sensor unit. For example, in one embodiment the battery remaining indicator 7118 is filled with four bars when the battery strength of the sensor unit is at about its maximum capacity. When the battery strength of the sensor unit is roughly at half strength, then the battery remaining indicator 7118 would be show two bars. Once the battery remaining indicator 7118 is depicted with either one or no bars, this should signal to a user to change the battery of the given sensor unit. As described herein, the sensor unit 12 is configured to send information about its battery strength to the interface unit. In other embodiments, the battery indicator 7118 is depicted with another indicator, such as a fill level of a battery representation, a bar with a sliding indicator or other such indication of battery power at the corresponding sensor unit.

The signal strength indicator 7120 illustrates the strength of signaling via the communication link between the communicating interface unit and sensor unit. In one embodiment, the signal strength indicator 7120 illustrates the strength of a radio signal (e.g., in terms of signal to noise) between the interface unit (14, 3600, 3702, 7000) and a given sensor unit 12. The signal strength indicator 7120 comprises a plurality of bars of increasing heights. The number of bars represents the strength of the signals received from the sensor unit at the interface unit.

The sensor unit indicator 7126 conveys to the user which sensor unit 12 the interface unit 14 is currently communicating with. In FIG. 71A, the sensor unit indicator 7126 is show with four identifying numbers (i.e., "1," "2," "3" and "4"). Typically, one of the indicator numbers is shown at any given time, such that the battery remaining indicator 7118 and signal strength indicator 7120 correspond to the sensor unit identified by the sensor unit indicator 7126. In some embodiments, the sensor unit indicator 7126 toggles between substantially any number of sensor units in communication with the interface unit, where the sensor numbers of the sensor unit indicator 7126 identifies the sensor unit corresponding to the displayed battery remaining indicator 7118 and signal strength indicator 7120.

The rainfall indicator 7138 illustrates the amount of moisture currently present at or sensed by the sensor unit 12. In some instances, the rainfall indicator 7138 displays a graphical representation comprising one or more displayed bars dependent on the amount of accumulated rainfall with an greater number of bars being displayed as the sensed accumulated amount of rainfall increases. In some embodiments, the rainfall indicator 7138 fills with horizontal bars as rainfall is collected at the sensor unit and the level of rainfall is communicated to the interface unit 14. The rain trip indicator 7142 is exemplified as a rain cloud which appears when the interface unit determines that the moisture sensed by a given sensor unit has risen above the rainfall threshold 7140, or as a result of increasing rainfall as described above.

The rainfall threshold 7140 is exemplified as an arrow that can be moved, toggled or otherwise adjusted up and down the height of the rainfall indicator 7138. In some instances, the rainfall threshold 7140 can be selected from a plurality of predefined amounts of moisture. In other implementations, the threshold may be on a sliding scale, a user can select specific numbers by using the buttons, or other such designations. For example, a user can utilizes the forward button 7004, the backward button 7006, the plus button 7008 and the minus button 7010 of the user interface to set the rainfall threshold 7140, indicating a threshold level of rainfall typically triggering the interface unit 14 to interrupt irrigation. The embodiment depicted in FIG. 71 shows six predefined moisture threshold levels. Again, however, more or fewer predefined threshold levels can be available, a sliding scale may be provided, a user may enter a selected value, or the like. Additionally or alternatively, a user may select or specify a range and the predefined thresholds could automatically be defined within that range based on the size of the range (e.g., equally distributed over the scale).

The rainfall threshold 7140 displays to the user the selected rainfall threshold point with respect to the rainfall indicator 7138. In some embodiments, as the user presses the plus button 7008, the rainfall threshold 7140 is raised along the rainfall indicator 7138. In some implementations, once the rainfall threshold 7140 reaches the top of the rainfall indicator 7138 further depression of the plus button 7008 can cause the rainfall threshold 7140 to wrap to the bottom of the rainfall indicator 7138 and repeat as above. Similarly, continued selection of the minus button 7010 in some embodiments can cause the rainfall threshold 7140 to wrap around to the top of the rainfall indicator 7138. When the rainfall threshold 7140 is closer to the top of the rainfall indicator 7138, the user has selected a high rainfall threshold point allowing the irrigation controller to continue irrigation even though, in some instances and/or configurations, a relatively high level of moisture may be detected. As introduced above, in other implementations a user can set the rainfall threshold 7140 by selecting specific numbers by using the buttons (e.g., numbers are displayed and changed in response to a selection of the plus or minus button, such as incrementing a predefined amount of rainfall, for example 0.05 inches, with each selection of the plus or minus button). Similarly, in some instances, numeric values of the rainfall threshold 7140 and/or the sensed accumulation amount of rainfall in the rainfall indicator 7138 can be displayed in cooperation with or in place of the rainfall indicator 7138, such as in response to a selection of a pattern of the buttons.

The temperature indicator 7144 illustrates the temperature currently present in the rain sensor system as measured by the sensor unit 12 identified by the sensor unit indicator 7126. In the embodiment of FIG. 71A, the temperature indicator 7144 is exemplified as a thermometer; the amount of fill in the thermometer illustrates the sensed temperature. Disposed to the side of the temperature indicator 7144 is the temperature threshold 7146. The temperature threshold 7146 illustrates the selected sensitivity for interrupted irrigation during low temperature. The temperature trip indicator 7148 is exemplified as a snowflake which appears on the display 7012 when the interface unit determines from measurements sent from the sensor unit that the temperature has dropped below the temperature threshold 7146.

In some embodiments the temperature threshold 7146 is exemplified as an arrow that can be moved, toggled or otherwise adjusted up and down the height of the temperature indicator 7144. In some instances, the temperature threshold 7146 can be selected from a plurality of predefined temperatures. In other implementations, the threshold may be on a sliding scale, a user can select specific temperature by using the buttons, or other such designations. The embodiment depicted in FIG. 71A shows three predefined temperature threshold levels. Again, however, more or fewer predefined threshold levels can be available, a sliding scale may be provided, a user may enter a selected value, or the like. Additionally or alternatively, a user may select or specify a range and the predefined thresholds could automatically be defined within that range based on the size of the range (e.g., equally distributed over the scale). Typically, the temperature threshold 7146 indicates a minimum sensed temperature that would prompt the interface unit to interrupt irrigation. The temperature threshold 7146 displays to the user the selected temperature threshold point with respect to the temperature indicator 7144.

Similar to the rainfall threshold, in some embodiments, the user may press the plus button 7008 or minus button 7010 to alter the temperature threshold 7146. In some embodiments, once the temperature threshold 7146 reaches the top of the temperature indicator 7144 further depression of the plus button 7008 can cause the temperature threshold 7146 to wrap back to the bottom of the temperature indicator 7144 and repeat as above; and similarly further selection of the minus button 7010 when the temperature threshold 7146 is at a bottom of the temperature indicator 7144 can cause the temperature threshold 7146 to wrap to the top of the temperature indicator 7144. In other implementations, the temperature threshold 7146 may be selected from specific numbers by using the buttons (e.g., numbers are displayed and changed in response to selection of the plus or minus button, such as incrementing a predefined amount of temperature, for example a 0.5° F., in response each selection of the plus or minus button). Similarly, in some instances, a numeric value of the temperature threshold 7146 and/or the sensed temperature can be displayed in association with or in place of the temperature indicator 7144, such as in response to a selection of a pattern of the buttons.

The irrigation device indicator 7128 and sprayed water indicator 7130 displayed together indicate to a user that irrigation is authorized and/or active. The interrupt indicator 7132 identifies that the irrigation is interrupted. Typically, while the interrupt indicator 7132 is displayed the sprayed water indicator 7130 is not displayed further conveying to a user that irrigation is interrupted. Some of the other pictorial representations may be displayed in cooperation with the interrupt indicator 7132 to further identify to the user the reasoning for the irrigation interruption. For example, the display of the interrupt indicator 3732 while the rain trip indicator 7142 is displayed identifies that the irrigation is interrupted due at least to an amount of rainfall exceeding the rainfall threshold 3440 or that the sensed rainfall, although not above the rainfall threshold 3440, is increasing and the interface unit determines a rain event has occurred and interrupts irrigation. Similarly, the display of the interrupt indicator 3732 while the temperature trip indicator 7148 is displayed identifies that the irrigation is interrupted due at least to the temperature falling below the temperature threshold 7146.

The override indicator 7134 identifies when a user has selected to bypass one or more of the thresholds and sensed weather conditions, or when a user manually overrides irrigation to force an interrupt regardless of the temperature and/or rainfall. Again, one or more other pictorial representations displayed while the override indicator 7134 is displayed can provide the user with the information to accurately interpret the override or bypass. For example, displaying the override indicator 7134 while the interrupt indicator 7132 is displayed and the sprayed water indicator 7130 is not displayed identifies that the interface unit is in the override interrupt or halt irrigation mode 4508 and that a user is intentionally interrupting irrigation. Typically, because the interface unit is in the halt irrigation mode 4508, the interface unit interrupts the irrigation schedule of the irrigation controller 30 regardless of the sensed weather or other environmental conditions. This mode, as described above, may be used by the user to interrupt irrigation, such as for an event (e.g., an outdoor gathering) and therefore has the option to choose the halt irrigation mode 4508. The interface unit returns to normal irrigation mode 4502 when the user manually places the interface unit into normal irrigation mode 4502 as discussed above, or in some instances automatically, such as after a given time span. The time span can be substantially any time span. In some embodiments, the time span may be predefined (e.g., three days or seventy-two hours), while in other instances, the time span may be user selected (e.g., from a list of predefined time spans), or the time span may be user definable. Additionally, in some implementations, the override indicator 7134 may specify the time span (e.g., "72 hr") and/or may count down the remainder of a time span.

Similarly, displaying the override indicator 7134 while the sprayed water indicator 7130 is displayed and the interrupt indicator 7132 is not displayed identifies that the interface unit is in the bypass rain mode 4504 or bypass rain/freeze mode 4506 and further conveys that a user desires to intentionally continue to irrigate regardless of an amount of sensed rainfall and/or sensed temperature. As described above, during the bypass rain mode 4504 or bypass rain/freeze mode 4506, the interface unit allows the irrigation controller to irrigate during fair weather, rain, and/or when a low temperature condition (e.g., a freeze condition) is determined.

The interface unit returns to the normal irrigation mode 4502 when the user manually returns the interface unit to normal irrigation mode 4502 (e.g., using the right arrow button 7004 and/or left arrow button 7006 to select the irrigation device indicator 7128 in a program or set-up mode, and then using the plus button 7008 and/or minus button 7010 to the normal irrigation mode 4502 to allow irrigation), or in some instances automatically after a given time span. This time span can be substantially any time span. In some embodiments, the time span may be predefined (e.g., three days or seventy-two hours), while in other instances, the time span may be user selected (e.g., from a list of predefined time spans), or the time span may be user defined. Additionally, in some implementations, the override indicator 7134 may specify the time span (e.g., "72 hr") and/or may count down the remainder of a time span. In some implementations, once the interface unit has determined a freeze condition has passed (e.g., when the sensed temperature has risen above the temperature threshold 7146) and/or the interface unit has determined the rain event has passed (e.g., when the sensed rainfall in the rainfall indicator 7138 has fallen below the rainfall threshold 7140), the interface unit returns to the normal irrigation mode 4502.

While the interface unit is in the bypass rain mode 4504 or bypass rain/freeze mode 4506 the interface unit typically continues to display the rainfall indicator 7138 showing the amount of moisture measured by the sensor unit 12 and displays the temperature indicator 7144 showing the temperature as measured by the sensor unit 12. Further, in some instances, the rain trip indicator 7142 and/or the temperature trip indicator 7148 can also be displayed in those instances where the interface unit determines that the moisture amount exceeds the rainfall threshold 7140 and/or the temperature falls below the temperature threshold 7146. The levels identified by the rainfall indicator 7138 and the temperature indicator 7144, as well as the rain trip indicator 7142 and/or the temperature trip indicator 7148, continue to allow the interface unit to convey relevant information to a user, including at least whether a rain event is occurring and/or a freeze condition is detected. Again, while in the bypass rain mode 4504 the interface unit does not interrupt the irrigation schedule of the irrigation controller 30 even though the interface unit may have determined that a rain event has occurred, in the bypass rain/freeze mode 4506 the interface unit does not interrupt the irrigation schedule of the irrigation controller 30 even though the interface unit may have determined that a rain event and/or freeze condition has occurred.

Figure 71B:
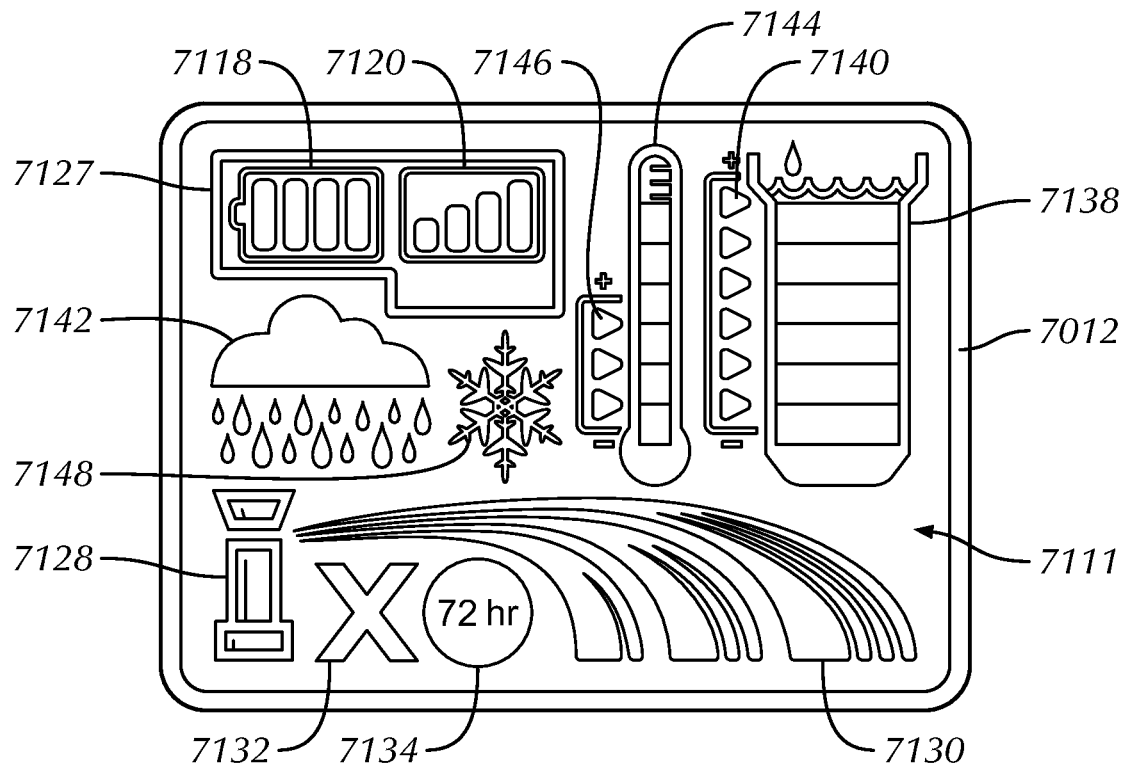
FIG. 71B shows a graphical user interface displayed on the display of the interface unit of FIG. 70 displaying various pictorial representations in accordance with some embodiments.

FIG. 71B illustrates a graphical user interface 7111 displayed on the display 7012 of the interface unit 7000 of FIG. 70 according to some embodiments. The graphical user interface 7111 is similar to the graphical user interface 7110 of FIG. 71A, but does not display the sensor unit indicator 7126. In some embodiments, the interface unit 7000 only communicates with a single sensor unit 12 and/or may be configured to only communicate with a single sensor unit. As such, the graphical user interface 7111 may be configured to not display the sensor unit indicator 7126 because the interface unit 7000 communicates with the single sensor unit 12.

Figure 71C:
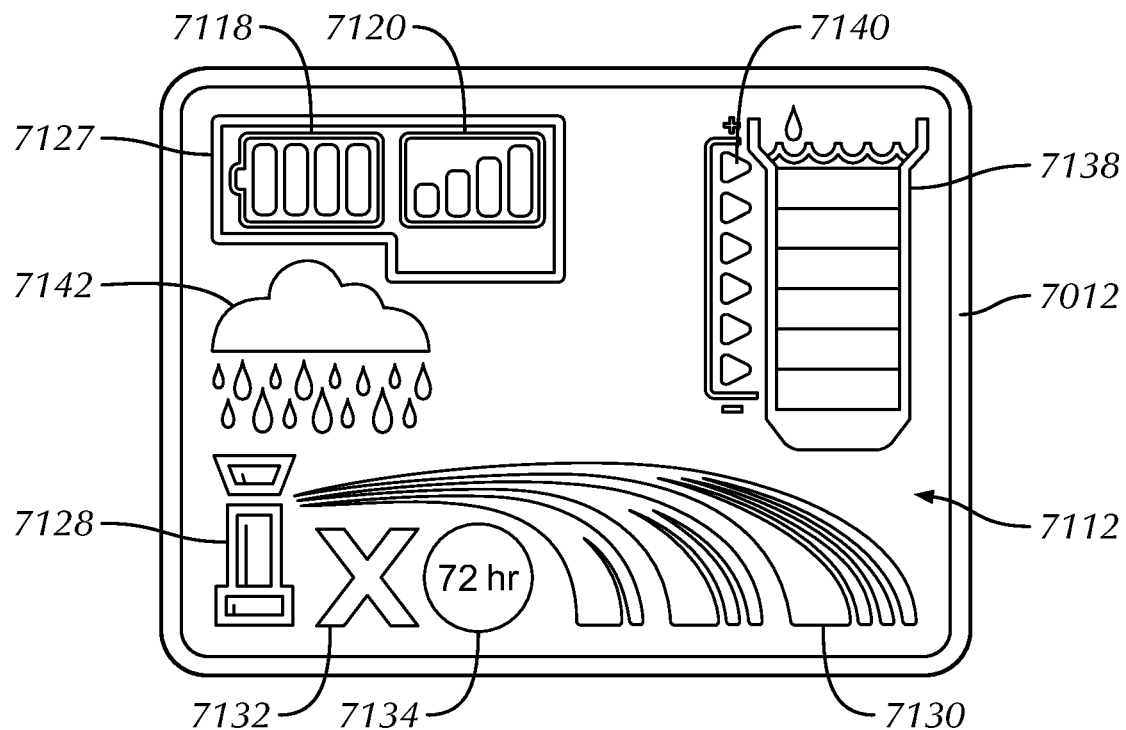
FIG. 71C illustrates a graphical user interface displayed on the display of the interface unit of FIG. 70 according to some embodiments.

FIG. 71C illustrates a graphical user interface 7112 displayed on the display 7012 of the interface unit 7000 of FIG. 70 according to some embodiments. The graphical user interface 7112 is similar to the graphical user interface 7110 of FIG. 71A, but does not display the temperature indicator 7144 or corresponding temperature threshold 7146. In some embodiments, the interface unit 7000 provides irrigation control relative to sensed rainfall and does not consider temperature, display information about temperature or interrupt irrigation based on temperature. Accordingly, the graphical user interface 7112 does not display the temperature indicator 7144 or corresponding temperature threshold 7146, and further does not display the temperature trip indicator 7148 as the interface unit 7000 in such a configuration does not interrupt irrigation based on temperature and would not display the temperature trip indicator 7148. Additionally, in some embodiments the graphical user interface 7112 does not display the sensor unit indicator 7126. As described above, the interface unit 7000 may be communicating with a single sensor unit and/or be configured to only communicate with a single sensor unit 12. As such, the graphical user interface 7112 may not display the sensor unit indicator 7126.

In yet other embodiments, the interface unit may only interrupt irrigation based on temperature. In these such embodiments, the temperature indicator 7144, the corresponding temperature threshold 7146 and the temperature trip indicator 7148 may only be displayed, while the rainfall indicator 7138, corresponding rainfall threshold 7140 and the rain trip indicator 7142 are not displayed when the interface unit 7000 is configured to interrupt irrigation based on temperature and not configured to interrupt irrigation based on rain fall.

Figure 72:
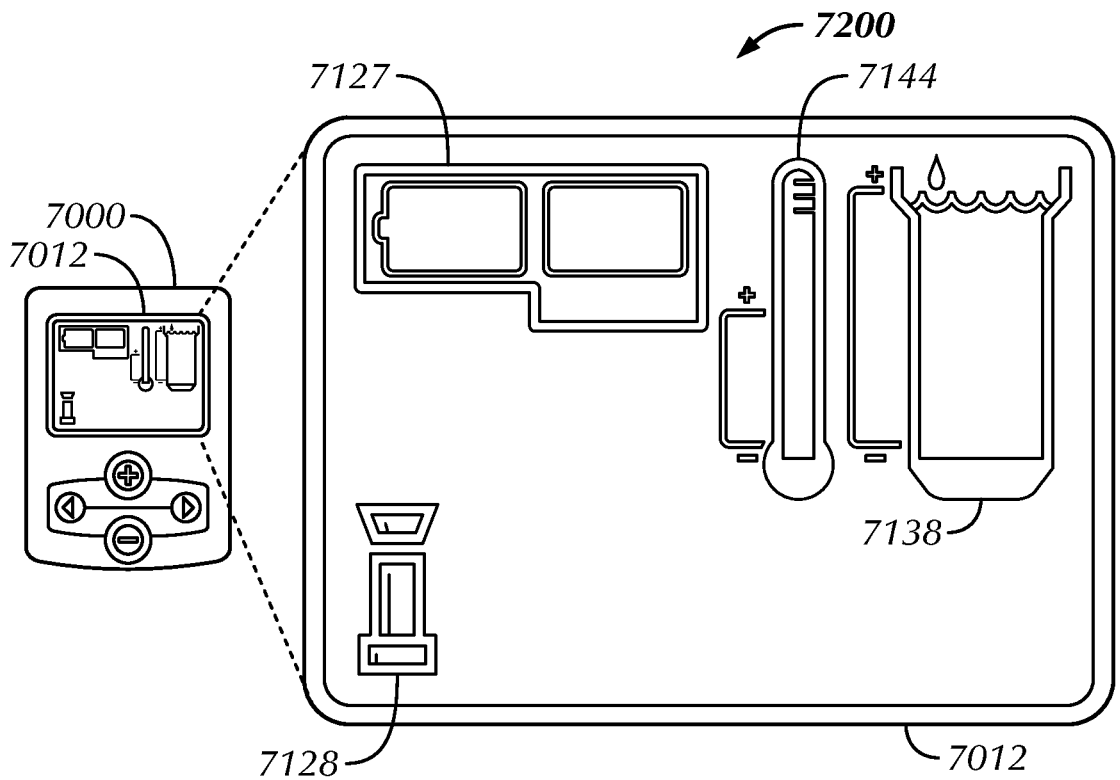
FIG. 72 depicts an embodiment of the display of the interface unit of FIG. 70 displaying an initial power up screen.

In FIG. 72, an embodiment is shown of the display 7012 of the interface unit 7000 of FIG. 70 displaying an initial power up or initial activation screen or view 7200. In the power up screen 7200 the pairing status indicator 7127 is shown with the battery remaining indicator 7118 without an indication of a battery level and the signal strength indicator 7120 without an indication of signal strength. Further, the temperature indicator 7144 and rainfall indicator 7138 are shown, again without an indication of a measured temperature or an amount of moisture detected. Also shown is the irrigation device indicator 7128 without the sprayed water indicator 7130, the interrupt indicator 7132 or the override indicator 7134. From this power up screen 7200 a user can configure the interface unit through the use of the interface buttons to transition between the pairing status indicator 7127 to initiate and establish a connection with one or more sensor units 12, the temperature indicator 7144 to select a temperature threshold 7146, the rainfall indicator 7138 to select a rainfall threshold 7140, and the irrigation device indicator 7128 to allow the user to force an interrupt and/or to activate the override condition. For example, the user can select the right arrow button 7004 to transition to the pairing status indicator 7127 and activate a pairing with one or more sensor units (e.g., pressing both the left arrow button 7006 and the right arrow button 7004 together while the pairing status indicator 7127 is highlighted to activate the interface unit to transmit a connection signal). In some instances, the battery remaining indicator 7118, the signal strength indicator 7120, the sensor unit indicator 7126 and/or the pairing status indicator 7127 may flash while the user is configuring the pairing of the interface unit with one or more sensor units.

Similarly, while in the power up screen 7200 the user can further select the right arrow button 7004 to transition from the pairing status indicator 7127 to the temperature indicator 7144 to configure the temperature indicator and/or select a temperature threshold 7146 (e.g., using the plus button 7008 and/or minus button 7010 to select a desired temperature threshold 7146). Again, in some instances the temperature indicator 7144 may flash while the user is configuring the temperature indicator and/or selecting a temperature threshold 7146). By again select the right arrow button 7004 the user can cause a transition to the rainfall indicator 7138 to allow the user to configure the rainfall indicator 7138 and/or select a rainfall threshold 7140 (e.g., using the plus button 7008 and/or minus button 7010 to select a desired rainfall threshold 7140). Again, in some instances the rainfall indicator 7138 may flash while the user is configuring the rainfall indicator 7138 and/or selecting a rainfall threshold 7140). A further selection of the right arrow button 7004 can cause a transition to the irrigation device indicator 7128. The use of the plus button 7008 and/or minus button 7010 can allow the user to transition between predefined configurations for the irrigation device indicator 7128 (e.g., normal irrigation mode 4502 to allow irrigation, halt irrigation mode 4508 to suspend irrigation, suspend irrigation for a period of time (e.g., 72 hr), sensor override to allow for continued irrigation, sensor override for a defined period of time (e.g., bypass rain mode 4504, bypass freeze mode, bypass rain/freeze mode 4506, or the like), and/or other such modes. Other settings, parameters, conditions and/or other configurations can be defined through further transitions.

Figure 73:
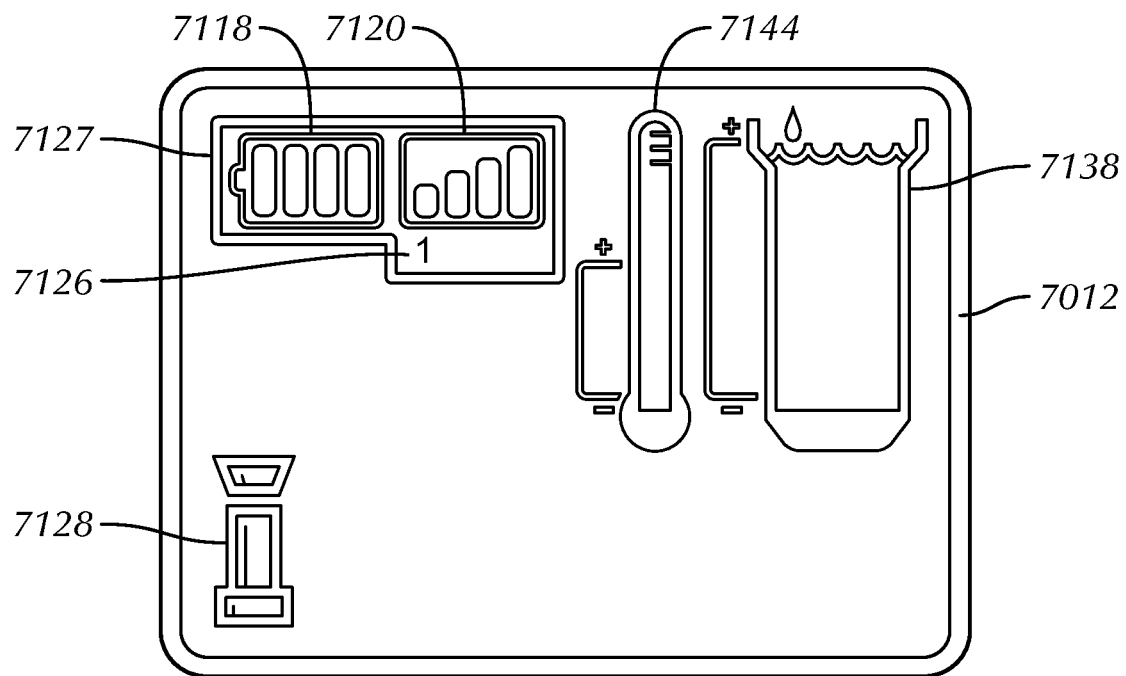
FIG. 73 illustrates an embodiment of the display of the user interface of FIG. 70 when the system is pairing with a rain sensor device to establish a communication link.

FIG. 73 illustrates an embodiment of the display 7012 of the user interface of FIG. 70 when the system is pairing with a sensor unit (e.g., rain sensor device) to establish a communication link. The display 7012 shows that no rainfall or temperature data has yet to be sensed for the sensor unit that the interface unit 14 is attempting to pair with. To begin the pairing of the interface unit with a given sensor unit, the user in some instances presses one or more of the buttons on the interface unit. For example, the user can press both the right arrow button 7004 and the left arrow button 7006 simultaneously, and in some instances pressing the buttons for a predefined period of time. In some embodiments, the predefined period of time is greater than 2 seconds (e.g., about 5 seconds). In response the interface unit 14 initiates the transmission of a pairing signal.

In some instances, while the sensor unit and the interface unit are pairing, the signal strength indicator 7120 may blink or otherwise indicate that pairing is taking place. Further, with some implementations the display 7012 identifies a sensor unit number in the sensor unit indicator 7126. As described above and further below, some embodiments allow an interface unit to communicate with multiple sensors. For this example, the sensor unit indicator 7126 in FIG. 73 is set to "1," such as in a first time the interface unit is pairing with a sensor unit. It should be appreciated that the sensor unit indicator 7126 may be set to a different number, corresponding to a different sensor unit. In some instances the sensor unit indicator 7126 may flash to further highlight the sensor unit number. Similarly, the battery remaining indicator 7118, the signal strength indicator 7120 and/or the pairing status indicator 7127 may flash. The some instances other indications may demonstrate that pairing is being performed, such as sequentially flashing the individual bars within the signal strength indicator 7120 or some other indication. In many embodiments, however, the interface unit may pair with one sensor unit, or may be configured to only be capable of pairing with a single sensor unit, and during pairing and/or during operation the sensor unit indicator 7126 is not displayed. In some embodiments, once an interface unit is paired with a sensor unit, the pairing is maintained at one or both of the interface unit and the sensor unit, and may even be maintained after a power outage. Similarly, in some implementations, the user set thresholds and/or parameters may also be maintained even in the event of a power outage.

As described above, in some embodiments the sensor unit can be equipped with a lighting mechanism to communicate to the user the signal strength between the sensor unit and the interface unit to help determine the optimal location for the sensor unit. For example, the sensor unit may utilize a lighting mechanism to represent signal strength, such as through a series of blinks with the larger the number of blinks identifying greater signal strength.

Once the pairing is complete and the interface unit has paired with the sensor unit, the display screen 7012 displays the battery remaining indicator 7118, the signal strength indicator 7120 and the sensor unit indicator 7126 for the paired sensor unit. This display indicates to the user that pairing was successful. In some implementations, the displayed pairing status indicator 7127 may eventually disappear in a specified amount of time or in response to further user interaction, such as a transition to a different state such as a transition to configure one or more thresholds, setting an override or the like. In some instances, the interface unit transitions to an irrigation mode (e.g., normal irrigation mode 4502) when the pairing is complete, unless one or more other user inactions cause a transition to another mode.

Figure 74:
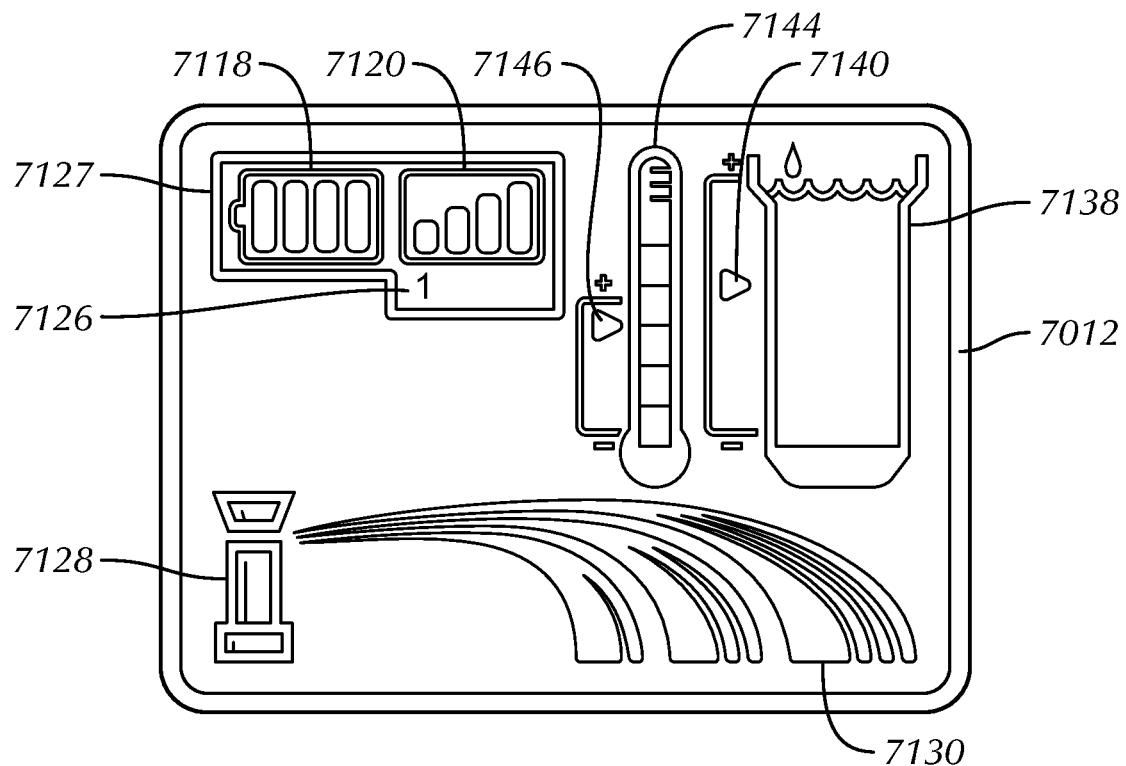
FIG. 74 illustrates one embodiment of the display of the user interface of FIG. 70 once the interface unit has been paired to one or more rain sensor devices, and the system is in normal irrigation mode.

FIG. 74 illustrates one embodiment of the display 7012 of the user interface of FIG. 70 once the interface unit has been paired to one or more rain sensor devices, and the system is in normal irrigation mode. In FIG. 74, the display displays a combination of icons or representations that convey to the user that the interface unit is in a normal irrigation mode. In the example depicted in FIG. 74, rainfall indicator identifies that no precipitation (or less than a minimum threshold amount of precipitation) has been sensed, and the temperature indicator 7144 shows that the sensed temperature is above the temperature threshold 7146. Again, this normal mode is entered when the interface unit has determines that a rain event is not occurring and/or the sensed moisture is below the rainfall threshold 7140, and the sensed temperature is above the temperature threshold 7146. The rain trip indicator 7142 is not displayed because the amount of moisture does not exceed the rainfall threshold 7140 and/or a rain event has not been identified. Similarly, the temperature trip indicator 7148 is also not displayed because the temperature is above the temperature threshold 7146.

When the interface unit is in the normal irrigation mode 4502, the interface unit displays the pictorial representations of the irrigation device indicator 7128 and the sprayed water indicator 7130 identifying to the user that the system is allowing irrigation as programmed through the irrigation controller 30. In some instances, while in the normal irrigation mode, the display 7012 further displays the rainfall indicator 7138, rainfall threshold 7140, the temperature indicator 7144 and temperature threshold 7146. Further in some implementations, the sensor unit indicator 7126 along with the corresponding battery remaining indicator 7118 and signal strength indicator 7120 may also be displayed.

During the normal irrigation mode 4502, the interface unit does not interrupt the irrigation schedule of the irrigation controller 30, and allows the controller 30 to irrigate as it is programmed. The interface unit transitions from the normal irrigation mode 4502, which effectively shut off the normal irrigation mode, when the interface unit determines that the rainfall sensed is above the rainfall threshold 7140, detects a rain event, determines that the sensed temperature has drops below the temperature threshold 7146, or otherwise transitions from the normal irrigation mode (e.g., manual interrupt by the user). In some implementations, the normal irrigation mode 4502 may be viewed as the default mode, where the system reverts back to the normal irrigation mode 4502, for example, after a given amount of time from one or more of the other modes of operation. When the interface unit reverts back to the normal mode can depend on the mode the interface unit is in. For example, in some embodiments, the interface unit reverts from an override mode and back to the normal irrigation mode after a predefined or user specified time (e.g., after 72 hours). As another example, the interface unit reverts from an weather condition interrupt and back to the normal irrigation mode after the interface unit determines the rain event has ended, the moisture level drops below the rainfall threshold 7140 (or drops a predefined amount below the rainfall threshold), and/or the freeze condition no longer exists.

It is noted that in some embodiments, when the interface unit is in the normal irrigation mode one or more of the battery remaining indicator 7118, the signal strength indicator 7120, the sensor unit indicator 7126, the pairing status indicator 7127, the rainfall indicator 7138, the rainfall threshold 7140, the temperature indicator 7144, and/or the temperature threshold 7146 may not be displayed. For example, in some instances only the irrigation device indicator 7128 and water spray indicator 7130 may be displayed, which can indicate normal operation in the normal irrigation mode. Additionally or alternatively, when the sensed temperature is above the temperature threshold 7146 the temperature indicator 7144 and temperature threshold 7146 may not be displayed. Similarly, when sensed rain and/or moisture level does not indicate a rain event the rainfall indicator 7138 and rainfall threshold 7140 may not be displayed. Further, when the battery remaining indicator 7118 is not a concern (e.g., above a threshold) the battery remaining indicator 7118 may not be displayed, and when the signal strength with the sensor unit is not a concern (e.g., above a signal strength threshold) the signal strength indicator 7120 may not be displayed. Furthermore, when the battery remaining indicator 7118 and signal strength indicator 7120 are not displayed the sensor unit indicator 7126 and the pairing status indicator 7127 may not be displayed. The relevant pictorial representations that are not actively displayed, however, may be displayed upon further user interaction with the interface unit. Additionally or alternatively, the display 7012 may transition to a sleep mode as described above.

Figure 75A:
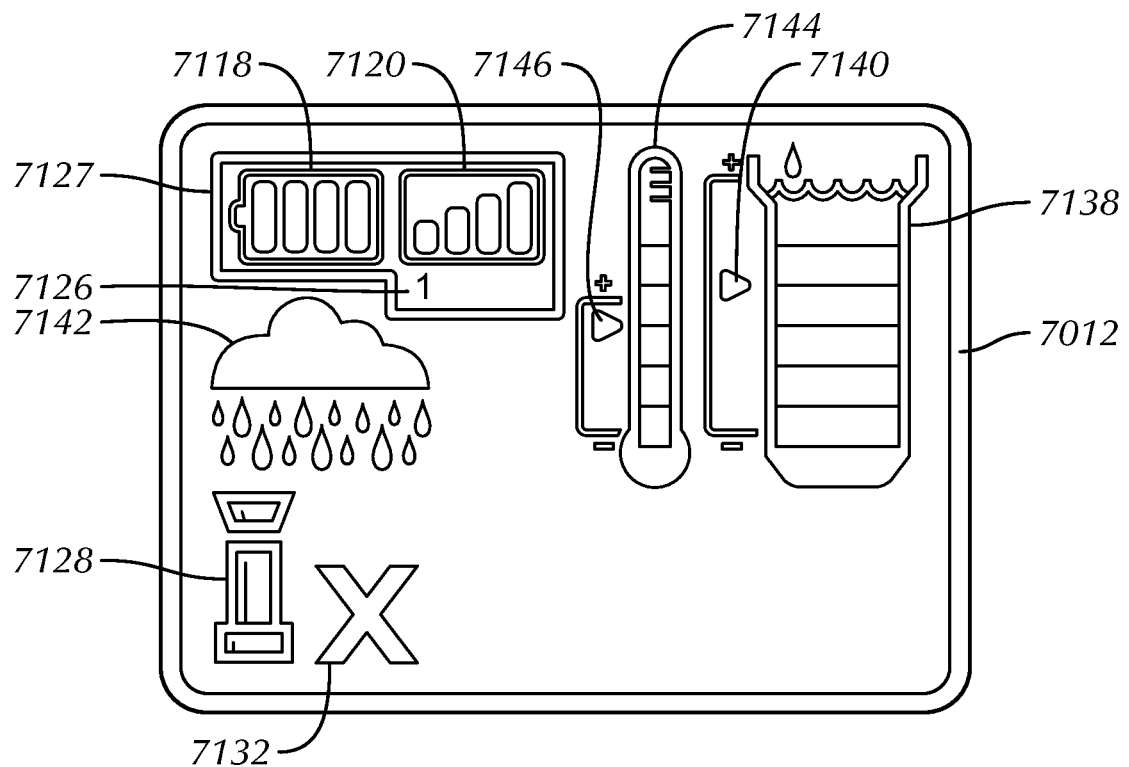
FIG. 75A illustrates an embodiment of the display of an interface unit when a sensed rainfall is above a rainfall threshold while a sensed temperature is above a temperature threshold, where the combination of representations conveys to the user that the irrigation is interrupted.

FIG. 75A illustrates an embodiment of the display 7012 of the interface unit when the sensed rainfall is above the rainfall threshold 7140 while the sensed temperature is above the temperature threshold 7146, where the combination of representations conveys to the user that the irrigation is interrupted. As shown in FIG. 75A, the fill level, which in some instances is represented by one or more horizontal bars, within the rainfall indicator 7138 exceeds the rainfall threshold 7140. In response to the sensed rainfall exceeding the rainfall threshold 7140, the rain trip indicator 7142 is displayed. By displaying the rain trip indicator 7142, the interface unit conveys that a rain event is occurring. Alternatively or additionally, the interface unit may determine a rain event is occurring when the amount of sensed moisture is gradually increasing upward, which can be depicted by gradually displaying an increased number of horizontal bars within the rainfall indicator 7138, triggering the interface unit to display the rain trip indicator 7142. Again in this example, the temperature indicator 7144 depicts the sensed temperature to be above the temperature threshold 7146, therefore the temperature trip indicator 7148 is not displayed.

Since the interface unit has determined a rain event is occurring, the interface unit transitions to the halt irrigation mode and interrupts the irrigation of the irrigation controller 30. The interface unit additionally displays the interrupt indicator 7132 while not displaying the water spray indicator 7130 indicating to a user that the interface unit is inhibiting/interrupting irrigation. The interface unit, in some implementations, returns to the normal irrigation mode when the rain fall sensed by the rainfall indicator 7138 falls below the rainfall threshold 7140. In other embodiments, the interface unit returns to the normal irrigation mode when the sensed moisture level falls below the rainfall threshold 7140 by a predetermined and/or user specified amount. In some instances, the display 7012 may further display the battery remaining indicator 7118, signal strength indicator 7120 and sensor unit indicator 7126. In other instances, however, the battery remaining indicator 7118, signal strength indicator 7120 and sensor unit indicator 7126 may not be displayed.

Figure 75B:
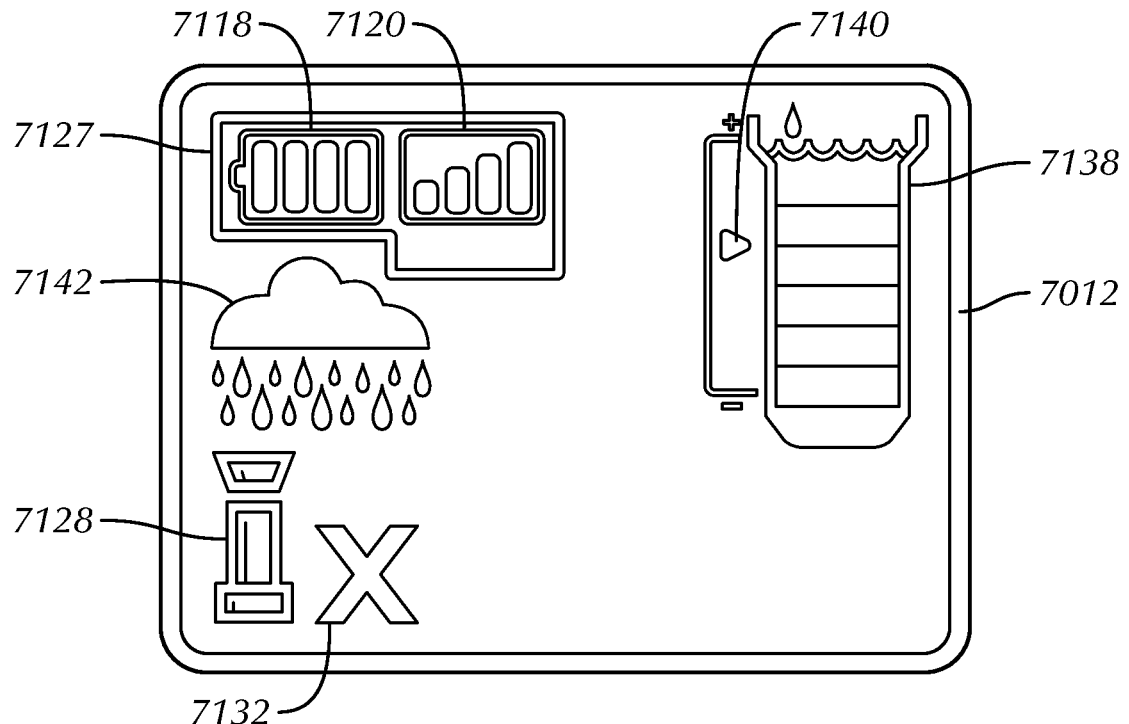
FIG. 75B depicts the user interface displayed on the display of the interface unit, in accordance with some embodiments.

FIG. 75B depicts the user interface displayed on the display 7012 of the interface unit 7000, similar to that depicted in FIG. 75A, in accordance with some embodiments. As described above, in some embodiments, the interface unit 7000 provides irrigation control relative to sensed rainfall and does not consider temperature. In the embodiment depicted in FIG. 75B, the graphical user interface does not display the temperature indicator 7144 or corresponding temperature threshold 7146. Again, in this example, the sensed rainfall exceeds the rainfall threshold 7140 and as such the rain trip indicator 7142 is displayed indicating (in cooperation with the lack of the sprayed water indicator 7130 representation) that irrigation is interrupted due to the accumulated rain.

Figure 76:
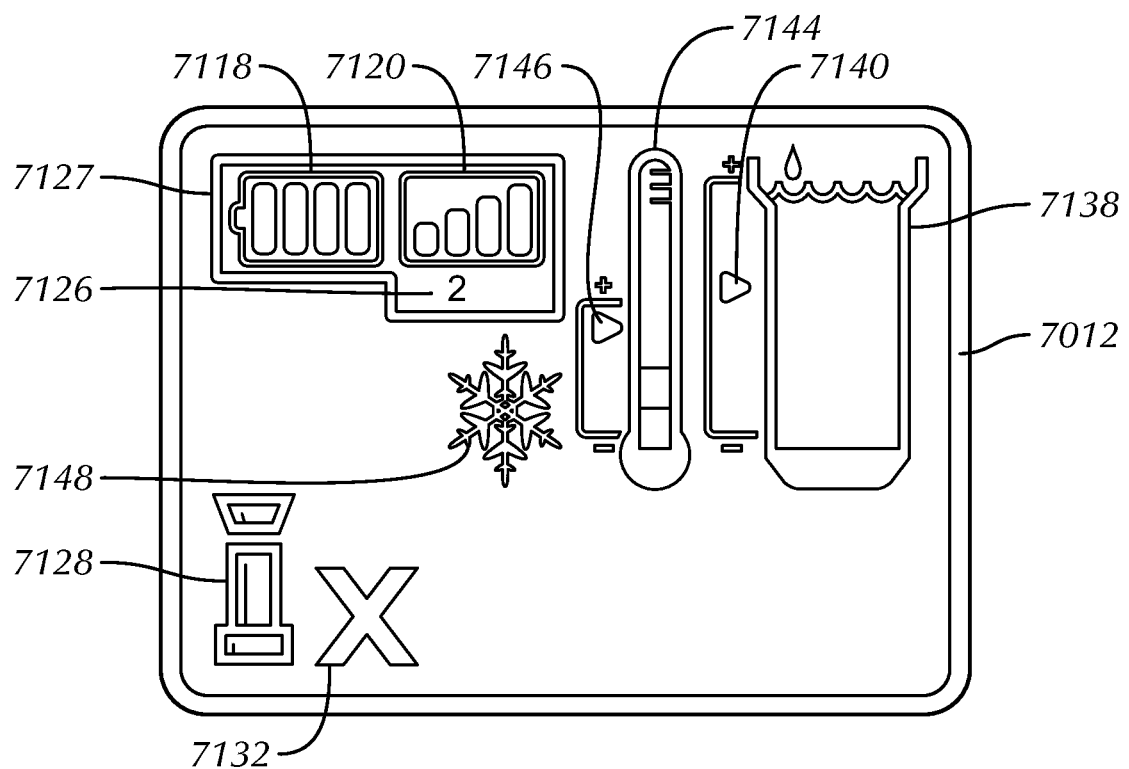
FIG. 76 illustrates an embodiment of the display of an interface unit when a sensed temperature falls below the temperature threshold while the sensed rainfall is below the rainfall threshold and a rain event is not identified, where the combination of representations convey to the user that the irrigation is interrupted.

FIG. 76 illustrates an embodiment of the display 7012 of the interface unit when the sensed temperature falls below the temperature threshold 7146 while the sensed rainfall is below the rainfall threshold 7140 and a rain event is not identified, where the combination of representations convey to the user that the irrigation is interrupted. As shown in FIG. 76, the sensed temperature, which in some instances is represented by one or more bars, within the temperature indicator 7144 is below the temperature threshold 7146. In response, the interface unit displays the temperature trip indicator 7148. As such, the interface unit in displaying the temperature trip indicator 7148 conveys that a freeze condition has been detected by the interface unit. It is noted that the freeze condition as used herein may be broadly referred to as a low temperature condition. That is, the low temperature condition may not strictly correspond to a freeze, but simply to a defined low temperature.

Since the interface unit has determined a freeze condition is occurring, the interface unit transitions to the halt irrigation mode and interrupts the irrigation of the irrigation controller 30. The interface unit additionally displays the interrupt indicator 7132 while not displaying the water spray indicator 7130 identifying to a user that the interface unit is inhibiting/interrupting irrigation. The interface unit, in some implementations, returns to the normal irrigation mode when the temperature sensed by the temperature indicator 7144 rises above the temperature threshold 7146. In some instances, the display further displays the battery remaining indicator 7118, signal strength indicator 7120 and sensor unit indicator 7126. In other instances, however, the battery remaining indicator 7118, signal strength indicator 7120 and sensor unit indicator 7126 may not be displayed.

Figure 77:
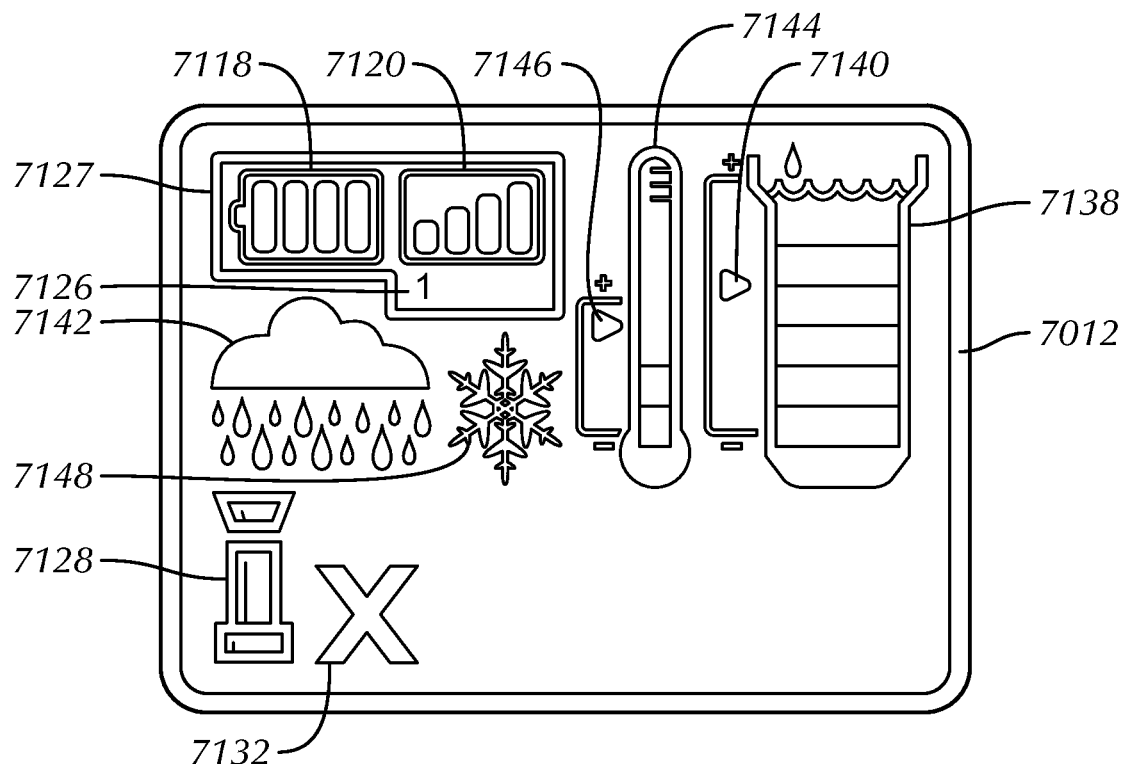
FIG. 77 illustrates an embodiment of the display of an interface unit when a sensed rainfall is above a rainfall threshold and a sensed temperature falls below a temperature threshold, where the combination of representations conveys to the user that the irrigation is interrupted.

FIG. 77 illustrates an embodiment of the display 7012 of the interface unit when the sensed rainfall is above the rainfall threshold 7140 and the sensed temperature falls below the temperature threshold 7146, where the combination of representations conveys to the user that the irrigation is interrupted. As shown in FIG. 77, the fill level within the rainfall indicator 7138 exceeds the rainfall threshold 7140 and the sensed temperature is below the temperature threshold 7146. In response, the interface unit displays both the rain trip indicator 7142 and the temperature trip indicator 7148. By displaying the rain trip indicator 7142 and the temperature trip indicator 7148, the interface unit conveys that a rain event and a freeze condition are occurring.

In response to detecting that either the rain event or the freeze condition is occurring, the interface unit transitions to the halt irrigation mode and interrupts the irrigation of the irrigation controller 30. The interface unit additionally displays the interrupt indicator 7132 while not displaying the water spray indicator 7130 identifying to a user that the interface unit is inhibiting/interrupting irrigation. Typically, the interface unit stays in the halt irrigation mode until both the temperature sensed by the temperature indicator 7144 rises above the temperature threshold 7146 and the sensed moisture level, as displayed by the rainfall indicator 7138, falls below the rainfall threshold 7140 (or in some instances falls below the rainfall threshold 7140 by a predetermined and/or user specified amount). Again, in some embodiments, the display further displays the battery remaining indicator 7118, signal strength indicator 7120 and sensor unit indicator 7126. In other instances, however, the battery remaining indicator 7118, signal strength indicator 7120 and sensor unit indicator 7126 may not be displayed.

Figure 78:
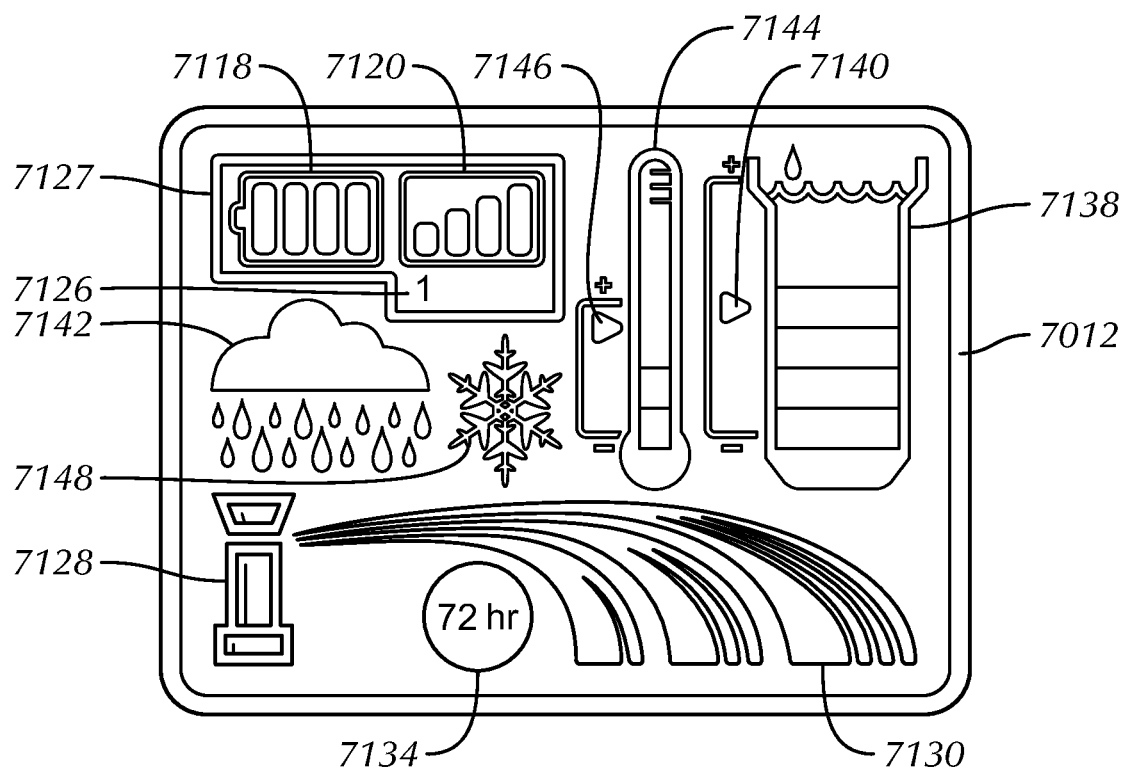
FIG. 78 illustrates an embodiment of the display of an interface unit where a combination of displayed representations informs a user that the interface unit is in a bypass rain/freeze mode with the sensed rainfall being above the rainfall threshold and the sensed temperature being below the temperature threshold.

FIG. 78 illustrates an embodiment of the display 7012 of the interface unit where the combination of displayed representations informs a user that the interface unit is in a bypass rain/freeze mode 4506 with the sensed rainfall being above the rainfall threshold 7140 and the sensed temperature being below the temperature threshold 7146. The interface unit enters the bypass rain/freeze mode through user selections. While in the bypass mode the override indicator 7134 is displayed in cooperation with the irrigation device indicator 7128 and the water spray indicator 7130, regardless of whether a rain event and/or freeze condition are detected, and conveys that the interface unit will continue to allow the irrigation controller 30 to irrigate during fair weather, rain, or when a low temperature condition (e.g., a freeze condition) is determined during the bypass rain/freeze mode.

In the example of FIG. 78, the displayed rainfall indicator 7138 shows that the rainfall exceeds the rainfall threshold 7140. In response to the sensed rainfall exceeding the rainfall threshold 7140 the rain trip indicator 7142 is displayed. By displaying the rain trip indicator 7142, the interface unit conveys that a rain event is occurring. The example in FIG. 78 further shows that the temperature indicator 7144 identifies that the sensed temperature is below the temperature threshold 7146. In response, the interface unit displays the temperature trip indicator 7148 to indicate to a user that a freeze condition has occurred.

When the interface unit is in the bypass rain/freeze mode 4506, however, the interface unit does not interrupt the irrigation schedule of the irrigation controller 30, even though the interface unit may determine that one or both of a rain event and freeze condition has occurred. Further, the interrupt indicator 7132 is not displayed and the sprayed water indicator 7130 is displayed. Thus, this displayed combination of pictorial representations conveys to the user that even though a rain event is occurring and/or a freeze condition is occurring irrigation is not going to be interrupted.

In some implementations, the interface unit terminates the bypass rain/freeze mode and no longer displays the override indicator 7134, and in some instances returns to normal irrigation mode 4502, after a given period of time. The given period of time can be predefined, selected by a user, defined by a user or otherwise identified. For example, the interface unit may be kept in the bypass rain/freeze mode 4506 for a predefined 72 hours in response to a user activating the bypass. Additionally or alternatively, the user may manually return the interface unit to normal irrigation mode 4502.

Some embodiments similarly provide a bypass rain mode 4504 that allows irrigation even though a rain event is detected. In the bypass rain mode and during a rain event the display 7012 displays the override indicator 7134 in cooperation with the irrigation device indicator 7128 and the water spray indicator 7130 even when a rain event is detected and while the rain trip indicator 7142 is displayed, which conveys to the user that the interface unit is in the bypass rain mode. During the bypass rain mode 4504, the interface unit does not interrupt the irrigation schedule and allows the irrigation controller to irrigate during fair weather, when it is raining and/or when the sensed moisture exceeds the rainfall threshold 7140. While in the bypass rain mode 4504, however, the interface unit will continue to interrupt irrigation when a low temperature condition (e.g., a "freeze" condition) is sensed, where the low temperature condition occurs when the sensed temperature falls below the temperature threshold 7146. The interface unit terminates the bypass rain mode and no longer displays the override indicator 7134, and in some instances returns to normal irrigation mode 4502, after a given period of time, which can be predefined, selected by a user, defined by a user or otherwise identified. For example, the interface unit may be kept in the bypass rain/freeze mode 4506 for a predefined 72 hours in response to a user activating the bypass. Additionally or alternatively, the interface unit may exit the bypass rain mode when the user manually returns the interface unit to normal irrigation mode 4502, or other such conditions.

In the event that the interface unit determined a freeze condition existed while in the bypass rain mode 4504, the interface unit would proceed to the halt irrigation mode 4508 and interrupt the irrigation controller 30. The interface unit would further display on the display 7012 the temperature trip indicator 7148 and the interrupt indicator 7132 while not displaying the water spray indicator 7130, similar to FIG. 76, conveying that the interface unit is in halt irrigation mode 4508 and interrupting irrigation.

Figure 79:
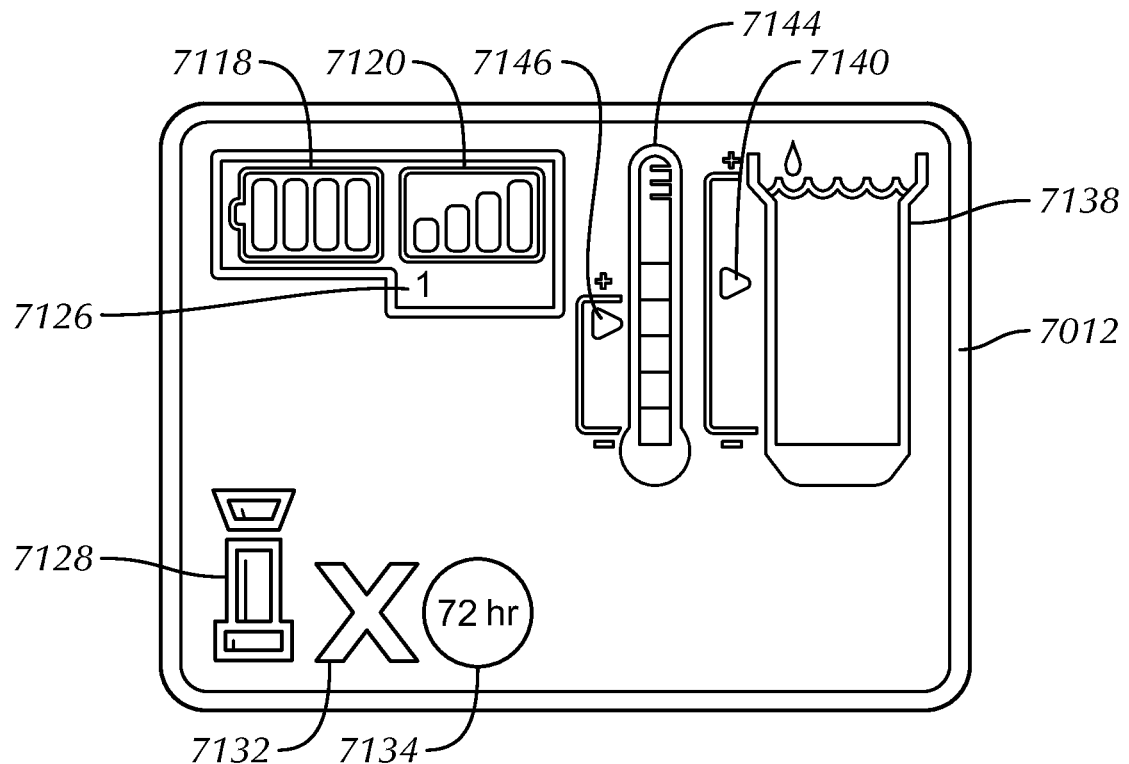
FIG. 79 illustrates an embodiment of the display of an interface unit with the combination of displayed representations conveying that the interface unit is in an override halt irrigation mode.

FIG. 79 illustrates an embodiment of the display 7012 of the interface unit with the combination of displayed representations conveying that the interface unit is in a user activated or override halt irrigation mode 4508 (also referred to as an interrupt irrigation mode). When the interface unit is in the halt irrigation mode 4508, the interface unit displays the representations of an irrigation device indicator 7128 without the sprayed water indicator 7130, the interrupt indicator 7132 and, in some instances, the override indicator 7134. Again, the interrupt indicator 7132 indicates that irrigation from the irrigation controller is to be interrupted, hence the absence of the sprayed water indicator 7130. The override indicator 7134 further conveys to a user that the interrupt is user induced. Additionally, in some embodiments, the override indicator 7134 identifies an amount of time scheduled for the interrupt and/or a remaining amount of time for the interrupt.

During the halt irrigation mode 4508, the interface unit interrupts irrigation from the irrigation controller 30. When the halt irrigation mode 4508 is triggered by a user, irrigation is interrupted regardless of the sensed weather conditions. The user may manually place the interface unit into the halt irrigation mode 4508 by selecting the mode (e.g., using the right arrow button 7004, the left arrow button 7006, the plus button 7008 and/or the minus button 7010). Again, the interface unit may enter into the halt irrigation mode 4508 from either the normal irrigation mode 4502 or the bypass modes, but in these instances the pictorial representations displayed are typically different (e.g., see FIGS. 75-77, where the override indicator 7134 is not shown). The interface unit returns to the normal irrigation mode 4502 when either the user manually returns the interface unit to the normal irrigation mode 4502, or automatically after a given time span. In some embodiments, the given time span is roughly three days or seventy-two hours.

In the example of FIG. 79, the display 7012 identifies through the display of the select representations that the interface unit is in a user induced halt irrigation mode while the sensed rainfall as shown in the rainfall indicator 7138 is below the rainfall threshold 7140 and the sensed temperature as shown in the temperature indicator 7144 is above the temperature threshold 7146, corresponding to fair weather conditions. No bars are displayed within the rainfall indicator 7138, indicating the sensor unit has not sensed any rainfall or moisture (or the sensed moisture is less than a threshold amount of moisture). For this example, since there is no sensed rainfall, the sensed rainfall falls below the rainfall threshold 7140, such that the rain trip indicator 7142 is not displayed. Similarly, the temperature indicator 7144 depicts that the sensed temperature is above the temperature threshold 7146, and as such the temperature trip indicator 7148 is not displayed. Again, the user induced halt irrigation mode allows the user to manually override the irrigation controller 30, for example, because of an event such as an outdoor gathering.

The above embodiments demonstrate that the interface unit provides users with information through easily recognizable and intuitive visual pictorial, graphical or other such representations or icons. These representations make it easier for users to understand what is going on with irrigation control as well as the conditions defining at least part of the control over the irrigation. Further, the graphical user interface typically does not display numerical values at least with respect to the rainfall indicator 7138, the rainfall threshold 7140, the temperature indicator 7144 and/or the temperature threshold 7146.

It is noted, as described above, that not all of the representations are required, and in some embodiments one or more of the representations may not be included and/or displayed, and/or one or more representations temporarily may not be displayed. For example, some embodiments may not include or display a temperature indicator 7144 and temperature threshold 7146, and thus would not display or include a temperature trip indicator 7148. This may result when the interface unit is not configured to take into consideration temperature information. In other embodiments, a temperature indicator 7144, temperature threshold 7146 and temperature trip indicator 7148 may not be displayed through the display 7012 when each of the one or more sensor units 12 in communication with the interface unit do not include a temperature sensor, and/or the interface unit does not otherwise receive temperature information. Similarly, in some implementations, the display 7012 may not display the rainfall indicator 7138, rainfall threshold 7140 and rain trip indicator 7142, such as when the interface unit is not cooperated with a sensor unit that can supply sensed moisture and/or rainfall information.

Additionally or alternatively, one or more of the representations that might typically be displayed in a certain mode temporarily may not be displayed. For example, one or more representations may not be displayed until a user interacts with the interface unit (e.g., by selecting one or more buttons, a touch screen or such other interaction). As a specific example, the battery remaining indicator 7118, signal strength indicator 7120, sensor unit indicator 7126 and/or pairing status indicator 7127 may not be displayed after a threshold amount of time after a most recent user interaction and be redisplayed upon subsequent user interaction with the interface unit. As another example, the battery remaining indicator 7118, signal strength indicator 7120, sensor unit indicator 7126 and/or pairing status indicator 7127 may not be displayed unless the user requests one or more of these representations be displayed through the selection of one or more buttons, and/or should a battery life fall below a threshold and/or a signal strength fall below a threshold. Similarly, in some instances, one or both the rainfall indicator 7138 and the temperature indicator 7144 may not be displayed (e.g., when there is not a rain event or a low temperature event detected). For example, rainfall indicator 7138 and the temperature indicator 7144 may not be displayed until and in response to detecting a rain event or a low temperature event, and/or detecting user interaction with the interface unit.

Further, some embodiments are configured to allow a user to define and store one or more user settings as at least part of a restore parameter setting or contractor setting. For example, a user upon setting up the interface unit with the desired thresholds (e.g., user set rainfall threshold and/or user set temperature threshold), the interface unit can be activated to store these parameters as the restore parameter settings. With the parameters stored as the restore parameter settings, the user can later restore the interface unit to these restore parameter settings, such as after the user changed the settings for a period of time (e.g., change the rainfall threshold as a result of a larger than expected amount of rainfall over a period of time) and/or other reasons. For example, the user can depress a specific combination of buttons on the user interface, such as simultaneously depressing the right arrow button 7004 and the plus button 7008 and holding these buttons for a preset period of time (e.g., 5 seconds), to cause the current parameter and/or threshold settings to be saved as the restore parameter settings.

Once saved, the restore parameter settings can be restored at a later time and in place of current parameters or thresholds that are different than those stored as the restore parameter settings. For example, to restore the restore parameter settings the user could depress a specific sequence of one or more of the buttons, such as simultaneously depressing both the plus button 7008 and minus button 7010 for a predefined period of time (e.g., 5 seconds). In some instances, factory settings or other default settings can additionally or alternatively be defined and/or used to rest the interface unit.

Figure 80A:
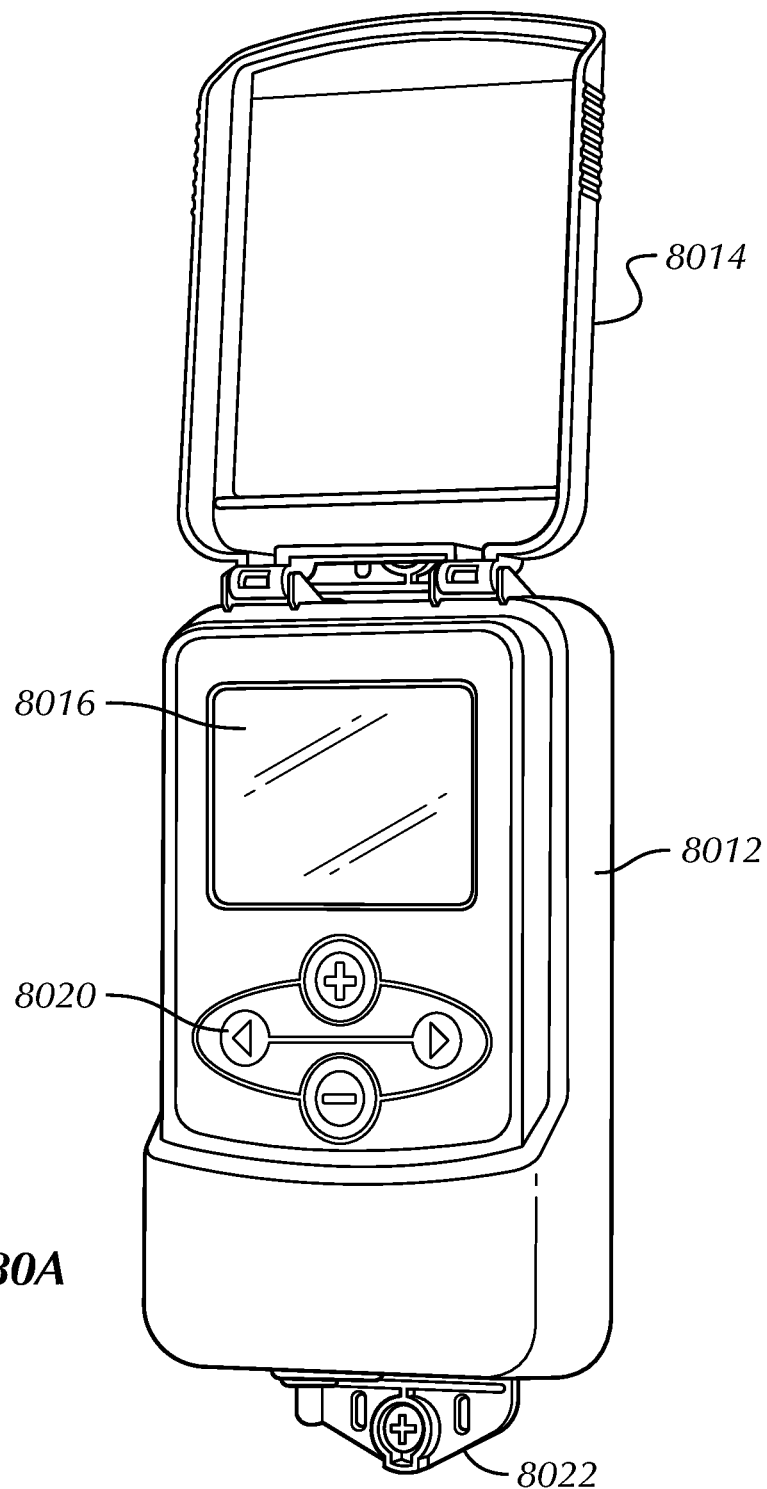
FIG. 80A depicts a perspective view of an interface unit in accordance with some embodiments.

FIG. 80A depicts a perspective view of an interface unit 14 in accordance with some embodiments. The interface unit 14 comprises a housing 8012 that houses the one or more microprocessors and wireless communication system. In some instances, the housing 8012 includes a lid or cover 8014. For example, the lid 8014 can be cooperated with the body of the housing through a hinge or other pivot. A display 8016 is included that displays the pictorial representations that provide the user with information and/or status of operation. One or more user input devices or buttons 8020 are included that allow the user to interact with the interface unit. Further, one or more mountings 8022 can be included that allow the interface unit 14 to be mounted on a wall, on a side of an irrigation controller or other such mounting, such as through one or more screws, nuts and bolts, or the like.

Figure 80B:
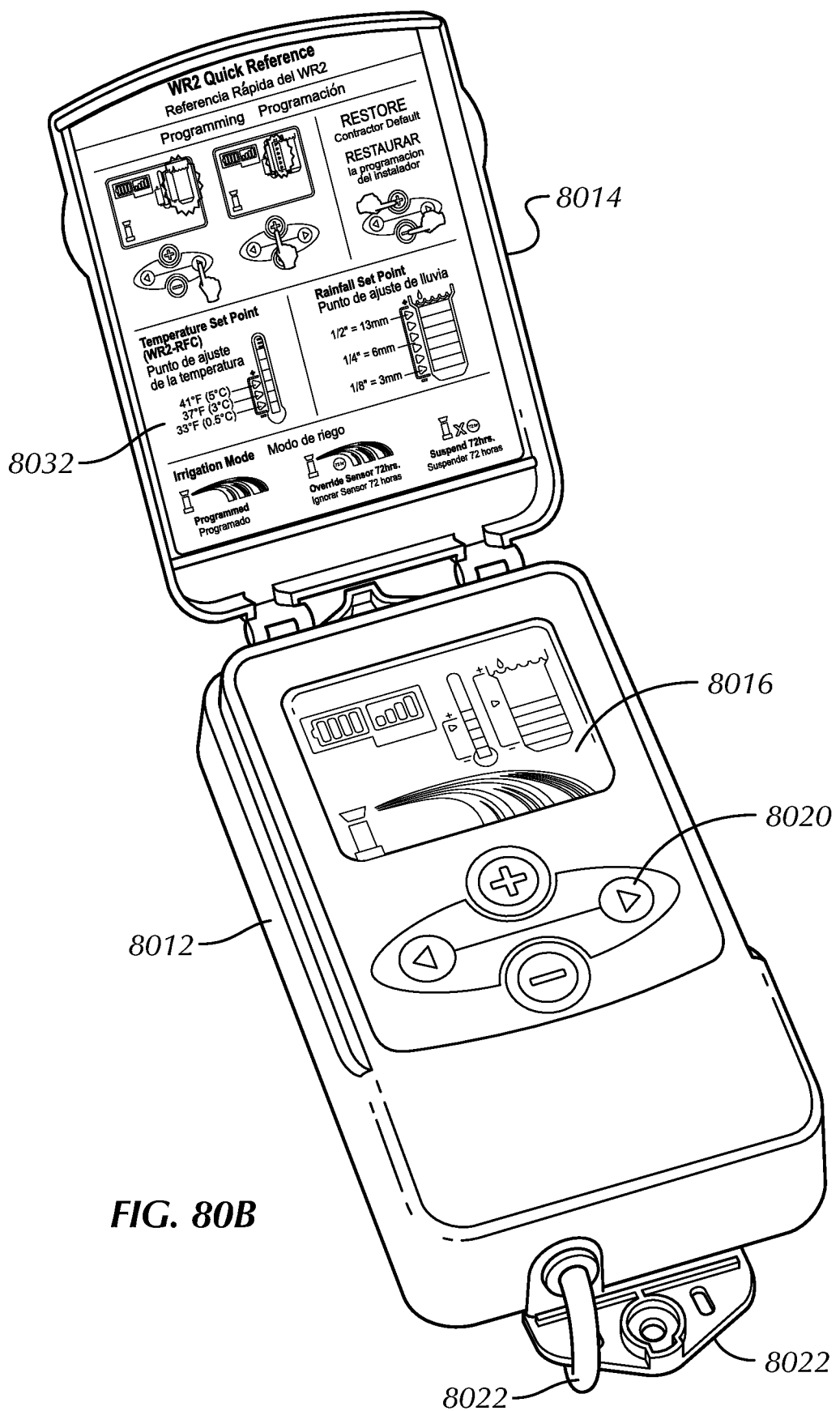
FIG. 80B depicts another perspective view of the interface unit of FIG. 80A.

FIG. 80B depicts another perspective view of the interface unit 14 of FIG. 80A. The display 8016 cooperated with the housing 8012 is shown displaying the graphical user interface that includes the one or more pictorial representations (e.g., the rainfall indicator 7138, the rainfall threshold 7140, the temperature indicator 7144, the temperature threshold 7146, and other pictorial representations when relevant, such as but not limited to the battery remaining indicator 7118, the signal strength indicator 7120, the irrigation device indicator 7128, the sprayed water indicator 7130, the rain trip indicator 7142, the temperature trip indicator 7148 and the like). Also illustrated is a communication link or wiring 8030. The communication link can cooperate with a separate switch or irrigation controller to interrupt irrigation.

Referring to FIGS. 80A-B, as described above, in many embodiments the graphical user interface does not display numeric values, at least with respect to the amount of accumulated rainfall, the rainfall indicator 7138, the rainfall threshold 7140, the sensed temperature, the temperature indicator 7144 and the temperature threshold 7146. Instead, the graphical user interface provides a graphical, pictorial representation that is readily understandable and easily visible. In some instances, some embodiments include printing, an insert or other information provided relative to the housing 8012 and/or lid 8014.

Figure 81:
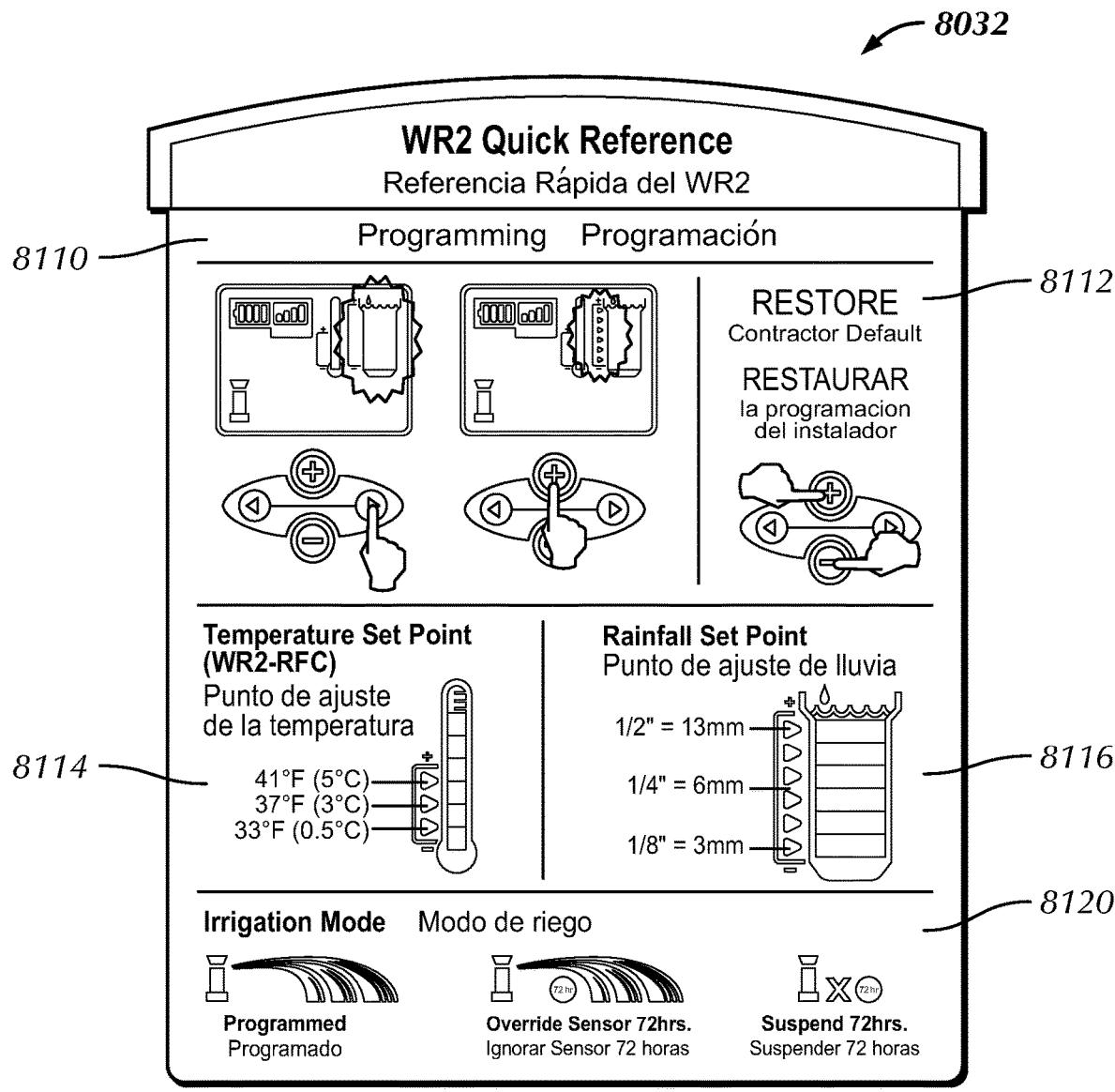
FIG. 81 depicts a simplified representation of an insert, in accordance with some embodiments, that can be cooperated with an interface unit, such as the interface unit of FIGS. 80A and 80B.

FIG. 81 depicts a simplified representation of an insert 8032, according to some embodiments, that can be cooperated with an interface unit, such as the interface unit of FIGS. 80A-B. Referring to FIGS. 80A-B and 81, for example, some embodiments include an insert 8032. The insert 8032, printing or the like can provide a user with information and/or instructions regarding setting and adjusting parameters and/or thresholds 8110, setting the restore parameter setting or contractor setting 8112, setting threshold parameters 8114, 8116, explanations of the pictorial representations 8120, and/or other information. Further, in some instances, the insert 8032 can provide numerical values corresponding to the different threshold settings and/or graphical depictions. For example, the insert 8032 can include one or more tables, listings or the like that identify the temperatures that correspond to the predefined number of settings for the temperature threshold 7146 (e.g., 41° F. (5° C.), 37° F. (3° C.), and 33° F. (0.5° C.)), the amounts of rainfall that correspond to the predefined number of settings for the rainfall threshold 7140 (e.g., between ⅛ inches (~33 mm) to ½ inches (~13 mm)), and/or other such numerical information.

Figure 82:
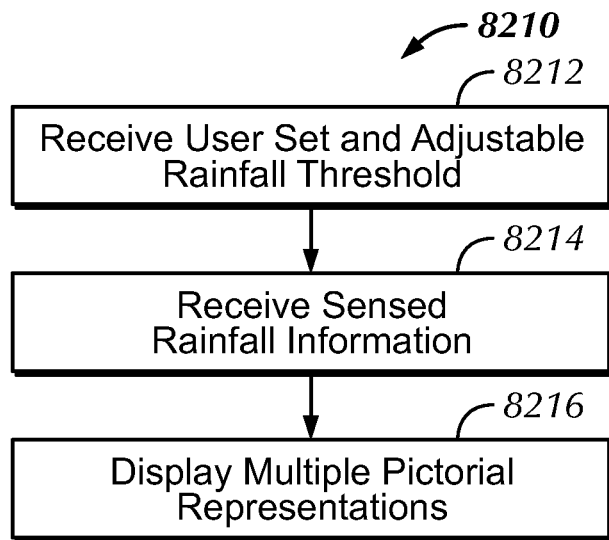
FIG. 82 depicts a simplified flow diagram of a process of controlling irrigation in accordance with some embodiments.

FIG. 82 depicts a simplified flow diagram of a process 8210 of controlling irrigation in accordance with some embodiments. In step 8212, a user set and adjustable rainfall threshold is received. Typically, the user set rainfall threshold is received through the user interface integrated with an interface unit or device 14, where the interface device is configured to use the rainfall threshold in determining whether to cause an interruption of one or more watering schedules executed by a separate irrigation controller.

In step 8214, sensed rainfall information is received at the interface device and from a remote sensor unit 12. In some embodiments, the remote sensor unit 12 is configured to periodically communicate the sensed data. In other instances, the sensor unit is configured to communicate the sensed data when the sensed amount of rainfall or change in temperature varies by a predefined amount. As described above, in some instances, the rainfall indicator 7138 displays an accumulated amount of rainfall. Accordingly, the sensor can include an accumulation sensor that measures an accumulated amount of rainfall and transmits data identifying the accumulated amount to the interface device. In step 8216, the interface device displays multiple pictorial representations corresponding to the sensed rainfall information and the user set and adjustable rainfall threshold such that a state of interrupting irrigation based at least on a relationship between the sensed rainfall information and the user set and adjustable rainfall threshold is conveyed.

Figure 83:
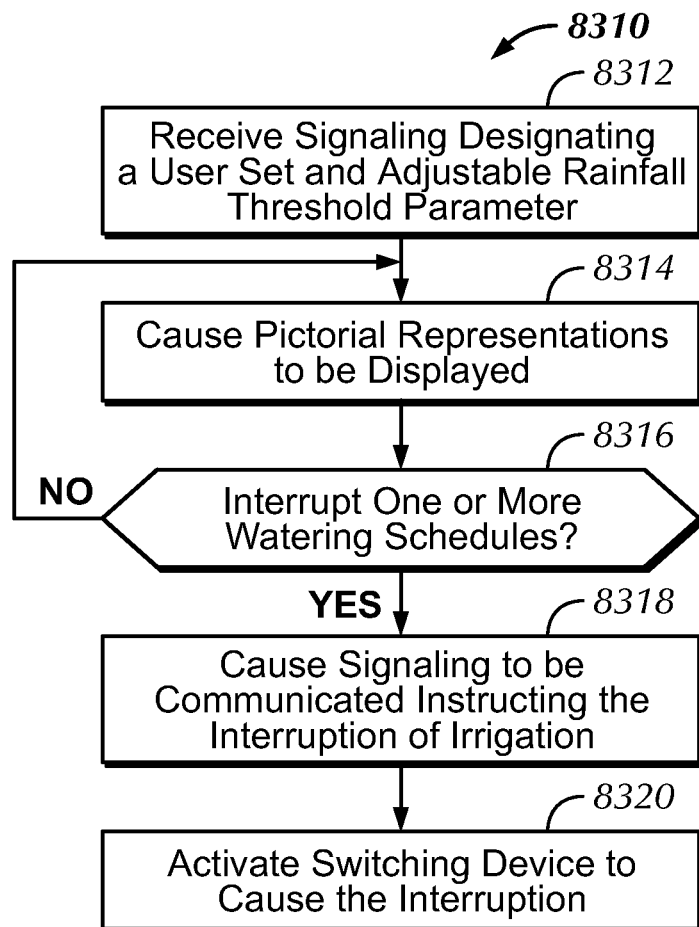
FIG. 83 depicts a simplified flow diagram of a process of setting parameters for use in controlling irrigation in accordance with some embodiments.

FIG. 83 depicts a simplified flow diagram of a process 8310 of setting parameters for use in controlling irrigation in accordance with some embodiments. In step 8312, signaling is received, through a plurality of user input devices of a user interface coupled with a controller and integrated with a housing of the interface unit 14, designating a user set and adjustable rainfall threshold parameter and locally storing the threshold at the interface unit. In step 8314, the controller causes one or more pictorial representations to be displayed on a user display. The plurality of pictorial representations are displayed in combination to convey to the user the sensed rainfall accumulation amount, the user set rainfall threshold parameter and whether irrigation is being interrupted.

In step 8316, it is determine, by the one or more controllers, whether an interruption of one or more watering schedules executed by the irrigation controller, which is separate from the interface unit, should occur. When it is determined that irrigation is not to be interrupted the process returns to step 8314 to continue to display the relevant pictorial representations. It is noted that in some instances the display may enter a sleep mode where none or less than all of the pictorial representations are not displayed. This sleep mode may temporarily display one or more of the pictorial representations (e.g., periodically). In other instances, a trigger may awaken the system out of the sleep mode to again display the pictorial representations.

Alternatively, when it is determined that irrigation is to be interrupted the process 8310 continues to step 8318 to cause signaling to be communicated instructing the interruption of irrigation. The interruption, in at least some implementations, is based at least on a sensed rainfall accumulation amount and the user set rainfall threshold parameter. In step 8320, a switching device coupled with the controller causes the interruption in response to the signaling irrigation from the controller to interrupt.

Some embodiments provide interface units that interface with an irrigation controller. These interface units comprise a housing; a controller within the housing, where the controller is adapted in part to interrupt an execution of one or more watering schedules implemented at an irrigation controller; a relay device coupled with the controller and the irrigation controller, where the relay device is adapted to cause an interruption of an execution of a watering schedule by the irrigation controller in response to signaling from the controller; and a user interface comprising: a plurality of user input devices coupled to the controller and adapted to provide signaling to the controller based upon a user's engagement therewith, the plurality of user input devices adapted to allow the user to define parameters used by the controller in determining whether to interrupt irrigation; and a user display coupled to the controller and adapted to display one or more pictorial representations, the user display comprising a display screen; wherein the controller is adapted to cause the user display to simultaneously display a plurality of pictorial representations that in combination convey to a user a mode of operation and whether irrigation is being interrupted.

Some implementations provide an interface unit that interfaces with an irrigation controller. The interface unit comprise: a housing; a controller within the housing, where the controller is adapted in part to interrupt an execution of one or more watering schedules implemented at an irrigation controller; a relay device coupled with the controller and the irrigation controller, where the relay device is adapted to cause an interruption of an execution of a watering schedule by the irrigation controller in response to signaling from the controller; and a user interface comprising: a plurality of user input devices coupled to the controller and adapted to provide signaling to the controller based upon a user's engagement therewith, the plurality of user input devices adapted to allow the user to define parameters used by the controller in determining whether to interrupt irrigation; and a user display coupled to the controller and adapted to display one or more pictorial representations, the user display comprising a display screen; wherein the controller is adapted to cause the user display to simultaneously display a plurality of pictorial representations, where the plurality of pictorial representations in combination convey to a user that irrigation is being interrupted and one or more reasons why irrigation is interrupted. In some instances the controller in being adapted to cause the user display to display the plurality of pictorial representations is adapted to cause the display to simultaneously display an interrupt indicator and to not display a water spray indicator, where the combination of the interrupt indicator and the lack of display of the water spray indicator convey to a user that the irrigation is interrupted.

Similarly, some embodiments provide an interface unit that interfaces with an irrigation controller. These embodiments comprise: a housing; a controller within the housing, where the controller is adapted in part to interrupt an execution of one or more watering schedules implemented at an irrigation controller; a relay device coupled with the controller and the irrigation controller, where the relay device is adapted to cause an interruption of an execution of a watering schedule by the irrigation controller in response to signaling from the controller; and a user interface comprising: a plurality of user input devices coupled to the controller and adapted to provide signaling to the controller based upon a user's engagement therewith, the plurality of user input devices adapted to allow the user to define parameters used by the controller in determining whether to interrupt irrigation; and a user display coupled to the controller and adapted to display one or more pictorial representations, the user display comprising a display screen; wherein the controller is adapted to cause the user display to simultaneously display a plurality of pictorial representations, where the plurality of pictorial representations in combination convey to a user that irrigation is being interrupted based on a user override.

Further, some embodiments provide interface units that interfaces with an irrigation controller, and comprise: a housing; a controller within the housing, where the controller is adapted in part to interrupt an execution of one or more watering schedules implemented at an irrigation controller; a relay device coupled with the controller and the irrigation controller, where the relay device is adapted to cause an interruption of an execution of a watering schedule by the irrigation controller in response to signaling from the controller; and a user interface comprising: a plurality of user input devices coupled to the controller and adapted to provide signaling to the controller based upon a user's engagement therewith, the plurality of user input devices adapted to allow the user to define parameters used by the controller in determining whether to interrupt irrigation; and a user display coupled to the controller and adapted to display one or more pictorial representations, the user display comprising a display screen; wherein the controller is adapted to cause the user display to simultaneously display a plurality of pictorial representations, where the plurality of pictorial representations in combination convey to a user that an interruption of irrigation is prevented based on a user override.

Additionally, some embodiments provide methods of controlling irrigation. These methods comprise: receiving from a remote sensor unit environmental information; determining, locally based on the received environmental information, whether to interrupt irrigation intended to be implemented by a separate irrigation controller implementing irrigation according to an irrigation schedule; and simultaneously displaying on a local display multiple pictorial representations, where the combination of the multiple pictorial representations conveys to a user a mode of operation and whether irrigation is being interrupted. In some instances, these methods may further interrupt irrigation; determine rainfall, determine whether to interrupt based on rainfall and display pictorial representations identifying that the interruption based on rainfall; determine temperature information, determine whether to interrupt based on the temperature information, and display pictorial representations identifying that the interruption is based on the temperature information; and/or determine whether to override interrupting irrigation and/or overriding irrigation and inducing interruptions.

Further embodiments provide methods of controlling irrigation. Some of these methods comprise: receiving from a remote sensor unit environmental information; determining, locally based on the received environmental information, whether to interrupt irrigation intended to be implemented by a separate and distinct irrigation controller implementing irrigation according to an irrigation schedule; and simultaneously displaying on a local display multiple pictorial representations, where the combination of the multiple pictorial representations conveys to a user that irrigation is being interrupted and one or more reasons why irrigation is interrupted in response to determining to interrupt irrigation.

Some embodiments provide methods of providing notifications of operating status in controlling irrigation. These methods comprise: determining a current state of operation in allowing or interrupting irrigation as implemented by a separate and remote irrigation controller implementing the irrigation in accordance with an irrigation schedule; and simultaneously displaying, on a local display that is not part of and is separate from the irrigation controller, multiple pictorial representations based on the determined current state of operation, where the combination of the multiple pictorial representations conveys to a user the current state of operation and whether irrigation is interrupted.

In some embodiments, a method is provided for use in controlling irrigation. These methods comprise: receiving a user defined rainfall parameter; receiving, from a remote sensor, rainfall information; and displaying, in response to the rainfall information, a plurality of pictorial representations corresponding to the rainfall information and a state of interrupting irrigation based on a relationship between the rainfall information and the user defined rainfall parameter.

Additionally or alternatively, some embodiments provide methods of controlling irrigation. Some of these methods comprise: receiving a user defined temperature parameter; receiving, from a remote sensor, temperature information; and displaying, in response to the temperature information, a plurality of pictorial representations corresponding to the temperature information and a state of interrupting irrigation based on a relationship between the temperature information and the user defined temperature parameter.

Some embodiments comprise a processor; and a memory that stores executable program code, wherein the processor is configured to execute the executable program code to: receive from a remote sensor unit environmental information; determine, locally based on the received environmental information, whether to interrupt irrigation intended to be implemented by a separate irrigation controller implementing irrigation according to an irrigation schedule; and simultaneously display on a local display multiple pictorial representations, where the combination of the multiple pictorial representations conveys to a user a mode of operation and whether irrigation is being interrupted. In some instances, these methods may further interrupt irrigation; determine rainfall, determine whether to interrupt based on rainfall and display pictorial representations identifying that the interruption based on rainfall; determine temperature information, determine whether to interrupt based on the temperature information, and display pictorial representations identifying that the interruption is based on the temperature information; and/or determine whether to override interrupting irrigation and/or overriding irrigation and inducing interruptions.

Similarly, some embodiments comprise a processor; and a memory that stores executable program code, wherein the processor is configured to execute the executable program code to: receive from a remote sensor unit environmental information; determine, locally based on the received environmental information, whether to interrupt irrigation intended to be implemented by a separate and distinct irrigation controller implementing irrigation according to an irrigation schedule; and simultaneously display on a local display multiple pictorial representations, where the combination of the multiple pictorial representations conveys to a user that irrigation is being interrupted and one or more reasons why irrigation is interrupted in response to determining to interrupt irrigation.

Some embodiments comprise a processor; and a memory that stores executable program code, wherein the processor is configured to execute the executable program code to: determine a current state of operation in allowing or interrupting irrigation as implemented by a separate and remote irrigation controller implementing the irrigation in accordance with an irrigation schedule; and simultaneously display, on a local display that is not part of and is separate from the irrigation controller, multiple pictorial representations based on the determined current state of operation, where the combination of the multiple pictorial representations conveys to a user the current state of operation and whether irrigation is interrupted.

Further embodiments comprise a processor; and a memory that stores executable program code, wherein the processor is configured to execute the executable program code to: receive a user defined rainfall parameter; receive, from a remote sensor, rainfall information; and display, in response to the rainfall information, a plurality of pictorial representations corresponding to the rainfall information and a state of interrupting irrigation based on a relationship between the rainfall information and the user defined rainfall parameter.

Additionally, some embodiments comprise a processor; and a memory that stores executable program code, wherein the processor is configured to execute the executable program code to: receive a user defined temperature parameter; receive, from a remote sensor, temperature information; and display, in response to the temperature information, a plurality of pictorial representations corresponding to the temperature information and a state of interrupting irrigation based on a relationship between the temperature information and the user defined temperature parameter.

Several embodiments provide an interface unit interfacing with an irrigation controller, where the interface unit comprises: a housing; a controller within the housing, where the controller is adapted in part to interrupt an execution of one or more watering schedules implemented at an irrigation controller; a relay device coupled with the controller and the irrigation controller, where the relay device is adapted to cause an interruption of an execution of a watering schedule by the irrigation controller in response to signaling from the controller; and a user interface comprising: a plurality of user input devices coupled to the controller and adapted to provide signaling to the controller based upon a user's engagement therewith, the plurality of user input devices adapted to allow the user to define parameters used by the controller in determining whether to interrupt irrigation; and a user display coupled to the controller and adapted to display one or more pictorial representations, the user display comprising a display screen; wherein the controller is adapted to cause the user display to simultaneously display a plurality of pictorial representations that in combination convey to a user a mode of operation and whether irrigation is being interrupted.

In some embodiments, the invention can be characterized as a method of controlling irrigation, comprising: receiving a user defined rainfall threshold; receiving, from a remote sensor, rainfall information; and displaying, in response to the rainfall information, multiple pictorial representations corresponding to the rainfall information and a state of interrupting irrigation based on a relationship between the rainfall information and the user defined rainfall threshold.

In another embodiment, the invention can be characterized as an irrigation controller comprising: a housing; a controller within the housing, where the controller is adapted to implement irrigation according to one or more watering schedules and further adapted to interrupt irrigation; activation lines each coupled to a valve to activate the one or more valves as instructed by the controller in accordance with the one more irrigation schedules implemented by the controller; and a user interface comprising: a plurality of user input devices coupled to the controller and adapted to provide signaling to the controller based upon a user's engagement therewith, the plurality of user input devices adapted to allow the user to define parameters used by the controller in determining whether to interrupt irrigation; and a user display coupled to the controller and adapted to display one or more pictorial representations, the user display comprising a display screen; wherein the controller is adapted to cause the user display to simultaneously display a plurality of pictorial representations, where the plurality of pictorial representations in combination convey to a user that irrigation is being interrupted and one or more reasons why irrigation is interrupted.

Some embodiments provide an interface unit comprising: a housing; a controller within the housing configured to interrupt execution of a watering schedule implemented at an irrigation controller; a relay device configured to cause an interruption of a watering schedule in response to signaling from the controller; and a user interface comprising: a plurality of user input devices configured to provide signaling to the controller based upon a user's engagement therewith, and configured to allow the user to define parameters used by the controller in determining whether to interrupt irrigation; and a user display configured to display one or more pictorial representations, the user display comprising a display screen; the controller is configured to cause the user display to simultaneously display a plurality of pictorial representations in combination convey to a user a mode of operation and whether irrigation is being interrupted.

Further, some embodiments provide irrigation controllers that comprise: a housing; a controller within the housing, where the controller is configured to implement irrigation according to one or more watering schedules and further configured to cause an interruption of the irrigation; activation lines each coupled to a valve to activate the one or more valves as instructed by the controller in accordance with the one more irrigation schedules implemented by the controller; and a user interface comprising: a plurality of user input devices coupled to the controller and configured to provide signaling to the controller based upon a user's engagement therewith, the plurality of user input devices configured to allow the user to define at least the user entered temperature threshold parameter and the user entered rainfall threshold parameter; and a user display comprising a display screen and coupled to the controller and configured to display one or more pictorial representations; wherein the controller is configured to cause the display screen to display a plurality of pictorial representations, where the plurality of pictorial representations in combination convey to the user that the irrigation is being interrupted and one or more reasons why irrigation is interrupted.

Furthermore, at least some of these irrigation controllers can further comprise: a receiver coupled with the controller, wherein the receiver is configured to receive a communication from a remote sensor, where the communication comprises sensed rainfall information; and the controller is configured to: receive the sensed rainfall information and determine, at the controller and based on the sensed rainfall information, whether a rainfall threshold has been exceeded; and cause the interruption of the irrigation schedule when the rainfall threshold has been exceeded; and wherein the controller in being configured to cause the display screen to display the plurality of pictorial representations is configured to cause the display screen to display, in response to determining that the rainfall threshold has been exceeded, an interrupt indicator and a rain indicator, wherein the combination of the interrupt indicator and the rain indicator conveys to a user that the irrigation is interrupted based on the sensed rainfall information. Additionally, in some implementations the communication from the remote sensor comprises sensed temperature information; and the controller is configured to: receive the sensed temperature information and determine, at the controller, whether a sensed temperature is below a temperature threshold; and cause the interruption of the irrigation schedule when the sensed temperature is below the temperature threshold; wherein the controller in being configured to cause the display screen to display the plurality of pictorial representations is configured to cause the display screen to display a temperature indicator in response to determining that the sensed temperature is below the temperature threshold, wherein a combination of the interrupt indicator, the rain indicator and the temperature indicator conveys to the user that the irrigation is interrupted based on the sensed rainfall information and the sensed temperature information.

Reference throughout this specification to "one embodiment," "an embodiment," "some embodiments," or similar language means that a particular feature, structure, or characteristic described in connection with the embodiment is included in at least one embodiment of the present invention. Thus, appearances of the phrases "in one embodiment," "in an embodiment," "in some embodiments" and similar language throughout this specification may, but do not necessarily, all refer to the same embodiment.

While the invention herein disclosed has been described by means of specific embodiments, examples and applications thereof, numerous modifications and variations could be made thereto by those skilled in the art without departing from the scope of the invention set forth in the claims.

What is claimed is:

1. An interface unit interfacing with an irrigation controller that is separate from the interface unit, the interface unit comprising:
    a housing;
    a control unit within the housing, where the control unit is configured to,
    based on signaling received from a rain sensor, detect active rainfall and an absence of rain,
        the rain sensor including a moisture absorptive material configured to expand in response to the contact with the rainfall and contract in response to the absence of the rain;
        the signaling received from the rain sensor by the interface unit including data corresponding to a variable amount of expansion and contraction of the moisture absorptive material of the rain sensor; and
    determine, based on an analysis of the data corresponding to the variable amount of expansion and contraction of the moisture absorptive material of the rain sensor received by the interface unit in the signaling from the rain sensor by the interface unit, whether an interruption of one or more watering schedules executed by the irrigation controller should occur; and
    output signaling to instruct the interruption, the interruption being based on a determination by the control unit that the data corresponding to the variable amount of expansion and contraction of the moisture absorptive material of the rain sensor received by the interface unit in the signaling from the rain sensor indicates that a sensed rainfall accumulation amount is above a predefined rainfall accumulation threshold parameter, the interruption being for an interval of time after a detection of a sensed stop of the rainfall; and
    a switching device configured to cause the interruption in response to the signaling from the control unit.

2. The interface unit of claim 1, further comprising a user interface including at least one user input device coupled to the control unit and configured to provide signaling to the control unit based upon a user's engagement therewith, the at least one user input devices configured to allow the user to set and adjust at least the user set rainfall threshold parameter, the at least one user input device including a display screen;
    wherein the control unit is configured to cause the display screen of the at least one user input device to display to the user at least one of the sensed rainfall accumulation amount, the predefined rainfall accumulation threshold parameter and whether irrigation is being interrupted.

3. The interface unit of claim 2,
    wherein the display screen of the at least one user input device is configured to display one or more pictorial representations; and
    wherein the control unit is configured to cause the display screen of the at least one user input device to display a plurality of pictorial representations that in combination convey to the user the at least one of the sensed rainfall accumulation amount, the predefined rainfall accumulation threshold parameter, and whether irrigation is being interrupted; and
    wherein the control unit in being configured to cause the display screen of the at least one user input device to display the plurality of pictorial representations is configured to cause the display screen of the at least one user input device to simultaneously display the plurality of the pictorial representations.

4. The interface unit of claim 2,
    wherein the display screen of the at least one user input device is configured to display one or more pictorial representations; and
    wherein the control unit is configured to cause the display screen of the at least one user input device to display a plurality of pictorial representations that in combination convey to the user the at least one of the sensed rainfall accumulation amount, the predefined rainfall accumulation threshold parameter, and whether irrigation is being interrupted; and
    further comprising:
    a receiver coupled with the control unit, wherein the receiver is configured to receive a communication from a remote sensor, where the communication comprises data indicating the sensed rainfall accumulation amount above the predefined rainfall accumulation threshold parameter; and
    the control unit is configured to:
        receive the data indicating that the sensed rainfall accumulation amount exceeds the predefined rainfall accumulation threshold parameter; and
        communicate the signaling to cause the switching device, when it is determined by the control unit that the data indicating the sensed rainfall accumulation amount exceeds the predefined rainfall accumulation threshold parameter, to cause the interruption;
    wherein the control unit in being configured to cause the display screen of the at least one user input device to display the plurality of pictorial representations is configured to cause the display screen of the at least one user input device to display an interrupt indicator and a rain indicator in response to a determination by the control unit that the sensed rainfall accumulation amount exceeds the predefined rainfall accumulation threshold parameter,
    wherein the combination of the interrupt indicator and the rain indicator conveys to the user that the irrigation is interrupted based on the sensed start of rainfall.

5. The interface unit of claim 4, wherein the control unit is configured in part to instruct the interruption of the one or more watering schedules executed by the irrigation controller based on a user set interval of time of the interruption after the sensed stop of the rainfall; and
wherein the plurality of user input devices are configured to allow the user to set and adjust the interval of time of the interruption after the sensed stop of the rainfall.

6. The interface unit of claim 5, wherein the control unit in being configured to cause the display screen of the at least one user input device to display the plurality of pictorial representations is configured to cause the display screen of the at least one user input device to not display a water spray indicator such that the combination of the interrupt indicator and the lack of the display of the water spray indicator conveys to the user that the irrigation is being interrupted, and the combination of the interrupt indicator, the lack of the display of the water spray indicator and the rain indicator conveys to the user that the irrigation is interrupted based on the sensed rainfall accumulation amount being above the predefined rainfall accumulation threshold parameter.

7. The interface unit of claim 6, wherein the control unit in being configured to communicate the signaling to cause the switching device to cause the interruption is further configured such that the signaling communicated by the control unit to cause the switching device to cause the interruption is not communicated to the irrigation controller.

8. The interface unit of claim 5, wherein the control unit in being configured to cause the display screen of the at least one user input device to display the plurality of pictorial representations is configured to cause the display screen of the at least one user input device to display, based on the sensed rainfall accumulation amount, a rainfall indicator that depicts a graphical representation of the sensed rainfall accumulation amount.

9. The interface unit of claim 2,
wherein the display screen of the at least one user input device is configured to display one or more pictorial representations; and
wherein the control unit is configured to cause the display screen of the at least one user input device to display a plurality of pictorial representations that convey to the user the sensed rainfall accumulation amount and wherein the pictorial representations that convey to the user the sensed rainfall accumulation amount include a graphical representation comprising one or more displayed bars dependent on the sensed rainfall accumulation amount with a greater number of bars being displayed as the sensed rainfall accumulation amount increases.

10. The interface unit of claim 2,
wherein the display screen of the at least one user input device is configured to display one or more pictorial representations; and
wherein the control unit is configured to cause the display screen of the at least one user input device to display a plurality of pictorial representations that in combination convey to the user the at least one of the sensed rainfall accumulation amount, the predefined rainfall accumulation threshold parameter, and whether irrigation is being interrupted; and
wherein the control unit in being configured to cause the display screen of the at least one user input device to display the plurality of pictorial representations is configured to cause the display screen of the at least one user input device to display an interrupt indicator and to not display a water spray indicator such that the combination of the interrupt indicator and a lack of the display of the water spray indicator conveys to the user that the irrigation is being interrupted.

11. The interface unit of claim 2,
wherein the display screen of the at least one user input device is configured to display one or more pictorial representations; and
wherein the control unit is configured to cause the display screen of the at least one user input device to display a plurality of pictorial representations that in combination convey to the user the at least one of the sensed rainfall accumulation amount, the predefined rainfall accumulation threshold parameter, and whether irrigation is being interrupted; and
wherein the control unit is configured to cause the display screen of the at least one user input device to display the plurality of pictorial representations that in combination convey to a user a mode of operation and whether irrigation is being interrupted.

12. The interface unit of claim 1, wherein the interval of time of the interruption after the sensed stop of the rainfall, is predefined by being programmed into the control unit.

13. The interface unit of claim 1, wherein the interval of time of the interruption after the sensed stop of the rainfall is selected from one of 48 hours and 72 hours.

14. The interface unit of claim 1,
wherein the display screen of the at least one user input device is configured to display one or more pictorial representations; and
wherein the control unit is configured to cause the display screen of the at least one user input device to display a plurality of pictorial representations that in combination convey to the user the at least one of the sensed rainfall accumulation amount, the predefined rainfall accumulation threshold parameter, and whether irrigation is being interrupted; and
wherein the control unit in being configured to cause the display screen of the at least one user input device to display a plurality of pictorial representations is configured to cause the display screen of the at least one user input device to display a countdown of a remainder of time left on the interval of time of the interruption after the sensed stop of the rainfall.

15. The interface unit of claim 1, wherein the control unit is configured to output signaling to instruct a reset of the interval of time after the sensed stop of the rainfall, in response to a sensed start of another rainfall.

16. A method for use in irrigation control, the method comprising:
receiving, from a rain sensor, signaling indicating one of a sensed rainfall accumulation amount and a sensed stop of rainfall at a user interface integrated with an interface device including a control unit,
the rain sensor including a moisture absorptive material configured to expand in response to the contact with the rainfall and contract in response to the absence of the rain,
the signaling received from the rain sensor including data corresponding to a variable amount of expansion and contraction of the moisture absorptive material of the rain sensor;
causing, via the interface device and based on an analysis by the control unit of the data corresponding to the variable amount of expansion and contraction of the moisture absorptive material of the rain sensor received by the interface unit in the signaling from the rain sensor, an interruption of one or more watering schedules executed by an irrigation controller that is separate from the interface unit, the interruption being based on a determination by the control unit that the data corresponding to the variable amount of expansion and contraction of the moisture absorptive material of the rain sensor received by the interface unit in the signaling from the rain sensor indicates that the sensed rainfall accumulation amount is above a predefined rainfall accumulation threshold parameter, the interruption being for an interval of time after the sensed stop of the rainfall; and receiving, at the interface device, an interval of time for the interruption of one or more watering schedules executed by the irrigation controller after the sensed stop of the rainfall.

17. The method of claim 16, further comprising displaying, on a display of at least one user input device coupled to the interface device, at least one of the sensed rainfall accumulation amount, the predefined rainfall accumulation threshold parameter, and whether irrigation is being interrupted, such that a state of interrupting irrigation based at least on a relationship between the sensed rainfall accumulation amount and the predefined rainfall accumulation threshold parameter is conveyed to a user via the display of the at least one user input device.

18. The method of claim 17, wherein the receiving, at the interface device, an interval of time for the interruption of one or more watering schedules executed by the irrigation controller after the sensed stop of the rainfall further comprises one of:

receiving a user input from the at least one user input device, the user input specifying the interval of time of the interruption after the sensed stop of the rainfall; and programming the control unit to define the interval of time of the interruption after the sensed stop of the rainfall.

19. The method of claim 17, wherein the displaying step further comprises displaying a countdown of a remainder of time left on the interval of time of the interruption after the sensed stop of the rainfall.

20. The method of claim 16, wherein the receiving the interval of time for interruption after the sensed stop of the rainfall further comprises receiving the interval of time of the interruption after the sensed stop of the rainfall preset to one of 48 hours and 72 hours.

21. The method of claim 16, wherein the receiving the interval of time for interruption after the sensed stop of the rainfall further comprises resetting the interval of time after the sensed stop of the rainfall, in response to a sensed start of another rainfall.

\* \* \* \* \*